US012316838B2

(12) United States Patent
Sun et al.

(10) Patent No.: US 12,316,838 B2
(45) **Date of Patent: *May 27, 2025**

(54) SYSTEM AND METHOD FOR VIDEO CODING

(71) Applicant: Panasonic Intellectual Property Corporation of America, Torrance, CA (US)

(72) Inventors: Hai Wei Sun, Singapore (SG); Chong Soon Lim, Singapore (SG); Jing Ya Li, Singapore (SG); Han Boon Teo, Singapore (SG); Che-Wei Kuo, Singapore (SG); Chu Tong Wang, Singapore (SG); Tadamasa Toma, Osaka (JP); Takahiro Nishi, Nara (JP); Kiyofumi Abe, Osaka (JP); Yusuke Kato, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,452

(22) Filed: Apr. 5, 2024

(65) Prior Publication Data

US 2024/0275963 A1 Aug. 15, 2024

Related U.S. Application Data

(63) Continuation of application No. 17/992,833, filed on Nov. 22, 2022, now Pat. No. 12,022,072, which is a (Continued)

(51) Int. Cl.

*H04N 19/117* (2014.01)
*H04N 19/132* (2014.01)

(Continued)

(52) U.S. Cl.

CPC ......... *H04N 19/117* (2014.11); *H04N 19/132* (2014.11); *H04N 19/186* (2014.11); *H04N 19/82* (2014.11)

(58) Field of Classification Search

CPC .................................................... H04N 19/117

(Continued)

(56) References Cited

U.S. PATENT DOCUMENTS

| | | | |
|---|---|---|---|
| 9,025,675 | B2 | 5/2015 | Sadafale |
| 9,313,505 | B2 | 4/2016 | Horowitz |

(Continued)

FOREIGN PATENT DOCUMENTS

| | | | |
|---|---|---|---|
| EP | 3720129 | A1 | 10/2020 |
| WO | WO 2018070914 | A1 | 4/2018 |
| WO | WO 2019107994 | A1 | 6/2019 |

OTHER PUBLICATIONS

Hu et al., "CE5-related: Dynamic range reduction for coefficients of cross component adaptive loop filter," JVET-P0555-v2, Joint Video Experts Team (JVET) of ITU-T SG 16 WP 3 and ISO/IEC JTC 1/SC 29/WG 11, 16th Meeting: Geneva, Switzerland, Oct. 1-11, 2019. (7 pages).

(Continued)

*Primary Examiner* — Amir Shahnami
(74) *Attorney, Agent, or Firm* — Seed IP Law Group LLP

(57) ABSTRACT

An encoder includes circuitry and memory coupled to the circuitry. The circuitry, in operation, generates a first coefficient value by applying a CCALF (cross component adaptive loop filtering) process to a first reconstructed image sample of a luma component, generates a second coefficient value by applying an ALF (adaptive loop filtering) process to a second reconstructed image sample of a chroma component, and clips the second coefficient value. The circuitry generates a third coefficient value by adding the first coef- (Continued)

ficient value to the clipped second coefficient value, and clips the third coefficient value. The circuitry encodes a third reconstructed image sample of the chroma component using the clipped third coefficient value.

2 Claims, 173 Drawing Sheets

Related U.S. Application Data continuation of application No. 17/582,937, filed on Jan. 24, 2022, now Pat. No. 11,546,590, which is a continuation of application No. PCT/JP2020/030512, filed on Aug. 7, 2020.

(60) Provisional application No. 62/884,420, filed on Aug. 8, 2019.

(51) Int. Cl.
*H04N 19/186* (2014.01)
*H04N 19/82* (2014.01)

(58) Field of Classification Search
USPC .................................................... 375/240.02
See application file for complete search history.

(56) References Cited

U.S. PATENT DOCUMENTS

| | | | | |
|---|---|---|---|---|
| 10,419,757 | B2 | 9/2019 | Chen et al. | |
| 11,115,671 | B2 | 9/2021 | Kuo et al. | |
| 11,197,030 | B2 | 12/2021 | Li et al. | |
| 11,234,010 | B2 | 1/2022 | Hu et al. | |
| 11,438,613 | B2 | 9/2022 | Xu et al. | |
| 11,496,734 | B2 | 11/2022 | Nam et al. | |
| 11,528,508 | B2 | 12/2022 | Wang et al. | |
| 11,546,590 | B2 | 1/2023 | Sun et al. | |
| 11,546,591 | B2 | 1/2023 | Li et al. | |
| 2011/0228841 | A1 | 9/2011 | Suzuki et al. | |
| 2011/0274158 | A1 | 11/2011 | Fu et al. | |
| 2012/0183081 | A1 | 7/2012 | Liu et al. | |
| 2014/0198840 | A1 | 7/2014 | Huang et al. | |
| 2018/0063527 | A1 | 3/2018 | Chen et al. | |
| 2018/0220138 | A1 | 8/2018 | He et al. | |
| 2018/0295364 | A1 | 10/2018 | Liu et al. | |
| 2018/0359480 | A1 | 12/2018 | Xiu et al. | |
| 2020/0329239 | A1 | 10/2020 | Hsiao et al. | |
| 2021/0218962 | A1* | 7/2021 | Lim | H04N 19/1883 |
| 2021/0297680 | A1 | 9/2021 | Wang et al. | |
| 2021/0360238 | A1 | 11/2021 | Chen et al. | |
| 2022/0182641 | A1 | 6/2022 | Nam et al. | |
| 2022/0201294 | A1 | 6/2022 | Nam et al. | |

OTHER PUBLICATIONS

International Search Report and Written Opinion, mailed Nov. 11, 2020, for International Application No. PCT/JP2020/030507. (19 pages).

International Search Report, mailed Dec. 2, 2020, for International Patent Application No. PCT/JP2020/034381. (4 pages).

International Search Report, mailed Nov. 11, 2020, for International Application No. PCT/JP2020/030512, 4 pages.

Li et al., "AHG16/Non-CE5: Cross component ALF simplification," JVET-P0173-v1, Joint Video Experts Team (JVET) of ITU-T SG 16 WP 3 and ISO/IEC JTC 1/SC 29/WG 11, 16th Meeting: Geneva, Switzerland, Oct. 1-11, 2019. (9 pages).

Li et al., "Non-SCE4: Simplification of chroma enhancement for inter layer reference picture generation," Joint Collaborative Team on Video Coding (JCT-VC) of ITU-T SG 16 WP 3 and ISO/IEC JTC 1/SC 29/WG 11, Document: JCTVC-M0253, 13th Meeting: Incheon, KR, Apr. 18-26, 2013. (4 pages).

Ma et al., "CE5-related: Joint clip operation for CCALF and chroma ALF," JVET-Q0494_r1, Joint Video Experts Team (JVET) of ITU-T SG 16 WP 3 and ISO/IEC JTC 1/SC 29/WG 11, 17th Meeting: Brussels, Belgium, Jan. 7-17, 2020. (3 pages).

Misra et al., "CE5-Related: Reducing multiplier count in CCALF," Joint Video Experts Team (JVET) of ITU-T SG 16 WP 3 and ISO/IEC JTC 1/SC 29/WG 11, Document: JVET-P0468-v3, 16th Meeting: Geneva, CH, Oct. 1-11, 2019. (5 pages).

Misra et al., "Cross-Component Adaptive Loop Filter for chroma," JVET-00636_rl, Joint Video Experts Team (JVET) of ITU-T SG 16 WP 3 and ISO/IEC JTC 1/SC 29/WG 11, 15th Meeting: Gothenburg, Sweden, Jul. 3-12, 2019, 9 pages.

Notice of Allowance, mailed Oct. 3, 2022, for U.S. Appl. No. 17/667,871. (13 pages).

Office Action, issued Dec. 6, 2023, for U.S. Appl. No. 18/071,370. (13 pages).

Office Action, issued Nov. 21, 2023, for U.S. Appl. No. 18/071,365. (10 pages).

Panusopone et al., "CCALF Coefficient Derivation Using Combined Neighbors," 2020 IEEE International Conference on Image Processing (ICIP), Abu Dhabi, United Arab Emirates, Oct. 25-28, 2020, 4 pages.

Taquet et al., "Non-Linear Adaptive Loop Filter," Joint Video Experts Team (JVET) of ITU-T SG 16 WP 3 and ISO/IEC JTC 1/SC 29/WG 11, Document: JVET-M0385, 13th Meeting: Marrakech, MA, Jan. 9-18, 2019. (5 pages).

USPTO Library, "NPL search query," Jul. 16, 2022. (3 pages).

Zhang et al., "CE5-related: On the CC-ALF filtering process," Joint Video Experts Team (JVET) of ITU-T SG 16 WP 3 and ISO/IEC JTC 1/SC 29/WG 11, Document: JVET-Q0165-v1, 17th Meeting: Brussels, BE, Jan. 7-17, 2020. (7 pages).

* cited by examiner

| TRANSFORM TYPE | BASIS FUNCTION $T_i(j)$, $i, j = 0, 1, \ldots, N-1$ |
|---|---|
| DCT - II | $T_i(j) = \omega_0 \cdot \sqrt{\frac{2}{N}} \cdot \cos\left(\frac{\pi \cdot i \cdot (2j+1)}{2N}\right)$ WHERE $\omega_0 = \begin{cases} \sqrt{\frac{2}{N}} & i = 0 \\ 1 & i \neq 0 \end{cases}$ |
| DCT - V | $T_i(j) = \omega_0 \cdot \omega_1 \cdot \sqrt{\frac{2}{2N-1}} \cdot \cos\left(\frac{2\pi \cdot i \cdot j}{2N-1}\right)$ WHERE $\omega_0 = \begin{cases} \sqrt{\frac{2}{N}} & i = 0 \\ 1 & i \neq 0 \end{cases}, \omega_1 = \begin{cases} \sqrt{\frac{2}{N}} & j = 0 \\ 1 & j \neq 0 \end{cases}$ |
| DCT - VIII | $T_i(j) = \sqrt{\frac{4}{2N+1}} \cdot \cos\left(\frac{\pi \cdot (2i+1) \cdot (2j+1)}{4N+2}\right)$ |
| DST - I | $T_i(j) = \sqrt{\frac{2}{N+1}} \cdot \sin\left(\frac{\pi \cdot (i+1) \cdot (j+1)}{N+1}\right)$ |
| DST - VII | $T_i(j) = \sqrt{\frac{4}{2N+1}} \cdot \sin\left(\frac{\pi \cdot (2i+1) \cdot (j+1)}{2N+1}\right)$ |

*FIG. 14*

| Index | 1 | 2 | 3 | 4 | 5 | 6 | 7 |
|---|---|---|---|---|---|---|---|
| \|w\| | 1/4 | 1/2 | 3/4 | 1 | 4 | 2 | 4/3 |

FIG. 23G $$q'0 = (p1 + 2 \times p0 + 2 \times q0 + 2 \times q1 + q2 + 4) / 8$$

$$q'1 = (p0 + q0 + q1 + q2 + 2) / 4$$

$$q'2 = (p0 + q0 + q1 + 3 \times q2 + 2 \times q3 + 4) / 8$$

| CONDITIONS FOR BLOCKS P AND Q LOCATED ACROSS BOUNDARY FOR WHICH $B_S$ VALUE IS TO BE DETERMINED | $B_S$ VALUES |
|---|---|
| · AT LEAST ONE OF THE BLOCKS IS INTRA PREDICTION BLOCK | 2 |
| · AT LEAST ONE OF THE BLOCKS INCLUDES NON-ZERO TRANSFORM COEFFICIENT AND HAS A SIDE WHICH COINCIDES WITH BOUNDARY BETWEEN ORTHOGONAL TRANSFORM BLOCKS | 1 |
| · ABSOLUTE VALUE OF DIFFERENCE BETWEEN MOTION VECTORS OF THE TWO BLOCKS ACROSS BOUNDARY CORRESPONDS TO ONE OR MORE PIXELS | 1 |
| · REFERENCE IMAGES FOR MOTION COMPENSATION OF THE TWO BLOCKS ACROSS BOUNDARY OR THE NUMBERS OF MOTION VECTORS OF THE TWO BLOCKS ARE DIFFERENT | 1 |
| · THE OTHERS | 0 |

*FIG. 27*

| MV DERIVATION MODE | | MOTION INFORMATION | MV DIFFERENCE |
|---|---|---|---|
| INTER MODE | | ○ | ○ |
| MERGE MODE | OTHER THAN MMVD MODE | ○ | × |
| | MMVD MODE | ○ | △ |
| FRUC MODE | | × | × |

| |
|---|
| adaptation_parameter_set_rbsp(){ |
| ... |
| alf_data(); |
| .... |
| } |

Wherein,

| |
|---|
| alf_data(){ |
| ... |
| for ( j = 0; j < NumClipIdx; j++ ) |
| **ccalf_luma_clip_idx[j]** |
| .... |
| } |

Clip(−range_array[ccalf_luma_clip_idx[j], range_array[ccalf_luma_clip_idx[j], value)

(ii)

| |
|---|
| adaptation_parameter_set_rbsp(){ |
| ... |
| alf_data(); |
| .... |
| } |

Wherein,

| |
|---|
| alf_data(){ |
| ... |
| for ( j = 0; j < NumClipIdx; j++ ) |
| **ccalf_luma_clip_low_range[j]** |
| **ccalf_luma_clip_up_range[j]** |
| .... |
| } |

Clip(~ccalf_luma_clip_low_range[j], ccalf_luma_clip_up_range, value)

(iii)

| |
|---|
| adaptation_parameter_set_rbsp(){ |
| ... |
| alf_data(); |
| .... |
| } |

Wherein,

| |
|---|
| alf_data(){ |
| ... |
| for ( j = 0; j < NumClipIdx; j++ ) |
| **ccalf_luma_clip_range[j]** |
| .... |
| } |

Clip(~ccalf_luma_clip_range[j], ccalf_luma_clip_range, value)

```
adaptation_parameter_set_rbsp(){
    …
    alf_data();
    …,
}
```

Wherein,

```
alf_data(){
    …
    NumCoeff = if (4:2:0) ? 14 : 7
    for ( j = 0; j < NumCoeff; j++ )
        … // paring coefficients
    …,
}
```

(ii)

```
adaptation_parameter_set_rbsp(){
    …
    alf_data();
    …,
}
```

Wherein,

```
alf_data(){
    …
    NumCoeff = if (YCbCr) ? 14 : 7
    for ( j = 0; j < NumCoeff; j++ )
        … // paring coefficients
    …,
}
```

(iii)

```
adaptation_parameter_set_rbsp(){
    …
    alf_data();
    …,
}
```

Wherein,

```
alf_data(){
    …
    NumCoeff = if (use Cb information to modify Cr) ? 7 : 14
    for ( j = 0; j < NumCoeff; j++ )
        … // paring coefficients
    …,
}
```

(iv)

```
adaptation_parameter_set_rbsp(){
    …
    alf_data();
    …,
}
```

Wherein,

```
alf_data(){
    …
    NumCoeff = if (8K) ? 26 : 14
    for ( j = 0; j < NumCoeff; j++ )
        … // paring coefficients
    …,
}
```

FIG. 122

Example of ALF luma filter equation

– The variable sum is derived as follows:

$$
\begin{aligned}
sum = f[\,idx[\,0\,]\,] &* (\ \mathrm{Clip3}(\,-c[\,idx[\,0\,]\,],\ c[\,idx[\,0\,]\,],\ recPicture_L[\,h_x,\ v_{y+r3}\,] - curr\,) + \\
&\quad \mathrm{Clip3}(\,-c[\,idx[\,0\,]\,],\ c[\,idx[\,0\,]\,],\ recPicture_L[\,h_x,\ v_{y-r3}\,] - curr\,)\,) + \\
f[\,idx[\,1\,]\,] &* (\ \mathrm{Clip3}(\,-c[\,idx[\,1\,]\,],\ c[\,idx[\,1\,]\,],\ recPicture_L[\,h_{x+1},\ v_{y+r2}\,] - curr\,) + \\
&\quad \mathrm{Clip3}(\,-c[\,idx[\,1\,]\,],\ c[\,idx[\,1\,]\,],\ recPicture_L[\,h_{x-1},\ v_{y-r2}\,] - curr\,)\,) + \\
f[\,idx[\,2\,]\,] &* (\ \mathrm{Clip3}(\,-c[\,idx[\,2\,]\,],\ c[\,idx[\,2\,]\,],\ recPicture_L[\,h_x,\ v_{y+r2}\,] - curr\,) + \\
&\quad \mathrm{Clip3}(\,-c[\,idx[\,2\,]\,],\ c[\,idx[\,2\,]\,],\ recPicture_L[\,h_x,\ v_{y-r2}\,] - curr\,)\,) + \\
f[\,idx[\,3\,]\,] &* (\ \mathrm{Clip3}(\,-c[\,idx[\,3\,]\,],\ c[\,idx[\,3\,]\,],\ recPicture_L[\,h_{x-1},\ v_{y+r2}\,] - curr\,) + \\
&\quad \mathrm{Clip3}(\,-c[\,idx[\,3\,]\,],\ c[\,idx[\,3\,]\,],\ recPicture_L[\,h_{x+1},\ v_{y-r2}\,] - curr\,)\,) + \\
f[\,idx[\,4\,]\,] &* (\ \mathrm{Clip3}(\,-c[\,idx[\,4\,]\,],\ c[\,idx[\,4\,]\,],\ recPicture_L[\,h_{x+2},\ v_{y+r1}\,] - curr\,) + \\
&\quad \mathrm{Clip3}(\,-c[\,idx[\,4\,]\,],\ c[\,idx[\,4\,]\,],\ recPicture_L[\,h_{x-2},\ v_{y-r1}\,] - curr\,)\,) + \\
f[\,idx[\,5\,]\,] &* (\ \mathrm{Clip3}(\,-c[\,idx[\,5\,]\,],\ c[\,idx[\,5\,]\,],\ recPicture_L[\,h_{x+1},\ v_{y+r1}\,] - curr\,) + \\
&\quad \mathrm{Clip3}(\,-c[\,idx[\,5\,]\,],\ c[\,idx[\,5\,]\,],\ recPicture_L[\,h_{x-1},\ v_{y-r1}\,] - curr\,)\,) + \\
f[\,idx[\,6\,]\,] &* (\ \mathrm{Clip3}(\,-c[\,idx[\,6\,]\,],\ c[\,idx[\,6\,]\,],\ recPicture_L[\,h_x,\ v_{y+r1}\,] - curr\,) + \\
&\quad \mathrm{Clip3}(\,-c[\,idx[\,6\,]\,],\ c[\,idx[\,6\,]\,],\ recPicture_L[\,h_x,\ v_{y-r1}\,] - curr\,)\,) + \\
f[\,idx[\,7\,]\,] &* (\ \mathrm{Clip3}(\,-c[\,idx[\,7\,]\,],\ c[\,idx[\,7\,]\,],\ recPicture_L[\,h_{x-1},\ v_{y+r1}\,] - curr\,) + \\
&\quad \mathrm{Clip3}(\,-c[\,idx[\,7\,]\,],\ c[\,idx[\,7\,]\,],\ recPicture_L[\,h_{x+1},\ v_{y-r1}\,] - curr\,)\,) + \\
f[\,idx[\,8\,]\,] &* (\ \mathrm{Clip3}(\,-c[\,idx[\,8\,]\,],\ c[\,idx[\,8\,]\,],\ recPicture_L[\,h_{x-2},\ v_{y+r1}\,] - curr\,) + \\
&\quad \mathrm{Clip3}(\,-c[\,idx[\,8\,]\,],\ c[\,idx[\,8\,]\,],\ recPicture_L[\,h_{x+2},\ v_{y-r1}\,] - curr\,)\,) + \\
f[\,idx[\,9\,]\,] &* (\ \mathrm{Clip3}(\,-c[\,idx[\,9\,]\,],\ c[\,idx[\,9\,]\,],\ recPicture_L[\,h_{x+3},\ v_y\,] - curr\,) + \\
&\quad \mathrm{Clip3}(\,-c[\,idx[\,9\,]\,],\ c[\,idx[\,9\,]\,],\ recPicture_L[\,h_{x-3},\ v_y\,] - curr\,)\,) + \\
f[\,idx[\,10\,]\,] &* (\ \mathrm{Clip3}(\,-c[\,idx[\,10\,]\,],\ c[\,idx[\,10\,]\,],\ recPicture_L[\,h_{x+2},\ v_y\,] - curr\,) + \\
&\quad \mathrm{Clip3}(\,-c[\,idx[\,10\,]\,],\ c[\,idx[\,10\,]\,],\ recPicture_L[\,h_{x-2},\ v_y\,] - curr\,)\,) + \\
f[\,idx[\,11\,]\,] &* (\ \mathrm{Clip3}(\,-c[\,idx[\,11\,]\,],\ c[\,idx[\,11\,]\,],\ recPicture_L[\,h_{x+1},\ v_y\,] - curr\,) + \\
&\quad \mathrm{Clip3}(\,-c[\,idx[\,11\,]\,],\ c[\,idx[\,11\,]\,],\ recPicture_L[\,h_{x-1},\ v_y\,] - curr\,)\,)
\end{aligned} \tag{8-1187}
$$

$$
sum = curr + (\,(\,sum + 64\,) \gg 7\,) \tag{8-1188}
$$

Example of ALF chroma filter equation

– The variable sum is derived as follows:

$$
\begin{aligned}
sum = f[\,0\,] &* (\ \mathrm{Clip3}(\,-c[\,0\,],\ c[\,0\,],\ recPicture[\,h_x,\ v_{y+r2}\,] - curr\,) + \\
&\quad \mathrm{Clip3}(\,-c[\,0\,],\ c[\,0\,],\ recPicture[\,h_x,\ v_{y-r2}\,] - curr\,)\,) + \\
f[\,1\,] &* (\ \mathrm{Clip3}(\,-c[\,1\,],\ c[\,1\,],\ recPicture[\,h_{x+1},\ v_{y+r1}\,] - curr\,) + \\
&\quad \mathrm{Clip3}(\,-c[\,1\,],\ c[\,1\,],\ recPicture[\,h_{x-1},\ v_{y-r1}\,] - curr\,)\,) + \\
f[\,2\,] &* (\ \mathrm{Clip3}(\,-c[\,2\,],\ c[\,2\,],\ recPicture[\,h_x,\ v_{y+r1}\,] - curr\,) + \\
&\quad \mathrm{Clip3}(\,-c[\,2\,],\ c[\,2\,],\ recPicture[\,h_x,\ v_{y-r1}\,] - curr\,)\,) + \\
f[\,3\,] &* (\ \mathrm{Clip3}(\,-c[\,3\,],\ c[\,3\,],\ recPicture[\,h_{x-1},\ v_{y+r1}\,] - curr\,) + \\
&\quad \mathrm{Clip3}(\,-c[\,3\,],\ c[\,3\,],\ recPicture[\,h_{x+1},\ v_{y-r1}\,] - curr\,)\,) + \\
f[\,4\,] &* (\ \mathrm{Clip3}(\,-c[\,4\,],\ c[\,4\,],\ recPicture[\,h_{x+2},\ v_y\,] - curr\,) + \\
&\quad \mathrm{Clip3}(\,-c[\,4\,],\ c[\,4\,],\ recPicture[\,h_{x-2},\ v_y\,] - curr\,)\,) + \\
f[\,5\,] &* (\ \mathrm{Clip3}(\,-c[\,5\,],\ c[\,5\,],\ recPicture[\,h_{x+1},\ v_y\,] - curr\,) + \\
&\quad \mathrm{Clip3}(\,-c[\,5\,],\ c[\,5\,],\ recPicture[\,h_{x-1},\ v_y\,] - curr\,)\,)
\end{aligned} \tag{8-1238}
$$

$$
sum = curr + (\,sum + 64\,) \gg 7\,) \tag{8-1239}
$$

FIG. 127

Example of ALF luma filter equation

- The variable sum is derived as follows:

$$
\begin{aligned}
sum = f[\,idx[\,0\,]\,] * (\; & Clip3(\,-c[\,idx[\,0\,]\,], c[\,idx[\,0\,]\,], recPicture_L[\,h_x, v_{y+r3}\,] - curr\,) + \\
& Clip3(\,-c[\,idx[\,0\,]\,], c[\,idx[\,0\,]\,], recPicture_L[\,h_x, v_{y-r3}\,] - curr\,)\,) + \\
f[\,idx[\,1\,]\,] * (\; & Clip3(\,-c[\,idx[\,1\,]\,], c[\,idx[\,1\,]\,], recPicture_L[\,h_{x+1}, v_{y+r2}\,] - curr\,) + \\
& Clip3(\,-c[\,idx[\,1\,]\,], c[\,idx[\,1\,]\,], recPicture_L[\,h_{x-1}, v_{y-r2}\,] - curr\,)\,) + \\
f[\,idx[\,2\,]\,] * (\; & Clip3(\,-c[\,idx[\,2\,]\,], c[\,idx[\,2\,]\,], recPicture_L[\,h_x, v_{y+r2}\,] - curr\,) + \\
& Clip3(\,-c[\,idx[\,2\,]\,], c[\,idx[\,2\,]\,], recPicture_L[\,h_x, v_{y-r2}\,] - curr\,)\,) + \\
f[\,idx[\,3\,]\,] * (\; & Clip3(\,-c[\,idx[\,3\,]\,], c[\,idx[\,3\,]\,], recPicture_L[\,h_{x-1}, v_{y+r2}\,] - curr\,) + \\
& Clip3(\,-c[\,idx[\,3\,]\,], c[\,idx[\,3\,]\,], recPicture_L[\,h_{x+1}, v_{y-r2}\,] - curr\,)\,) + \\
f[\,idx[\,4\,]\,] * (\; & Clip3(\,-c[\,idx[\,4\,]\,], c[\,idx[\,4\,]\,], recPicture_L[\,h_{x+2}, v_{y+r1}\,] - curr\,) + \\
& Clip3(\,-c[\,idx[\,4\,]\,], c[\,idx[\,4\,]\,], recPicture_L[\,h_{x-2}, v_{y-r1}\,] - curr\,)\,) + \\
f[\,idx[\,5\,]\,] * (\; & Clip3(\,-c[\,idx[\,5\,]\,], c[\,idx[\,5\,]\,], recPicture_L[\,h_{x+1}, v_{y+r1}\,] - curr\,) + \\
& Clip3(\,-c[\,idx[\,5\,]\,], c[\,idx[\,5\,]\,], recPicture_L[\,h_{x-1}, v_{y-r1}\,] - curr\,)\,) + \\
f[\,idx[\,6\,]\,] * (\; & Clip3(\,-c[\,idx[\,6\,]\,], c[\,idx[\,6\,]\,], recPicture_L[\,h_x, v_{y+r1}\,] - curr\,) + \\
& Clip3(\,-c[\,idx[\,6\,]\,], c[\,idx[\,6\,]\,], recPicture_L[\,h_x, v_{y-r1}\,] - curr\,)\,) + \qquad (8\text{-}1187) \\
f[\,idx[\,7\,]\,] * (\; & Clip3(\,-c[\,idx[\,7\,]\,], c[\,idx[\,7\,]\,], recPicture_L[\,h_{x-1}, v_{y+r1}\,] - curr\,) + \\
& Clip3(\,-c[\,idx[\,7\,]\,], c[\,idx[\,7\,]\,], recPicture_L[\,h_{x+1}, v_{y-r1}\,] - curr\,)\,) + \\
f[\,idx[\,8\,]\,] * (\; & Clip3(\,-c[\,idx[\,8\,]\,], c[\,idx[\,8\,]\,], recPicture_L[\,h_{x-2}, v_{y+r1}\,] - curr\,) + \\
& Clip3(\,-c[\,idx[\,8\,]\,], c[\,idx[\,8\,]\,], recPicture_L[\,h_{x+2}, v_{y-r1}\,] - curr\,)\,) + \\
f[\,idx[\,9\,]\,] * (\; & Clip3(\,-c[\,idx[\,9\,]\,], c[\,idx[\,9\,]\,], recPicture_L[\,h_{x+3}, v_y\,] - curr\,) + \\
& Clip3(\,-c[\,idx[\,9\,]\,], c[\,idx[\,9\,]\,], recPicture_L[\,h_{x-3}, v_y\,] - curr\,)\,) + \\
f[\,idx[\,10\,]\,] * (\; & Clip3(\,-c[\,idx[\,10\,]\,], c[\,idx[\,10\,]\,], recPicture_L[\,h_{x+2}, v_y\,] - curr\,) + \\
& Clip3(\,-c[\,idx[\,10\,]\,], c[\,idx[\,10\,]\,], recPicture_L[\,h_{x-2}, v_y\,] - curr\,)\,) + \\
f[\,idx[\,11\,]\,] * (\; & Clip3(\,-c[\,idx[\,11\,]\,], c[\,idx[\,11\,]\,], recPicture_L[\,h_{x+1}, v_y\,] - curr\,) + \\
& Clip3(\,-c[\,idx[\,11\,]\,], c[\,idx[\,11\,]\,], recPicture_L[\,h_{x-1}, v_y\,] - curr\,)\,)
\end{aligned}
$$

$$sum = curr + (\,(\,sum + 64\,) >> 7\,) \qquad (8\text{-}1188)$$

Example of ALF chroma filter equation

- The variable sum is derived as follows:

$$
\begin{aligned}
sum = f[\,0\,] * (\; & Clip3(\,-c[\,0\,], c[\,0\,], recPicture[\,h_x, v_{y+r2}\,] - curr\,) + \\
& Clip3(\,-c[\,0\,], c[\,0\,], recPicture[\,h_x, v_{y-r2}\,] - curr\,)\,) + \\
f[\,1\,] * (\; & Clip3(\,-c[\,1\,], c[\,1\,], recPicture[\,h_{x+1}, v_{y+r1}\,] - curr\,) + \\
& Clip3(\,-c[\,1\,], c[\,1\,], recPicture[\,h_{x-1}, v_{y-r1}\,] - curr\,)\,) + \\
f[\,2\,] * (\; & Clip3(\,-c[\,2\,], c[\,2\,], recPicture[\,h_x, v_{y+r1}\,] - curr\,) + \\
& Clip3(\,-c[\,2\,], c[\,2\,], recPicture[\,h_x, v_{y-r1}\,] - curr\,)\,) + \qquad (8\text{-}1238) \\
f[\,3\,] * (\; & Clip3(\,-c[\,3\,], c[\,3\,], recPicture[\,h_{x-1}, v_{y+r1}\,] - curr\,) + \\
& Clip3(\,-c[\,3\,], c[\,3\,], recPicture[\,h_{x+1}, v_{y-r1}\,] - curr\,)\,) + \\
f[\,4\,] * (\; & Clip3(\,-c[\,4\,], c[\,4\,], recPicture[\,h_{x+2}, v_y\,] - curr\,) + \\
& Clip3(\,-c[\,4\,], c[\,4\,], recPicture[\,h_{x-2}, v_y\,] - curr\,)\,) + \\
f[\,5\,] * (\; & Clip3(\,-c[\,5\,], c[\,5\,], recPicture[\,h_{x+1}, v_y\,] - curr\,) + \\
& Clip3(\,-c[\,5\,], c[\,5\,], recPicture[\,h_{x-1}, v_y\,] - curr\,)\,)
\end{aligned}
$$

$$sum = curr + (\,sum + 64\,) >> 7\,) \qquad (8\text{-}1239)$$

SYSTEM AND METHOD FOR VIDEO CODING

BACKGROUND

Technical Field

This disclosure relates to video coding, and particularly to video encoding and decoding systems, components, and methods in video coding and decoding, such as for performing a CCALF (cross component adaptive loop filtering) process.

Description of the Related Art

With advancements in video coding technology, from H.261 and MPEG-1 to H.264/AVC (Advanced Video Coding), MPEG-LA, H.265/HEVC (High Efficiency Video Coding) and H.266/VVC (Versatile Video Codec), there remains a constant need to provide improvements and optimizations to the video coding technology to process an ever-increasing amount of digital video data in various applications. This disclosure relates to further advancements, improvements and optimizations in video coding, particularly in a CCALF (cross component adaptive loop filtering) process.

BRIEF SUMMARY

According to one aspect, an encoder is provided which includes circuitry and memory coupled to the circuitry. The circuitry, in operation, generates a first coefficient value by applying a CCALF (cross component adaptive loop filtering) process to a first reconstructed image sample of a luma component. The circuitry generates a second coefficient value by applying an ALF (adaptive loop filtering) process to a second reconstructed image sample of a chroma component, and clips the second coefficient value. The circuitry generates a third coefficient value by adding the first coefficient value to the clipped second coefficient value, and clips the third coefficient value. The circuitry encodes a third reconstructed image sample of the chroma component using the clipped third coefficient value.

According to a further aspect, the first reconstructed image sample is located adjacent to the second reconstructed image sample.

According to another aspect, the circuitry, in operation, sets the first coefficient value to zero in response to the first coefficient value being less than 64.

According to another aspect, an encoder is provided which includes: a block splitter, which, in operation, splits a first image into a plurality of blocks; an intra predictor, which, in operation, predicts blocks included in the first image, using reference blocks included in the first image; an inter predictor, which, in operation, predicts blocks included in the first image, using reference blocks included in a second image different from the first image; a loop filter, which, in operation, filters blocks included in the first image; a transformer, which, in operation, transforms a prediction error between an original signal and a prediction signal generated by the intra predictor or the inter predictor, to generate transform coefficients; a quantizer, which, in operation, quantizes the transform coefficients to generate quantized coefficients; and an entropy encoder, which, in operation, variably encodes the quantized coefficients to generate an encoded bitstream including the encoded quantized coefficients and control information. The loop filter performs the following:

- generating a first coefficient value by applying a CCALF (cross component adaptive loop filtering) process to a first reconstructed image sample of a luma component;
- generating a second coefficient value by applying an ALF (adaptive loop filtering) process to a second reconstructed image sample of a chroma component;
- clipping the second coefficient value;
- generating a third coefficient value by adding the first coefficient value to the clipped second coefficient value;
- clipping the third coefficient value; and
- encoding a third reconstructed image sample of the chroma component using the clipped third coefficient value.

According to a further aspect, a decoder is provided which includes circuitry and memory coupled to the circuitry. The circuitry, in operation, generates a first coefficient value by applying a CCALF (cross component adaptive loop filtering) process to a first reconstructed image sample of a luma component. The circuitry generates a second coefficient value by applying an ALF (adaptive loop filtering) process to a second reconstructed image sample of a chroma component, and clips the second coefficient value. The circuitry generates a third coefficient value by adding the first coefficient value to the clipped second coefficient value, and clips the third coefficient value. The circuitry decodes a third reconstructed image sample of the chroma component using the clipped third coefficient value.

According to another aspect, a decoding apparatus is provided which includes: a decoder, which, in operation, decodes an encoded bitstream to output quantized coefficients; an inverse quantizer, which, in operation, inverse quantizes the quantized coefficients to output transform coefficients; an inverse transformer, which, in operation, inverse transforms the transform coefficients to output a prediction error; an intra predictor, which, in operation, predicts blocks included in a first image, using a reference blocks included in the first image; an inter predictor, which, in operation, predicts blocks included in the first image, using reference blocks included in a second image different from the first image; a loop filter, which, in operation, filters blocks included in the first image; and an output, which, in operation, outputs a picture including the first image. The loop filter performs the following:

- generating a first coefficient value by applying a CCALF (cross component adaptive loop filtering) process to a first reconstructed image sample of a luma component;
- generating a second coefficient value by applying an ALF (adaptive loop filtering) process to a second reconstructed image sample of a chroma component;
- clipping the second coefficient value;
- generating a third coefficient value by adding the first coefficient value to the clipped second coefficient value;
- clipping the third coefficient value; and
- decoding a third reconstructed image sample of the chroma component using the clipped third coefficient value.

According to another aspect, an encoding method is provided, which includes:

- generating a first coefficient value by applying a CCALF (cross component adaptive loop filtering) process to a first reconstructed image sample of a luma component;
- generating a second coefficient value by applying an ALF (adaptive loop filtering) process to a second reconstructed image sample of a chroma component; clipping the second coefficient value;

generating a third coefficient value by adding the first coefficient value to the clipped second coefficient value;

clipping the third coefficient value; and encoding a third reconstructed image sample of the chroma component using the clipped third coefficient value.

According to a further aspect, a decoding method is provided, which includes:

generating a first coefficient value by applying a CCALF (cross component adaptive loop filtering) process to a first reconstructed image sample of a luma component;

generating a second coefficient value by applying an ALF (adaptive loop filtering) process to a second reconstructed image sample of a chroma component;

clipping the second coefficient value;

generating a third coefficient value by adding the first coefficient value to the clipped second coefficient value;

clipping the third coefficient value; and decoding a third reconstructed image sample of the chroma component using the clipped third coefficient value.

In video coding technology, it is desirable to propose new methods in order to improve coding efficiency, enhance image quality, and reduce circuit scale. Some implementations of embodiments of the present disclosure, including constituent elements of embodiments of the present disclosure considered alone or in various combinations, may facilitate one or more of the following: improvement in coding efficiency, enhancement in image quality, reduction in utilization of processing resources associated with encoding/decoding, reduction in circuit scale, improvement in processing speed of encoding/decoding, etc.

In addition, some implementations of embodiments of the present disclosure, including constituent elements of embodiments of the present disclosure considered alone or in various combinations, may facilitate, in encoding and decoding, appropriate selection of one or more elements, such as a filter, a block, a size, a motion vector, a reference picture, a reference block or an operation. It is to be noted that the present disclosure includes disclosure regarding configurations and methods which may provide advantages other than the above-described advantages. Examples of such configurations and methods include a configuration or method for improving coding efficiency while reducing an increase in the use of processing resources.

Additional benefits and advantages of the disclosed embodiments will become apparent from the specification and drawings. The benefits and/or advantages may be individually obtained by the various embodiments and features of the specification and drawings, not all of which need to be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF DRAWINGS

FIG. 14 is a chart indicating example transform basis functions for various transform types.

FIG. 23G is a table illustrating example weight index candidates that may be employed in a JC-CCALF.

FIG. 27 is a conceptual diagram for illustrating examples of Boundary strength (Bs) values.

FIG. 38A is conceptual diagram for illustrating example characterizations of modes for MV derivation.

FIG. 101 is a block diagram illustrating a configuration of an encoder and a decoder according to an embodiment.

FIG. 102 is a flow chart of a sample process flow of decoding an image applying a CCALF process according to a second aspect.

FIG. 103 illustrates sample locations of clip parameters to be parsed from, for example, a VPS, APS, SPS, PPS, slice header, CTU, or TU of a bitstream.

FIG. 104 illustrate examples of clip parameters.

FIG. 105 is a flow chart of a sample process flow of decoding an image applying a CCALF process using a filter coefficient according to a third aspect.

FIG. 106 is conceptual diagram of example indicating locations of filter coefficients to be used in a CCALF process.

FIG. 107 is conceptual diagram of example indicating locations of filter coefficients to be used in a CCALF process.

FIG. 108 is conceptual diagram of example indicating locations of filter coefficients to be used in a CCALF process.

FIG. 109 is conceptual diagram of example indicating locations of filter coefficients to be used in a CCALF process.

FIG. 110 is conceptual diagram of example indicating locations of filter coefficients to be used in a CCALF process.

FIG. 111 is conceptual diagram of further example indicating locations of filter coefficients to be used in a CCALF process.

FIG. 112 is conceptual diagram of further example indicating locations of filter coefficients to be used in a CCALF process.

Figure 113:
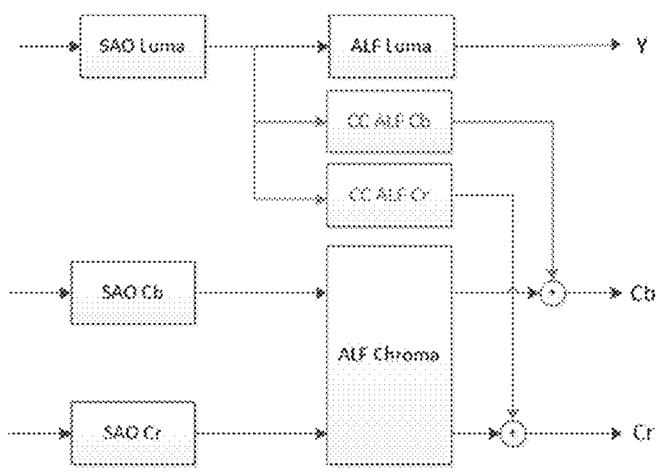

FIG. 113 is a block diagram illustrating a configuration of a CCALF process performed by an encoder and a decoder according to an embodiment.

Figure 114:
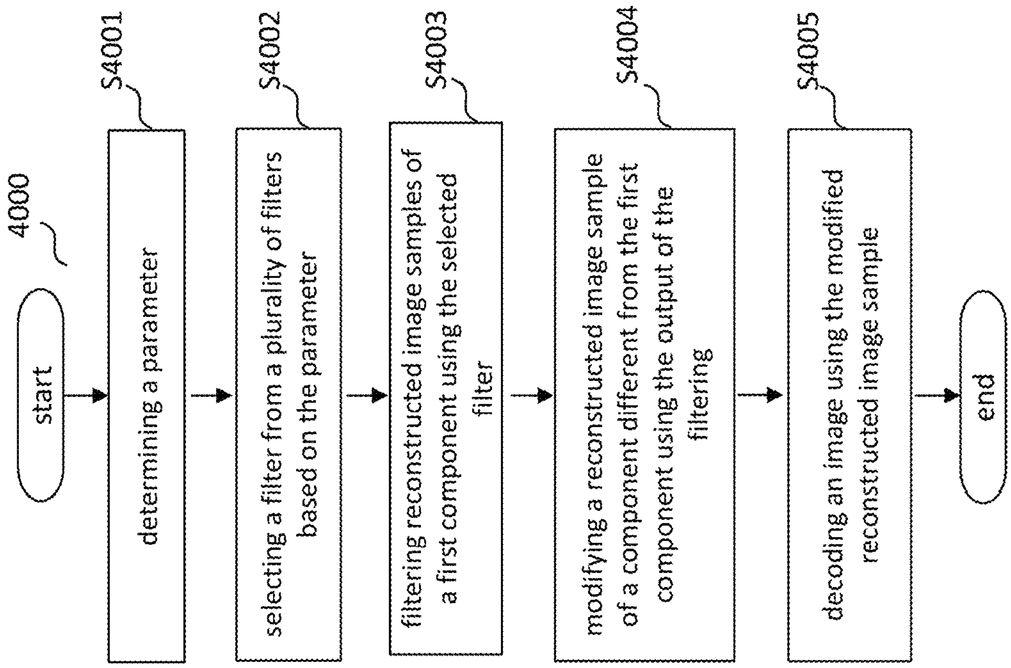

FIG. 114 is a flow chart of a sample process flow of decoding an image applying a CCALF process using a filter selected from a plurality of filters according to a fourth aspect.

Figure 115:
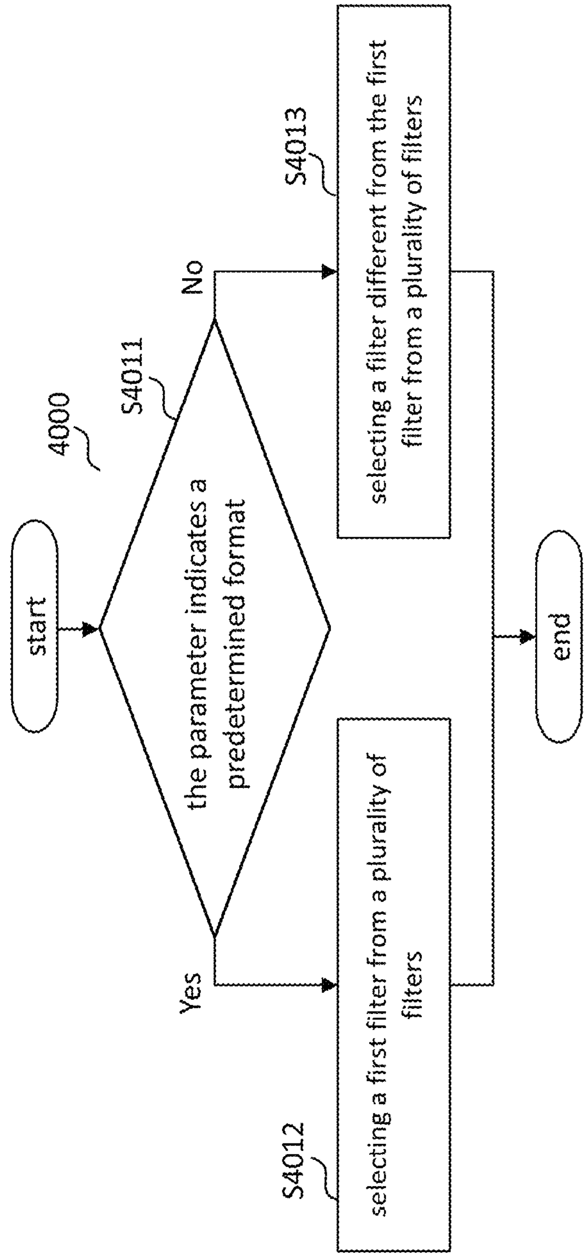

FIG. 115 illustrates an example of a process flow of selecting a filter.

Figure 116:
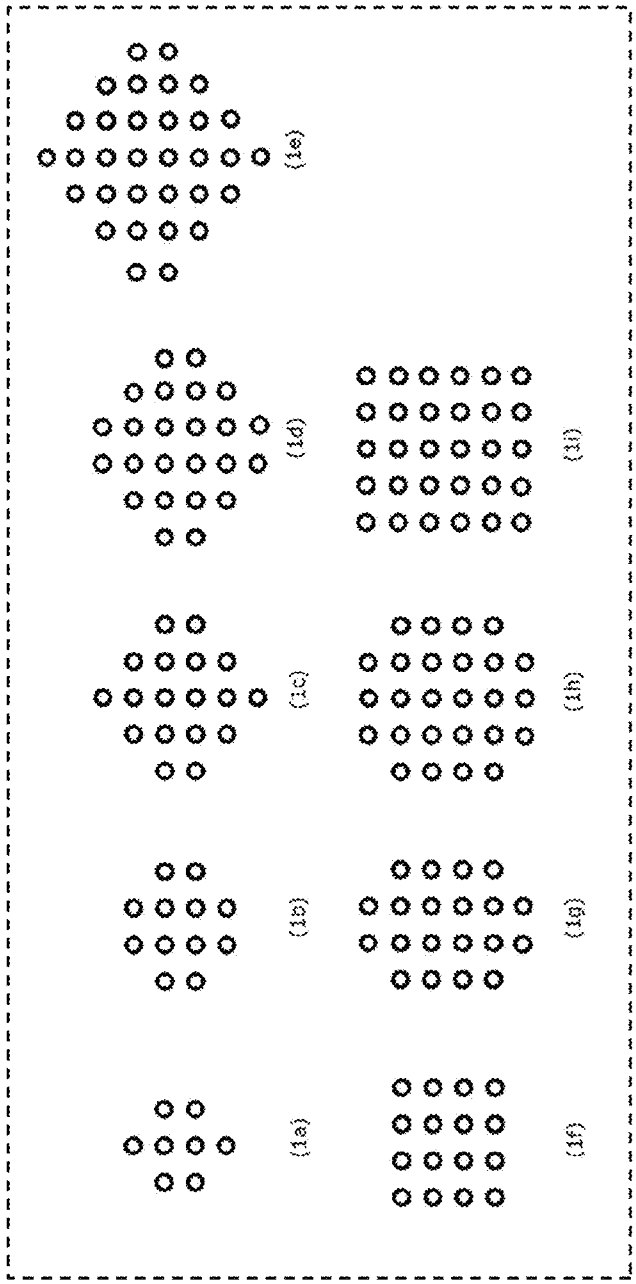

FIG. 116 illustrates examples of filters.

Figure 117:
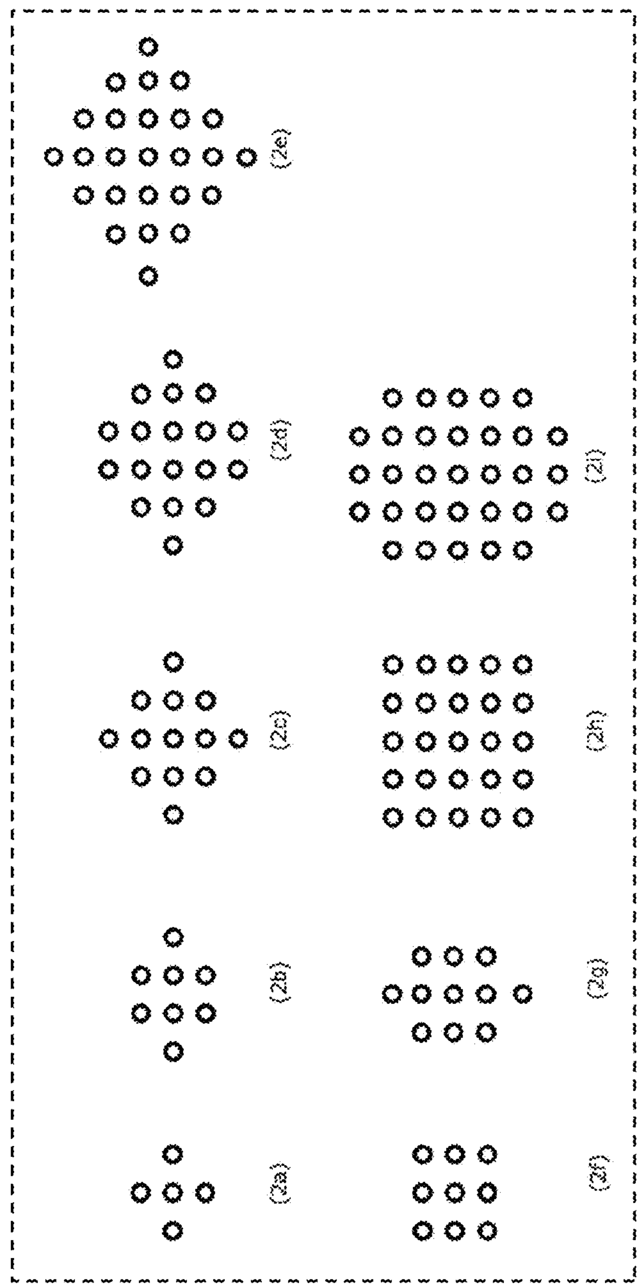

FIG. 117 illustrates examples of filters.

Figure 118:
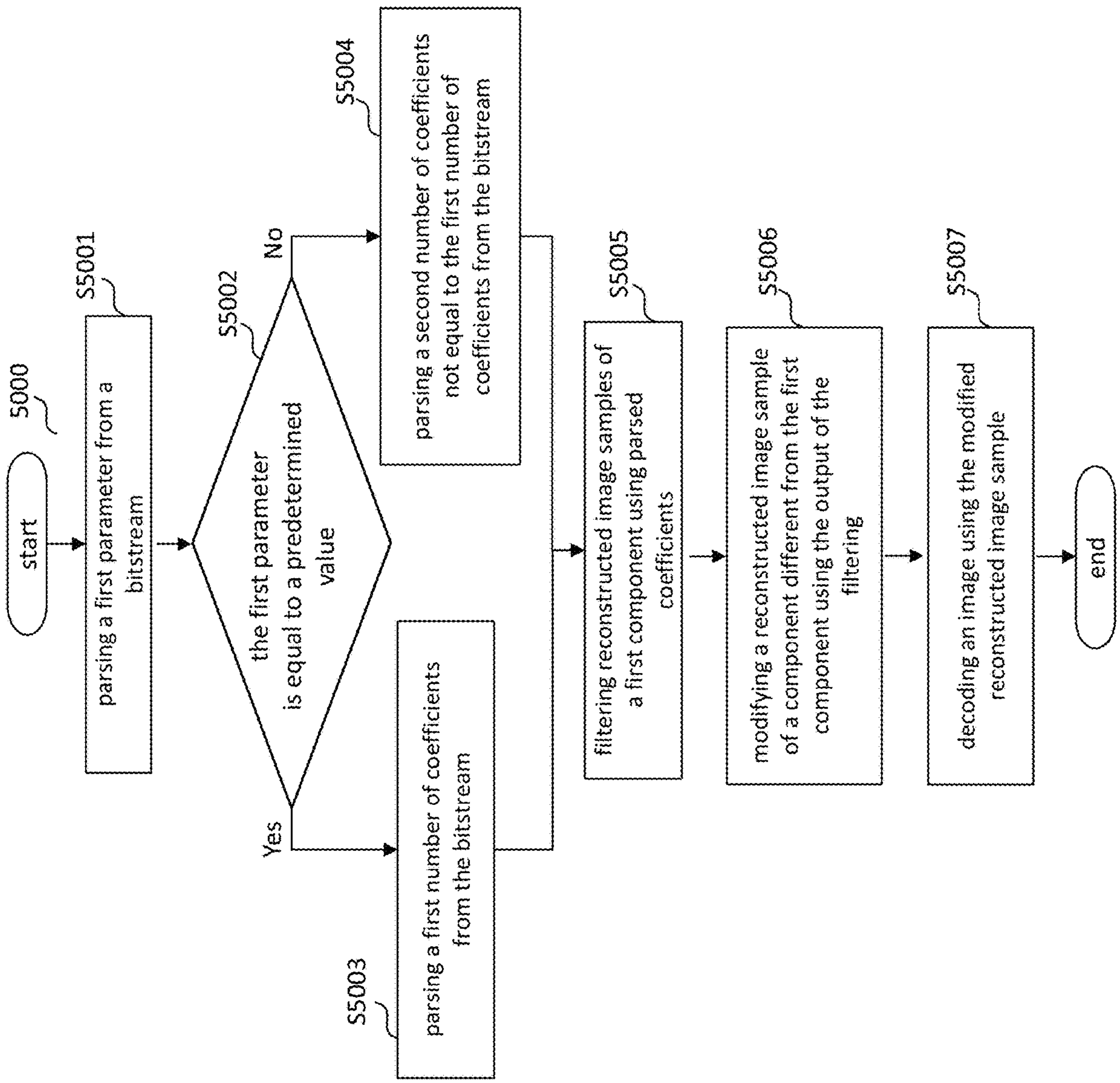

FIG. 118 is a flow chart of a sample process flow of decoding an image applying a CCALF process using a parameter according to a fifth aspect.

FIG. 119 illustrates examples of the number of coefficients to be parsed from a bitstream.

Figure 120:
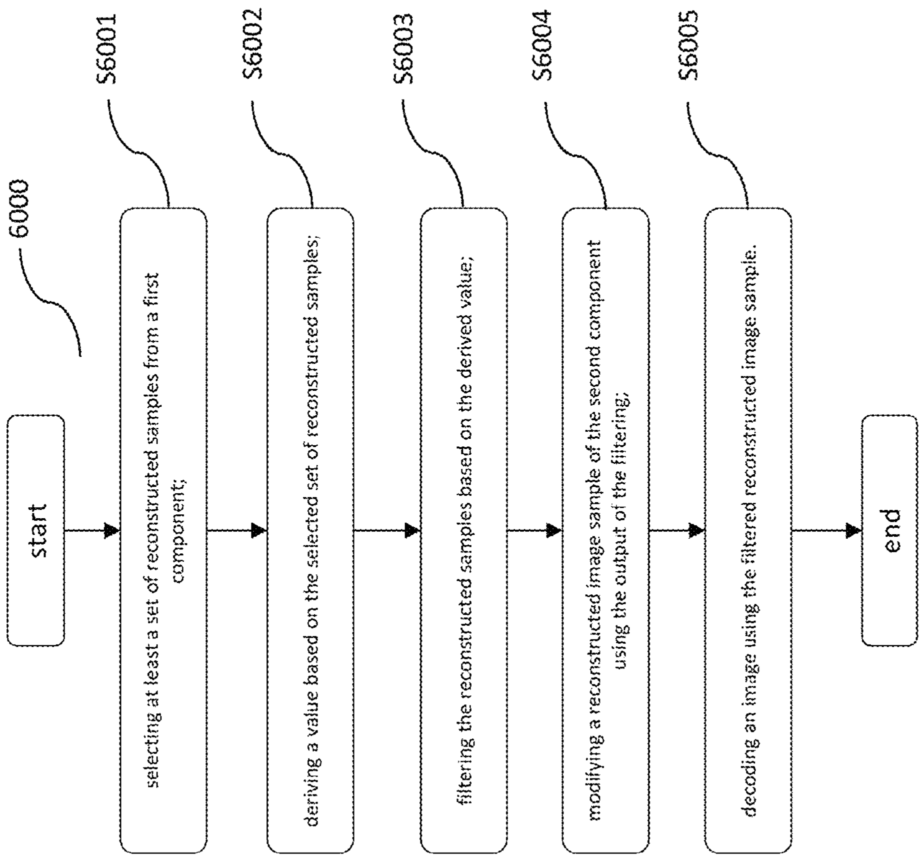

FIG. 120 is a flow chart of a sample process flow of decoding an image applying a CCALF process using a parameter according to a sixth aspect.

Figure 121:
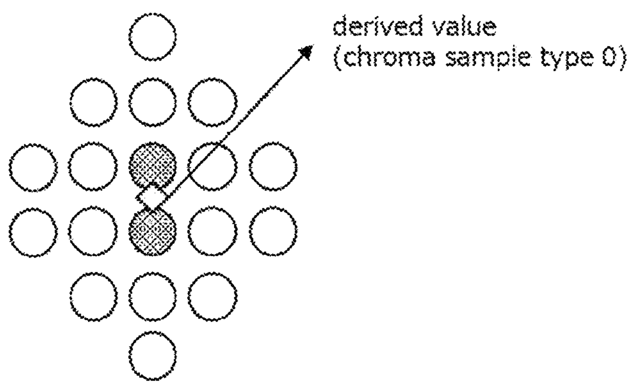

FIG. 121 is a conceptual diagram illustrating example of generating a CCALF value of a luma component for a current chroma sample by calculating a weighted average value of neighboring samples.

FIG. 122 is a conceptual diagram illustrating example of generating a CCALF value of a luma component for a current chroma sample by calculating a weighted average value of neighboring samples.

Figure 123:
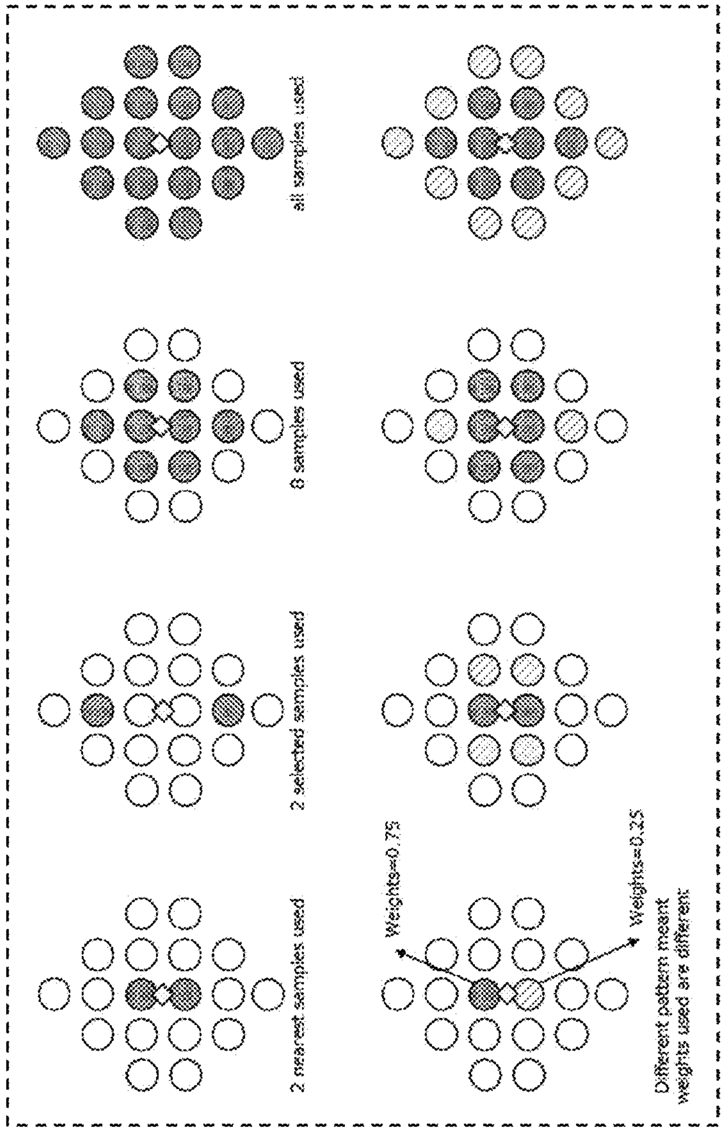

FIG. 123 is a conceptual diagram illustrating example of generating a CCALF value of a luma component for a current chroma sample by calculating a weighted average value of neighboring samples.

Figure 124:
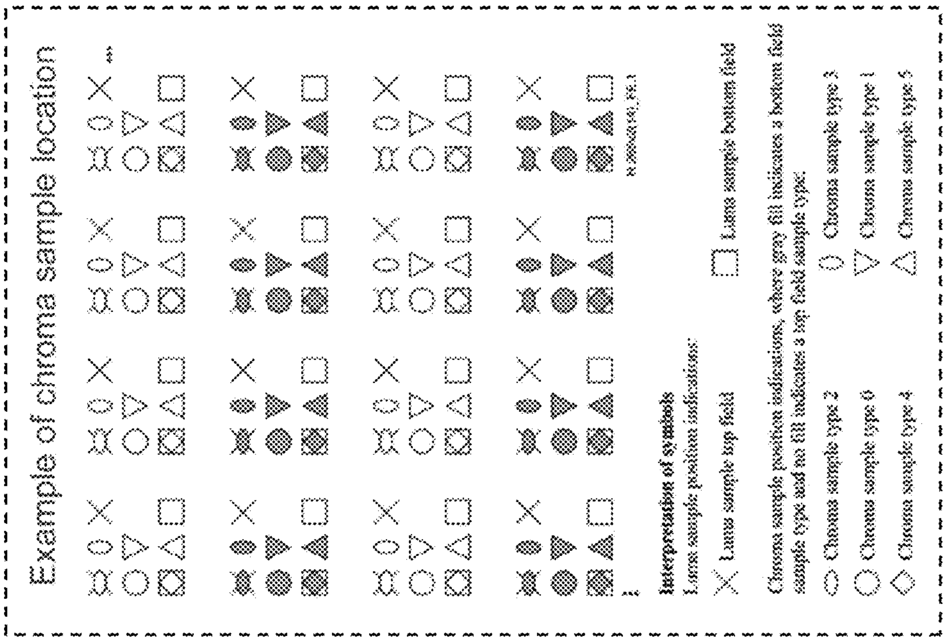

FIG. 124 is a conceptual diagram illustrating example of generating a CCALF value of a luma component for a current sample by calculating a weighted average value of neighboring samples, wherein locations of neighboring samples are determined adaptively to chroma type.

Figure 125:
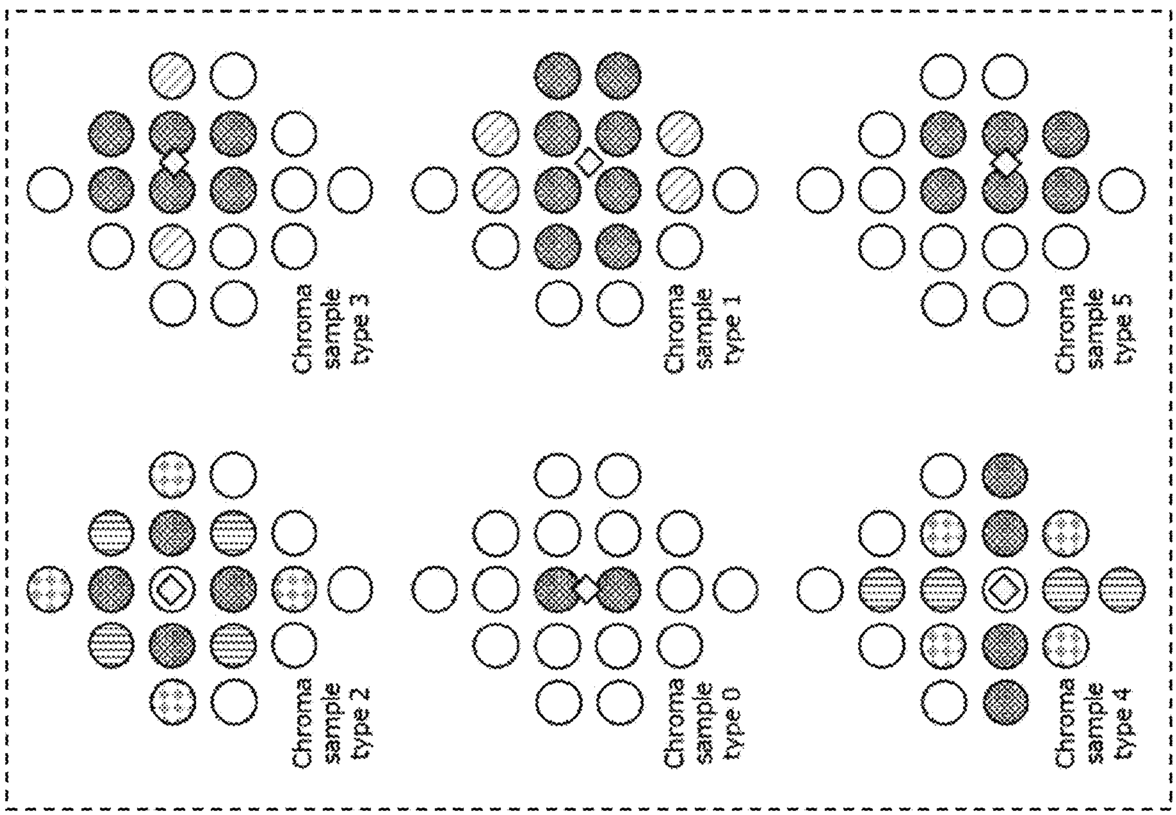

FIG. 125 is a conceptual diagram illustrating example of generating a CCALF value of a luma component for a current sample by calculating a weighted average value of neighboring samples, wherein locations of neighboring samples are determined adaptively to chroma type.

Figure 126:
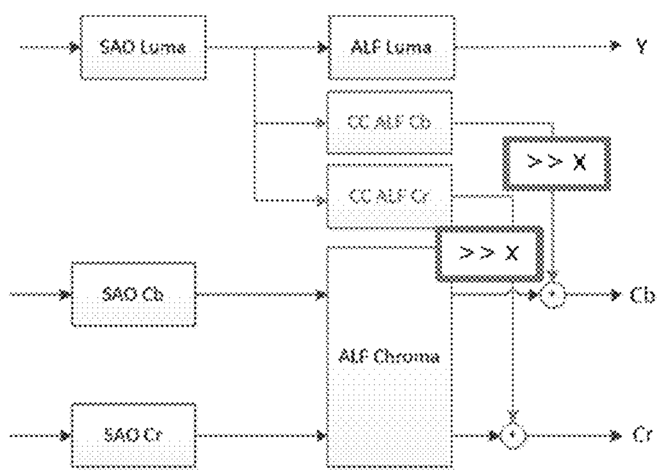

FIG. 126 is a conceptual diagram illustrating example of generating a CCALF value of a luma component by applying a bit shift to an output value of weighting calculation.

FIG. 127 is a conceptual diagram illustrating example of generating a CCALF value of a luma component by applying a bit shift to an output value of weighting calculation.

Figure 128:
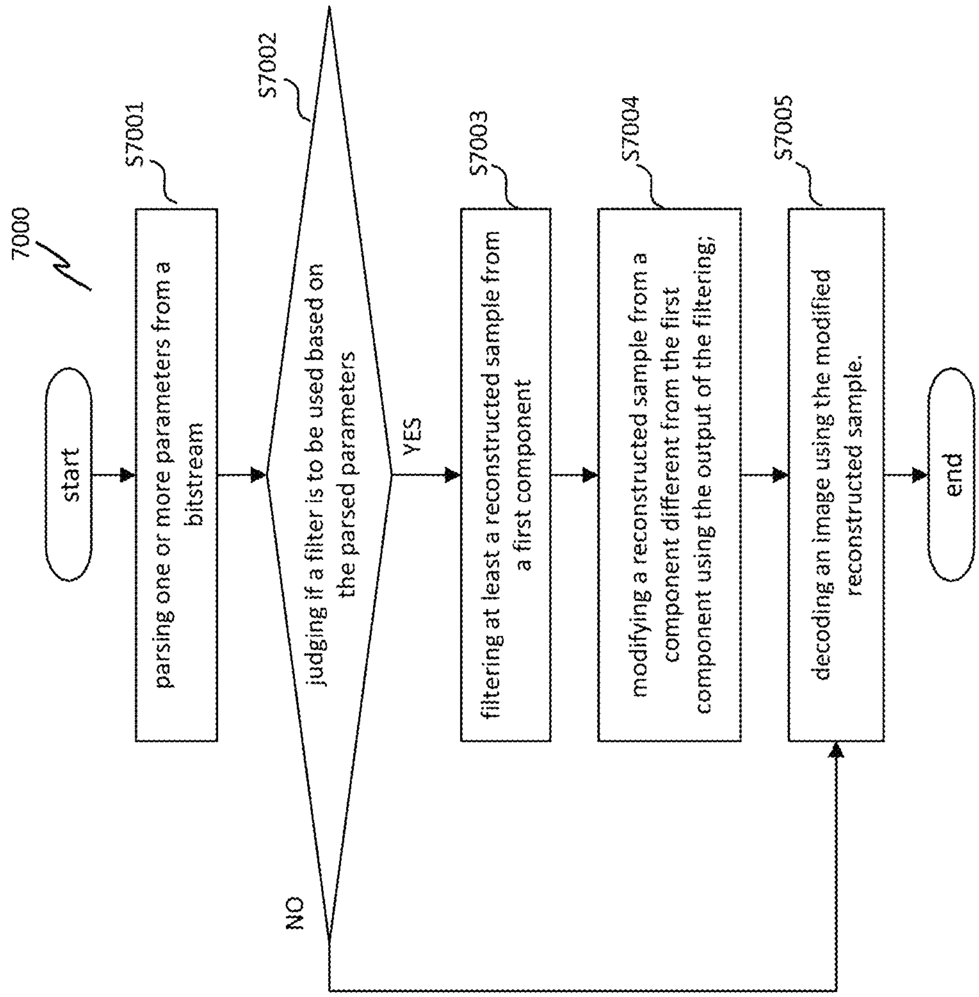

FIG. 128 is a flow chart of a sample process flow of decoding an image applying a CCALF process using a parameter according to a seventh aspect.

Figure 129:
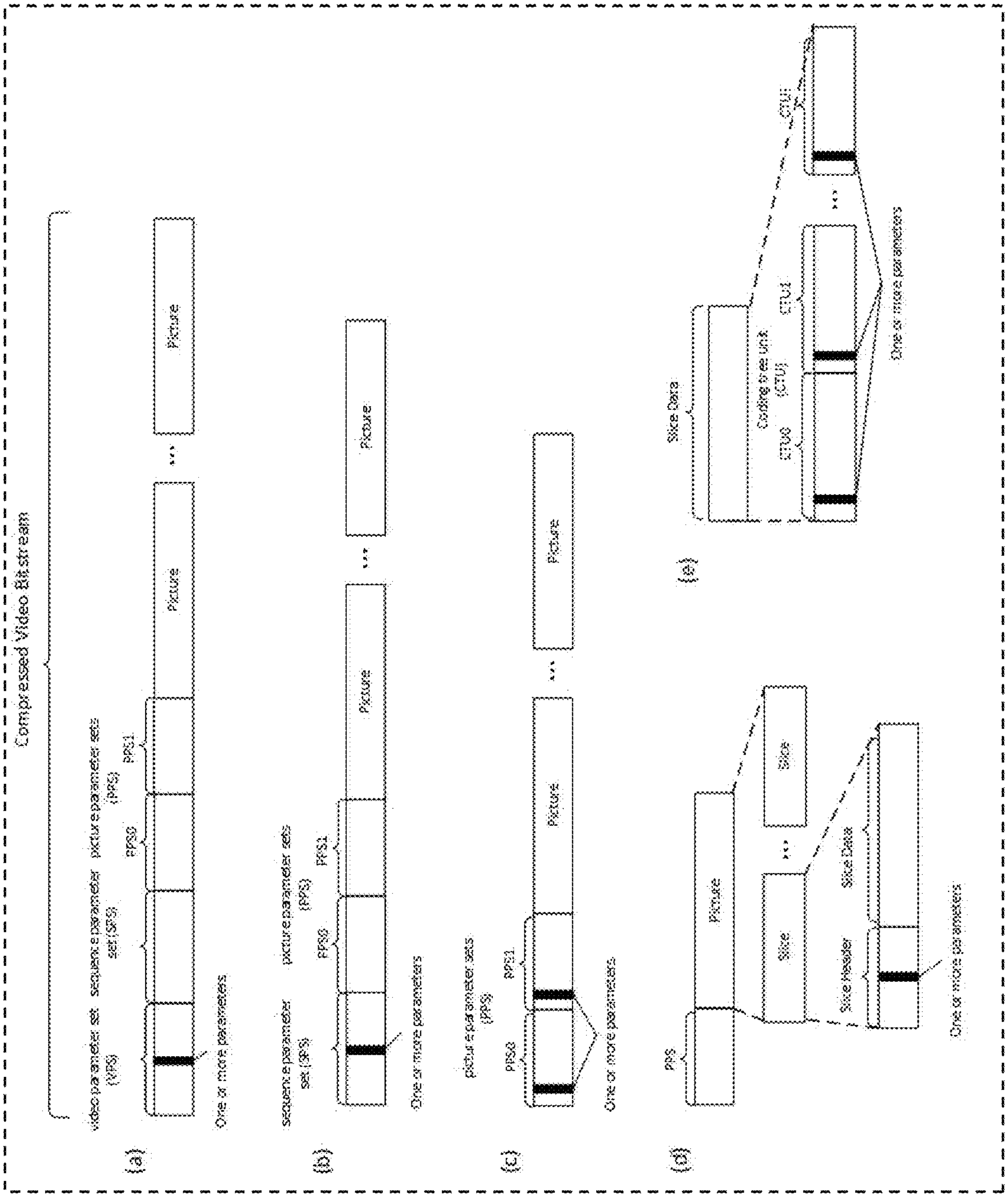

FIG. 129 illustrates sample locations of one or more parameters to be parsed from a bitstream.

Figure 130:
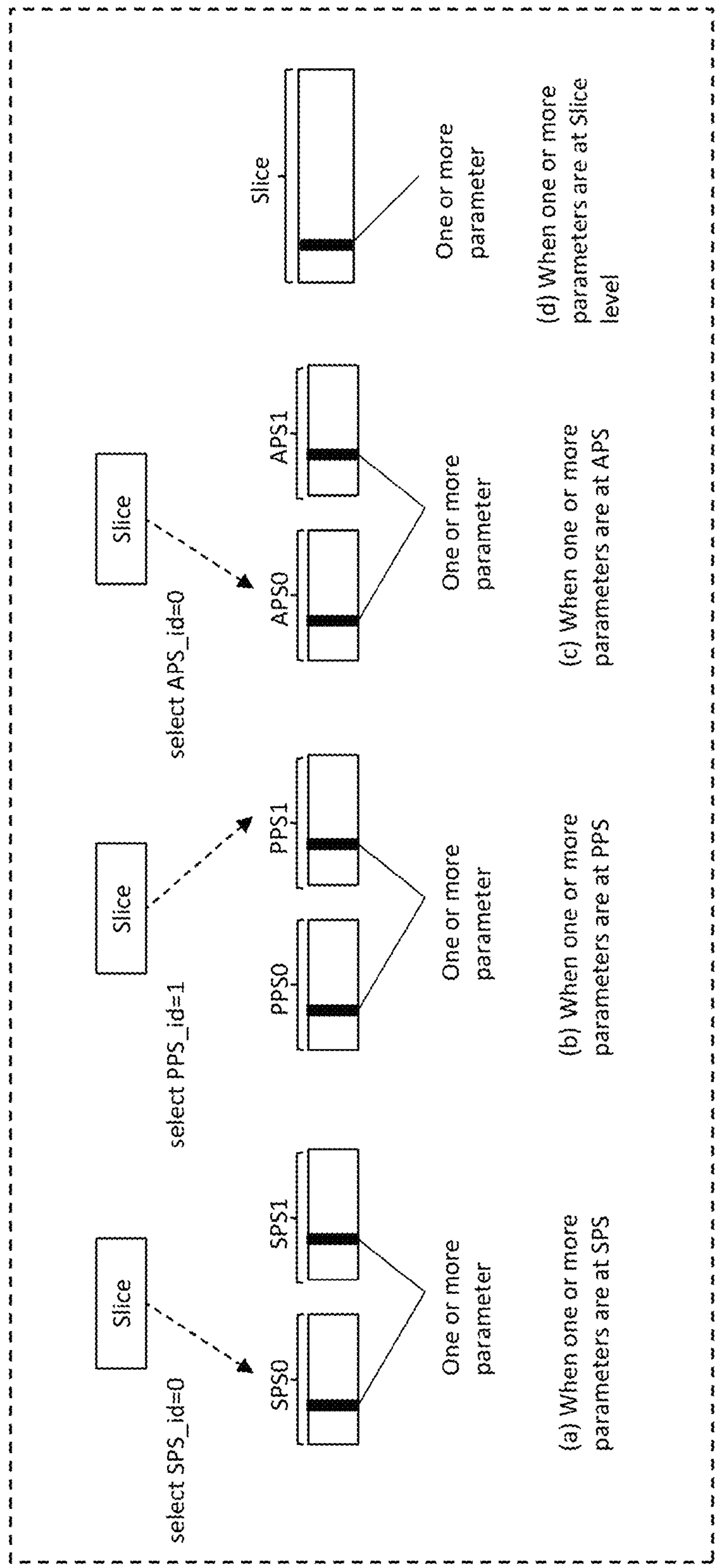

FIG. 130 shows sample processes of retrieving the one or more parameters.

Figure 131:
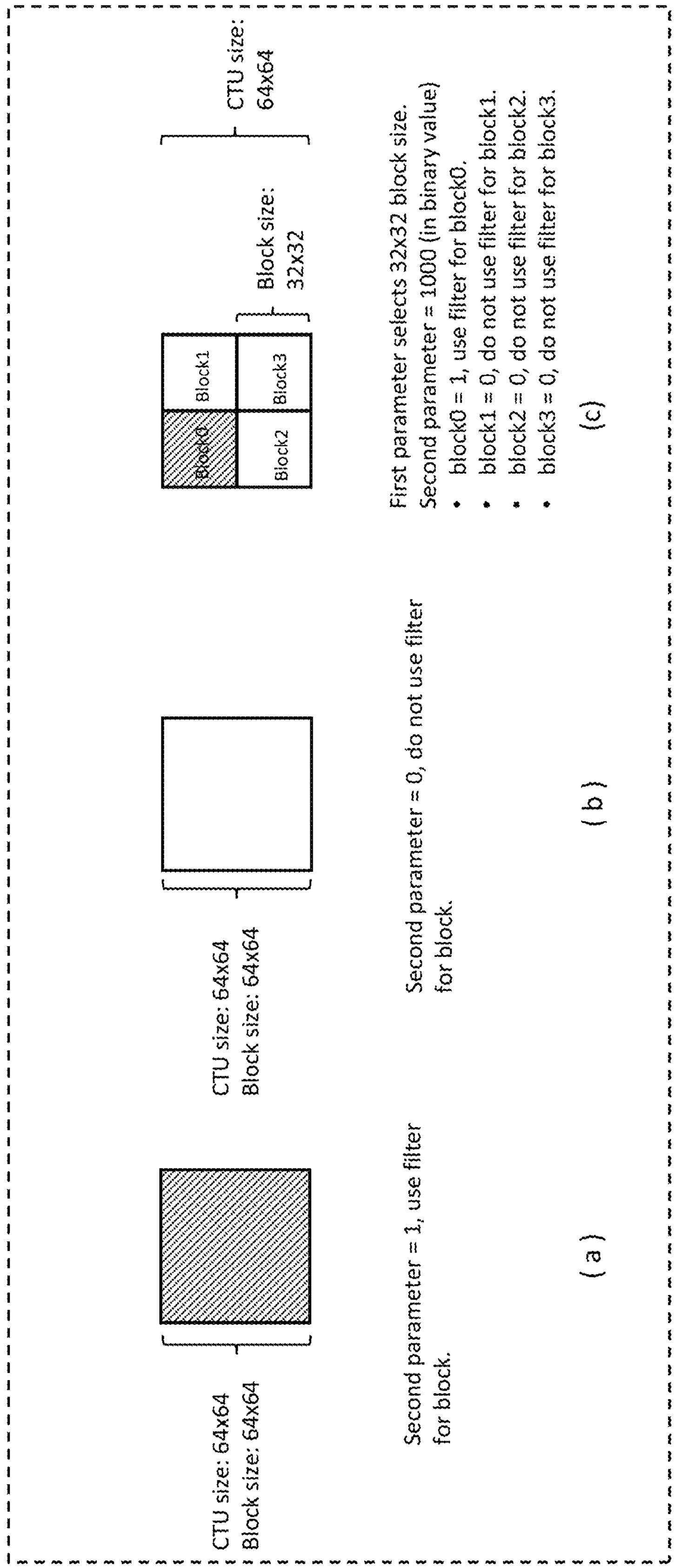

FIG. 131 shows sample values of a second parameter.

Figure 132:
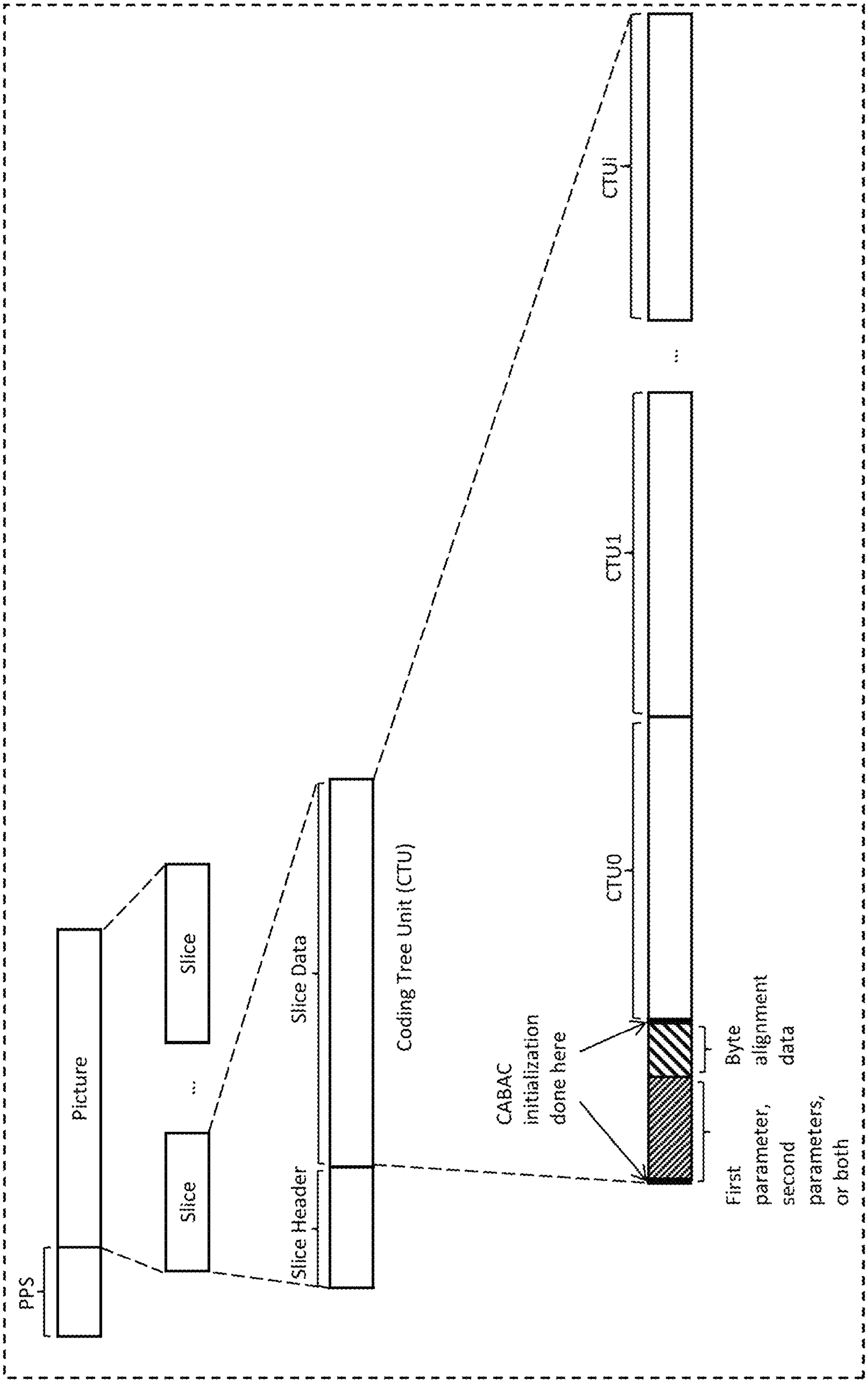

FIG. 132 shows an example of parsing a second parameter using arithmetic coding.

Figure 133:
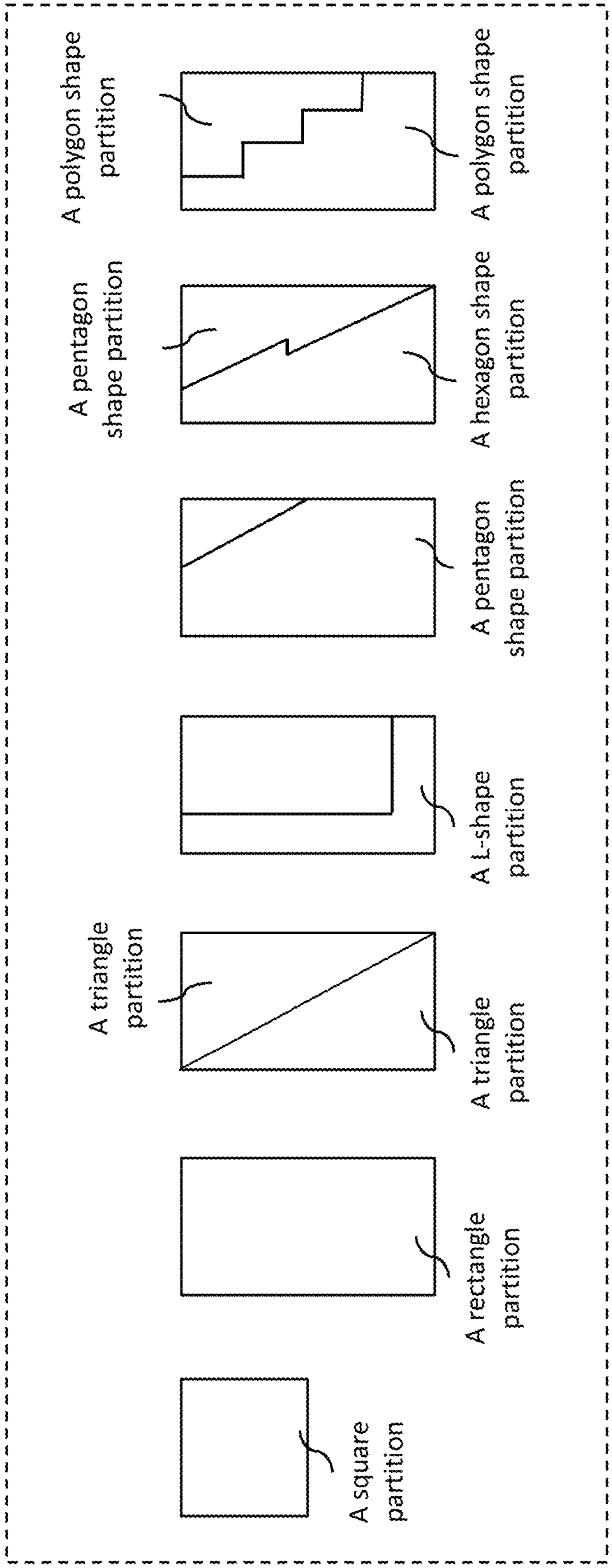

FIG. 133 is a conceptual diagram of a variation of this embodiment applied to rectangular partitions and non-rectangular partitions such as triangular partitions.

Figure 134:
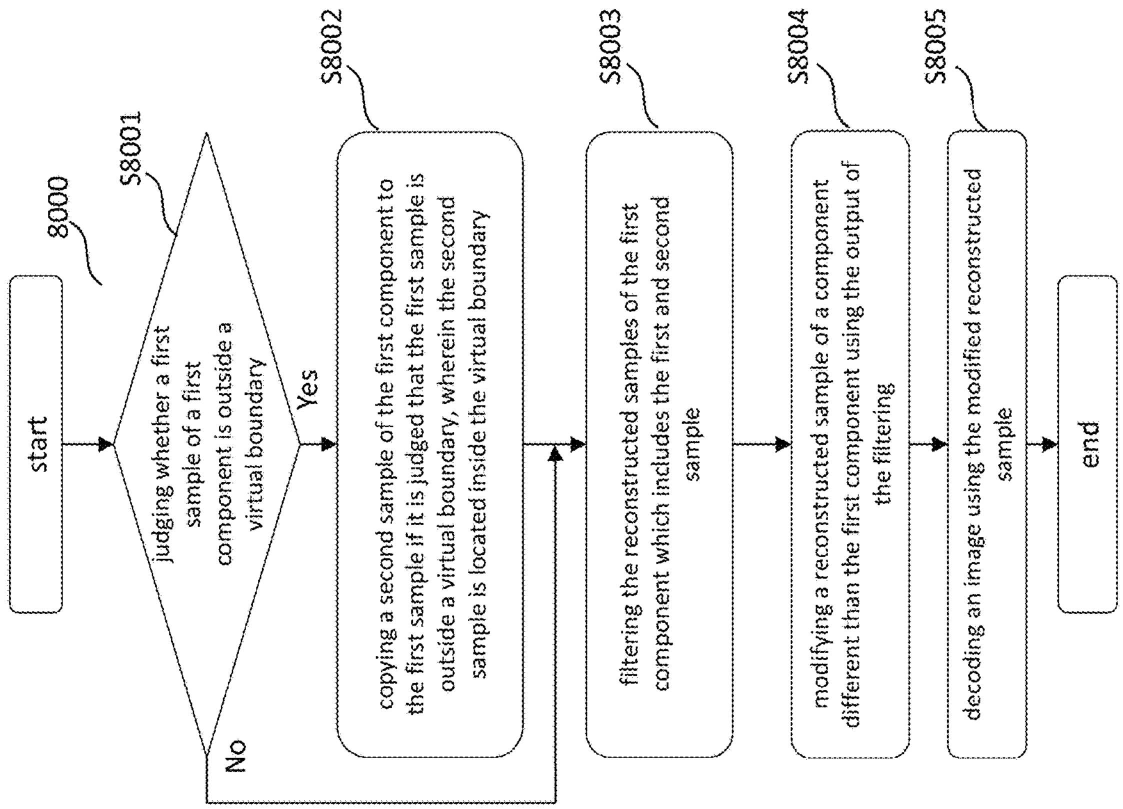

FIG. 134 is a flow chart of a sample process flow of decoding an image applying a CCALF process using a parameter according to an eight aspect.

Figure 135:
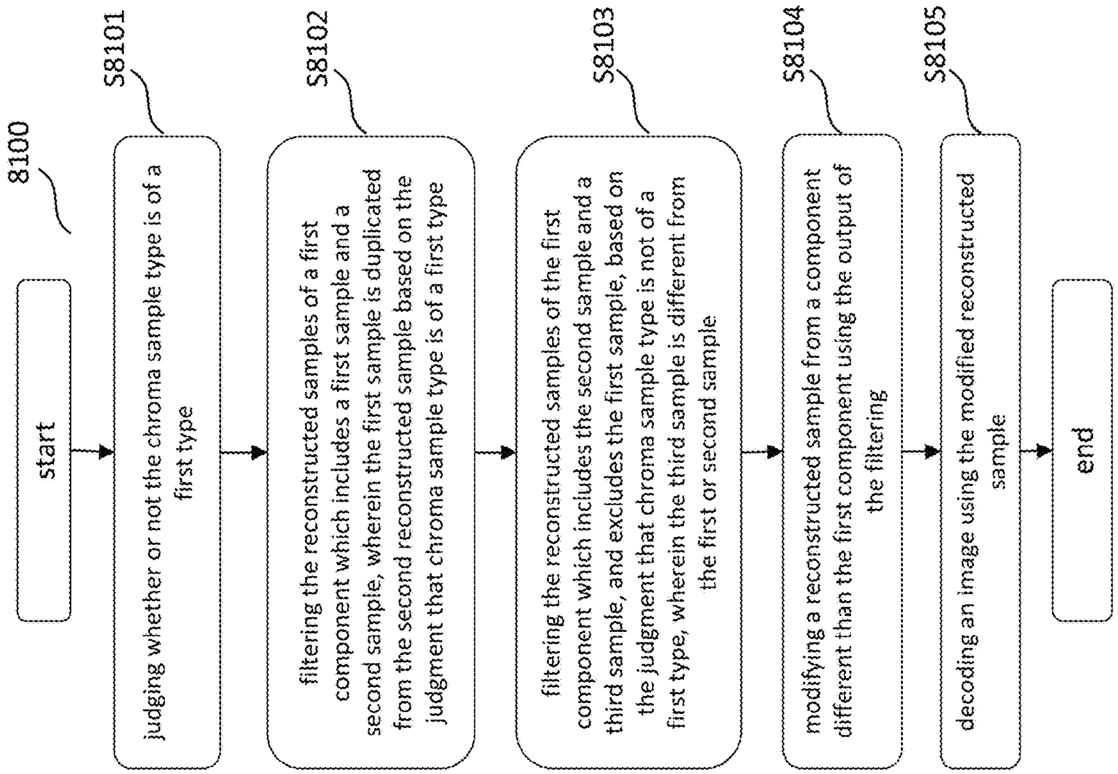

FIG. 135 is a flow chart of a sample process flow of decoding an image applying a CCALF process using a parameter according to the eighth aspect.

Figure 136:
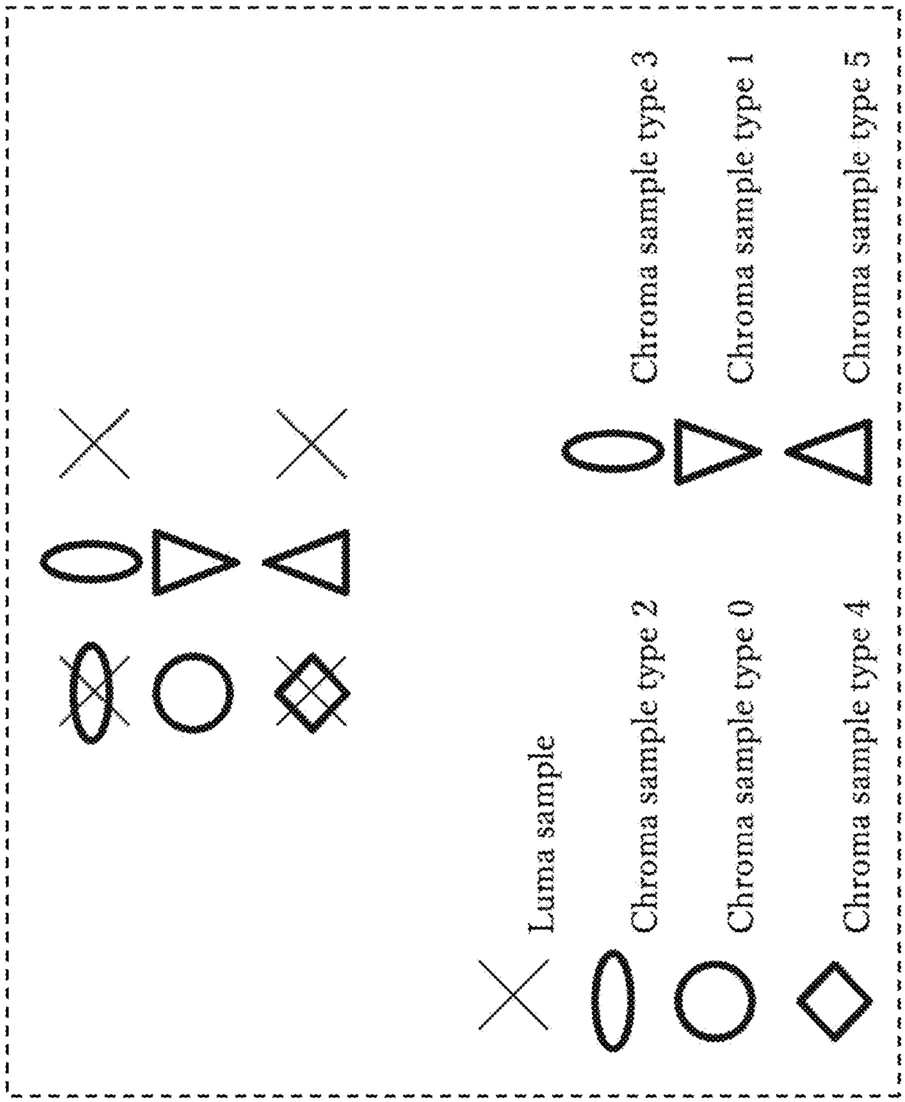

FIG. 136 shows example locations of chroma sample types 0 to 5.

Figure 137:
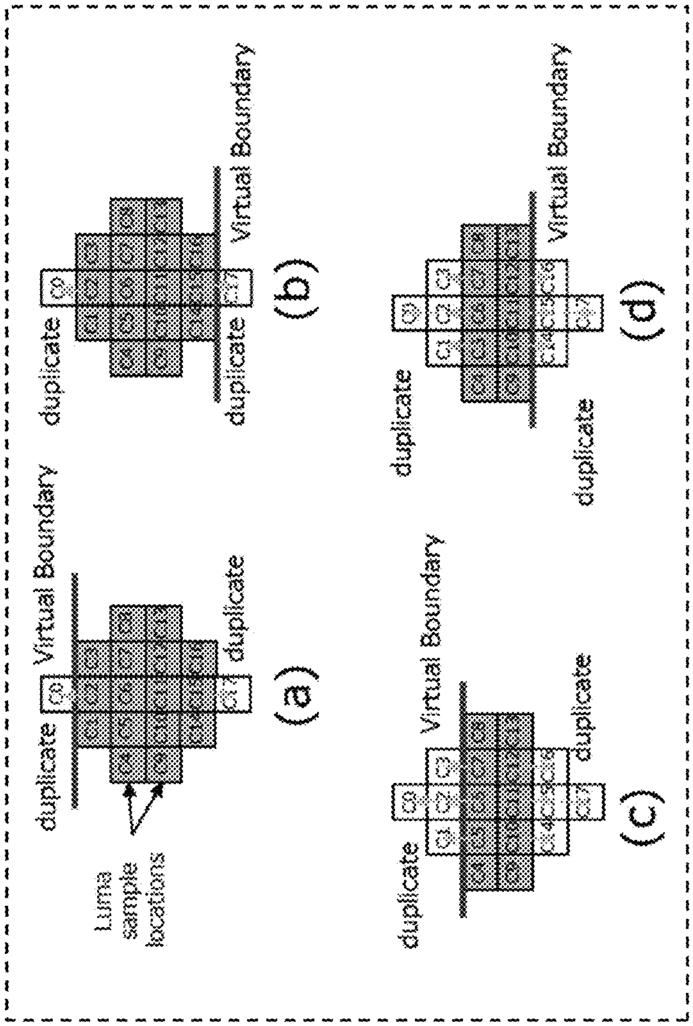

FIG. 137 is a conceptual diagram illustrating sample symmetric padding.

Figure 138:
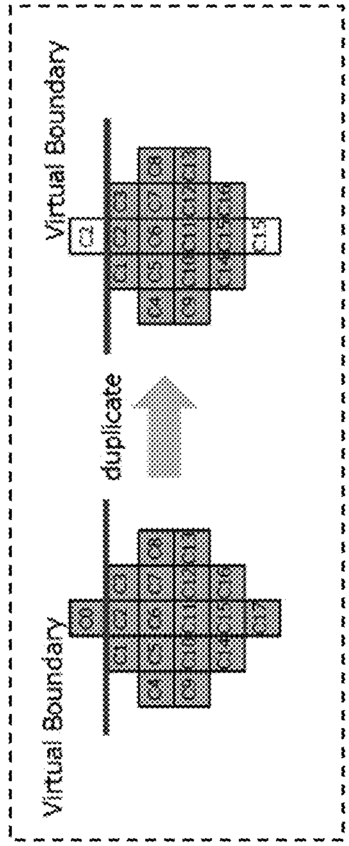

FIG. 138 is a conceptual diagram illustrating sample symmetric padding.

Figure 139:
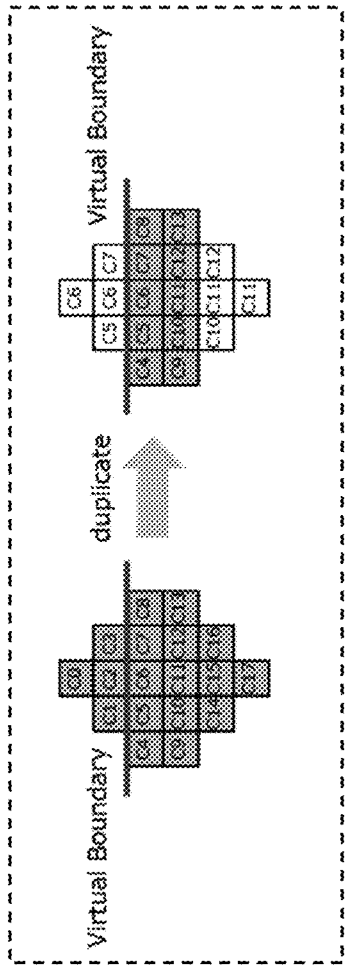

FIG. 139 is a conceptual diagram illustrating sample symmetric padding.

Figure 140:
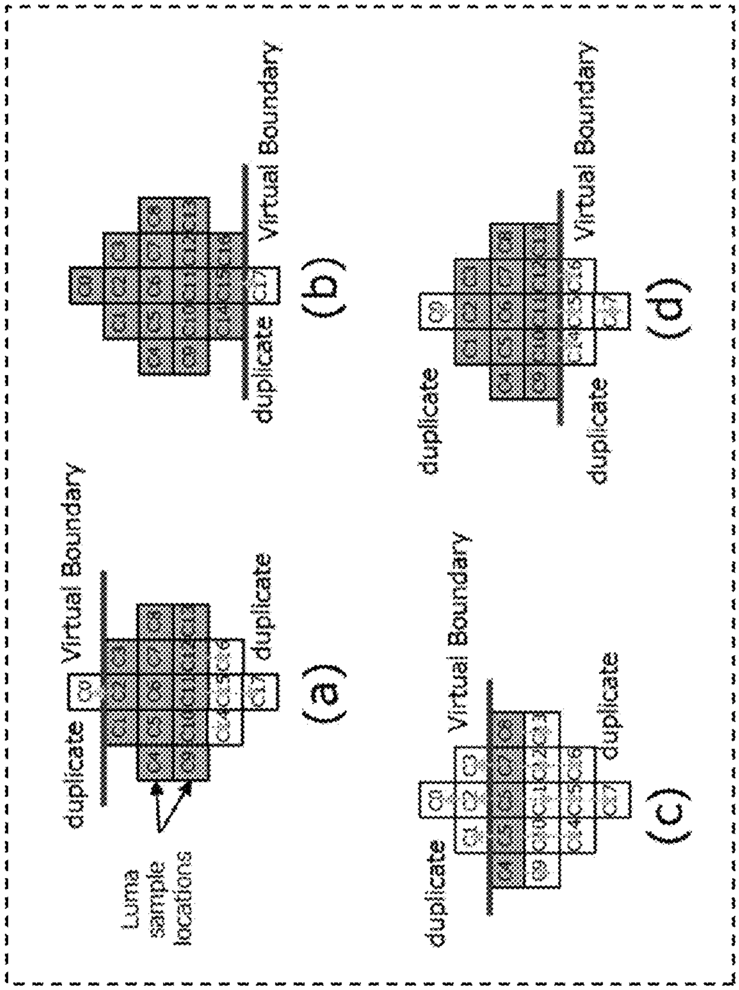

FIG. 140 is a conceptual diagram illustrating sample non-symmetric padding.

Figure 141:
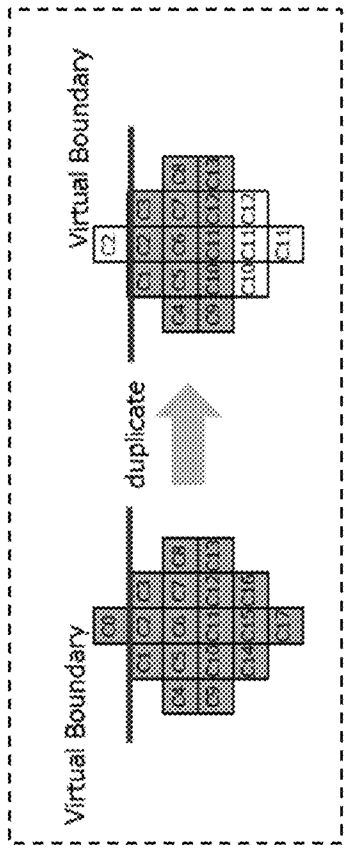

FIG. 141 is a conceptual diagram illustrating sample non-symmetric padding.

Figure 142:
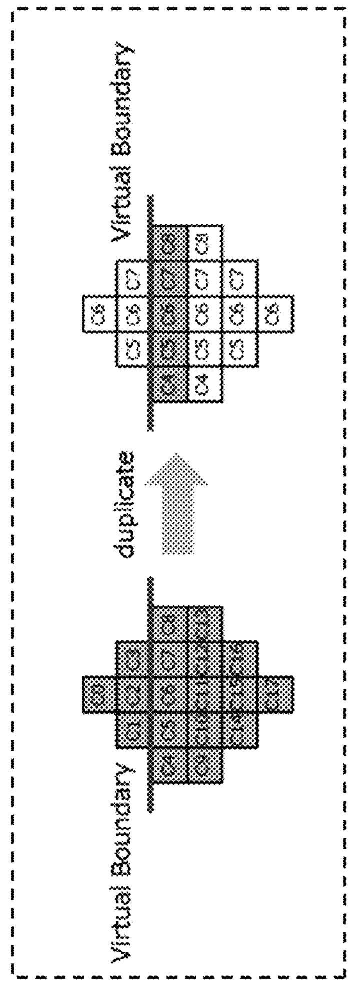

FIG. 142 is a conceptual diagram illustrating sample non-symmetric padding.

Figure 143:
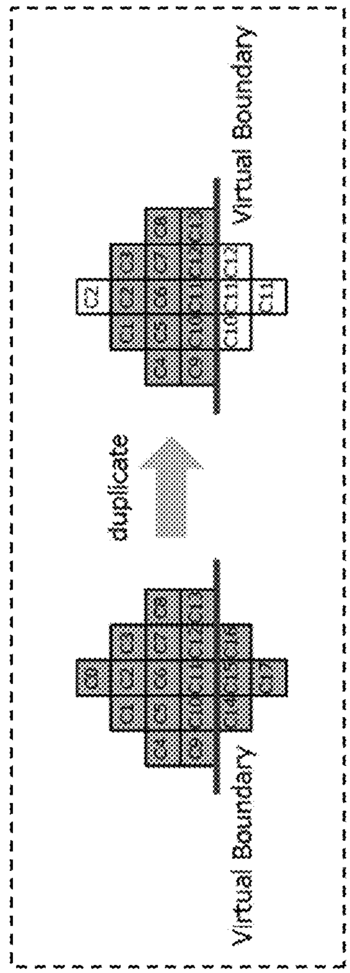

FIG. 143 is a conceptual diagram illustrating sample non-symmetric padding.

Figure 144:
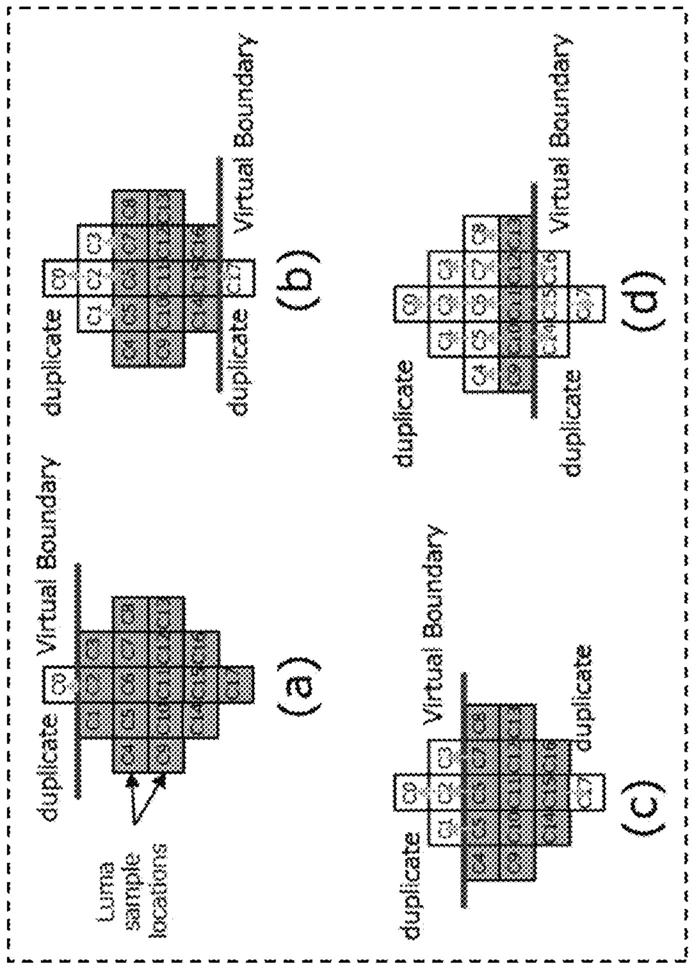

FIG. 144 is a conceptual diagram illustrating further sample non-symmetric padding.

Figure 145:
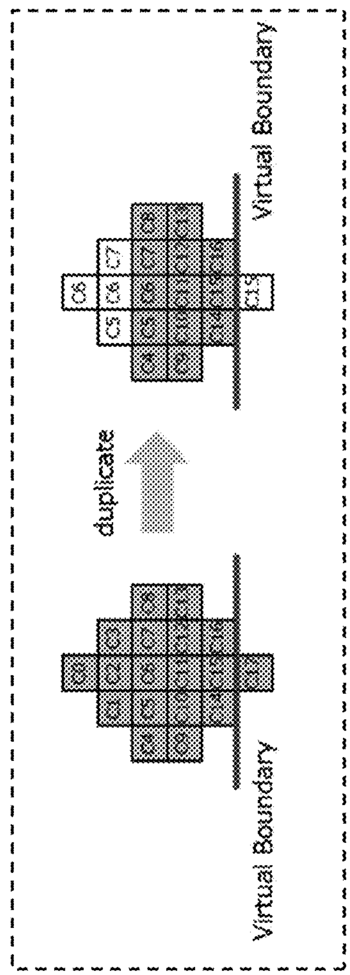

FIG. 145 is a conceptual diagram illustrating further sample non-symmetric padding.

Figure 146:
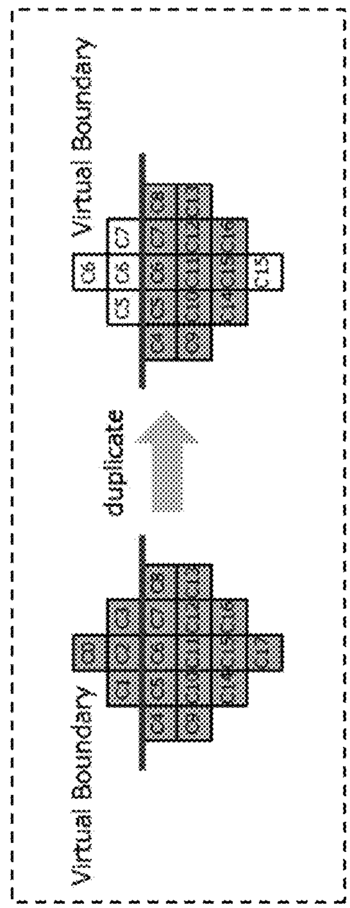

FIG. 146 is a conceptual diagram illustrating further sample non-symmetric padding.

Figure 147:
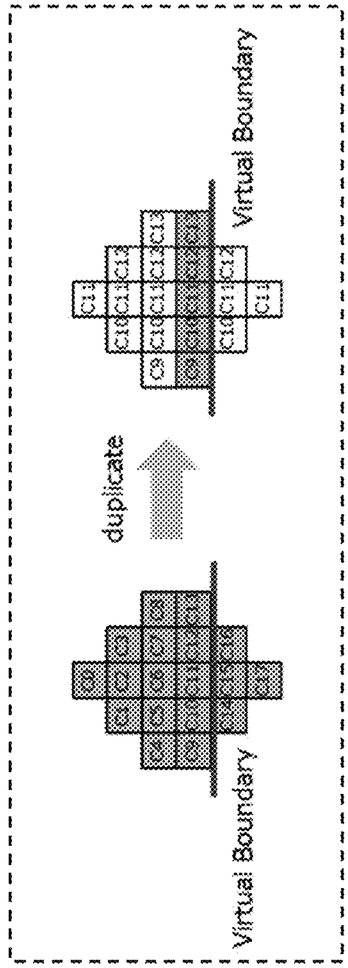

FIG. 147 is a conceptual diagram illustrating further sample non-symmetric padding.

Figure 148:
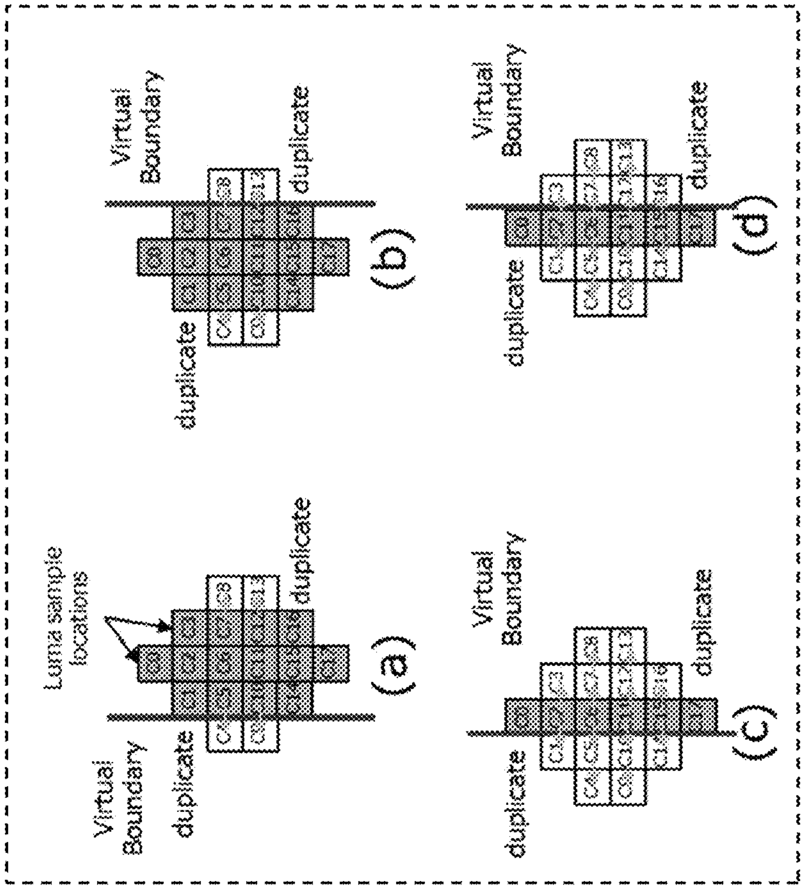

FIG. 148 is a conceptual diagram illustrating further sample symmetric padding.

Figure 149:
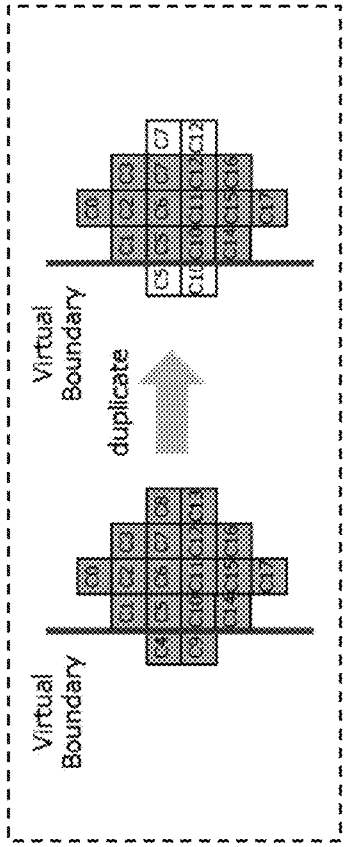

FIG. 149 is a conceptual diagram illustrating further sample symmetric padding.

Figure 150:
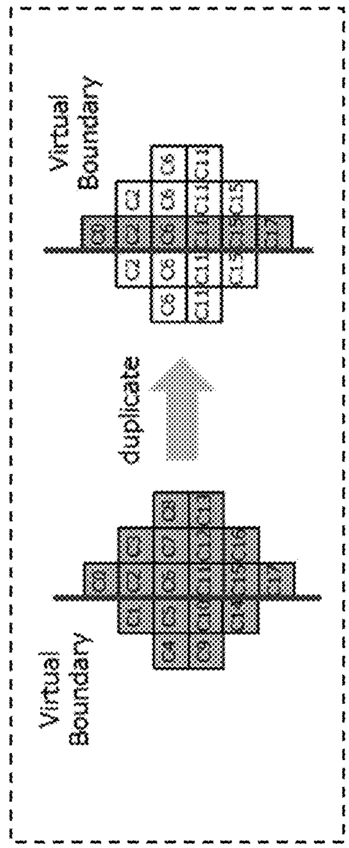

FIG. 150 is a conceptual diagram illustrating further sample symmetric padding.

Figure 151:
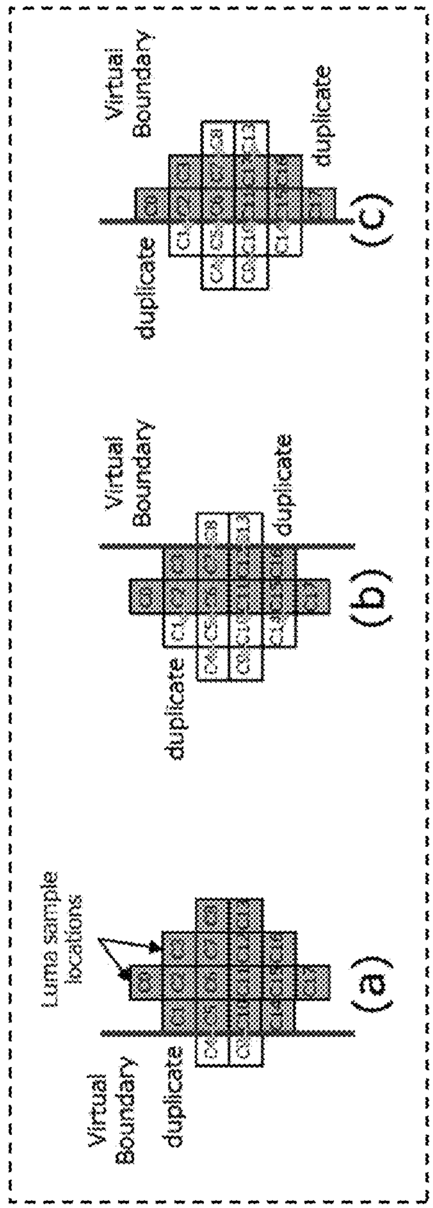

FIG. 151 is a conceptual diagram illustrating further sample non-symmetric padding.

Figure 152:
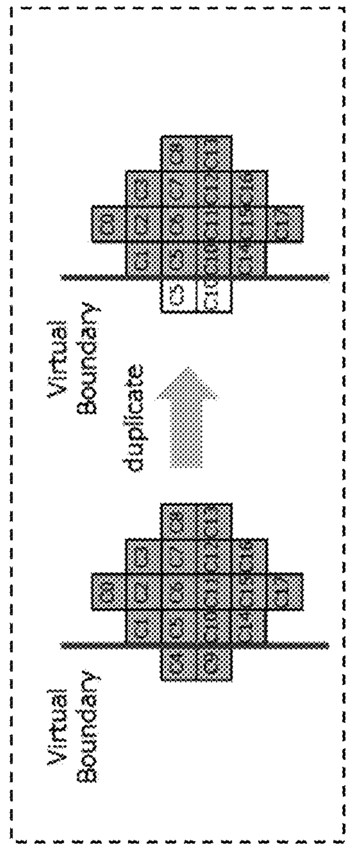

FIG. 152 is a conceptual diagram illustrating further sample non-symmetric padding.

Figure 153:
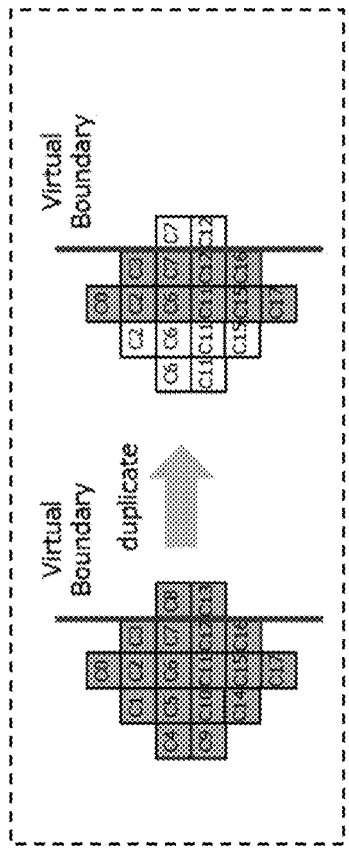

FIG. 153 is a conceptual diagram illustrating further sample non-symmetric padding.

Figure 154:
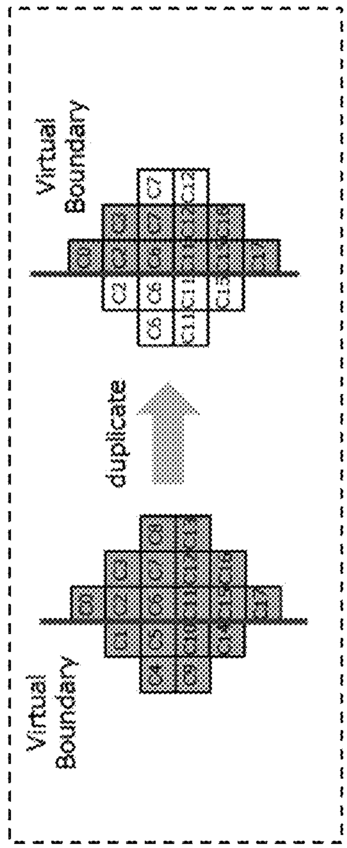

FIG. 154 is a conceptual diagram illustrating further sample non-symmetric padding.

Figure 155:
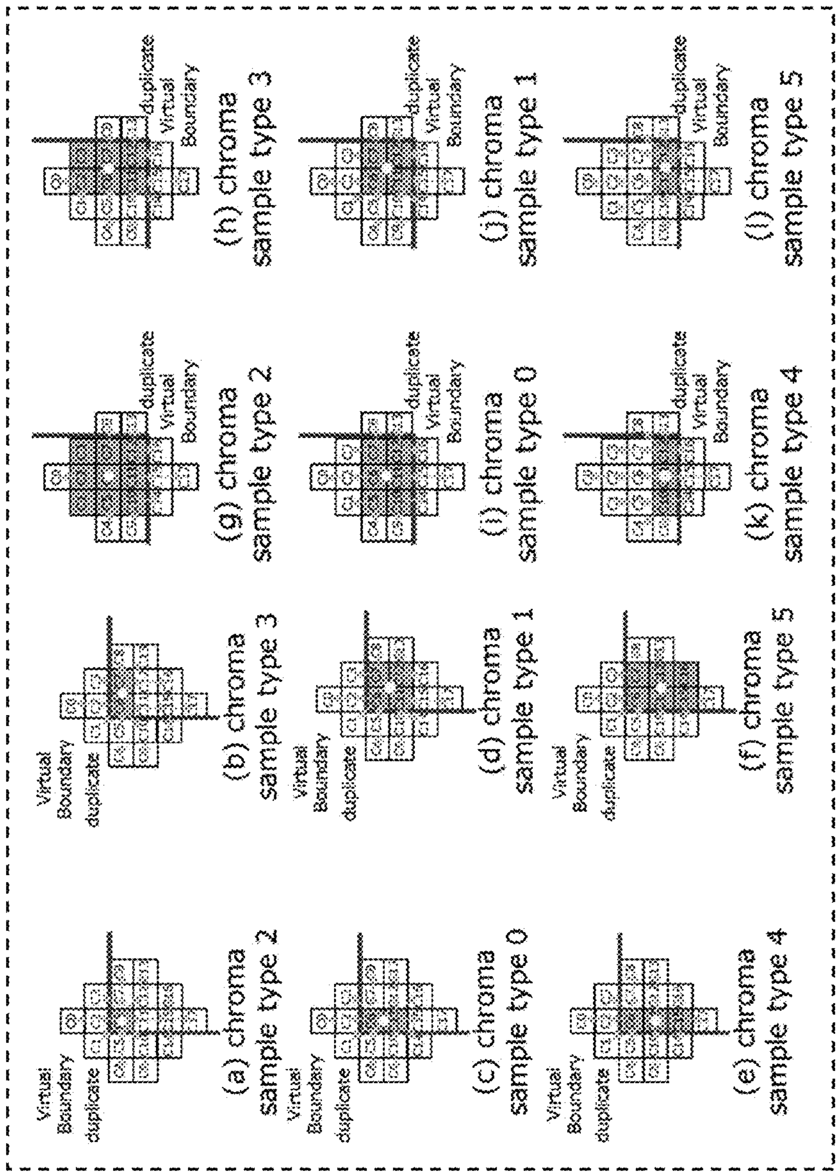

FIG. 155 illustrates further examples of padding with a horizontal and vertical virtual boundary.

Figure 156:
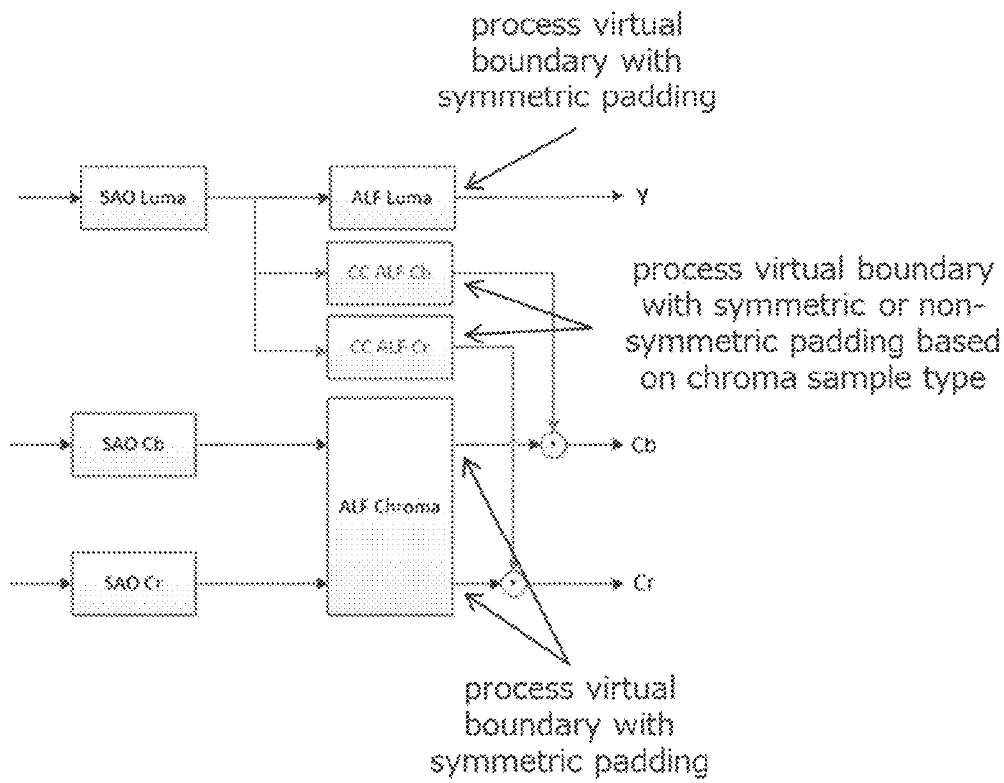

FIG. 156 is a block diagram illustrating a configuration of an encoder and a decoder according to an example where symmetric padding is used on virtual boundary locations for an ALF and either symmetric or non-symmetric padding is used on virtual boundary locations for a CC-ALF.

Figure 157:
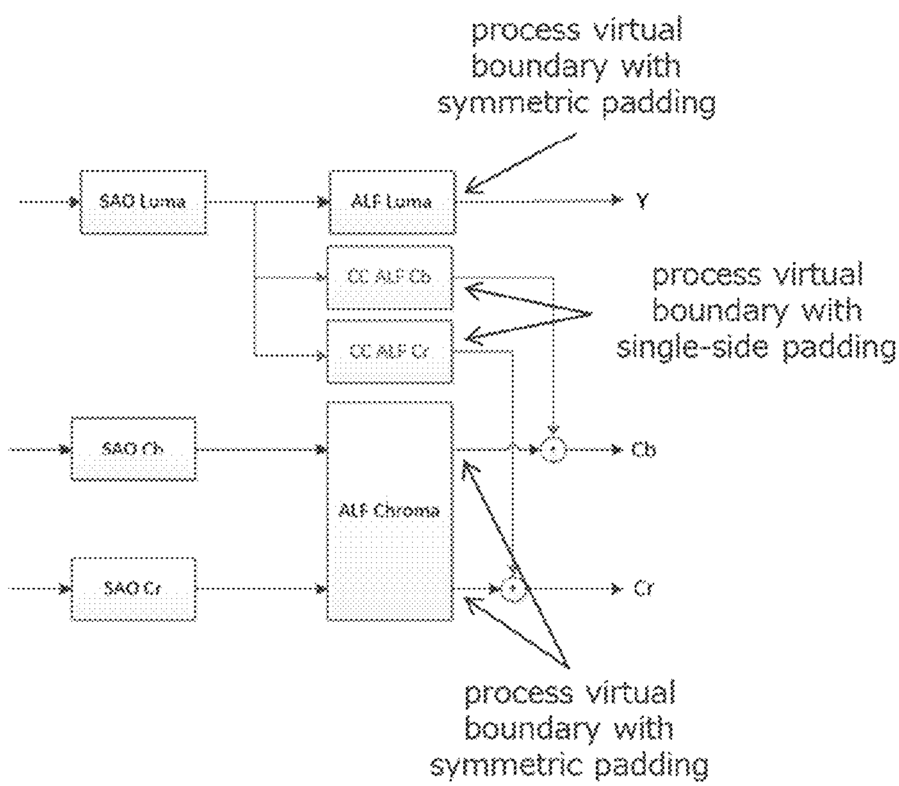

FIG. 157 is a block diagram illustrating a configuration of an encoder and a decoder according to another example where symmetric padding is used on virtual boundary locations for an ALF and single-side padding is used on virtual boundary locations for a CC-ALF.

Figure 158:
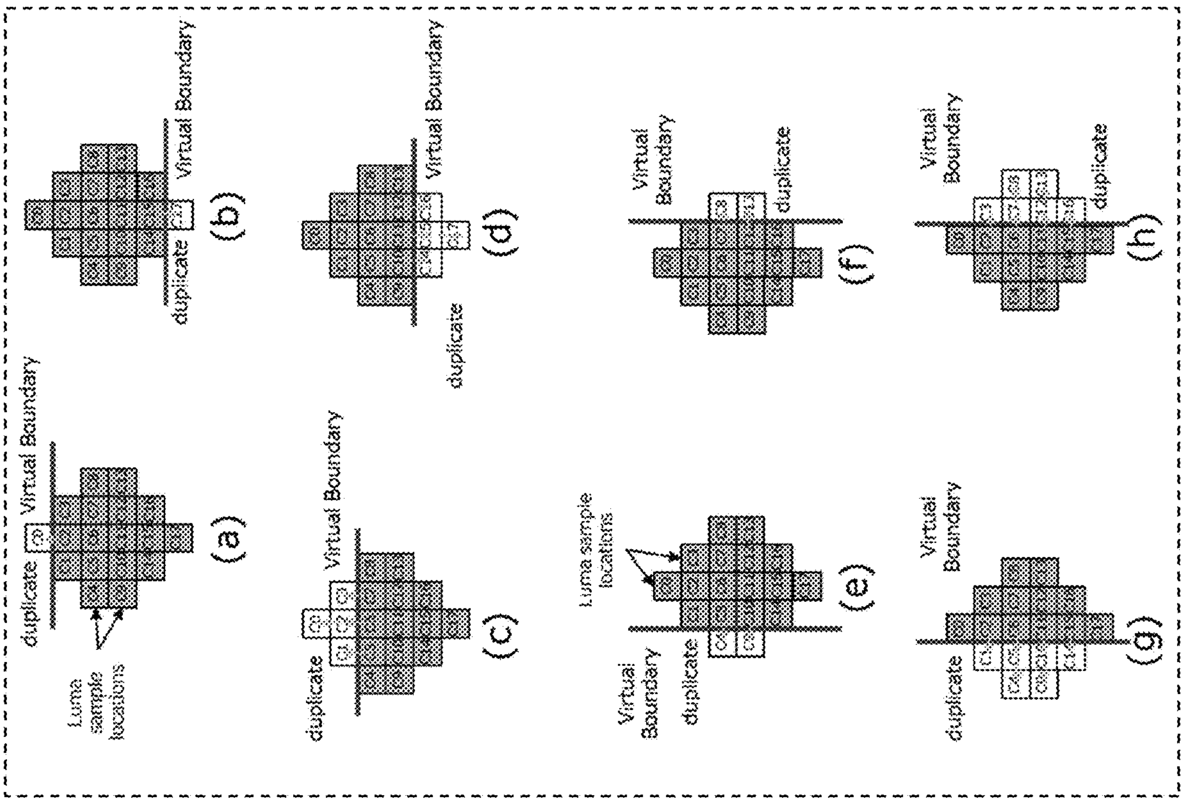

FIG. 158 is a conceptual diagram illustrating an example of single-side padding with either a horizontal or vertical virtual boundary.

Figure 159:
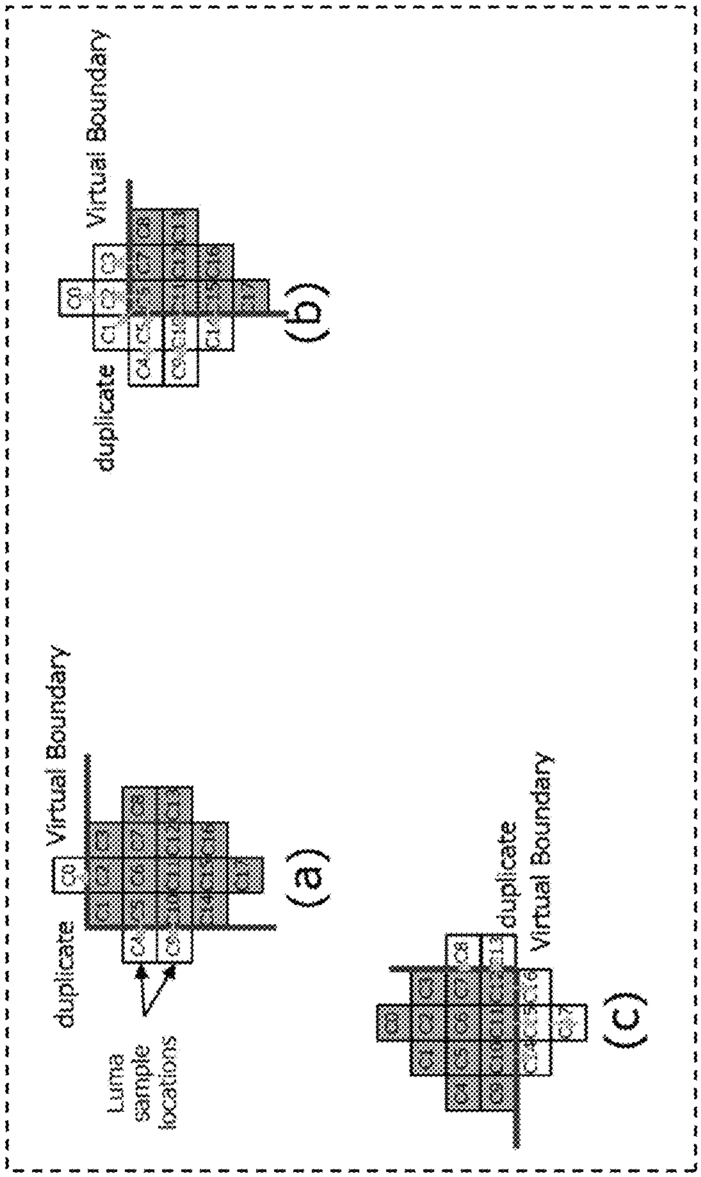

FIG. 159 is a conceptual diagram illustrating an example of single-side padding with a horizontal and vertical virtual boundary.

Figure 160:
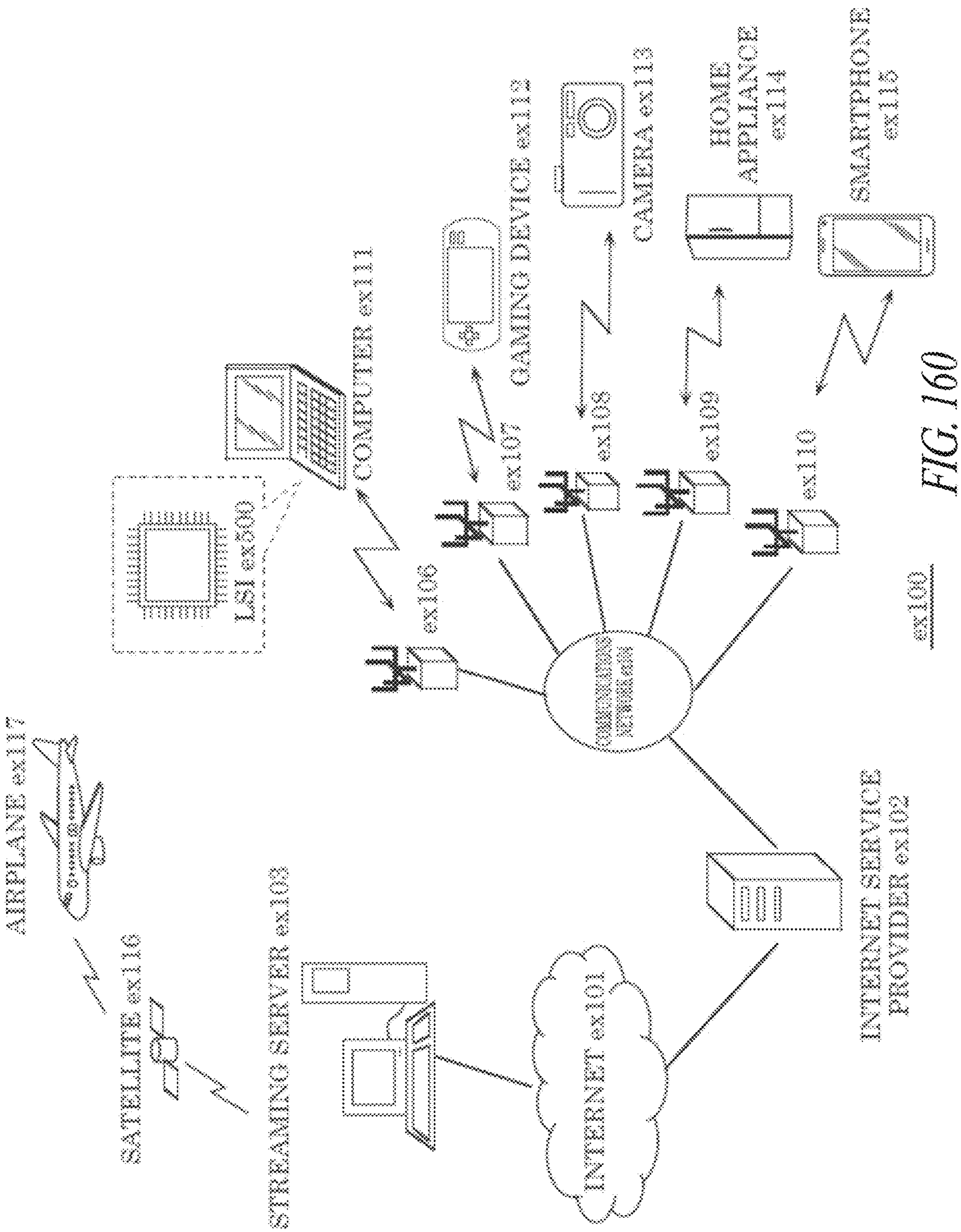

FIG. 160 is a diagram illustrating an example overall configuration of a content providing system for implementing a content distribution service.

Figure 161:
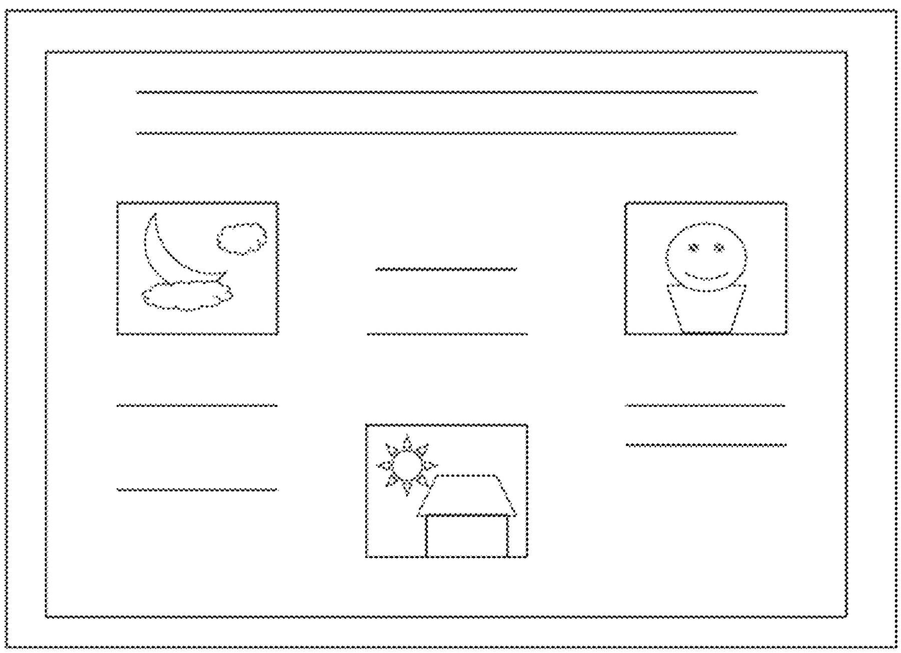

FIG. 161 is a conceptual diagram for illustrating an example of a display screen of a web page.

Figure 162:
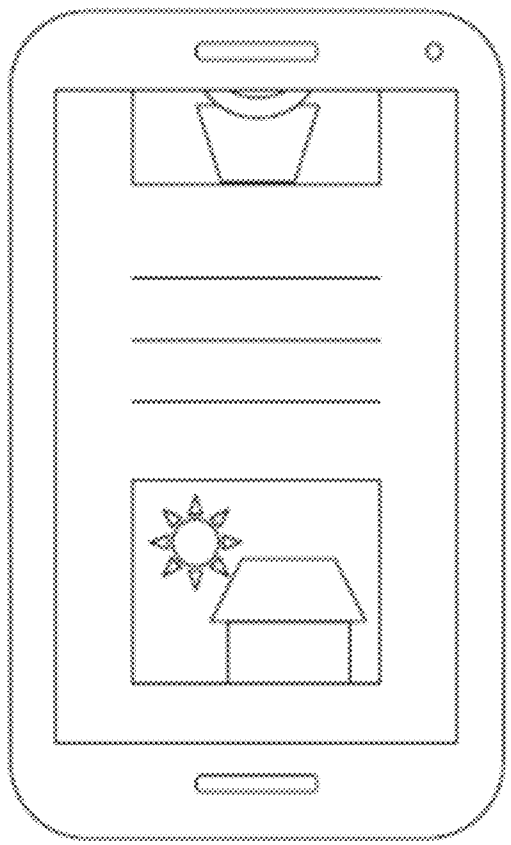

FIG. 162 is a conceptual diagram for illustrating an example of a display screen of a web page.

Figure 163:
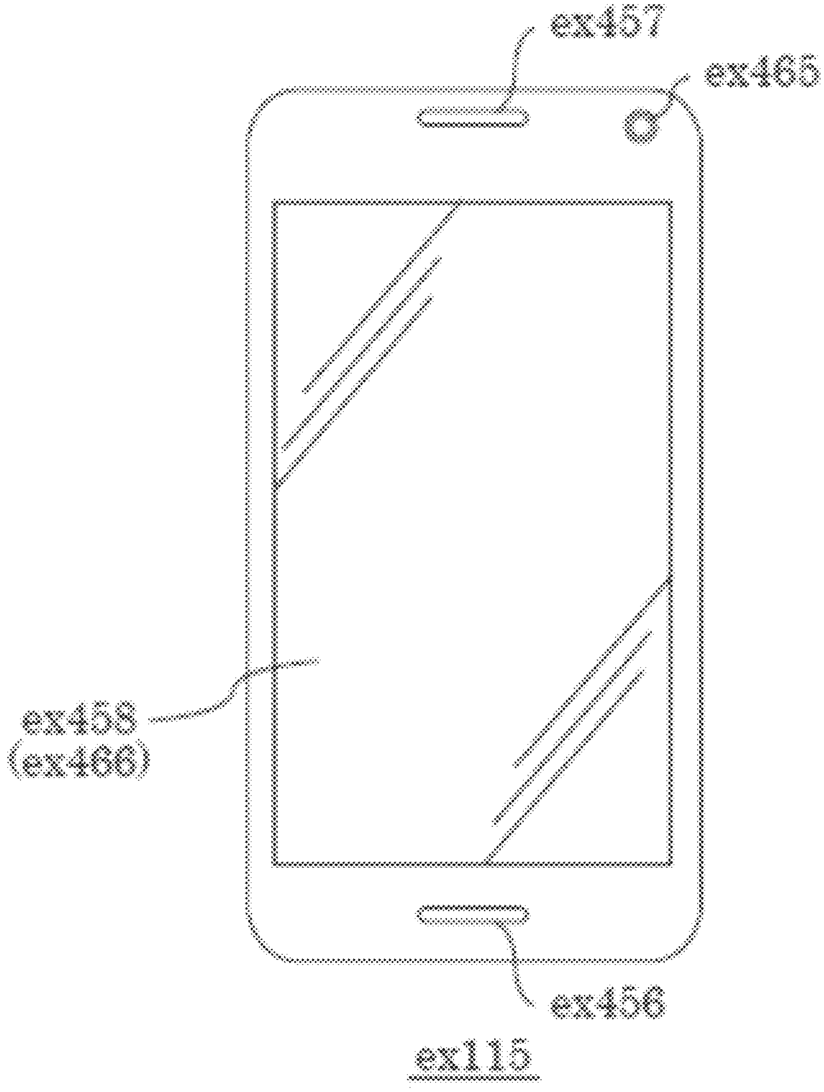

FIG. 163 is a block diagram illustrating one example of a smartphone.

Figure 164:
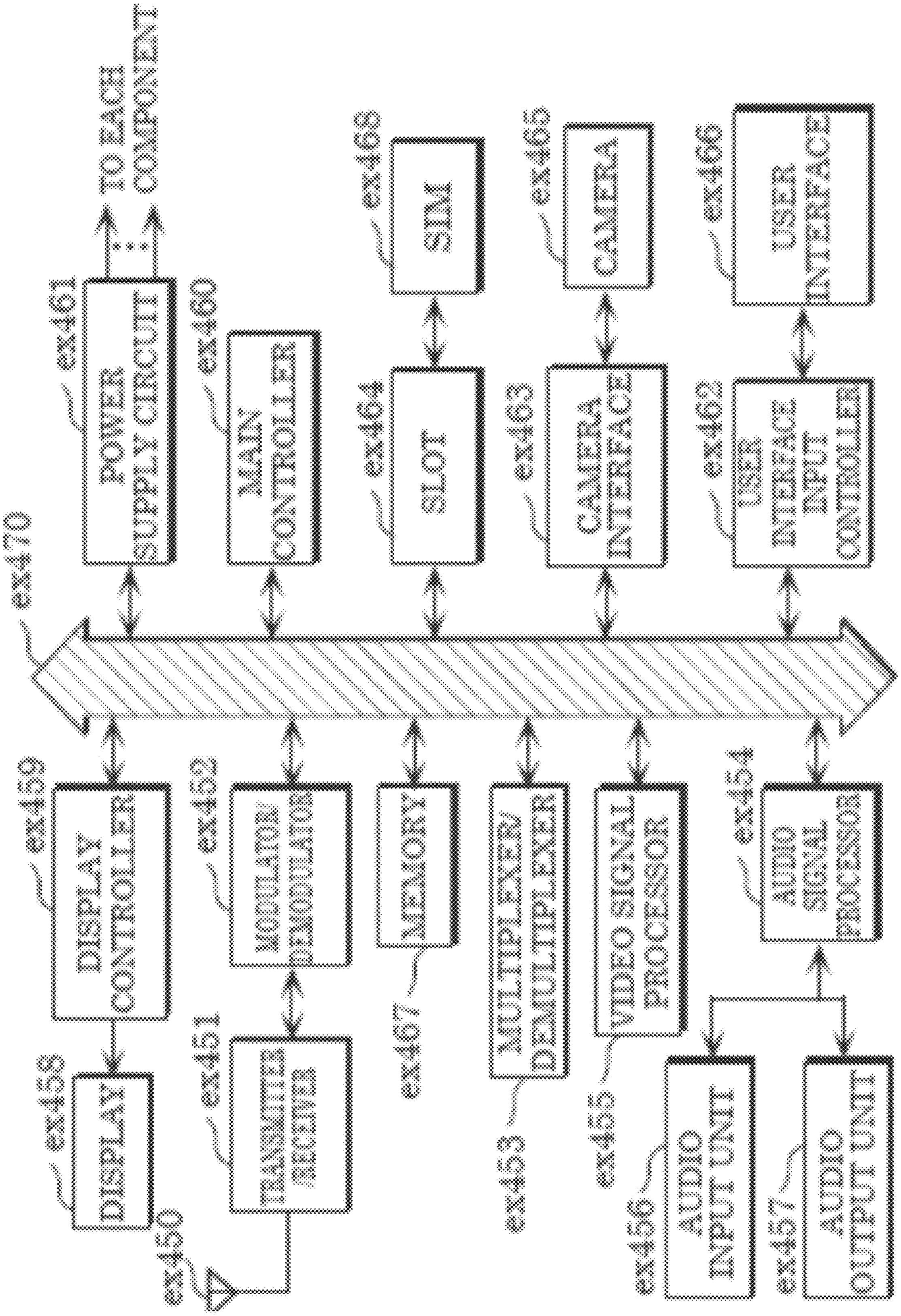

FIG. 164 is a block diagram illustrating an example of a configuration of a smartphone.

DESCRIPTION OF EMBODIMENTS

In the drawings, identical reference numbers identify similar elements, unless the context indicates otherwise. The sizes and relative positions of elements in the drawings are not necessarily drawn to scale.

Hereinafter, embodiment(s) will be described with reference to the drawings. Note that the embodiment(s) described below each show a general or specific example. The numerical values, shapes, materials, components, the arrangement and connection of the components, steps, the relation and order of the steps, etc., indicated in the following embodiment(s) are mere examples, and are not intended to limit the scope of the claims.

Embodiments of an encoder and a decoder will be described below. The embodiments are examples of an encoder and a decoder to which the processes and/or configurations presented in the description of aspects of the present disclosure are applicable. The processes and/or configurations can also be implemented in an encoder and a decoder different from those according to the embodiments. For example, regarding the processes and/or configurations as applied to the embodiments, any of the following may be implemented:

(1) Any of the components of the encoder or the decoder according to the embodiments presented in the description of aspects of the present disclosure may be substituted or combined with another component presented anywhere in the description of aspects of the present disclosure.

(2) In the encoder or the decoder according to the embodiments, discretionary changes may be made to functions or processes performed by one or more components of the encoder or the decoder, such as addition, substitution, removal, etc., of the functions or processes. For example, any function or process may be substituted or combined with another function or process presented anywhere in the description of aspects of the present disclosure.

(3) In methods implemented by the encoder or the decoder according to the embodiments, discretionary changes may be made such as addition, substitution, and removal of one or more of the processes included in the method. For example, any process in the method may be substituted or combined with another process presented anywhere in the description of aspects of the present disclosure.

(4) One or more components included in the encoder or the decoder according to embodiments may be combined with a component presented anywhere in the description of aspects of the present disclosure, may be combined with a component including one or more functions presented anywhere in the description of aspects of the present disclosure, and may be combined with a component that implements one or more processes implemented by a component presented in the description of aspects of the present disclosure.

(5) A component including one or more functions of the encoder or the decoder according to the embodiments, or a component that implements one or more processes of the encoder or the decoder according to the embodiments, may be combined or substituted with a component presented anywhere in the description of aspects of the present disclosure, with a component including one or more functions presented anywhere in the description of aspects of the present disclosure, or with a component that implements one or more processes presented anywhere in the description of aspects of the present disclosure.

(6) In methods implemented by the encoder or the decoder according to the embodiments, any of the processes included in the method may be substituted or combined with a process presented anywhere in the description of aspects of the present disclosure or with any corresponding or equivalent process.

(7) One or more processes included in methods implemented by the encoder or the decoder according to the embodiments may be combined with a process presented anywhere in the description of aspects of the present disclosure.

(8) The implementation of the processes and/or configurations presented in the description of aspects of the present disclosure is not limited to the encoder or the decoder according to the embodiments. For example, the processes and/or configurations may be implemented in a device used for a purpose different from the moving picture encoder or the moving picture decoder disclosed in the embodiments.

Definitions of Terms

The respective terms may be defined as indicated below as examples.

An image is a data unit configured with a set of pixels, is a picture, or includes blocks smaller than a pixel. Images include a still image in addition to a video.

A picture is an image processing unit configured with a set of pixels, and also may be referred to as a frame or a field. A picture may, for example, take the form of an array of luma samples in monochrome format or an array of luma samples and two corresponding arrays of chroma samples in 4:2:0, 4:2:2, and 4:4:4 color format.

A block is a processing unit which is a set of a determined number of pixels. Blocks may have any number of different shapes. For example, a block may have a rectangular shape of M×N (M-column by N-row) pixels, a square shape of M×M pixels, a triangular shape, a circular shape, etc. Examples of blocks include slices, tiles, bricks, CTUs, super blocks, basic splitting units, VPDUs, processing splitting units for hardware, CUs, processing block units, prediction block units (PUs) orthogonal transform block units (TUs), units, and sub-blocks. A block may take the form of an M×N array of samples, or an M×N array of transform coefficients. For example, a block may be a square or rectangular region of pixels including one Luma and two Chroma matrices.

A pixel or sample is a smallest point of an image. Pixels or samples include a pixel at an integer position, as well as pixels at sub-pixel positions, e.g., generated based on a pixel at an integer position.

A pixel value or a sample value is an eigenvalue of a pixel. Pixel values or sample values may include one or more of a luma value, a chroma value, an RGB gradation level, a depth value, binary values of zero or 1, etc.

Chroma or chrominance is an intensity of a color, typically represented by the symbols Cb and Cr, which specify that values of a sample array or a single sample value represent values of one of two color difference signals related to the primary colors.

Luma or luminance is a brightness of an image, typically represented by the symbol or the subscript Y or L, which specify that values of a sample array or a single sample value represent values of a monochrome signal related to the primary colors.

A flag comprises one or more bits which indicate a value, for example, of a parameter or index. A flag may be a binary flag which indicates a binary value of the flag, which also may indicate a non-binary value of a parameter.

A signal conveys information, which is symbolized by or encoded into the signal. Signals include discrete digital signals and continuous analog signals.

A stream or a bitstream is a digital data string of a digital data flow. A stream or bitstream may be one stream or may be configured with a plurality of streams having a plurality of hierarchical layers. A stream or bitstream may be transmitted in serial communication using a single transmission path, or may be transmitted in packet communication using a plurality of transmission paths.

A difference refers to various mathematical differences, such as a simple difference (x−y), an absolute value of a difference (|x−y|), a squared difference (x^2−y^2), a square root of a difference (√(x−y)), a weighted difference (ax−by: a and b are constants), an offset difference (x−y+a: a is an offset), etc. In the case of scalar quantity, a simple difference may suffice, and a difference calculation be included.

A sum refers to various mathematical sums, such as a simple sum (x+y), an absolute value of a sum (|x+y|), a squared sum (x^2+y^2), a square root of a sum (√(x+y)), a weighted difference (ax+by: a and b are constants), an offset sum (x+y+a: a is an offset), etc. In the case of scalar quantity, a simple sum may suffice, and a sum calculation be included.

A frame is the composition of a top field and a bottom field, where sample rows 0, 2, 4, . . . originate from the top field and sample rows 1, 3, 5, . . . originate from the bottom field.

A slice is an integer number of coding tree units contained in one independent slice segment and all subsequent dependent slice segments (if any) that precede the next independent slice segment (if any) within the same access unit.

A tile is a rectangular region of coding tree blocks within a particular tile column and a particular tile row in a picture. A tile may be a rectangular region of the frame that is intended to be able to be decoded and encoded independently, although loop-filtering across tile edges may still be applied.

A coding tree unit (CTU) may be a coding tree block of luma samples of a picture that has three sample arrays, or two corresponding coding tree blocks of chroma samples. Alternatively, a CTU may be a coding tree block of samples of one of a monochrome picture and a picture that is coded using three separate color planes and syntax structures used to code the samples. A super block may be a square block of 64×64 pixels that consists of either 1 or 2 mode info blocks or is recursively partitioned into four 32×32 blocks, which themselves can be further partitioned.

(System Configuration)

Figure 1:
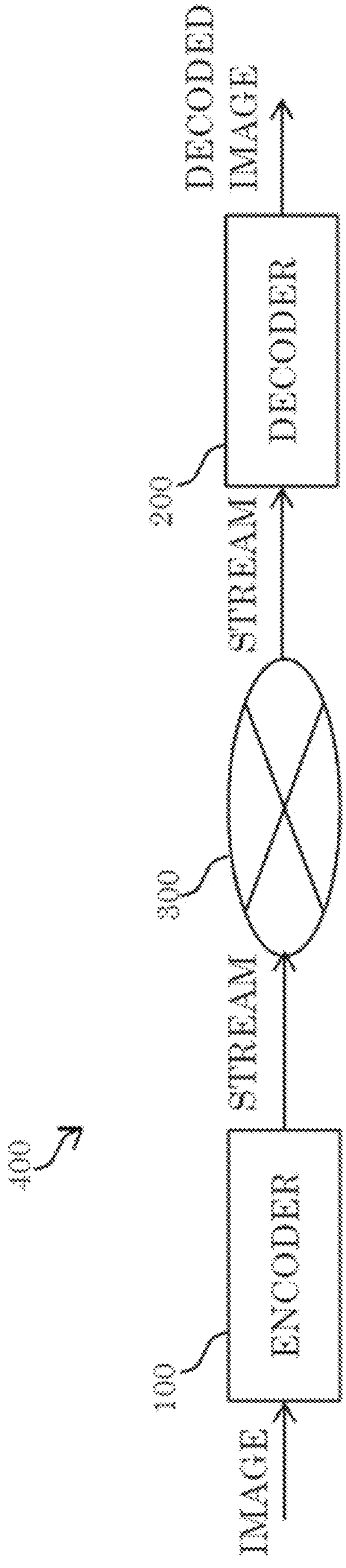
FIG. 1 is a schematic diagram illustrating one example of a configuration of a transmission system according to an embodiment.

First, a transmission system according to an embodiment will be described. FIG. 1 is a schematic diagram illustrating one example of a configuration of a transmission system 400 according to an embodiment.

The transmission system 400 is a system which transmits a stream generated by encoding an image and decodes the transmitted stream. As illustrated, transmission system 400 includes an encoder 100, a network 300, and decoder 200 as illustrated in FIG. 1.

An image is input to encoder 100. Encoder 100 generates a stream by encoding the input image, and outputs the stream to network 300. The stream includes, for example, the encoded image and control information for decoding the encoded image. The image is compressed by the encoding.

It is to be noted that an image before being encoded by the encoder 100 is also referred to as the original image, the original signal, or the original sample. The image may be a video or a still image. An image is a generic concept of a sequence, a picture, and a block, and thus is not limited to a spatial region having a particular size and to a temporal region having a particular size unless otherwise specified. An image is an array of pixels or pixel values, and the signal representing the image or pixel values are also referred to as samples. The stream may be referred to as a bitstream, an encoded bitstream, a compressed bitstream, or an encoded signal. Furthermore, the encoder 100 may be referred to as an image encoder or a video encoder. The encoding method performed by encoder 100 may be referred to as an encoding method, an image encoding method, or a video encoding method.

The network 300 transmits the stream generated by encoder 100 to decoder 200. The network 200 may be the Internet, a Wide Area Network (WAN), a Local Area Network (LAN), or any combination of networks. The network 300 is not limited to a bi-directional communication network, and may be a uni-directional communication network which transmits broadcast waves of digital terrestrial broadcasting, satellite broadcasting, or the like. Alternatively, the network 300 may be replaced by a recording medium such as a Digital Versatile Disc (DVD) and a Blue-Ray Disc (BD), etc. on which a stream is recorded.

The decoder 200 generates, for example, a decoded image which is an uncompressed image, by decoding a stream transmitted by network 300. For example, the decoder decodes a stream according to a decoding method corresponding to an encoding method employed by encoder 100.

It is to be noted that the decoder 200 may also be referred to as an image decoder or a video decoder, and that the decoding method performed by the decoder 200 may also be referred to as a decoding method, an image decoding method, or a video decoding method.

(Data Structure)

Figure 2:
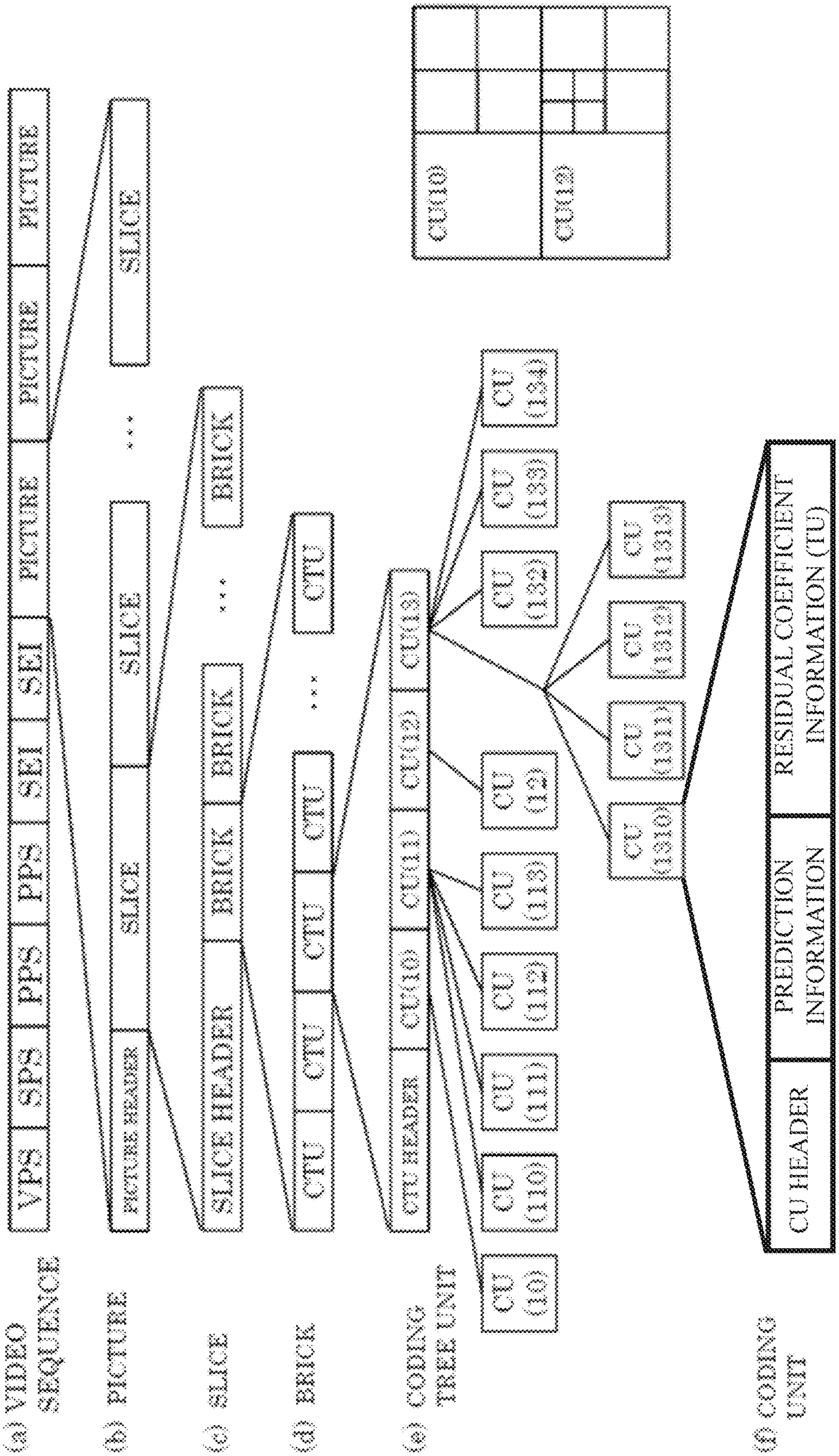
FIG. 2 is a conceptual diagram for illustrating one example of a hierarchical structure of data in a stream.

FIG. 2 is a conceptual diagram for illustrating one example of a hierarchical structure of data in a stream. For convenience, FIG. 2 will be described with reference to the transmission system 400 of FIG. 1. A stream includes, for example, a video sequence. As illustrated in (a) of FIG. 2, the video sequence includes a one or more video parameter sets (VPS), one or more sequence parameter sets (SPS), one or more picture parameter sets (PPS), supplemental enhancement information (SEI), and a plurality of pictures.

In a video having a plurality of layers, a VPS may include a coding parameter which is common between some of the plurality of layers, and a coding parameter related to some of the plurality of layers included in the video or to an individual layer.

An SPS includes a parameter which is used for a sequence, that is, a coding parameter which the decoder 200 refers to in order to decode the sequence. For example, the coding parameter may indicate the width or height of a picture. It is to be noted that a plurality of SPSs may be present.

A PPS includes a parameter which is used for a picture, that is, a coding parameter which the decoder 200 refers to in order to decode each of the pictures in the sequence. For example, the coding parameter may include a reference value for a quantization width which is used to decode a picture and a flag indicating application of weighted prediction. It is to be noted that a plurality of PPSs may be present. Each of the SPS and the PPS may be simply referred to as a parameter set.

As illustrated in (b) of FIG. 2, a picture may include a picture header and one or more slices. A picture header includes a coding parameter which the decoder 200 refers to in order to decode the one or more slices.

As illustrated in (c) of FIG. 2, a slice includes a slice header and one or more bricks. A slice header includes a coding parameter which the decoder 200 refers to in order to decode the one or more bricks.

As illustrated in (d) of FIG. 2, a brick includes one or more coding tree units (CTU).

It is to be noted that a picture may not include any slice and may include a tile group instead of a slice. In this case, the tile group includes at least one tile. In addition, a brick may include a slice.

A CTU is also referred to as a super block or a basis splitting unit. As illustrated in (e) of FIG. 2, a CTU includes a CTU header and at least one coding unit (CU). As illustrated, the CTU includes four coding units CU(10), CU(11), (CU(12) and CU(13). A CTU header includes a coding parameter which the decoder 200 refers to in order to decode the at least one CU.

A CU may be split into a plurality of smaller CUs. As shown, CU(10) is not split into smaller coding units; CU(11) is split into four smaller coding units CU(110), CU(111), CU(112) and CU(113); CU(12) is not split into smaller coding units; and CU(13) is split into seven smaller coding units CU(1310), CU(1311), CU(1312), CU(1313), CU(132), CU(133) and CU(134) As illustrated in (f) of FIG. 2, a CU includes a CU header, prediction information, and residual coefficient information. Prediction information is information for predicting the CU, and the residual coefficient information is information indicating a prediction residual to be described later. Although a CU is basically the same as a prediction unit (PU) and a transform unit (TU), it is to be noted that, for example, a sub-block transform (SBT) to be described later may include a plurality of TUs smaller than the CU. In addition, the CU may be processed for each virtual pipeline decoding unit (VPDU) included in the CU. The VPDU is, for example, a fixed unit which can be processed at one stage when pipeline processing is performed in hardware.

It is to be noted that a stream may not include all of the hierarchical layers illustrated in FIG. 2. The order of the hierarchical layers may be exchanged, or any of the hierarchical layers may be replaced by another hierarchical layer. Here, a picture which is a target for a process which is about to be performed by a device such as encoder 100 or decoder 200 is referred to as a current picture. A current picture means a current picture to be encoded when the process is an encoding process, and a current picture means a current picture to be decoded when the process is a decoding process. Likewise, for example, a CU or a block of CUs which is a target for a process which is about to be performed by a device such as the encoder 100 or the decoder 200 is referred to as a current block. A current block means a current block to be encoded when the process is an encoding process, and a current block means a current block to be decoded when the process is a decoding process.

(Picture Structure: Slice/Tile)

A picture may be configured with one or more slice units or one or more tile units to facilitate coding/decoding of the picture in parallel.

Slices are basic coding units included in a picture. A picture may include, for example, one or more slices. In addition, a slice includes one or more coding tree units (CTUs).

Figure 3:
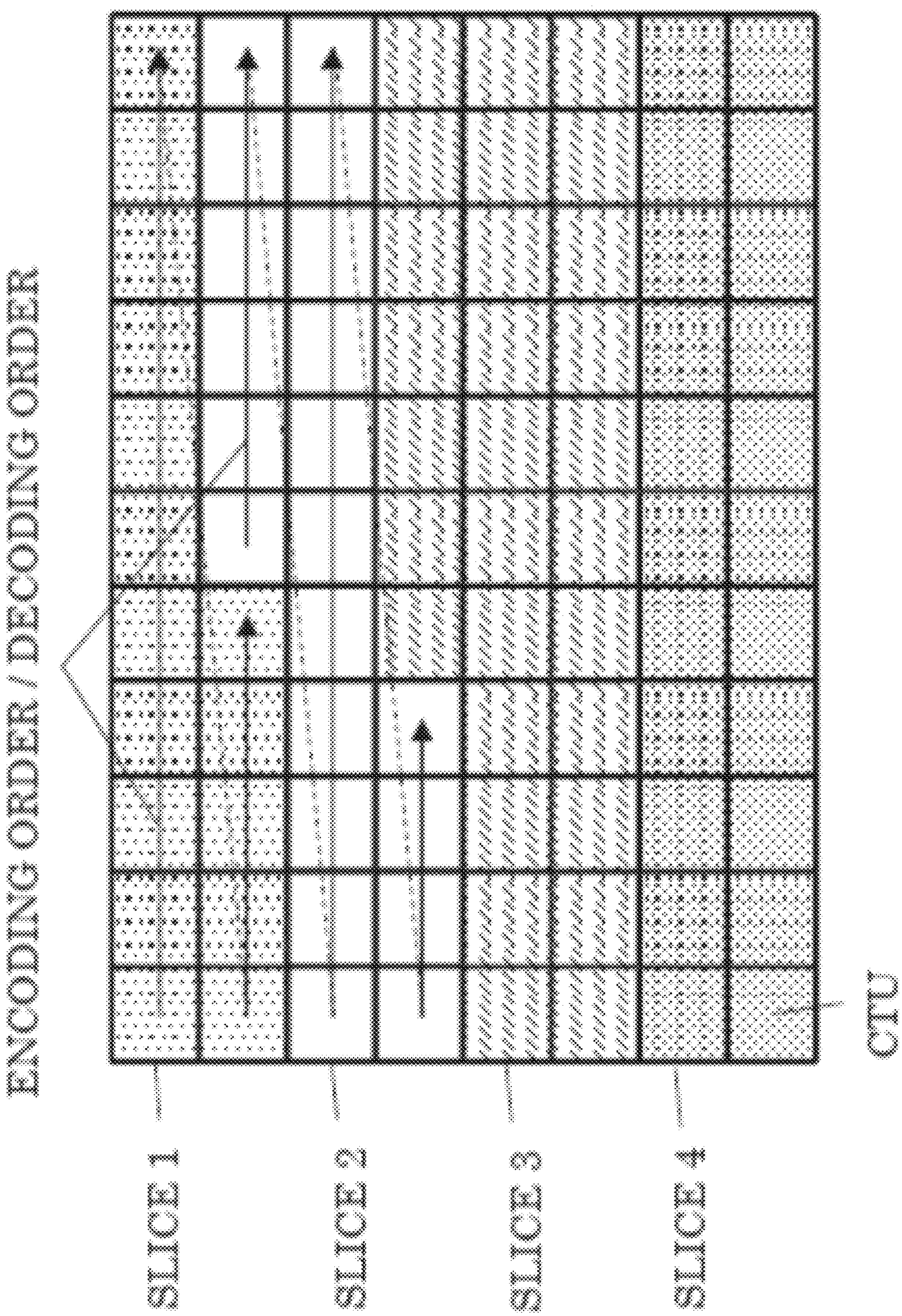
FIG. 3 is a conceptual diagram for illustrating one example of a slice configuration.

FIG. 3 is a conceptual diagram for illustrating one example of a slice configuration. For example, in FIG. 3 a picture includes 11×8 CTUs, and is split into four slices (slices 1 to 4). Slice 1 includes sixteen CTUs, slice 2 includes twenty-one CTUs, slice 3 includes twenty-nine CTUs, and slice 4 includes twenty-two CTUs. Here, each CTU in the picture belongs to one of the slices. The shape of each slice is a shape obtained by splitting the picture horizontally. A boundary of each slice does not need to coincide with an image end, and may coincide with any of the boundaries between CTUs in the image. The processing order of the CTUs in a slice (an encoding order or a decoding order) is, for example, a raster-scan order. A slice includes a slice header and encoded data. Features of the slice may be written in the slice header. The features may include a CTU address of a top CTU in the slice, a slice type, etc.

A tile is a unit of a rectangular region included in a picture. Tiles of a picture may be assigned with a number referred to as TileId in raster-scan order.

Figure 4:
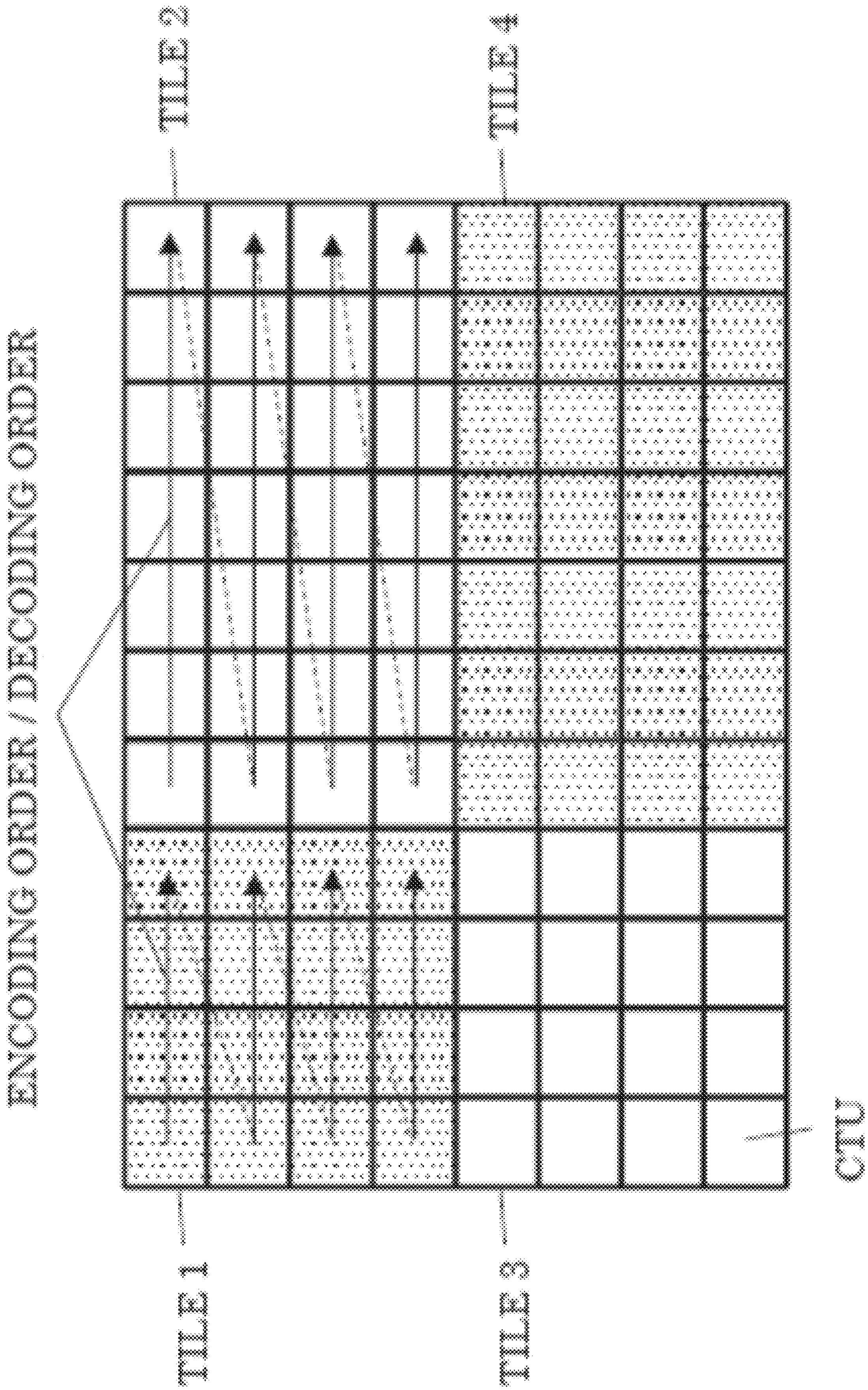
FIG. 4 is a conceptual diagram for illustrating one example of a tile configuration.

FIG. 4 is a conceptual diagram for illustrating one example of a tile configuration. For example, in FIG. 4 a picture includes 11×8 CTUs, and is split into four tiles of rectangular regions (tiles 1 to 4). When tiles are used, the processing order of CTUs may be different from the processing order in the case where tiles are not used. When no tile is used, a plurality of CTUs in a picture generally are processed in raster-scan order. When a plurality of tiles are used, at least one CTU in each of the plurality of tiles is processed in raster-scan order. For example, as illustrated in FIG. 4 the processing order of the CTUs included in tile 1 from the left-end of the first column of tile 1 toward the right-end of the first column of tile 1 and then continues from the left-end of the second column of tile 1 toward the right-end of the second column of tile 1.

It is to be noted that the one tile may include one or more slices, and one slice may include one or more tiles.

It is to be noted that the picture may be configured with one or more tile sets. A tile set may include one or more tile groups, or one or more tiles. A picture may be configured with one of a tile set, a tile group, and a tile. For example, an order for scanning a plurality of tiles for each tile set in raster scan order is assumed to be a basic encoding order of tiles. A set of one or more tiles which are continuous in the basic encoding order in each tile set is assumed to be a tile group. Such a picture may be configured by splitter 102 (see FIG. 7) to be described later.

(Scalable Encoding)

Figure 5:
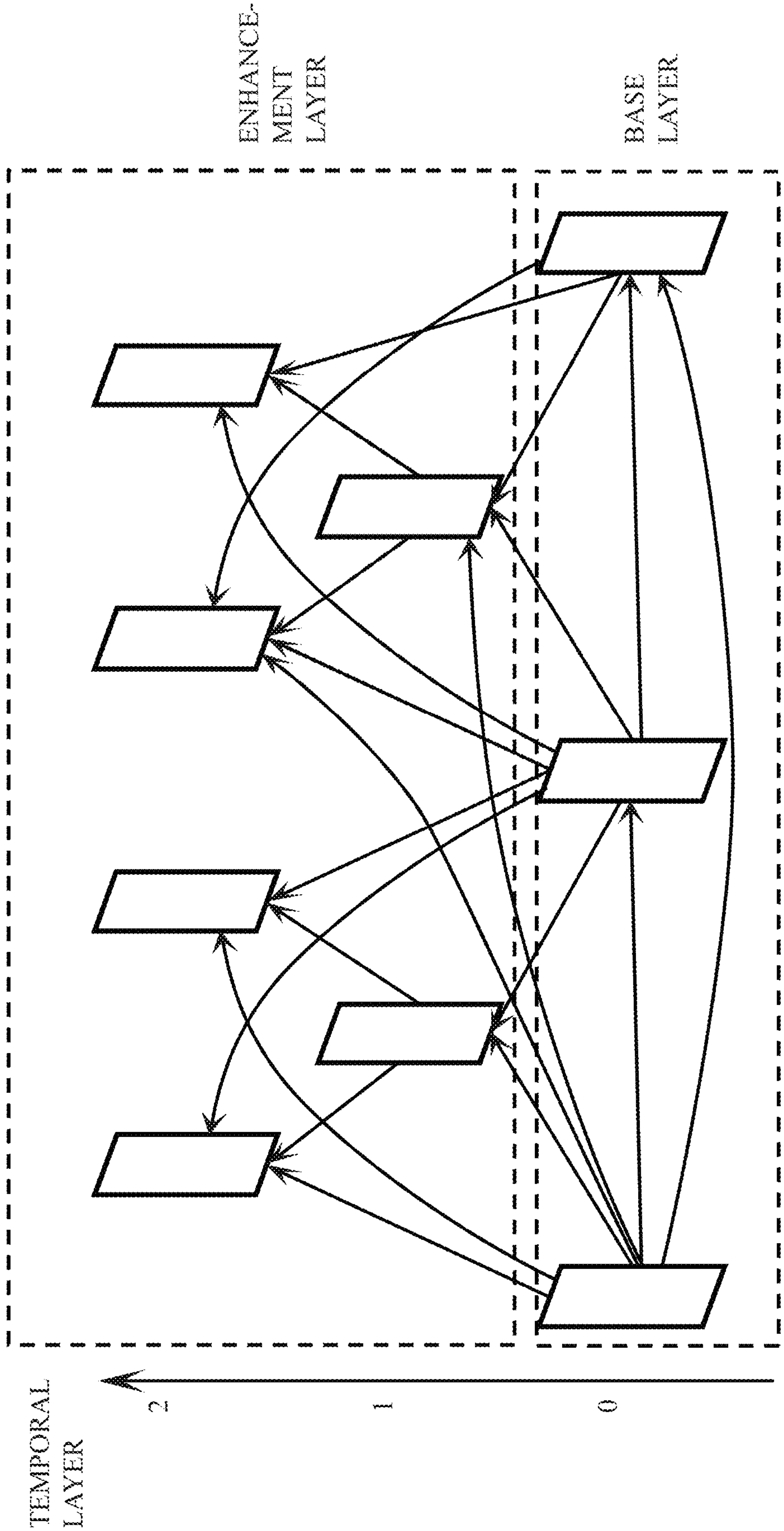
FIG. 5 is a conceptual diagram for illustrating one example of an encoding structure in scalable encoding.
Figure 6:
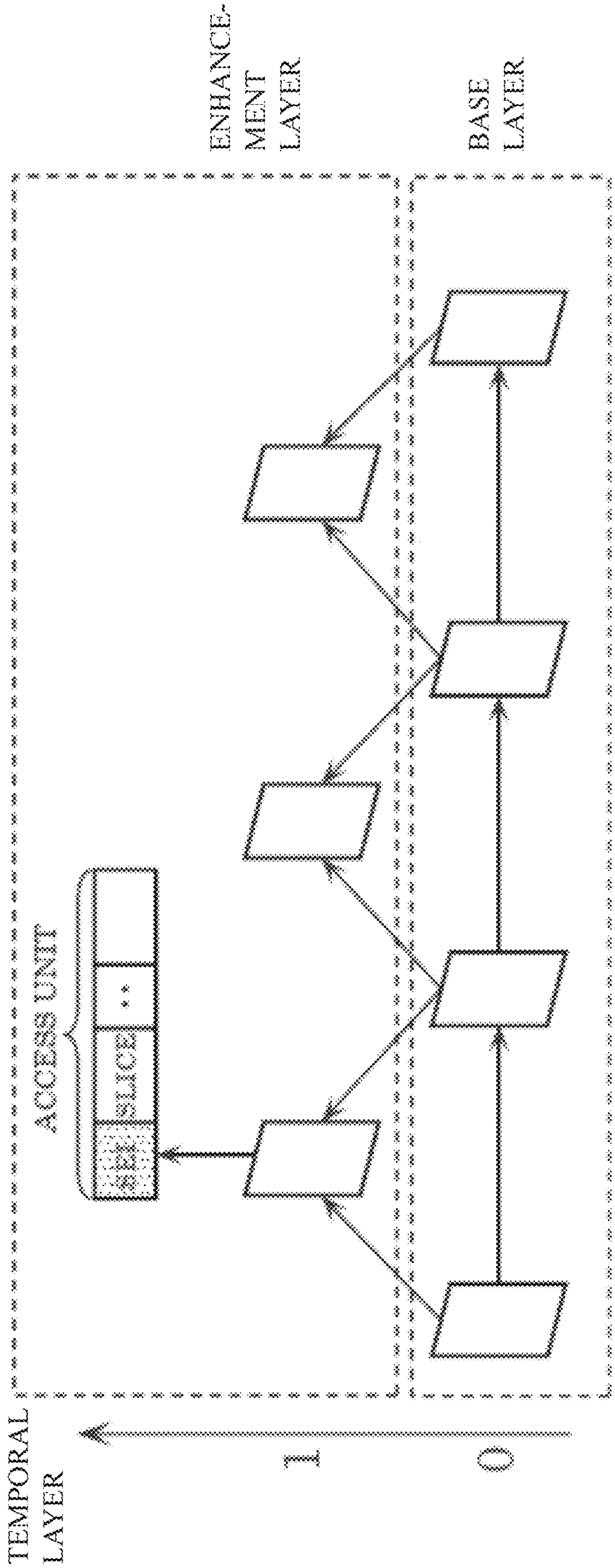
FIG. 6 is a conceptual diagram for illustrating one example of an encoding structure in scalable encoding.

FIGS. 5 and 6 are conceptual diagrams illustrating examples of scalable stream structures, and will be described for convenience with reference to FIG. 1.

As illustrated in FIG. 5, encoder 100 may generate a temporally/spatially scalable stream by dividing each of a plurality of pictures into any of a plurality of layers and encoding the picture in the layer. For example, encoder 100 encodes the picture for each layer, thereby achieving scalability where an enhancement layer is present above a base layer. Such encoding of each picture is also referred to as scalable encoding. In this way, decoder 200 is capable of switching image quality of an image which is displayed by decoding the stream. In other words, decoder 200 may determine which layer to decode based on internal factors such as the processing ability of decoder 200 and external factors such as a state of a communication bandwidth. As a result, decoder 200 is capable of decoding a content while freely switching between low resolution and high resolution. For example, the user of the stream watches a video of the stream halfway using a smartphone on the way to home, and continues watching the video at home on a device such as a TV connected to the Internet. It is to be noted that each of the smartphone and the device described above includes decoder 200 having the same or different performances. In this case, when the device decodes layers up to the higher layer in the stream, the user can watch the video at high quality at home. In this way, encoder 100 does not need to generate a plurality of streams having different image qualities of the same content, and thus the processing load can be reduced.

Furthermore, the enhancement layer may include meta information based on statistical information on the image. Decoder 200 may generate a video whose image quality has been enhanced by performing super-resolution imaging on a picture in the base layer based on the metadata. Super-resolution imaging may include, for example, improvement in the Signal-to-Noise (SN) ratio in the same resolution, an increase in resolution, etc. Metadata may include, for example, information for identifying a linear or a non-linear filter coefficient, as used in a super-resolution process, or information identifying a parameter value in a filter process, machine learning, or a least squares method used in super-resolution processing, etc.

In an embodiment, a configuration may be provided in which a picture is divided into, for example, tiles in accordance with, for example, the meaning of an object in the picture. In this case, decoder 200 may decode only a partial region in a picture by selecting a tile to be decoded. In addition, an attribute of the object (person, car, ball, etc.) and a position of the object in the picture (coordinates in identical images) may be stored as metadata. In this case, decoder 200 is capable of identifying the position of a desired object based on the metadata, and determining the tile including the object. For example, as illustrated in FIG.

6, the metadata may be stored using a data storage structure different from image data, such as an SEI (supplemental enhancement information) message in HEVC. This metadata indicates, for example, the position, size, or color of the main object.

Metadata may be stored in units of a plurality of pictures, such as a stream, a sequence, or a random access unit. In this way, decoder 200 is capable of obtaining, for example, the time at which a specific person appears in the video, and by fitting the time information with picture unit information, is capable of identifying a picture in which the object (person) is present and determining the position of the object in the picture.

(Encoder)

Figure 7:
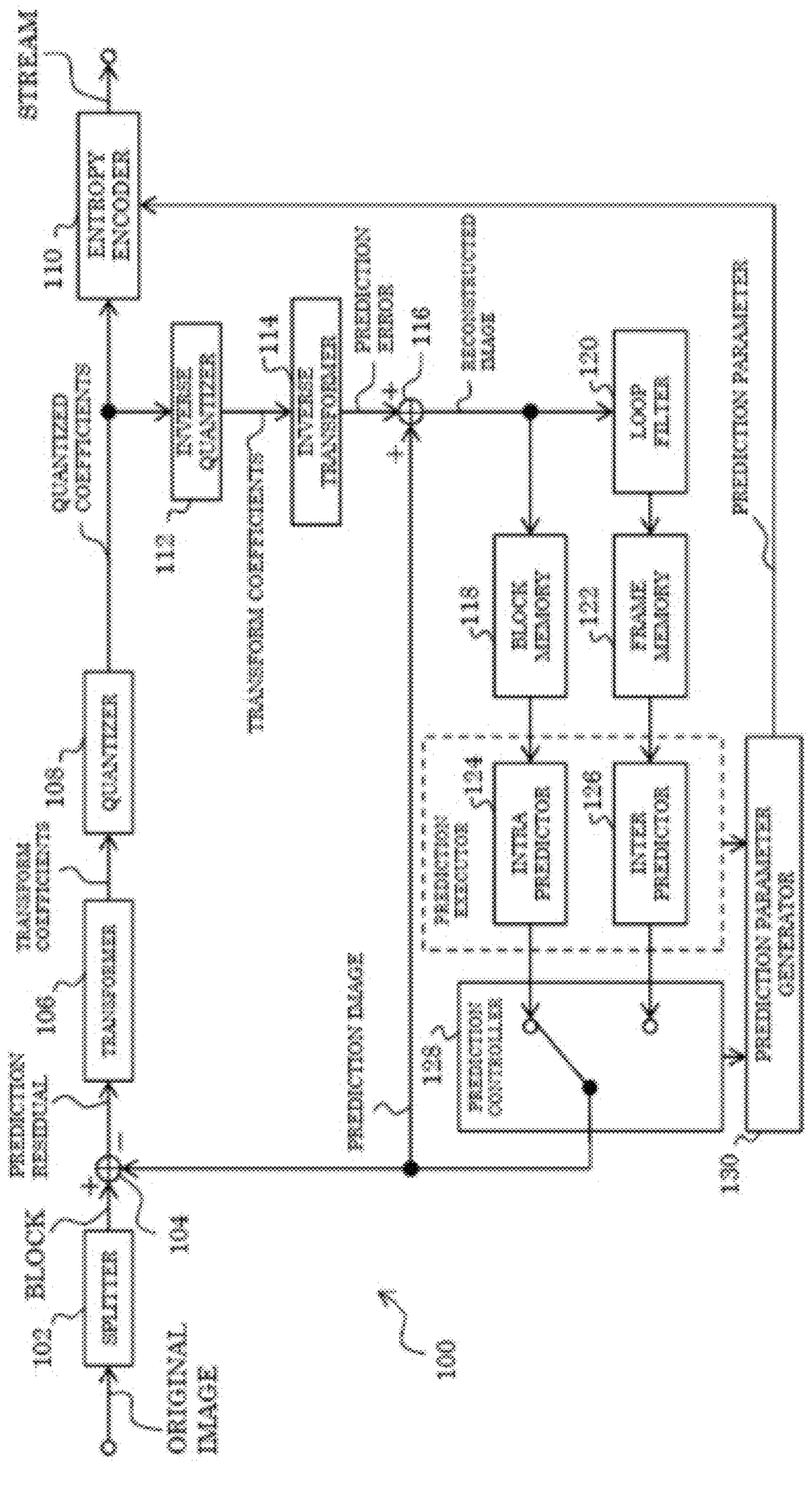
FIG. 7 is a block diagram illustrating a configuration of an encoder according to an embodiment.

An encoder according to an embodiment will be described. FIG. 7 is a block diagram illustrating a configuration of encoder 100 according to the embodiment. Encoder 100 is a video encoder which encodes a video in units of a block.

As illustrated in FIG. 7, encoder 100 is an apparatus which encodes an image in units of a block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, prediction controller 128, and prediction parameter generator 130. As illustrated, intra predictor 124 and inter predictor 126 are part of a prediction controller.

Encoder 100 is implemented as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be implemented as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

(Mounting Example of Encoder)

Figure 8:
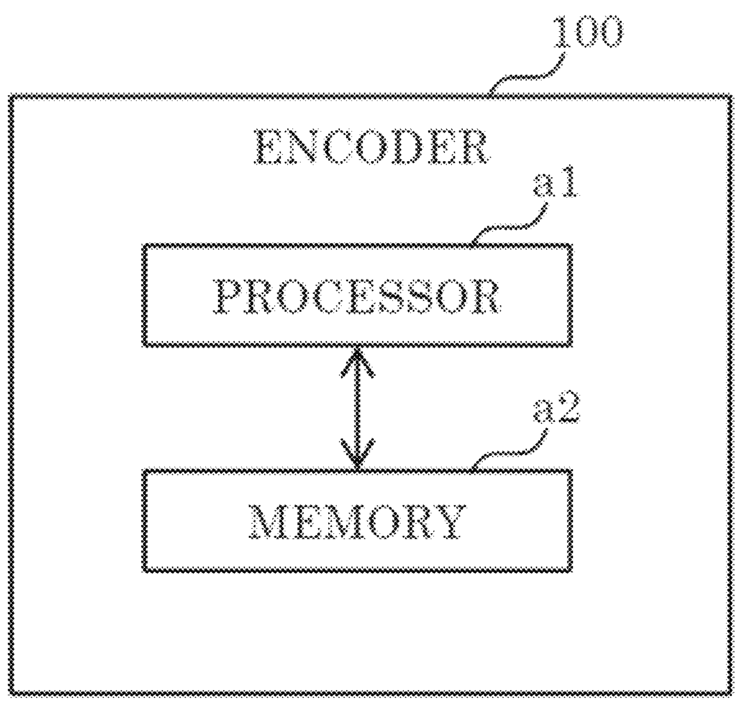
FIG. 8 is functional block diagram illustrating a mounting example of the encoder.

FIG. 8 is a functional block diagram illustrating a mounting example of an encoder 100. Encoder 100 includes processor a1 and memory a2. For example, the plurality of constituent elements of encoder 100 illustrated in FIG. 7 are mounted on processor a1 and memory a2 illustrated in FIG. 8.

Processor a1 is circuitry which performs information processing and is coupled to memory a2. For example, processor a1 is dedicated or general electronic circuitry which encodes an image. Processor a1 may be a processor such as a CPU. In addition, processor a1 may be an aggregate of a plurality of electronic circuits. In addition, for example, processor a1 may take the roles of two or more constituent elements out of the plurality of constituent elements of encoder 100 illustrated in FIG. 7, etc.

Memory a2 is dedicated or general memory for storing information that is used by processor a1 to encode the image. Memory a2 may be electronic circuitry, and may be connected to processor a1. In addition, memory a2 may be included in processor a1. In addition, memory a2 may be an aggregate of a plurality of electronic circuits. In addition, memory a2 may be a magnetic disc, an optical disc, or the like, or may be represented as a storage, a recording medium, or the like. In addition, memory a2 may be non-volatile memory, or volatile memory.

For example, memory a2 may store an image to be encoded or a bitstream corresponding to an encoded image. In addition, memory a2 may store a program for causing processor a1 to encode an image.

In addition, for example, memory a2 may take the roles of two or more constituent elements for storing information out of the plurality of constituent elements of encoder 100 illustrated in FIG. 7, etc. For example, memory a2 may take the roles of block memory 118 and frame memory 122 illustrated in FIG. 7. More specifically, memory a2 may store a reconstructed block, a reconstructed picture, etc.

It is to be noted that, in encoder 100, all of the plurality of constituent elements indicated in FIG. 7, etc. may not be implemented, and all the processes described herein may not be performed. Part of the constituent elements indicated in FIG. 7, etc. may be included in another device, or part of the processes described herein may be performed by another device.

Hereinafter, an overall flow of processes performed by encoder 100 is described, and then each of constituent elements included in encoder 100 will be described.

(Overall Flow of Encoding Process)

Figure 9:
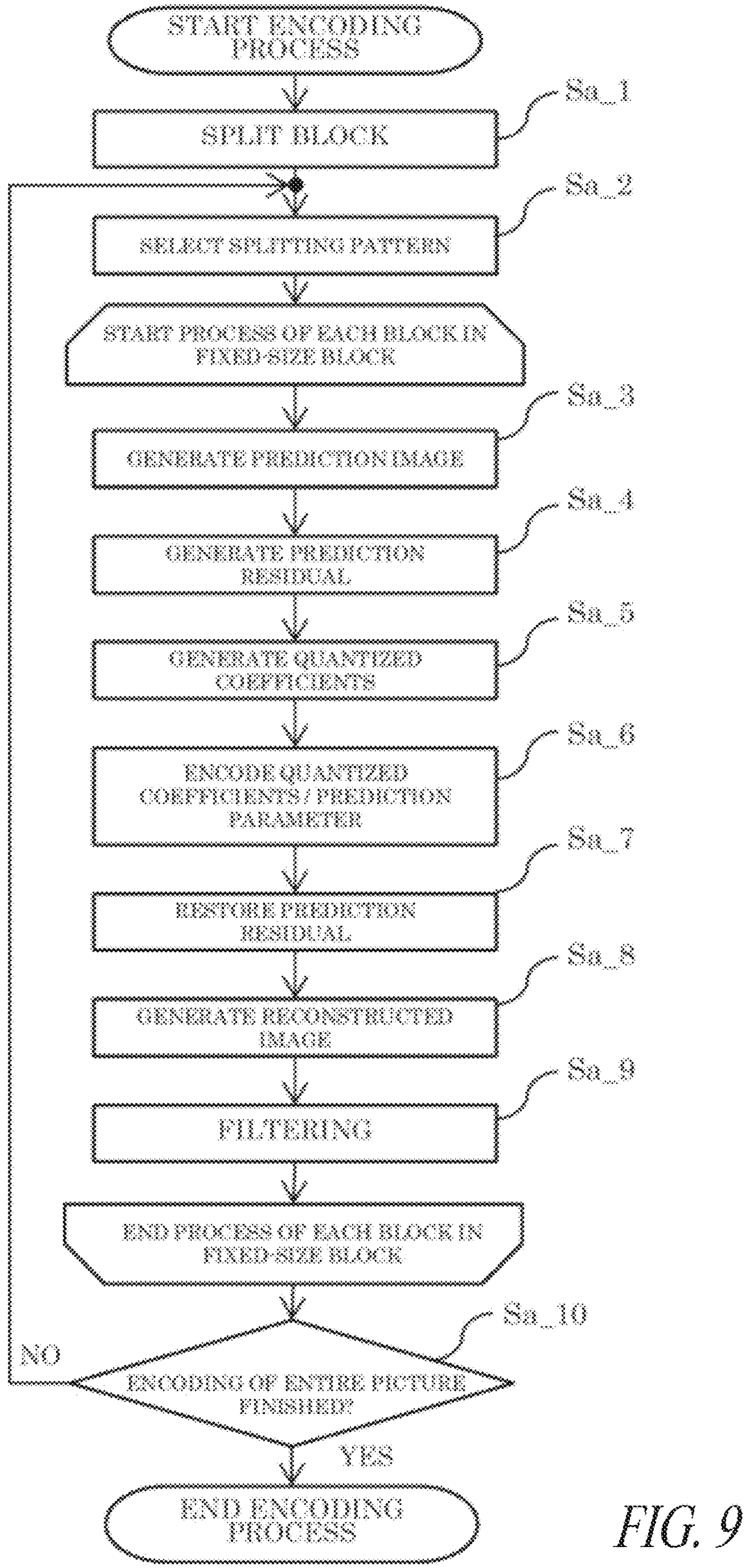
FIG. 9 is a flow chart indicating one example of an overall encoding process performed by the encoder.

FIG. 9 is a flow chart indicating one example of an overall encoding process performed by encoder 100, and for convenience will be described with reference to FIG. 7.

First, splitter 102 of encoder 100 splits each of the pictures included in an input image into a plurality of blocks having a fixed size (e.g., 128×128 pixels) (Step Sa_1). Splitter 102 then selects a splitting pattern for the fixed-size block (also referred to as a block shape) (Step Sa_2). In other words, splitter 102 further splits the fixed-size block into a plurality of blocks which form the selected splitting pattern. Encoder 100 performs, for each of the plurality of blocks, Steps Sa_3 to Sa_9 for the block (that is a current block to be encoded).

Prediction controller 128 and prediction executor (which includes intra predictor 124 and inter predictor 126) generate a prediction image of a current block (Step Sa-3). The prediction image may also be referred to as a prediction signal, a prediction block, or prediction samples.

Next, subtractor 104 generates a difference between the current block and a prediction image as a prediction residual (Step Sa_4). The prediction residual may also be referred to as a prediction error.

Next, transformer 106 transforms the prediction image and quantizer 108 quantizes the result, to generate a plurality of quantized coefficients (Step Sa_5). The plurality of quantized coefficients may sometimes be referred to as a coefficient block.

Next, entropy encoder 110 encodes (specifically, entropy encodes) the plurality of quantized coefficients and a prediction parameter related to generation of a prediction image, to generate a stream (Step Sa_6). The stream may sometimes be referred to as an encoded bitstream or a compressed bitstream.

Next, inverse quantizer 112 performs inverse quantization of the plurality of quantized coefficients and inverse transformer 114 performs inverse transformation of the result, to restore a prediction residual (Step Sa_7).

Next, adder 116 adds the prediction image to the restored prediction residual to reconstruct the current block (Step Sa_8). In this way, the reconstructed image is generated. The reconstructed image may also be referred to as a reconstructed block or a decoded image block.

When the reconstructed image is generated, loop filter 120 performs filtering of the reconstructed image as necessary (Step Sa_9).

Encoder 100 then determines whether encoding of the entire picture has been finished (Step Sa_10). When determining that the encoding has not yet been finished (No in Step Sa_10), execution of processes from Step Sa_2 are repeated for the next block of the picture.

Although encoder 100 selects one splitting pattern for a fixed-size block, and encodes each block according to the splitting pattern in the above-described example, it is to be noted that each block may be encoded according to a corresponding one of a plurality of splitting patterns. In this case, encoder 100 may evaluate a cost for each of the plurality of splitting patterns, and, for example, may select the stream obtainable by encoding according to the splitting pattern which yields the smallest cost as a stream which is output.

As illustrated, the processes in Steps Sa_1 to Sa_10 are performed sequentially by encoder 100. Alternatively, two or more of the processes may be performed in parallel, the processes may be reordered, etc.

The encoding process employed by encoder 100 is a hybrid encoding using prediction encoding and transform encoding. In addition, prediction encoding is performed by an encoding loop configured with subtractor 104, transformer 106, quantizer 108, inverse quantizer 112, inverse transformer 114, adder 116, loop filter 120, block memory 118, frame memory 122, intra predictor 124, inter predictor 126, and prediction controller 128. In other words, the prediction executor configured with intra predictor 124 and inter predictor 126 is part of the encoding loop.

(Splitter)

Splitter 102 splits each picture included in the original image into a plurality of blocks, and outputs each block to subtractor 104. For example, splitter 102 first splits a picture into blocks of a fixed size (for example, 128×128 pixels). Other fixed block sizes may be employed. The fixed-size block is also referred to as a coding tree unit (CTU). Splitter 102 then splits each fixed-size block into blocks of variable sizes (for example, 64×64 pixels or smaller), based on recursive quadtree and/or binary tree block splitting. In other words, splitter 102 selects a splitting pattern. The variable-size block also may be referred to as a coding unit (CU), a prediction unit (PU), or a transform unit (TU). It is to be noted that, in various kinds of processing examples, there is no need to differentiate between CU, PU, and TU; all or some of the blocks in a picture may be processed in units of a CU, a PU, or a TU.

Figure 10:
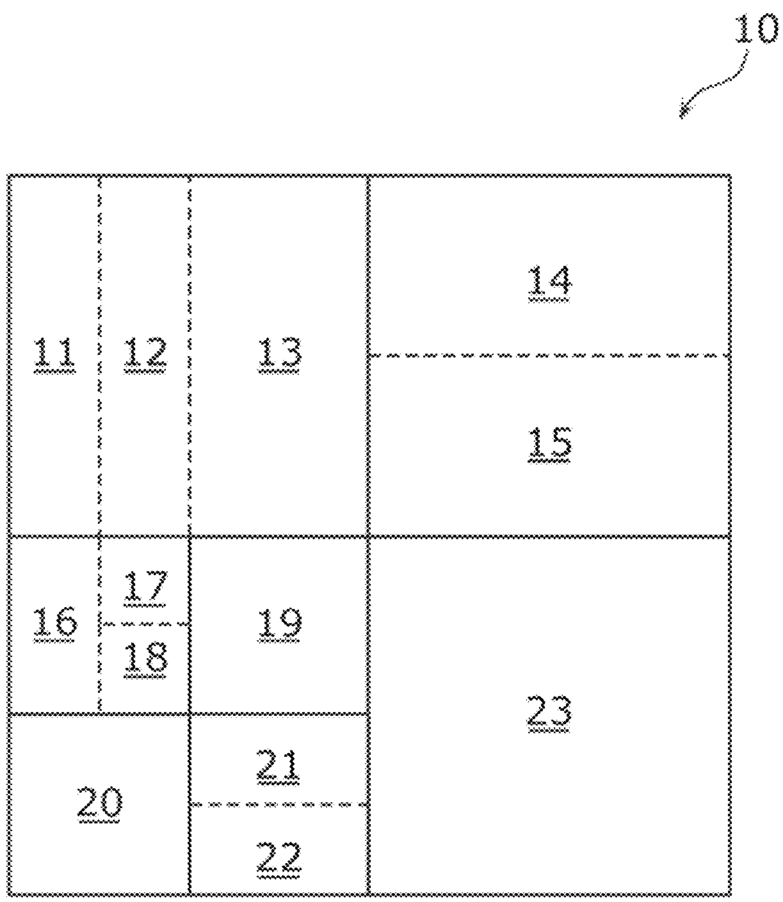
FIG. 10 is a conceptual diagram for illustrating one example of block splitting.

FIG. 10 is a conceptual diagram for illustrating one example of block splitting according to an embodiment. In FIG. 10, the solid lines represent block boundaries of blocks split by quadtree block splitting, and the dashed lines represent block boundaries of blocks split by binary tree block splitting.

Here, block 10 is a square block having 128×128 pixels (128×128 block). This 128×128 block 10 is first split into four square 64×64 pixel blocks (quadtree block splitting).

The upper-left 64×64 pixel block is further vertically split into two rectangular 32×64 pixel blocks, and the left 32×64 pixel block is further vertically split into two rectangular 16×64 pixel blocks (binary tree block splitting). As a result, the upper-left 64×64 pixel block is split into two 16×64 pixel blocks 11 and 12 and one 32×64 pixel block 13.

The upper-right 64×64 pixel block is horizontally split into two rectangular 64×32 pixel blocks 14 and 15 (binary tree block splitting).

The lower-left square 64×64 pixel block is first split into four square 32×32 pixel blocks (quadtree block splitting). The upper-left block and the lower-right block among the four square 32×32 pixel blocks are further split. The upper-left square 32×32 pixel block is vertically split into two rectangle 16×32 pixel blocks, and the right 16×32 pixel block is further horizontally split into two 16×16 pixel blocks (binary tree block splitting). The lower-right 32×32 pixel block is horizontally split into two 32×16 pixel blocks (binary tree block splitting). The upper-right square 32×32 pixel block is horizontally split into two rectangle 32×16 pixel blocks (binary tree block splitting). As a result, the lower-left square 64×64 pixel block is split into rectangle 16×32 pixel block 16, two square 16×16 pixel blocks 17 and 18, two square 32×32 pixel blocks 19 and 20, and two rectangle 32×16 pixel blocks 21 and 22.

The lower-right 64×64 pixel block 23 is not split.

As described above, in FIG. 10, block 10 is split into thirteen variable-size blocks 11 through 23 based on recursive quadtree and binary tree block splitting. This type of splitting is also referred to as quadtree plus binary tree (QTBT) splitting.

It is to be noted that, in FIG. 10, one block is split into four or two blocks (quadtree or binary tree block splitting), but splitting is not limited to these examples. For example, one block may be split into three blocks (ternary block splitting). Splitting including such ternary block splitting is also referred to as multi-type tree (MBT) splitting.

Figure 11:
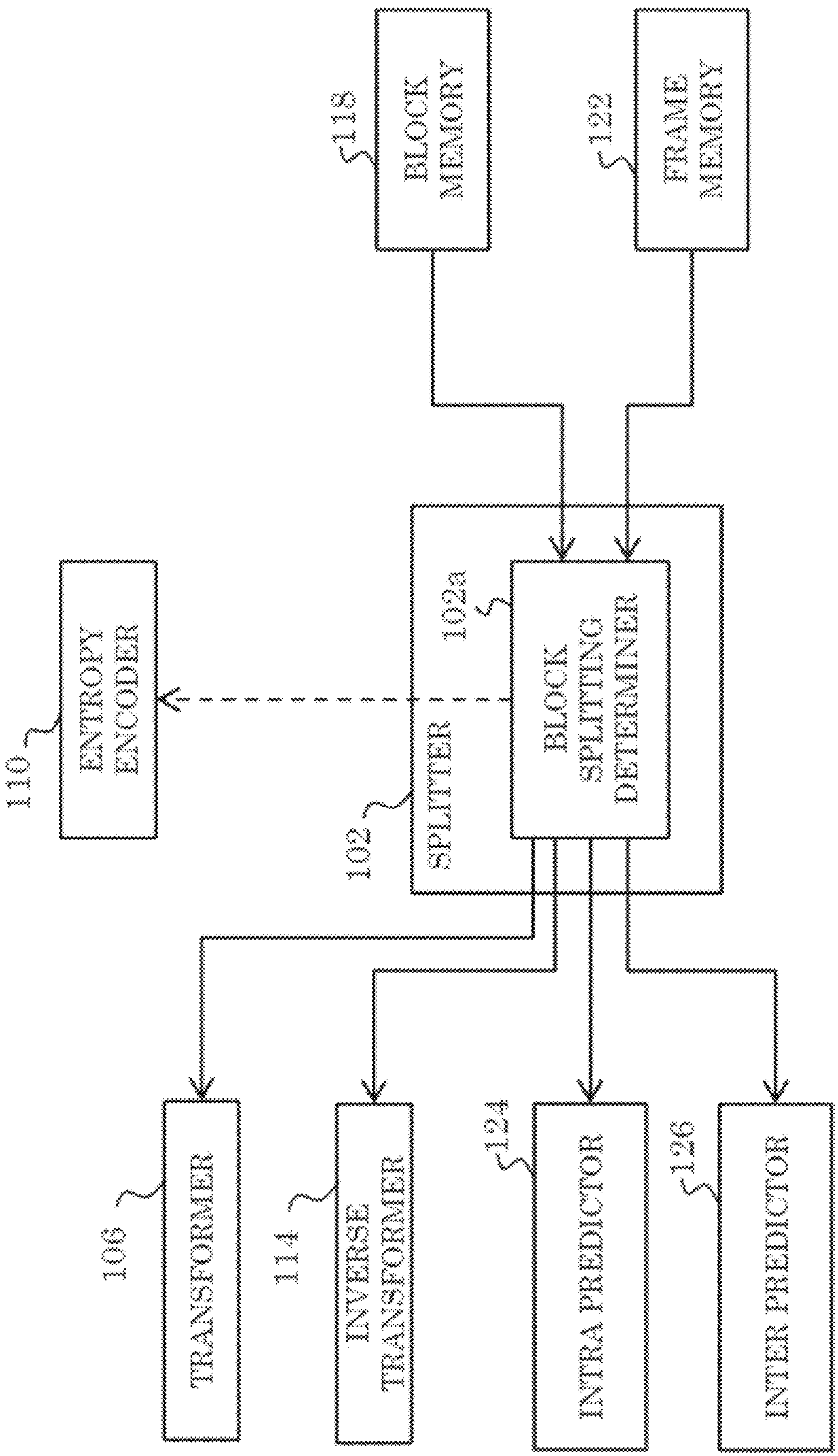
FIG. 11 is a block diagram illustrating one example of a configuration of a splitter according to an embodiment.

FIG. 11 is a block diagram illustrating one example of a configuration of splitter 102 according to one embodiment. As illustrated in FIG. 11, splitter 102 may include block splitting determiner 102*a*. Block splitting determiner 102*a* may perform the following processes as examples.

For example, block splitting determiner 102*a* may obtain or retrieve block information from block memory 118 and/or frame memory 122, and determine a splitting pattern (e.g., the above-described splitting pattern) based on the block information. Splitter 102 splits the original image according to the splitting pattern, and outputs at least one block obtained by the splitting to subtractor 104.

In addition, for example, block splitting determiner 102*a* outputs one or more parameters indicating the determined splitting pattern (e.g., the above-described splitting pattern) to transformer 106, inverse transformer 114, intra predictor 124, inter predictor 126, and entropy encoder 110. Transformer 106 may transform a prediction residual based on the one or more parameters. Intra predictor 124 and inter predictor 126 may generate a prediction image based on the one or more parameters. In addition, entropy encoder 110 may entropy encode the one or more parameters.

The parameter related to the splitting pattern may be written in a stream as indicated below as one example.

Figure 12:
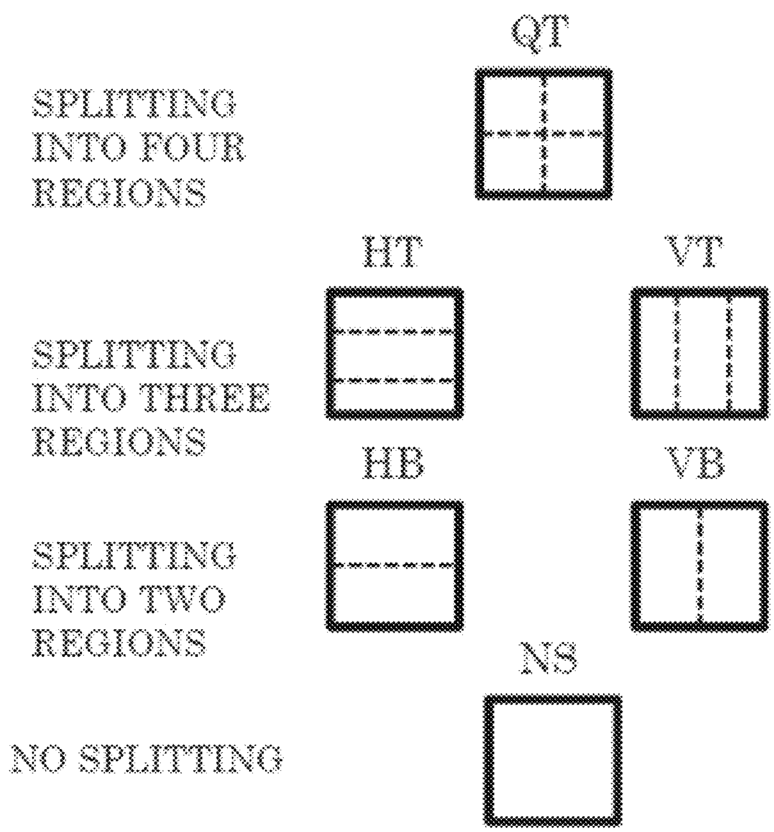
FIG. 12 is a conceptual diagram for illustrating examples of splitting patterns.

FIG. 12 is a conceptual diagram for illustrating examples of splitting patterns. Examples of splitting patterns include: splitting into four regions (QT) in which a block is split into two regions both horizontally and vertically; splitting into three regions (HT or VT) in which a block is split in the same direction in a ratio of 1:2:1; splitting into two regions (HB or VB) in which a block is split in the same direction in a ratio of 1:1; and no splitting (NS).

It is to be noted that the splitting pattern does not have a block splitting direction in the case of splitting into four regions and no splitting, and that the splitting pattern has splitting direction information in the case of splitting into two regions or three regions.

Figure 13A:
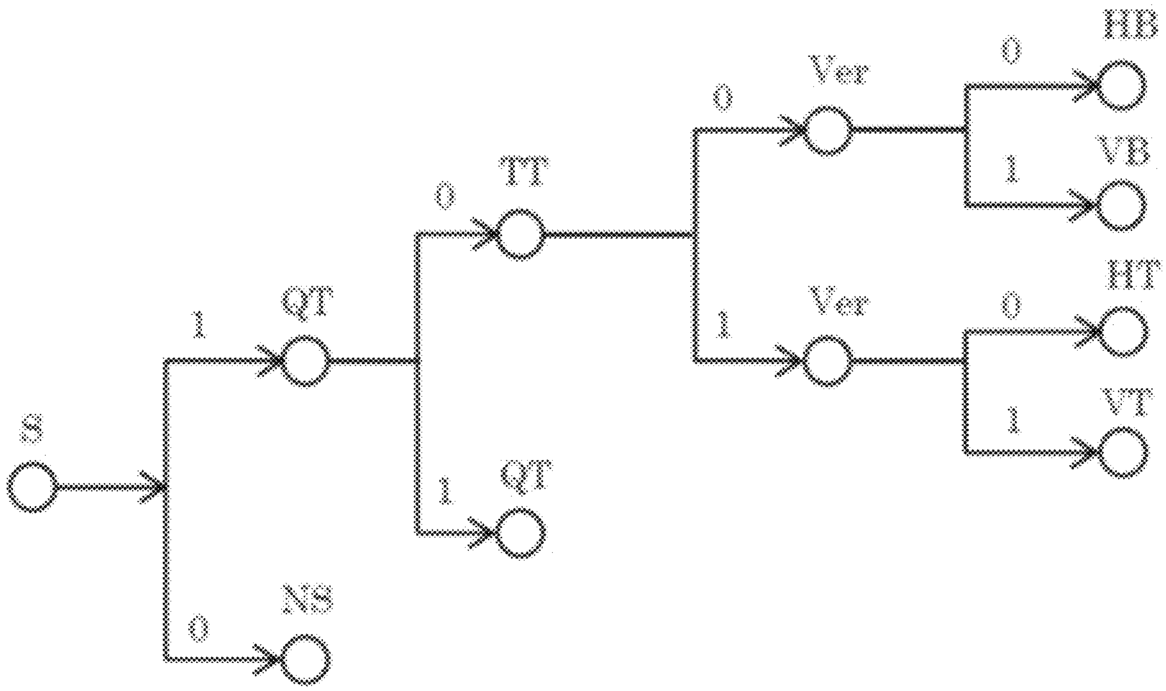
FIG. 13A is a conceptual diagram for illustrating one example of a syntax tree of a splitting pattern.

FIG. 13A is a conceptual diagram for illustrating one example of a syntax tree of a splitting pattern.

Figure 13B:
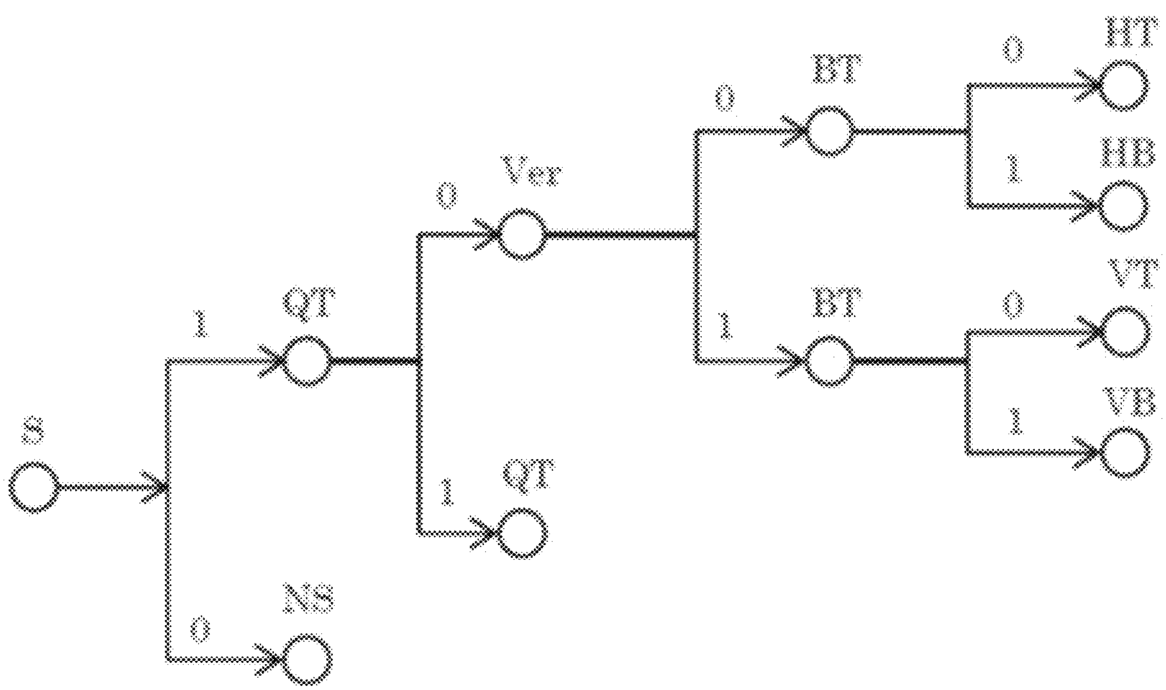
FIG. 13B is a conceptual diagram for illustrating another example of a syntax tree of a splitting pattern.

FIG. 13B is a conceptual diagram for illustrating another example of a syntax tree of a splitting pattern.

FIGS. 13A and 13B are conceptual diagrams for illustrating examples of a syntax tree of a splitting pattern. In the example of FIG. 13A, first, information indicating whether to perform splitting (S: Split flag) is present, and information indicating whether to perform splitting into four regions (QT: QT flag) is present next. Information indicating which one of splitting into three regions and two regions is to be performed (TT: TT flag or BT: BT flag) is present next, and information indicating a division direction (Ver: Vertical flag or Hor: Horizontal flag) is then present. It is to be noted that each of at least one block obtained by splitting according to such a splitting pattern may be further split repeatedly in a similar process. In other words, as one example, whether splitting is performed, whether splitting into four regions is performed, which one of the horizontal direction and the vertical direction is the direction in which a splitting method is to be performed, which one of splitting into three regions and splitting into two regions is to be performed may be recursively determined, and the determination results may be encoded in a stream according to the encoding order disclosed by the syntax tree illustrated in FIG. 13A.

In addition, although information items respectively indicating S, QT, TT, and Ver are arranged in the listed order in the syntax tree illustrated in FIG. 13A, information items respectively indicating S, QT, Ver, and BT may be arranged in the listed order. In other words, in the example of FIG. 13B, first, information indicating whether to perform splitting (S: Split flag) is present, and information indicating whether to perform splitting into four regions (QT: QT flag) is present next. Information indicating the splitting direction (Ver: Vertical flag or Hor: Horizontal flag) is present next, and information indicating which one of splitting into two regions and splitting into three regions is to be performed (BT: BT flag or TT: TT flag) is then present.

It is to be noted that the splitting patterns described above are examples, and splitting patterns other than the described splitting patterns may be used, or part of the described splitting patterns may be used.

(Subtractor)

Subtractor 104 subtracts a prediction image (prediction sample that is input from prediction controller 128 indicated below) from an original image in units of a block input from splitter 102 and split by splitter 102. In other words, subtractor 104 calculates prediction residuals (also referred to as errors) of a current block. Subtractor 104 then outputs the calculated prediction residuals to transformer 106.

The original image may be an image which has been input into encoder 100 as a signal representing an image of each picture included in a video (for example, a luma signal and two chroma signals). A signal representing an image also may be referred to as a sample.

(Transformer)

Transformer 106 transforms prediction residuals in a spatial domain into transform coefficients in a frequency domain, and outputs the transform coefficients to quantizer 108. More specifically, transformer 106 applies, for example, a defined discrete cosine transform (DCT) or discrete sine transform (DST) to prediction residuals in a spatial domain. The defined DCT or DST may be predefined.

It is to be noted that transformer 106 may adaptively select a transform type from among a plurality of transform types, and transform prediction residuals into transform coefficients by using a transform basis function corresponding to the selected transform type. This sort of transform is also referred to as explicit multiple core transform (EMT) or adaptive multiple transform (AMT). A transform basis function may also be referred to as a basis.

The transform types include, for example, DCT-II, DCT-V, DCT-VIII, DST-I, and DST-VII. It is noted that these transform types may be represented as DCT2, DCT5, DCT8, DST1 and DST7. FIG. 14 is a chart indicating example transform basis functions for the example transform types. In FIG. 14, N indicates the number of input pixels. For example, selection of a transform type from among the plurality of transform types may depend on a prediction type (one of intra prediction and inter prediction), and may depend on an intra prediction mode.

Information indicating whether to apply such EMT or AMT (referred to as, for example, an EMT flag or an AMT flag) and information indicating the selected transform type is normally signaled at the CU level. It is to be noted that the signaling of such information does not necessarily need to be performed at the CU level, and may be performed at another level (for example, at the sequence level, picture level, slice level, tile level, or CTU level).

In addition, transformer 106 may re-transform the transform coefficients (which are transform results). Such re-transform is also referred to as adaptive secondary transform (AST) or non-separable secondary transform (NSST). For example, transformer 106 performs re-transform in units of a sub-block (for example, 4×4 pixel sub-block) included in a transform coefficient block corresponding to an intra prediction residual. Information indicating whether to apply NSST and information related to a transform matrix for use in NSST are normally signaled at the CU level. It is to be noted that the signaling of such information does not necessarily need to be performed at the CU level, and may be performed at another level (for example, at the sequence level, picture level, slice level, tile level, or CTU level).

Transformer 106 may employ a separable transform and a non-separable transform. A separable transform is a method in which a transform is performed a plurality of times by separately performing a transform for each of a number of directions according to the number of dimensions of inputs. A non-separable transform is a method of performing a collective transform in which two or more dimensions in multidimensional inputs are collectively regarded as a single dimension.

In one example of a non-separable transform, when an input is a 4×4 pixel block, the 4×4 pixel block is regarded as a single array including sixteen elements, and the transform applies a 16×16 transform matrix to the array.

In another example of a non-separable transform, an input block of 4×4 pixels is regarded as a single array including sixteen elements, and then a transform (hypercube givens transform) in which givens revolution is performed on the array a plurality of times may be performed.

In the transform in transformer 106, the transform types of transform bases functions to be transformed into the frequency domain according to regions in a CU can be switched. Examples include a spatially varying transform (SVT).

Figure 15:
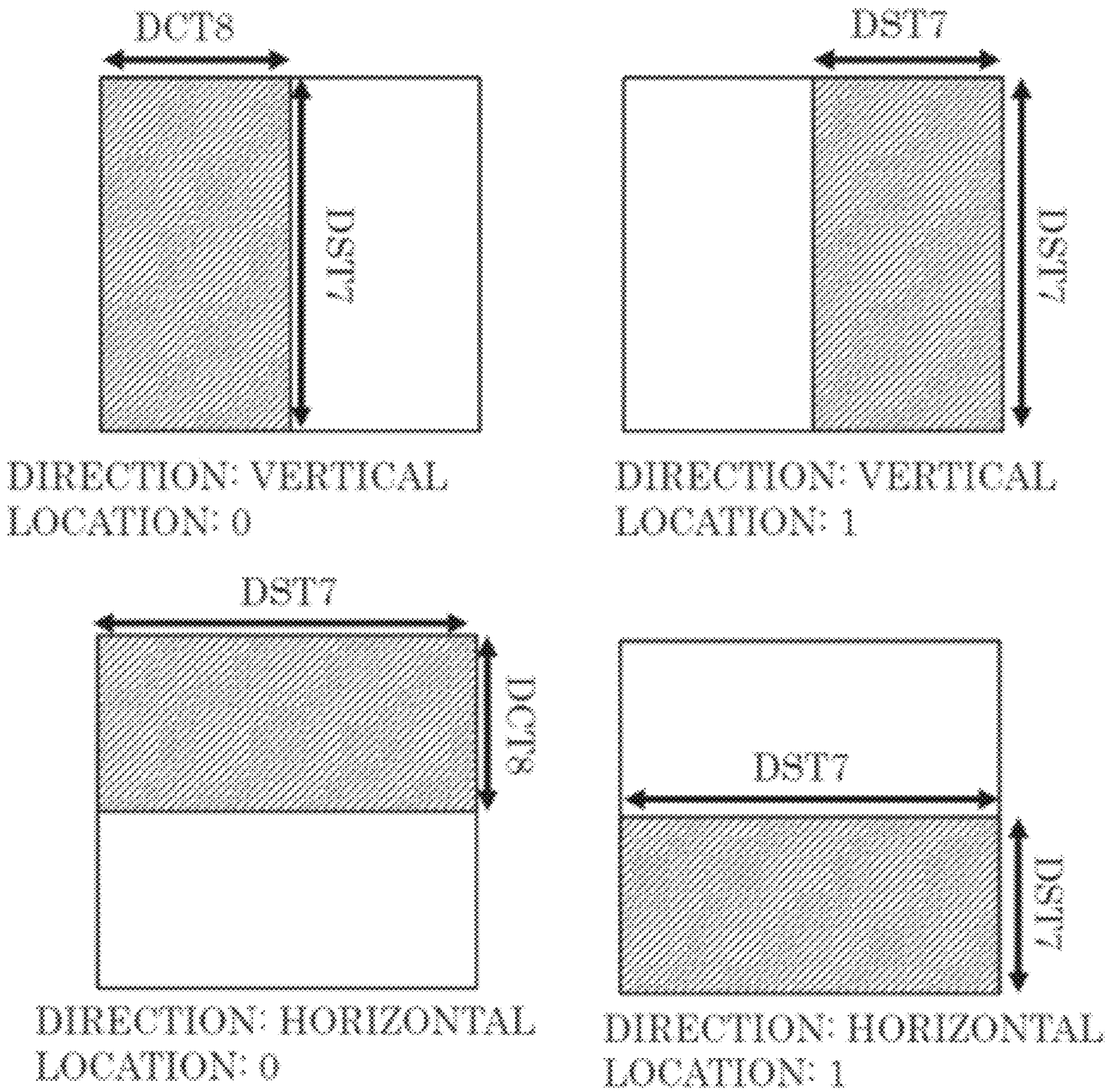
FIG. 15 is a conceptual diagram for illustrating example spatially varying transforms (SVT).

FIG. 15 is a conceptual diagram for illustrating one example of an SVT.

In SVT, as illustrated in FIG. 15, CUs are split into two equal regions horizontally or vertically, and only one of the regions is transformed into the frequency domain. A transform basis type can be set for each region. For example, DST7 and DST8 are used. For example, among the two regions obtained by splitting a CU vertically into two equal regions, DST7 and DCT8 may be used for the region at position 0. Alternatively, among the two regions, DST7 is used for the region at position 1. Likewise, among the two regions obtained by splitting a CU horizontally into two equal regions, DST7 and DCT8 are used for the region at position 0. Alternatively, among the two regions, DST7 is used for the region at position 1. Although only one of the two regions in a CU is transformed and the other is not transformed in the example illustrated in FIG. 15, each of the two regions may be transformed. In addition, a splitting method may include not only splitting into two regions but also splitting into four regions. In addition, the splitting method can be more flexible. For example, information indicating the splitting method may be encoded and may be signaled in the same manner as the CU splitting. It is to be noted that SVT also may be referred to as sub-block transform (SBT).

The AMT and EMT described above may be referred to as MTS (multiple transform selection). When MTS is applied, a transform type that is DST7, DCT8, or the like can be selected, and the information indicating the selected transform type may be encoded as index information for each CU. There is another process referred to as IMTS (implicit MTS) as a process for selecting a transform type to be used for orthogonal transform performed without encoding index information. When IMTS is applied, for example, when a CU has a rectangle shape, orthogonal transform of the rectangle shape may be performed using DST7 for the short side and DST2 for the long side. In addition, for example, when a CU has a square shape, orthogonal transform of the rectangle shape may be performed using DCT2 when MTS is effective in a sequence and using DST7 when MTS is ineffective in the sequence. DCT2 and DST7 are mere examples. Other transform types may be used, and it is also possible to change the combination of transform types for use to a different combination of transform types. IMTS may be used only for intra prediction blocks, or may be used for both intra prediction blocks and inter prediction block.

The three processes of MTS, SBT, and IMTS have been described above as selection processes for selectively switching transform types for use in orthogonal transform. However, all of the three selection processes may be employed, or only part of the selection processes may be selectively employed. Whether one or more of the selection processes is employed may be identified, for example, based on flag information or the like in a header such as an SPS. For example, when all of the three selection processes are available for use, one of the three selection processes is selected for each CU and orthogonal transform of the CU is performed. It is to be noted that the selection processes for selectively switching the transform types may be selection processes different from the above three selection processes, or each of the three selection processes may be replaced by another process. Typically, at least one of the following four transfer functions [1] to [4] is performed. Function [1] is a function for performing orthogonal transform of the entire CU and encoding information indicating the transform type used in the transform. Function [2] is a function for performing orthogonal transform of the entire CU and determining the transform type based on a determined rule without encoding information indicating the transform type. Function [3] is a function for performing orthogonal transform of a partial region of a CU and encoding information indicating the transform type used in the transform. Function [4] is a function for performing orthogonal transform of a partial region of a CU and determining the transform type based on a determined rule without encoding information indicating the transform type used in the transform. The determined rules may be predetermined.

It is to be noted that whether MTS, IMTS, and/or SBT is applied may be determined for each processing unit. For example, whether MTS, IMTS, and/or SBT is applied may be determined for each sequence, picture, brick, slice, CTU, or CU.

It is to be noted that a tool for selectively switching transform types in the present disclosure may be described as a method for selectively selecting a basis for use in a transform process, a selection process, or a process for selecting a basis. In addition, the tool for selectively switching transform types may be described as a mode for adaptively selecting transform types.

Figure 16:
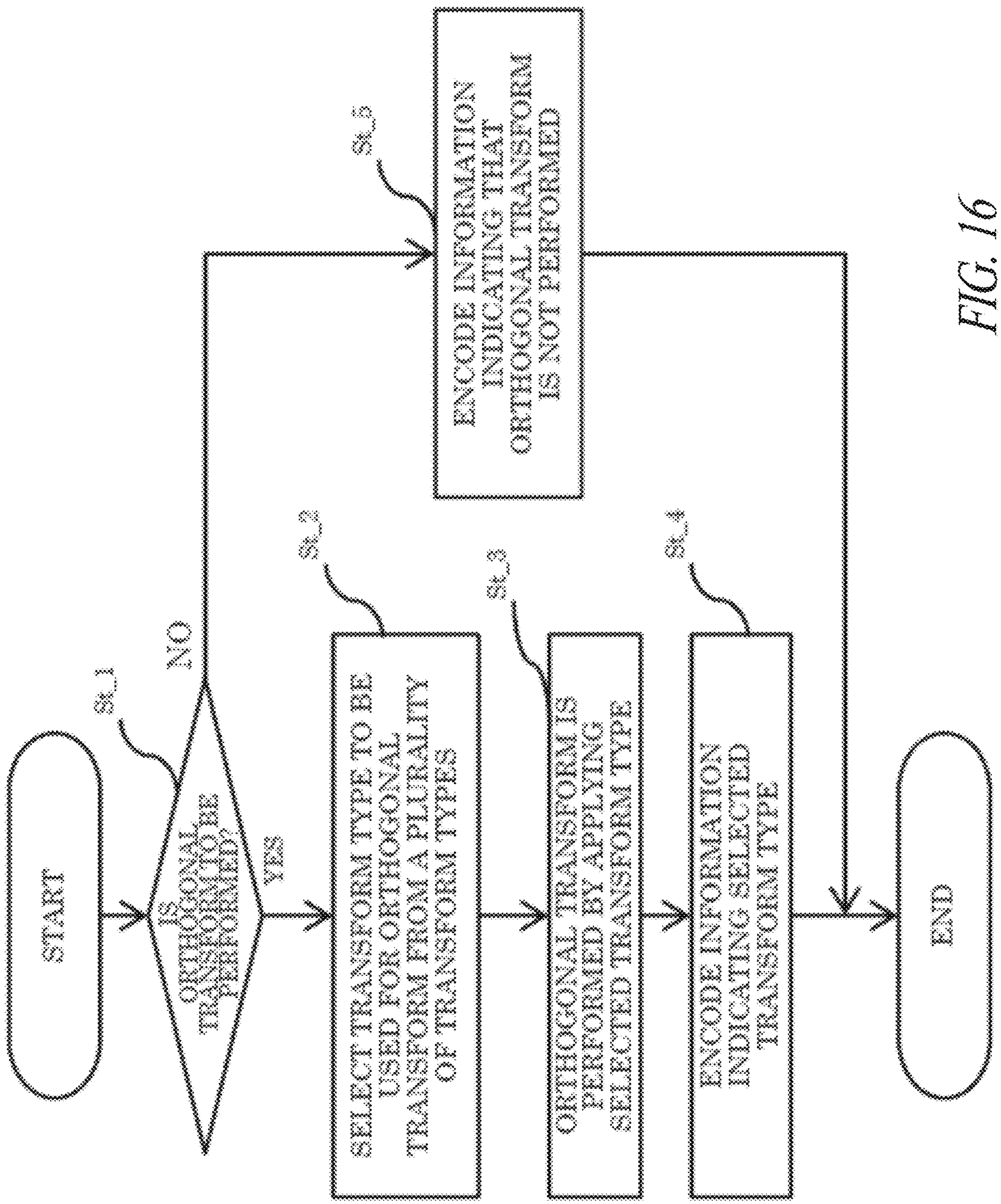
FIG. 16 is a flow chart illustrating one example of a process performed by a transformer.

FIG. 16 is a flow chart illustrating one example of a process performed by transformer 106, and will be described for convenience with reference to FIG. 7.

For example, transformer 106 determines whether to perform orthogonal transform (Step St_1). Here, when determining to perform orthogonal transform (Yes in Step St_1), transformer 106 selects a transform type for use in orthogonal transform from a plurality of transform types (Step St_2). Next, transformer 106 performs orthogonal transform by applying the selected transform type to the prediction residual of a current block (Step St_3). Transformer 106 then outputs information indicating the selected transform type to entropy encoder 110, so as to allow entropy encoder 110 to encode the information (Step St_4). On the other hand, when determining not to perform orthogonal transform (No in Step St_1), transformer 106 outputs information indicating that no orthogonal transform is performed, so as to allow entropy encoder 110 to encode the information (Step St_5). It is to be noted that whether to perform orthogonal transform in Step St_1 may be determined based on, for example, the size of a transform block, a prediction mode applied to the CU, etc. Alternatively, orthogonal transform may be performed using a defined transform type without encoding information indicating the transform type for use in orthogonal transform. The defined transform type may be predefined.

Figure 17:
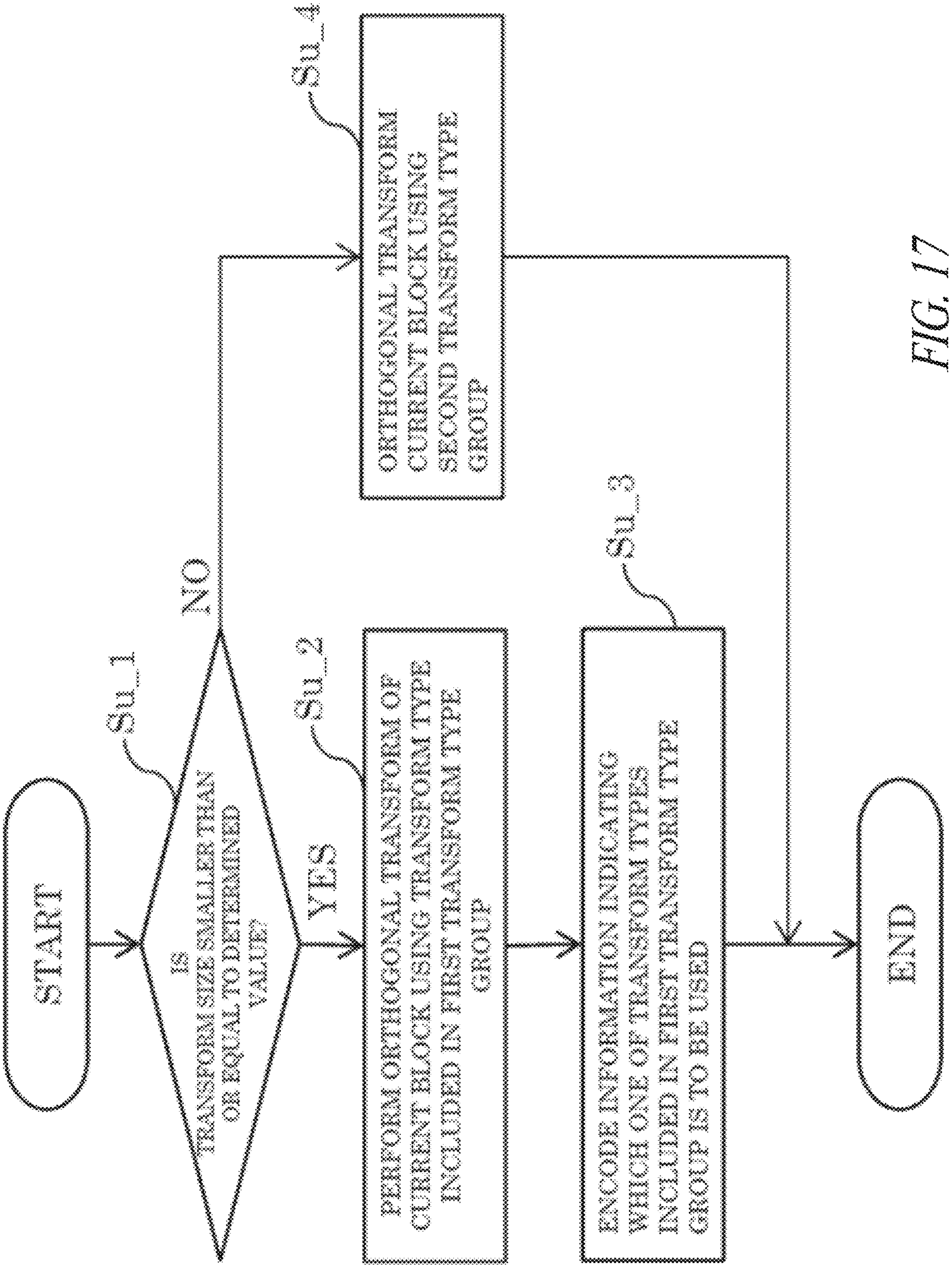
FIG. 17 is a flow chart illustrating another example of a process performed by the transformer.

FIG. 17 is a flow chart illustrating one example of a process performed by transformer 106, and will be described for convenience with reference to FIG. 7. It is to be noted that the example illustrated in FIG. 17 is an example of orthogonal transform in the case where transform types for use in orthogonal transform are selectively switched as in the case of the example illustrated in FIG. 16.

As one example, a first transform type group may include DCT2, DST7, and DCT8. As another example, a second transform type group may include DCT2. The transform types included in the first transform type group and the transform types included in the second transform type group may partly overlap with each other, or may be totally different from each other.

Transformer 106 determines whether a transform size is smaller than or equal to a determined value (Step Su_1). Here, when determining that the transform size is smaller than or equal to the determined value (Yes in Step Su_1), transformer 106 performs orthogonal transform of the prediction residual of the current block using the transform type included in the first transform type group (Step Su_2). Next, transformer 106 outputs information indicating the transform type to be used among at least one transform type included in the first transform type group to entropy encoder 110, so as to allow entropy encoder 110 to encode the information (Step Su_3). On the other hand, when determining that the transform size is not smaller than or equal to the predetermined value (No in Step Su_1), transformer 106 performs orthogonal transform of the prediction residual of the current block using the second transform type group (Step Su_4). The determined value may be a threshold value, and may be a predetermined value.

In Step Su_3, the information indicating the transform type for use in orthogonal transform may be information indicating a combination of the transform type to be applied vertically in the current block and the transform type to be applied horizontally in the current block. The first type group may include only one transform type, and the information indicating the transform type for use in orthogonal transform may not be encoded. The second transform type group may include a plurality of transform types, and information indicating the transform type for use in orthogonal transform among the one or more transform types included in the second transform type group may be encoded.

Alternatively, a transform type may be indicated based on a transform size without encoding information indicating the transform type. It is to be noted that such determinations are not limited to the determination as to whether the transform size is smaller than or equal to the determined value, and other processes are also possible for determining a transform type for use in orthogonal transform based on the transform size.

(Quantizer)

Quantizer 108 quantizes the transform coefficients output from transformer 106. More specifically, quantizer 108 scans, in a determined scanning order, the transform coefficients of the current block, and quantizes the scanned transform coefficients based on quantization parameters (QP) corresponding to the transform coefficients. Quantizer 108 then outputs the quantized transform coefficients (hereinafter also referred to as quantized coefficients) of the current block to entropy encoder 110 and inverse quantizer 112. The determined scanning order may be predetermined.

A determined scanning order is an order for quantizing/inverse quantizing transform coefficients. For example, a determined scanning order may be defined as ascending order of frequency (from low to high frequency) or descending order of frequency (from high to low frequency).

A quantization parameter (QP) is a parameter defining a quantization step (quantization width). For example, when the value of the quantization parameter increases, the quantization step also increases. In other words, when the value of the quantization parameter increases, the error in quantized coefficients (quantization error) increases.

In addition, a quantization matrix may be used for quantization. For example, several kinds of quantization matrices may be used correspondingly to frequency transform sizes such as 4×4 and 8×8, prediction modes such as intra prediction and inter prediction, and pixel components such as luma and chroma pixel components. It is to be noted that quantization means digitalizing values sampled at determined intervals correspondingly to determined levels. In this technical field, quantization may be referred to using other expressions, such as rounding and scaling, and may employ rounding and scaling. The determined intervals and determined levels may be predetermined.

Methods using quantization matrices may include a method using a quantization matrix which has been set directly at the encoder 100 side, and a method using a quantization matrix which has been set as a default (default matrix). At the encoder 100 side, a quantization matrix suitable for features of an image can be set by directly setting a quantization matrix. This case, however, may have a disadvantage of increasing a coding amount for encoding the quantization matrix. It is to be noted that a quantization matrix to be used to quantize the current block may be generated based on a default quantization matrix or an encoded quantization matrix, instead of directly using the default quantization matrix or the encoded quantization matrix.

There is a method for quantizing a high-frequency coefficient and a low-frequency coefficient without using a quantization matrix. It is to be noted that this method may be viewed as equivalent to a method using a quantization matrix (flat matrix) whose coefficients have the same value.

The quantization matrix may be encoded, for example, at the sequence level, picture level, slice level, brick level, or CTU level. The quantization matrix may be specified using, for example, a sequence parameter set (SPS) or a picture parameter set (PPS). The SPS includes a parameter which is used for a sequence, and the PPS includes a parameter which is used for a picture. Each of the SPS and the PPS may be simply referred to as a parameter set.

When using a quantization matrix, quantizer 108 scales, for each transform coefficient, for example a quantization width which can be calculated based on a quantization parameter, etc., using the value of the quantization matrix. The quantization process performed without using a quantization matrix may be a process for quantizing transform coefficients based on the quantization width calculated based on the quantization parameter, etc. It is to be noted that, in the quantization process performed without using any quantization matrix, the quantization width may be multiplied by a determined value which is common for all the transform coefficients in a block. The determined value may be predetermined.

Figure 18:
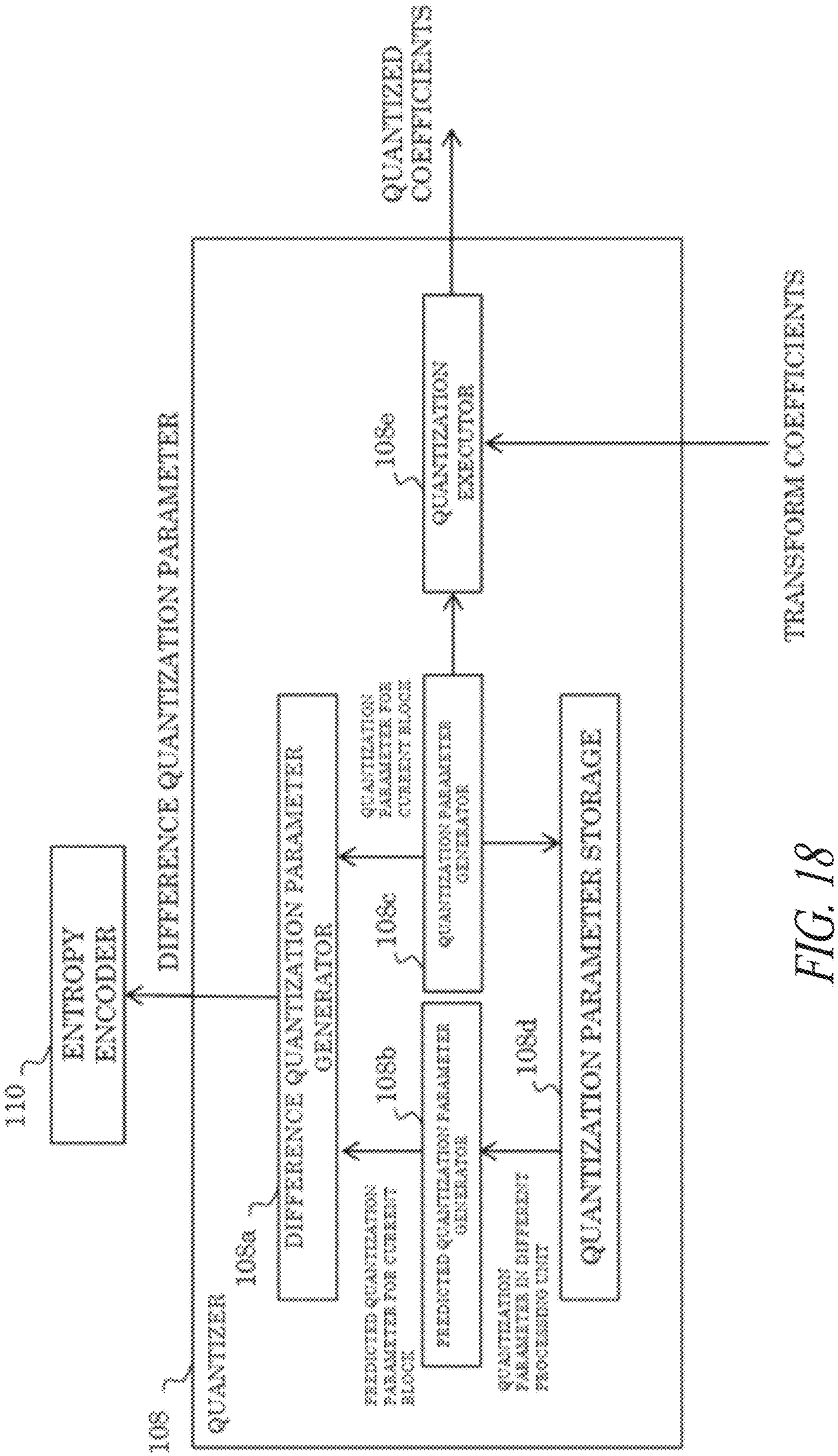
FIG. 18 is a block diagram illustrating one example of a configuration of a quantizer according to an embodiment.

FIG. 18 is a block diagram illustrating one example of a configuration of a quantizer according to an embodiment. For example, quantizer 108 includes difference quantization parameter generator 108*a*, predicted quantization parameter generator 108*b*, quantization parameter generator 108*c*, quantization parameter storage 108*d*, and quantization executor 108*e*.

Figure 19:
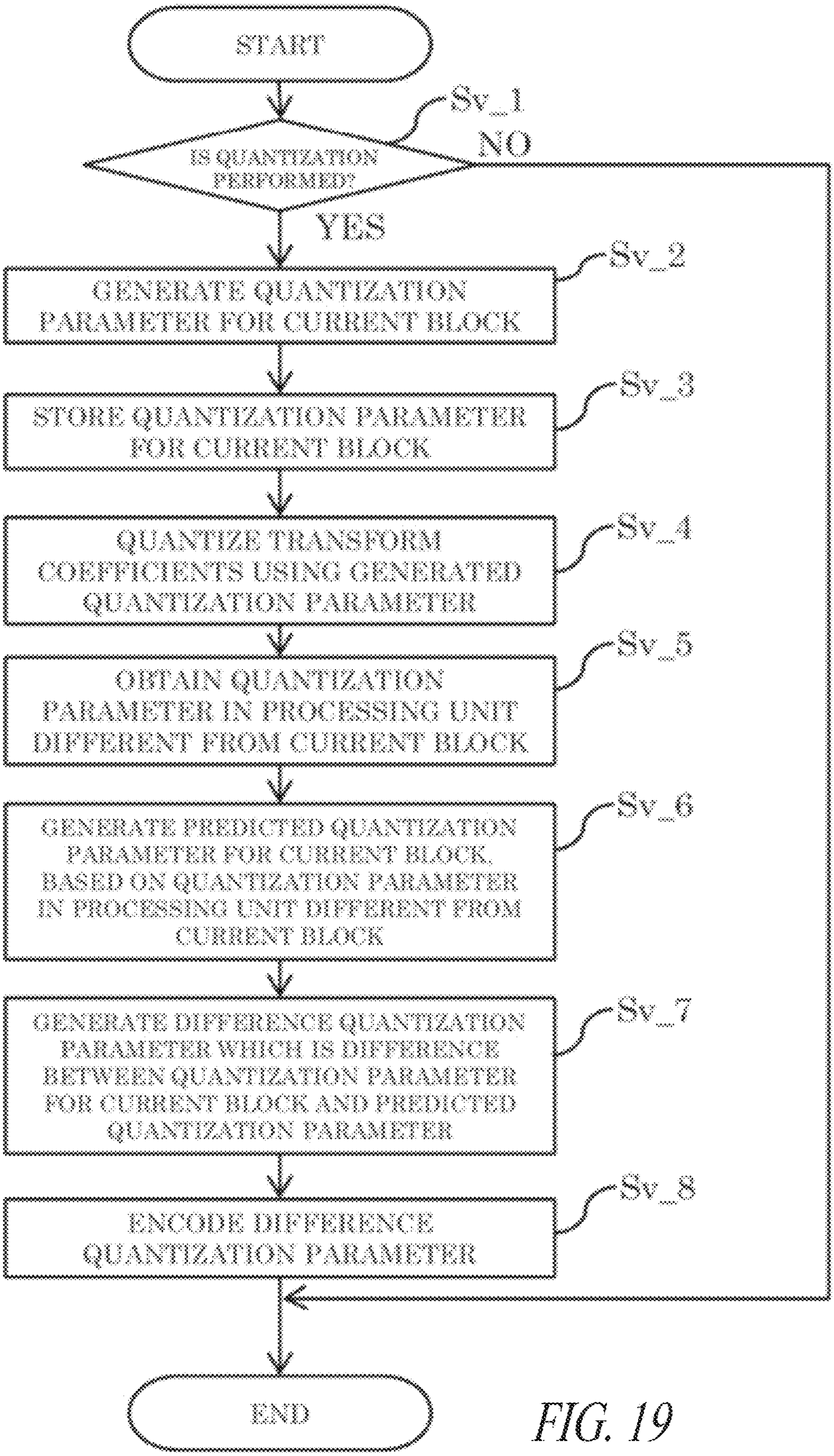
FIG. 19 is a flow chart illustrating one example of quantization process performed by the quantizer.

FIG. 19 is a flow chart illustrating one example of a quantization process performed by quantizer 108, and will be described for convenience with reference to FIGS. 7 and 18.

As one example, quantizer 108 may perform quantization for each CU based on the flow chart illustrated in FIG. 19. More specifically, quantization parameter generator 108*c* determines whether to perform quantization (Step Sv_1). Here, when determining to perform quantization (Yes in Step Sv_1), quantization parameter generator 108*c* generates a quantization parameter for a current block (Step Sv_2), and stores the quantization parameter to quantization parameter storage 108*d* (Step Sv_3).

Next, quantization executor 108*e* quantizes transform coefficients of the current block using the quantization parameter generated in Step Sv_2 (Step Sv_4). Predicted quantization parameter generator 108*b* then obtains a quantization parameter for a processing unit different from the current block from quantization parameter storage 108*d* (Step Sv_5). Predicted quantization parameter generator 108*b* generates a predicted quantization parameter of the current block based on the obtained quantization parameter (Step Sv_6). Difference quantization parameter generator 108*a* calculates the difference between the quantization parameter of the current block generated by quantization parameter generator 108*c* and the predicted quantization parameter of the current block generated by predicted quantization parameter generator 108*b* (Step Sv_7). The difference quantization parameter may be generated by calculating the difference. Difference quantization parameter generator 108*a* outputs the difference quantization parameter to entropy encoder 110, so as to allow entropy encoder 110 to encode the difference quantization parameter (Step Sv_8).

It is to be noted that the difference quantization parameter may be encoded, for example, at the sequence level, picture level, slice level, brick level, or CTU level. In addition, an initial value of the quantization parameter may be encoded at the sequence level, picture level, slice level, brick level, or CTU level. At initialization, the quantization parameter may be generated using the initial value of the quantization parameter and the difference quantization parameter.

It is to be noted that quantizer 108 may include a plurality of quantizers, and may apply dependent quantization in which transform coefficients are quantized using a quantization method selected from a plurality of quantization methods.

(Entropy Encoder)

Figure 20:
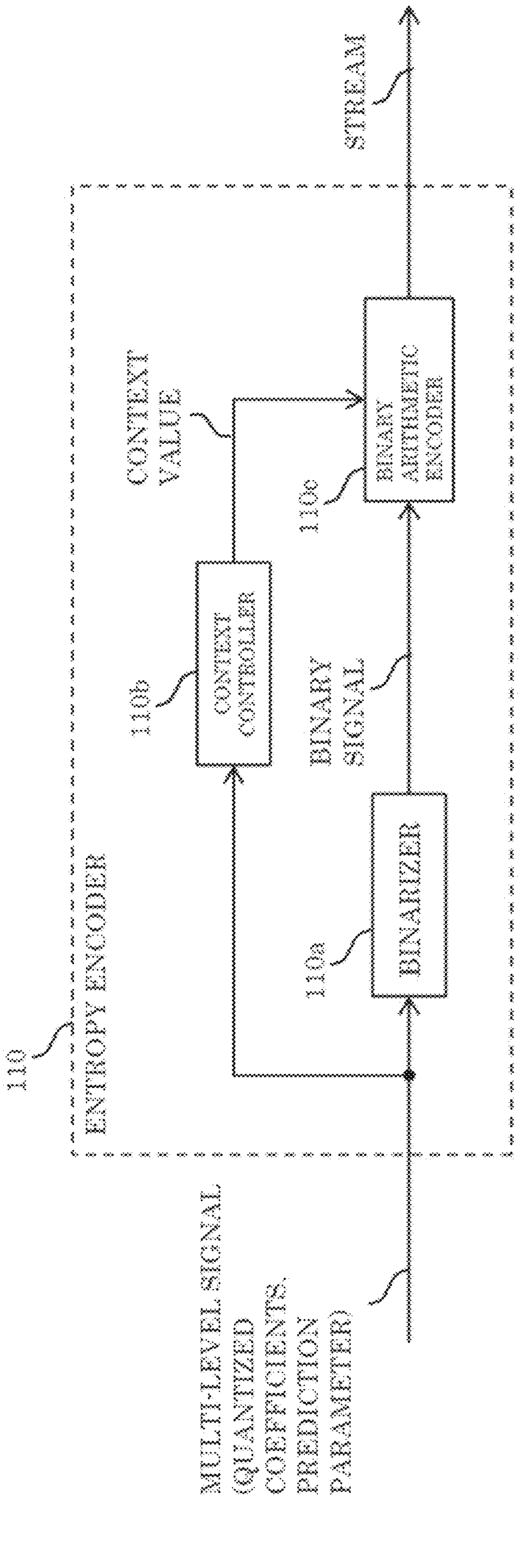
FIG. 20 is a block diagram illustrating one example of a configuration of an entropy encoder according to an embodiment.

FIG. 20 is a block diagram illustrating one example of a configuration of entropy encoder 110 according to an embodiment, and will be described for convenience with reference to FIG. 7. Entropy encoder 110 generates a stream by entropy encoding the quantized coefficients input from quantizer 108 and a prediction parameter input from prediction parameter generator 130. For example, context-based adaptive binary arithmetic coding (CABAC) is used as the entropy encoding. More specifically, entropy encoder 110 as illustrated includes binarizer 110*a*, context controller 110*b*, and binary arithmetic encoder 110*c*. Binarizer 110*a* performs binarization in which multi-level signals such as quantized coefficients and a prediction parameter are transformed into binary signals. Examples of binarization methods include truncated Rice binarization, exponential Golomb codes, and fixed length binarization. Context controller 110*b* derives a context value according to a feature or a surrounding state of a syntax element, that is an occurrence probability of a binary signal. Examples of methods for deriving a context value include bypass, referring to a syntax element, referring to an upper and left adjacent blocks, referring to hierarchical information, etc. Binary arithmetic encoder 110*c* arithmetically encodes the binary signal using the derived context.

Figure 21:
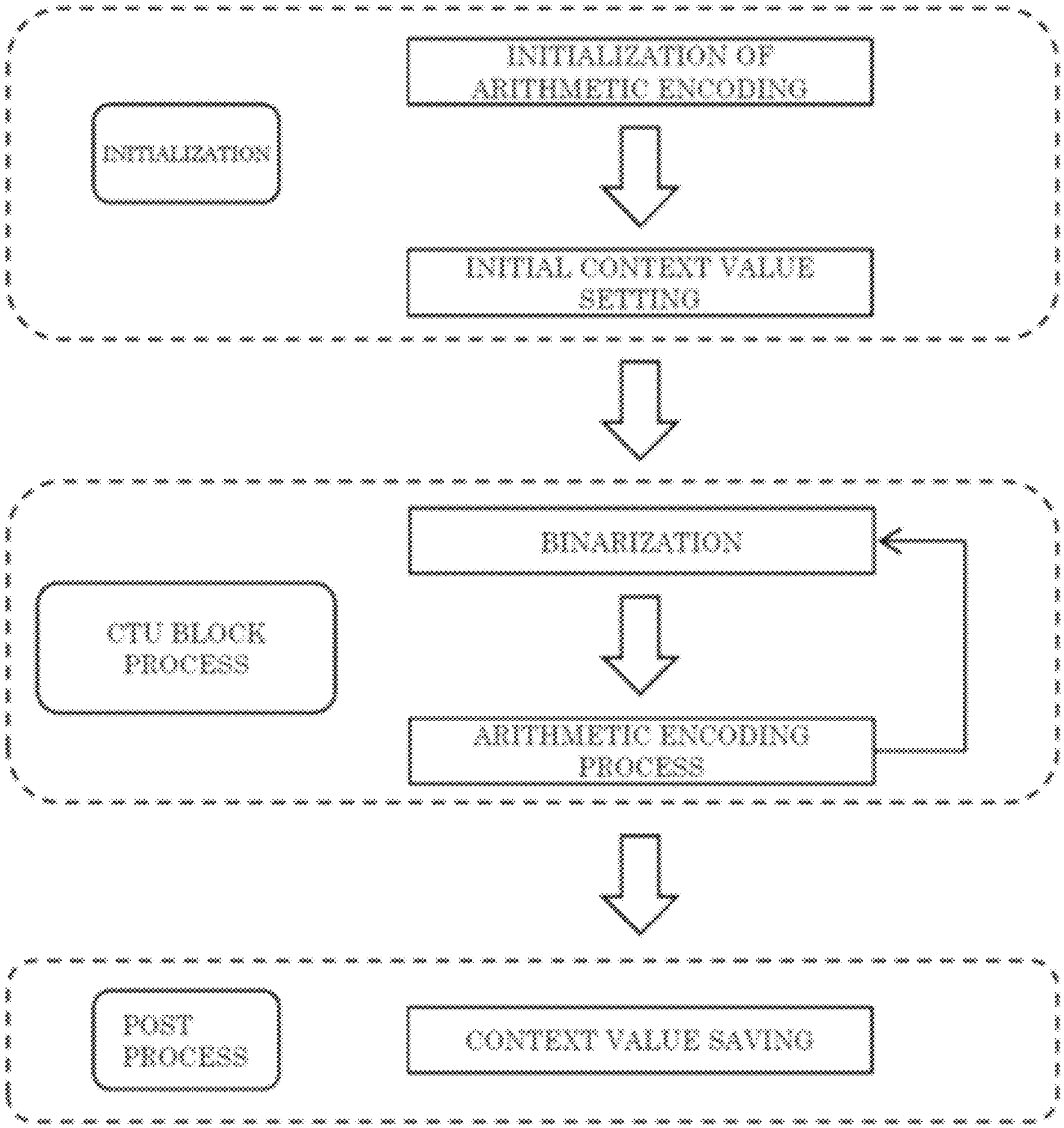
FIG. 21 is a conceptual diagram for illustrating an example flow of a context-based adaptive binary arithmetic coding (CABAC) process in the entropy encoder.

FIG. 21 is a conceptual diagram for illustrating an example flow of a CABAC process in the entropy encoder 110. First, initialization is performed in CABAC in entropy encoder 110. In the initialization, initialization in binary arithmetic encoder 110*c* and setting of an initial context value are performed. For example, binarizer 110*a* and binary arithmetic encoder 110*c* may execute binarization and arithmetic encoding of the plurality of quantization coefficients in a CTU sequentially. Context controller 110*b* may update the context value each time arithmetic encoding is performed. Context controller 110*b* may then save the context value as a post process. The saved context value may be used, for example, to initialize the context value for the next CTU.

(Inverse Quantizer)

Inverse quantizer 112 inverse quantizes quantized coefficients which have been input from quantizer 108. More specifically, inverse quantizer 112 inverse quantizes, in a determined scanning order, quantized coefficients of the current block. Inverse quantizer 112 then outputs the inverse quantized transform coefficients of the current block to inverse transformer 114. The determined scanning order may be predetermined.

(Inverse Transformer)

Inverse transformer 114 restores prediction residuals by inverse transforming transform coefficients which have been input from inverse quantizer 112. More specifically, inverse transformer 114 restores the prediction residuals of the current block by performing an inverse transform corresponding to the transform applied to the transform coefficients by the transformer 106. Inverse transformer 114 then outputs the restored prediction residuals to adder 116.

It is to be noted that since information is normally lost in quantization, the restored prediction residuals do not match the prediction residuals calculated by subtractor 104. In other words, the restored prediction residuals normally include quantization errors.

(Adder)

Adder 116 reconstructs the current block by adding the prediction residuals which have been input from inverse transformer 114 and prediction images which have been input from prediction controller 128. Consequently, a reconstructed image is generated. Adder 116 then outputs the reconstructed image to block memory 118 and loop filter 120. A reconstructed block may also be referred to as a local decoded block.

(Block Memory)

Block memory 118 is storage for storing blocks in a current picture, for example, for use in intra prediction. More specifically, block memory 118 stores reconstructed images output from adder 116.

(Frame Memory)

Frame memory 122 is, for example, storage for storing reference pictures for use in inter prediction, and is also referred to as a frame buffer. More specifically, frame memory 122 stores reconstructed images filtered by loop filter 120.

(Loop Filter)

Loop filter 120 applies a loop filter to a reconstructed image output by adder 116, and outputs the filtered reconstructed image to frame memory 122. A loop filter is a filter used in an encoding loop (in-loop filter). Examples of loop filters include, for example, an adaptive loop filter (ALF), a deblocking filter (DB or DBF), a sample adaptive offset (SAO) filter, etc.

Figure 22:
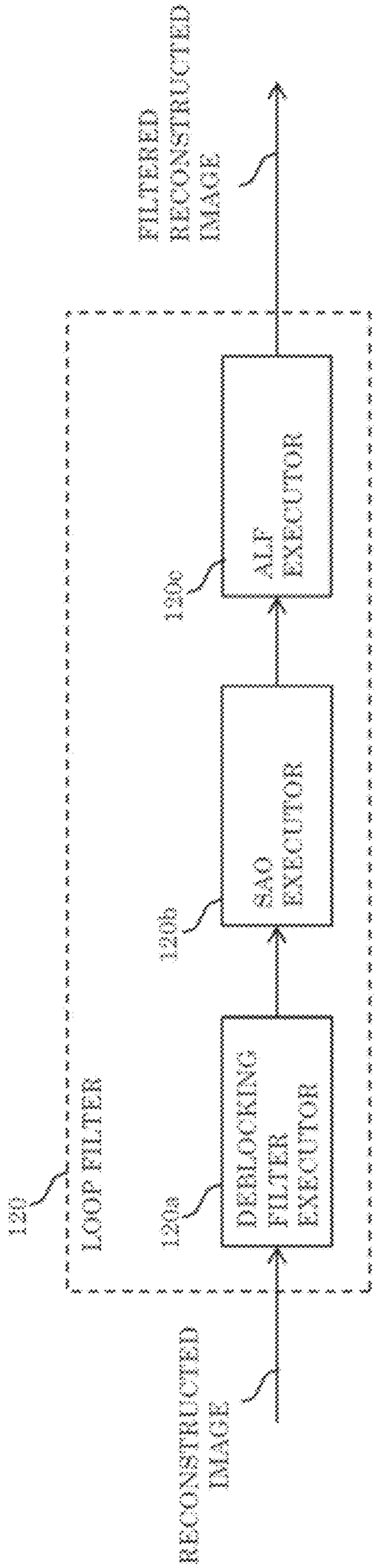
FIG. 22 is a block diagram illustrating one example of a configuration of loop filter according to an embodiment.

FIG. 22 is a block diagram illustrating one example of a configuration of loop filter 120 according to an embodiment. For example, as illustrated in FIG. 22, loop filter 120 includes deblocking filter executor 120*a*, SAO executor 120*b*, and ALF executor 120*c*. Deblocking filter executor 120*a* performs a deblocking filter process on the reconstructed image. SAO executor 120*b* performs a SAO process on the reconstructed image after being subjected to the deblocking filter process. ALF executor 120*c* performs an ALF process on the reconstructed image after being subjected to the SAO process. The ALF and deblocking filter are described later in detail. The SAO process is a process for enhancing image quality by reducing ringing (a phenomenon in which pixel values are distorted like waves around an edge) and correcting deviation in pixel value. Examples of SAO processes include an edge offset process and a band offset process. It is to be noted that loop filter 120, in some embodiments, may not include all the constituent elements disclosed in FIG. 22, and may include some of the constituent elements, and may include additional elements. In addition, loop filter 120 may be configured to perform the above processes in a processing order different from the one disclosed in FIG. 22, may not perform all of the processes, etc.

(Loop Filter>Adaptive Loop Filter)

In an ALF, a least square error filter for removing compression artifacts is applied. For example, one filter selected from among a plurality of filters based on the direction and activity of local gradients is applied for each 2×2 pixel sub-block in the current block.

More specifically, first, each sub-block (for example, each 2×2 pixel sub-block) is categorized into one out of a plurality of classes (for example, fifteen or twenty-five classes). The classification of the sub-block may be based on, for example, gradient directionality and activity. In an example, category index C (for example, C=5D+A) is calculated or determined based on gradient directionality D (for example, 0 to 2 or 0 to 4) and gradient activity A (for example, 0 to 4). Then, based on classification index C, each sub-block is categorized into one out of a plurality of classes.

For example, gradient directionality D is calculated by comparing gradients of a plurality of directions (for example, the horizontal, vertical, and two diagonal directions). Moreover, for example, gradient activity A is calculated by adding gradients of a plurality of directions and quantizing the result of addition.

The filter to be used for each sub-block may be determined from among the plurality of filters based on the result of such categorization.

Figure 23A:
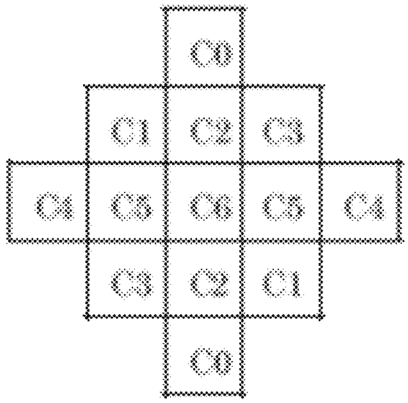
FIG. 23A is a conceptual diagram for illustrating one example of a filter shape used in an adaptive loop filter (ALF).
Figure 23B:
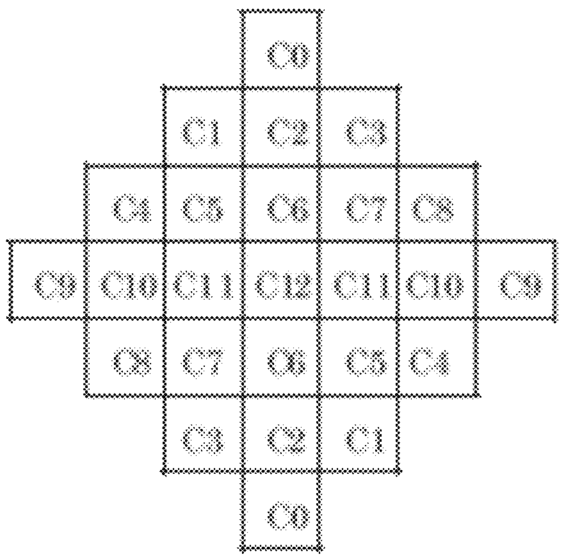
FIG. 23B is a conceptual diagram for illustrating another example of a filter shape used in an ALF.
Figure 23C:
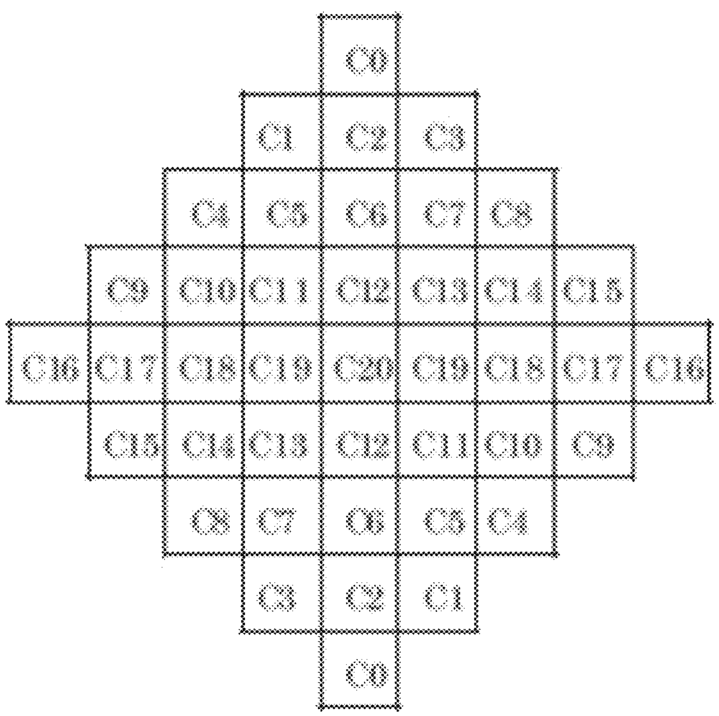
FIG. 23C is a conceptual diagram for illustrating another example of a filter shape used in an ALF.

The filter shape to be used in an ALF is, for example, a circular symmetric filter shape. FIG. 23A through FIG. 23C are conceptual diagrams for illustrating examples of filter shapes used in ALFs. FIG. 23A illustrates a 5×5 diamond shape filter, FIG. 23B illustrates a 7×7 diamond shape filter, and FIG. 23C illustrates a 9×9 diamond shape filter. Information indicating the filter shape is normally signaled at the picture level. It is to be noted that the signaling of such information indicating the filter shape does not necessarily need to be performed at the picture level, and may be performed at another level (for example, at the sequence level, slice level, tile level, CTU level, or CU level).

The ON or OFF of the ALF may be determined, for example, at the picture level or CU level. For example, the decision of whether to apply the ALF to luma may be made at the CU level, and the decision of whether to apply ALF to chroma may be made at the picture level. Information indicating ON or OFF of the ALF is normally signaled at the picture level or CU level. It is to be noted that the signaling of information indicating ON or OFF of the ALF does not necessarily need to be performed at the picture level or CU level, and may be performed at another level (for example, at the sequence level, slice level, tile level, or CTU level).

In addition, as described above, one filter is selected from the plurality of filters, and an ALF process of a sub-block is performed. A coefficient set of coefficients to be used for each of the plurality of filters (for example, up to the fifteenth or twenty-fifth filter) is normally signaled at the picture level. It is to be noted that the signaling of the coefficient set does not necessarily need to be performed at the picture level, and may be performed at another level (for example, at the sequence level, slice level, tile level, CTU level, CU level, or sub-block level).

(Loop Filter>Cross Component Adaptive Loop Filter)

Figure 23E:
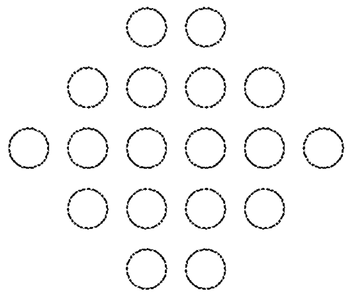
FIG. 23E is a conceptual diagram for illustrating an example of a filter shape used in a CC-ALF.
Figure 23D:
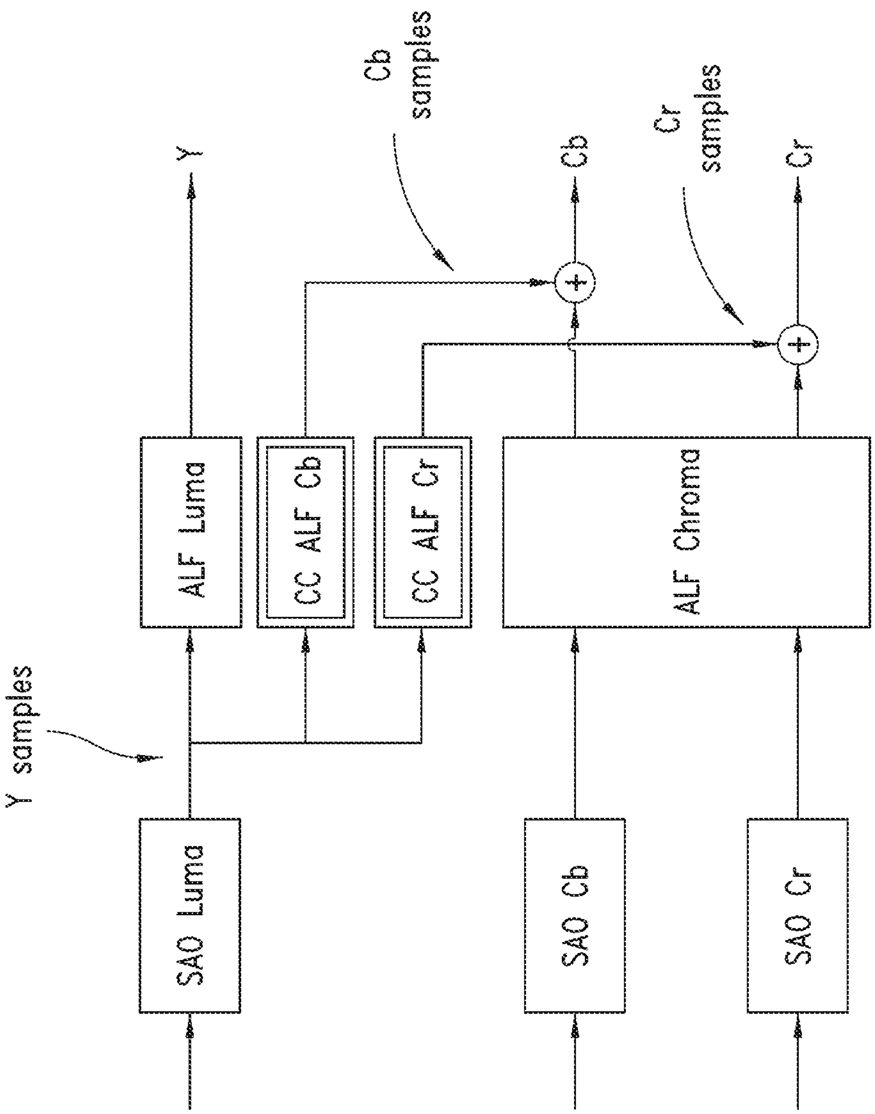
FIG. 23D is a conceptual diagram for illustrating an example flow of a cross component ALF (CC-ALF).

FIG. 23D is a conceptual diagram for illustrating an example flow of a cross component ALF (CC-ALF). FIG. 23E is a conceptual diagram for illustrating an example of a filter shape used in a CC-ALF, such as the CC-ALF of FIG. 23D. The example CC-ALF of FIGS. 23D and 23E operates by applying a linear, diamond shaped filter to the luma channel for each chroma component. The filter coefficients, for example, may be transmitted in the APS, scaled by a factor of 2^10, and rounded for fixed point representation. For example, in FIG. 23D, Y samples (first component) are used for CCALF for Cb and CCALF for Cr (components different from the first component).

The application of the filters may be controlled on a variable block size and signaled by a context-coded flag received for each block of samples. The block size along with an CC-ALF enabling flag may be received at the slice-level for each chroma component. CC-ALF may support various block sizes, for example (in chroma samples) 16×16 pixels, 32×32 pixels, 64×64 pixels, 128×128 pixels.

(Loop Filter>Joint Chroma Cross Component Adaptive Loop Filter)

Figure 23F:
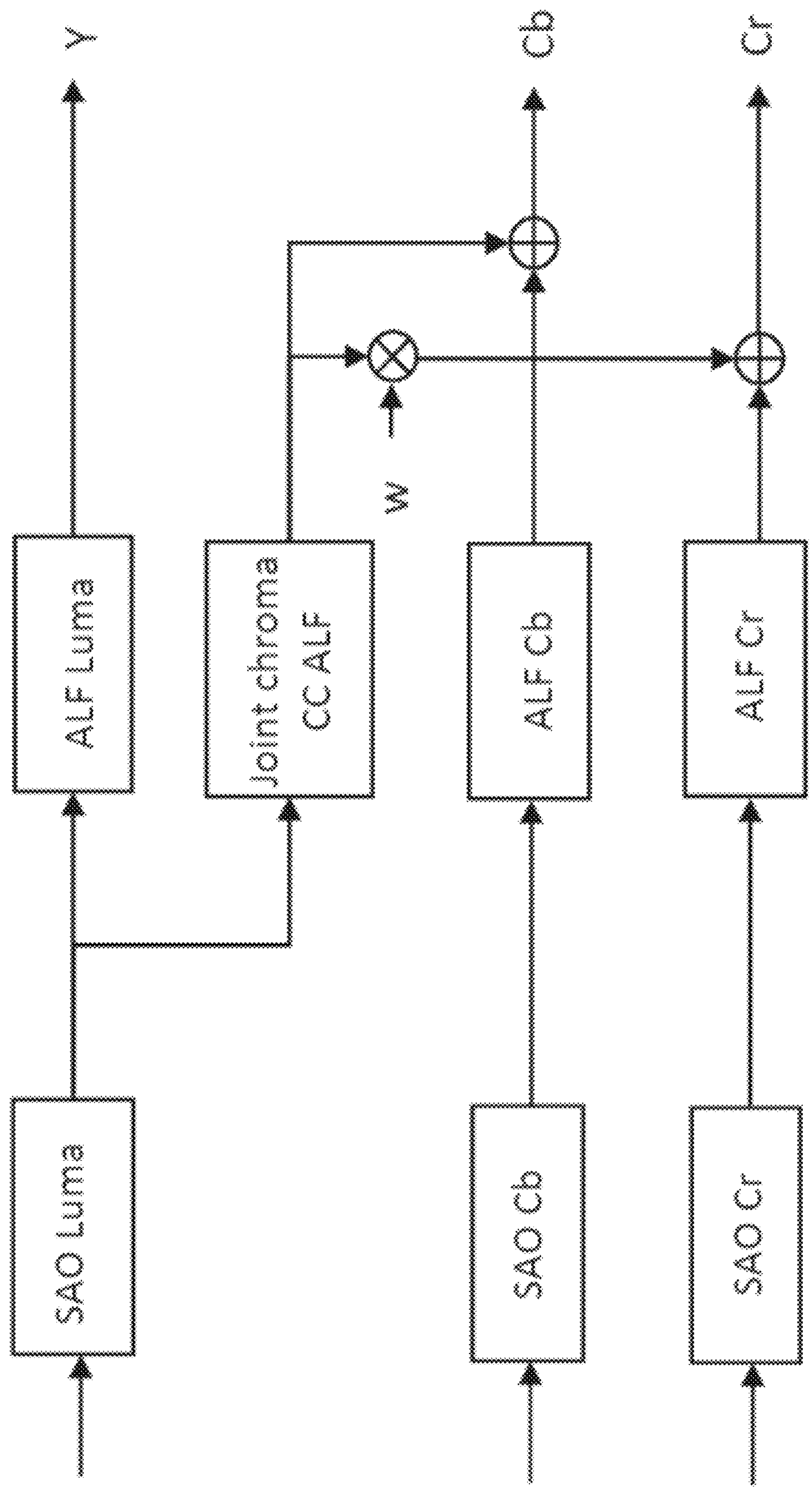
FIG. 23F is a conceptual diagram for illustrating an example flow of a Joint Chroma CCALF (JC-CCALF).

One example of Joint Chroma-CCALF, is illustrated in FIGS. 23F and 23G. FIG. 23F is a conceptual diagram for illustrating an example flow of a Joint Chroma CCALF. FIG. 23G is a table illustrating example weight index candidates. As illustrated, one CCALF filter is used to generate one CCALF filtered output as the chroma refinement signal for one color component, while a weighted version of the same chroma refinement signal is applied to the other color component. In this way, the complexity of existing CCALF is reduced roughly by half. The weight value may be coded into a sign flag and a weight index. The weight index (denoted as weight_index) may be coded into 3 bits, and specifies the magnitude of the JC-CCALF weight JcCcWeight, which is a non-zero magnitude. The magnitude of JcCcWeight may, for example, be determined as follows:

If weight_index is less than or equal to 4, JcCcWeight is equal to weight_index>>2;

Otherwise, JcCcWeight is equal to 4/(weight_index−4).

The block-level on/off control of ALF filtering for Cb and Cr may be separate. This is the same as in CCALF, and two separate sets of block-level on/off control flags may be coded. Different from CCALF, herein, the Cb, Cr on/off control block sizes are the same, and thus, only one block size variable may be coded.

(Loop Filter>Deblocking Filter)

In a deblocking filter process, loop filter 120 performs a filter process on a block boundary in a reconstructed image so as to reduce distortion which occurs at the block boundary.

Figure 24:
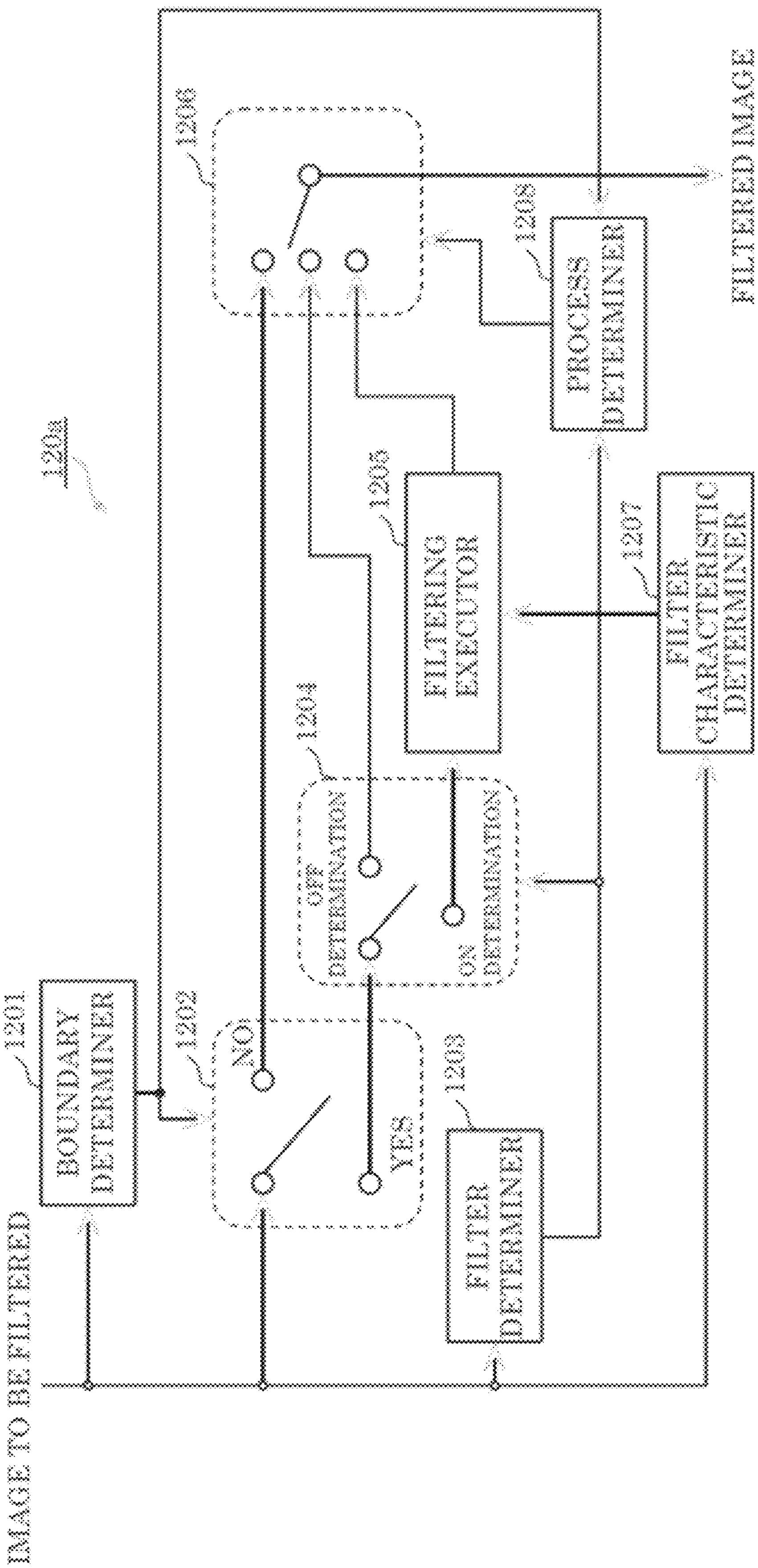
FIG. 24 is a block diagram indicating one example of a specific configuration of a loop filter which functions as a deblocking filter (DBF).

FIG. 24 is a block diagram illustrating one example of a specific configuration of deblocking filter executor 120*a* of a loop filter 120 (see FIGS. 7 and 22) which functions as a deblocking filter.

Deblocking filter executor 120*a* includes: boundary determiner 1201; filter determiner 1203; filtering executor 1205; process determiner 1208; filter characteristic determiner 1207; and switches 1202, 1204, and 1206.

Boundary determiner 1201 determines whether a pixel to be deblock-filtered (that is, a current pixel) is present around a block boundary. Boundary determiner 1201 then outputs the determination result to switch 1202 and processing determiner 1208.

In the case where boundary determiner 1201 has determined that a current pixel is present around a block boundary, switch 1202 outputs an unfiltered image to switch 1204. In the opposite case where boundary determiner 1201 has determined that no current pixel is present around a block boundary, switch 1202 outputs an unfiltered image to switch 1206. It is to be noted that the unfiltered image is an image configured with a current pixel and at least one surrounding pixel located around the current pixel.

Filter determiner 1203 determines whether to perform deblocking filtering of the current pixel, based on the pixel value of at least one surrounding pixel located around the current pixel. Filter determiner 1203 then outputs the determination result to switch 1204 and process determiner 1208.

In the case where filter determiner 1203 has determined to perform deblocking filtering of the current pixel, switch 1204 outputs the unfiltered image obtained through switch 1202 to filtering executor 1205. In the opposite case where filter determiner 1203 has determined not to perform deblocking filtering of the current pixel, switch 1204 outputs the unfiltered image obtained through switch 1202 to switch 1206.

When obtaining the unfiltered image through switches 1202 and 1204, filtering executor 1205 executes, for the current pixel, deblocking filtering with the filter characteristic determined by filter characteristic determiner 1207. Filtering executor 1205 then outputs the filtered pixel to switch 1206.

Under control by processing determiner 1208, switch 1206 selectively outputs one of a pixel which has not been deblock-filtered and a pixel which has been deblock-filtered by filtering executor 1205.

Processing determiner 1208 controls switch 1206 based on the results of determinations made by boundary determiner 1201 and filter determiner 1203. In other words, processing determiner 1208 causes switch 1206 to output the pixel which has been deblock-filtered when boundary determiner 1201 has determined that the current pixel is present around the block boundary and when filter determiner 1203 has determined to perform deblocking filtering of the current pixel. In addition, other than the above case, processing determiner 1208 causes switch 1206 to output the pixel which has not been deblock-filtered. A filtered image is output from switch 1206 by repeating output of a pixel in this way. It is to be noted that the configuration illustrated in FIG. 24 is one example of a configuration in deblocking filter executor 120*a*. Deblocking filter executor 120*a* may have various configurations.

Figure 25:
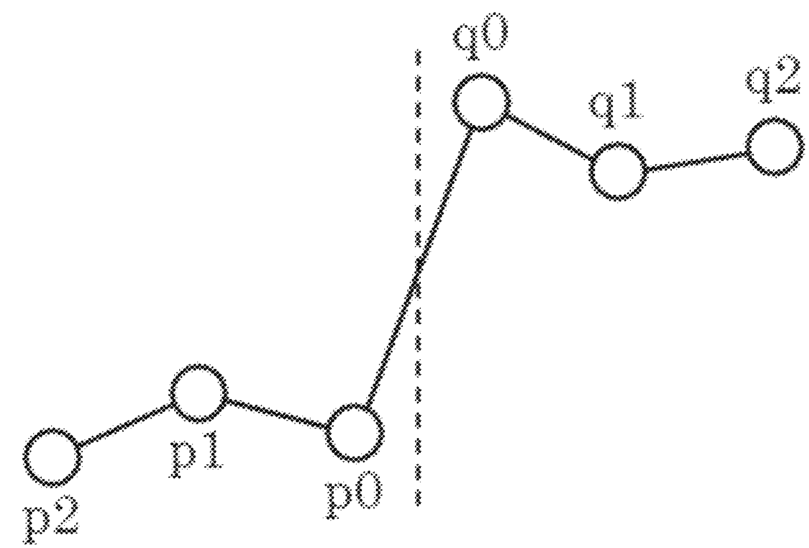
FIG. 25 is a conceptual diagram for illustrating an example of a deblocking filter having a symmetrical filtering characteristic with respect to a block boundary.

FIG. 25 is a conceptual diagram for illustrating an example of a deblocking filter having a symmetrical filtering characteristic with respect to a block boundary.

In a deblocking filter process, one of two deblocking filters having different characteristics, that is, a strong filter and a weak filter, may be selected using pixel values and quantization parameters. In the case of the strong filter, when pixels p0 to p2 and pixels q0 to q2 are present across a block boundary as illustrated in FIG. 25, the pixel values of the respective pixel q0 to q2 are changed to pixel values q'0 to q'2 by performing, for example, computations according to the expressions below.

$$q'0=(p1+2\times p0+2\times q0+2\times q1+q2+4)/8$$

$$q'1=(p0+q0+q1+q2+2)/4$$

$$q'2=(p0+q0+q1+3\times q2+2\times q3+4)/8$$

It is to be noted that, in the above expressions, p0 to p2 and q0 to q2 are the pixel values of respective pixels p0 to p2 and pixels q0 to q2. In addition, q3 is the pixel value of neighboring pixel q3 located at the opposite side of pixel q2 with respect to the block boundary. In addition, in the right side of each of the expressions, coefficients which are multiplied with the respective pixel values of the pixels to be used for deblocking filtering are filter coefficients.

Furthermore, in the deblocking filtering, clipping may be performed so that the calculated pixel values are not changed more than a threshold value. For example, in the clipping process the pixel values calculated according to the above expressions may be clipped to a value obtained according to "a computation pixel value±2×a threshold value" using a threshold value determined based on a quantization parameter. In this way, it is possible to prevent excessive smoothing.

Figure 26:
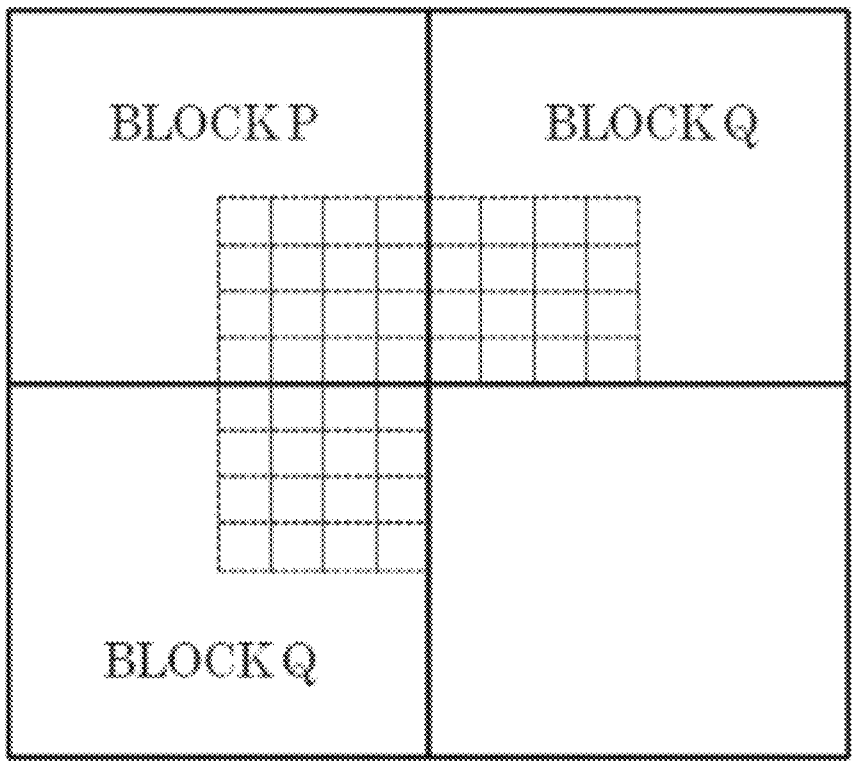
FIG. 26 is a conceptual diagram for illustrating a block boundary on which a deblocking filter process is performed.

FIG. 26 is a conceptual diagram for illustrating a block boundary on which a deblocking filter process is performed. FIG. 27 is a conceptual diagram for illustrating examples of Boundary strength (Bs) values.

The block boundary on which the deblocking filter process is performed is, for example, a boundary between CUs, Pus, or TUs having 8×8 pixel blocks as illustrated in FIG. 26. The deblocking filter process may be performed, for example, in units of four rows or four columns. First, boundary strength (Bs) values are determined as indicated in FIG. 27 for block P and block Q illustrated in FIG. 26.

According to the Bs values in FIG. 27, whether to perform deblocking filter processes of block boundaries belonging to the same image using different strengths may be determined. The deblocking filter process for a chroma signal is performed when a Bs value is 2. The deblocking filter process for a luma signal is performed when a Bs value is 1 or more and a determined condition is satisfied. The determined condition may be predetermined. It is noted that conditions for determining Bs values are not limited to those indicated in FIG. 27, and a Bs value may be determined based on another parameter.

(Predictor (Intra Predictor, Inter Predictor, Prediction Controller))

Figure 28:
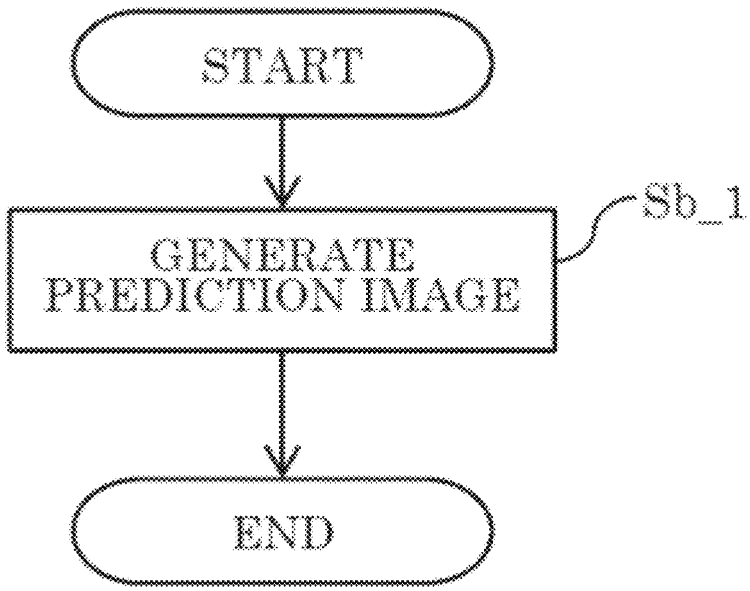
FIG. 28 is a flow chart illustrating one example of a process performed by a predictor of the encoder.

FIG. 28 is a flow chart illustrating one example of a process performed by a predictor of encoder 100. It is to be noted that the predictor includes all or part of the following constituent elements: intra predictor 124; inter predictor 126; and prediction controller 128. The prediction executor includes, for example, intra predictor 124 and inter predictor 126.

The predictor generates a prediction image of a current block (Step Sb_1). This prediction image may also be referred to as a prediction signal or a prediction block. It is to be noted that the prediction signal is, for example, an intra prediction image (image prediction signal) or an inter prediction image (inter prediction signal). The predictor generates the prediction image of the current block using a reconstructed image which has been already obtained through another block through generation of a prediction image, generation of a prediction residual, generation of quantized coefficients, restoring of a prediction residual, and addition of the prediction image.

The reconstructed image may be, for example, an image in a reference picture, or an image of an encoded block (that is, the other block described above) in a current picture which is the picture including the current block. The encoded block in the current picture is, for example, a neighboring block of the current block.

Figure 29:
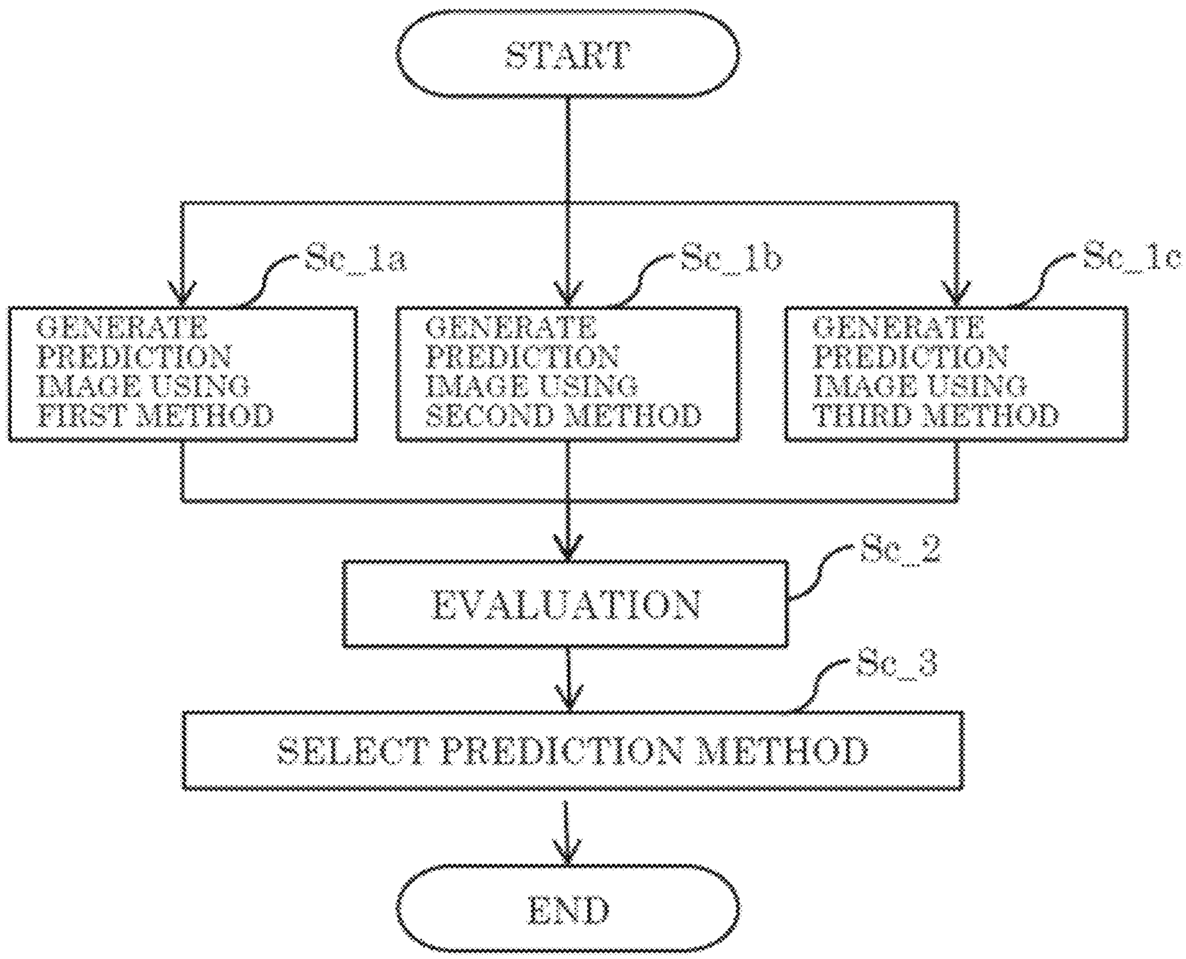
FIG. 29 is a flow chart illustrating another example of a process performed by the predictor of the encoder.

FIG. 29 is a flow chart illustrating another example of a process performed by the predictor of the encoder 100.

The predictor generates a prediction image using a first method (Step Sc_1a), generates a prediction image using a second method (Step Sc_1b), and generates a prediction image using a third method (Step Sc_1c). The first method, the second method, and the third method may be mutually different methods for generating a prediction image. Each of the first to third methods may be an inter prediction method, an intra prediction method, or another prediction method. The above-described reconstructed image may be used in these prediction methods.

Next, the prediction processor evaluates the prediction images generated in Steps Sc_1a, Sc_1b, and Sc_1c (Step Sc_2). For example, the predictor calculates costs C for the prediction images generated in Step Sc_1a, Sc_1b, and Sc_1, and evaluates the prediction images by comparing the costs C of the prediction images. It is to be noted that cost C may be calculated, for example, according to an expression of an R-D optimization model, for example, C=D+2×R. In this expression, D indicates compression artifacts of a prediction image, and is represented as, for example, a sum of absolute differences between the pixel value of a current block and the pixel value of a prediction image. In addition, R indicates a bit rate of a stream. In addition, λ indicates, for example, a multiplier according to the method of Lagrange multipliers.

The predictor then selects one of the prediction images generated in Steps Sc_1a, Sc_1b, and Sc_1c (Step Sc_3). In other words, the predictor selects a method or a mode for obtaining a final prediction image. For example, the predictor selects the prediction image having the smallest cost C, based on costs C calculated for the prediction images. Alternatively, the evaluation in Step Sc_2 and the selection of the prediction image in Step Sc_3 may be made based on a parameter which is used in an encoding process. Encoder 100 may transform information for identifying the selected prediction image, the method, or the mode into a stream. The information may be, for example, a flag or the like. In this way, decoder 200 is capable of generating a prediction image according to the method or the mode selected by encoder 100, based on the information. It is to be noted that, in the example illustrated in FIG. 29, the predictor selects any of the prediction images after the prediction images are generated using the respective methods. However, the predictor may select a method or a mode based on a parameter for use in the above-described encoding process before generating prediction images, and may generate a prediction image according to the method or mode selected.

For example, the first method and the second method may be intra prediction and inter prediction, respectively, and the predictor may select a final prediction image for a current block from prediction images generated according to the prediction methods.

Figure 30:
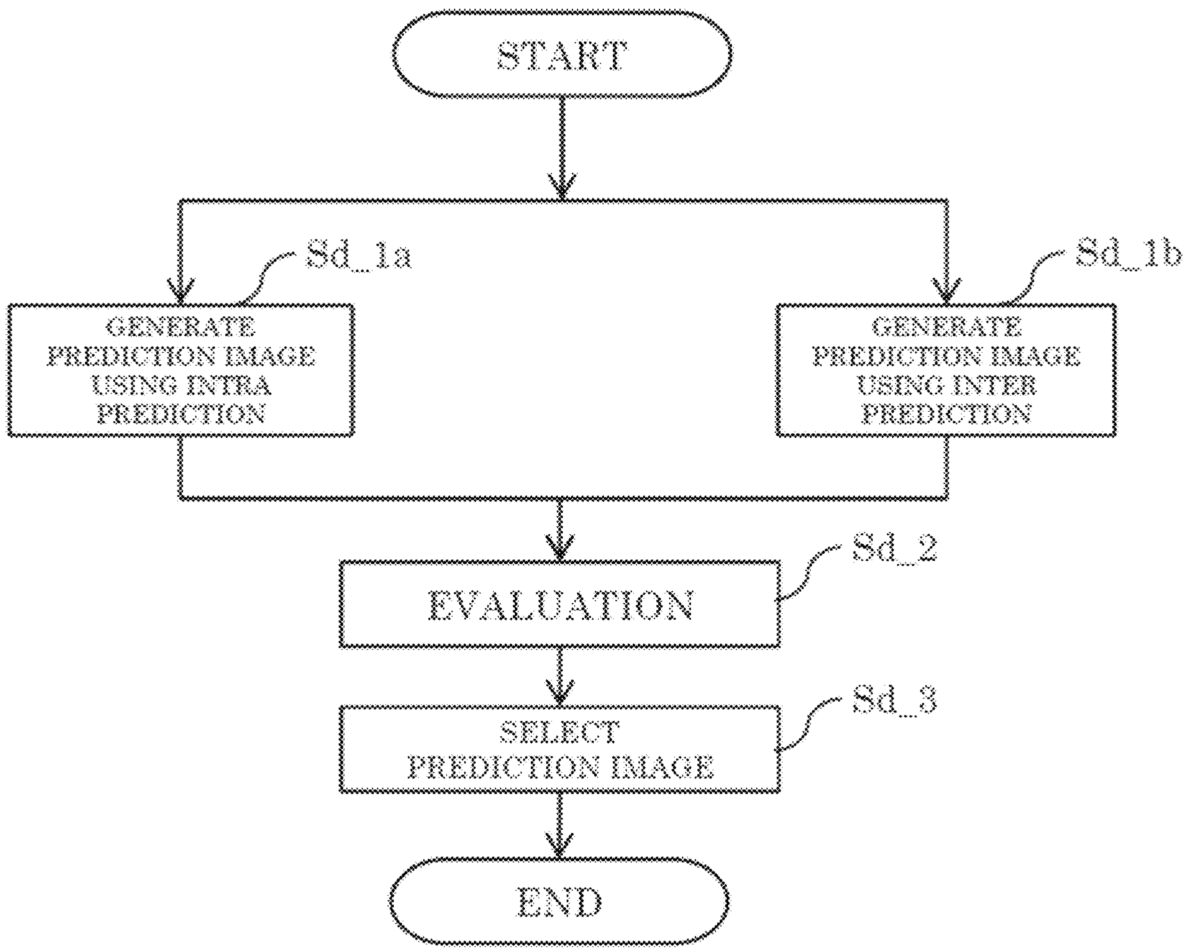
FIG. 30 is a flow chart illustrating another example of a process performed by the predictor of the encoder.

FIG. 30 is a flow chart illustrating another example of a process performed by the predictor of encoder 100.

First, the predictor generates a prediction image using intra prediction (Step Sd_1a), and generates a prediction image using inter prediction (Step Sd_1b). It is to be noted that the prediction image generated by intra prediction is also referred to as an intra prediction image, and the prediction image generated by inter prediction is also referred to as an inter prediction image.

Next, the predictor evaluates each of the intra prediction image and the inter prediction image (Step Sd_2). Cost C described above may be used in the evaluation. The predictor may then select the prediction image for which the smallest cost C has been calculated among the intra prediction image and the inter prediction image, as the final prediction image for the current block (Step Sd_3). In other words, the prediction method or the mode for generating the prediction image for the current block is selected.

The prediction processor then selects the prediction image for which the smallest cost C has been calculated among the intra prediction image and the inter prediction image, as the final prediction image for the current block (Step Sd_3). In other words, the prediction method or the mode for generating the prediction image for the current block is selected.

(Intra Predictor)

Intra predictor 124 generates a prediction signal (that is, intra prediction image) by performing intra prediction (also referred to as intra frame prediction) of the current block by referring to a block or blocks in the current picture and stored in block memory 118. More specifically, intra predictor 124 generates an intra prediction image by performing intra prediction by referring to pixel values (for example, luma and/or chroma values) of a block or blocks neighboring the current block, and then outputs the intra prediction image to prediction controller 128.

For example, intra predictor 124 performs intra prediction by using one mode from among a plurality of intra prediction modes which have been defined. The intra prediction modes typically include one or more non-directional prediction modes and a plurality of directional prediction modes. The defined modes may be predefined.

The one or more non-directional prediction modes include, for example, the planar prediction mode and DC prediction mode defined in the H.265/high-efficiency video coding (HEVC) standard.

Figure 31:
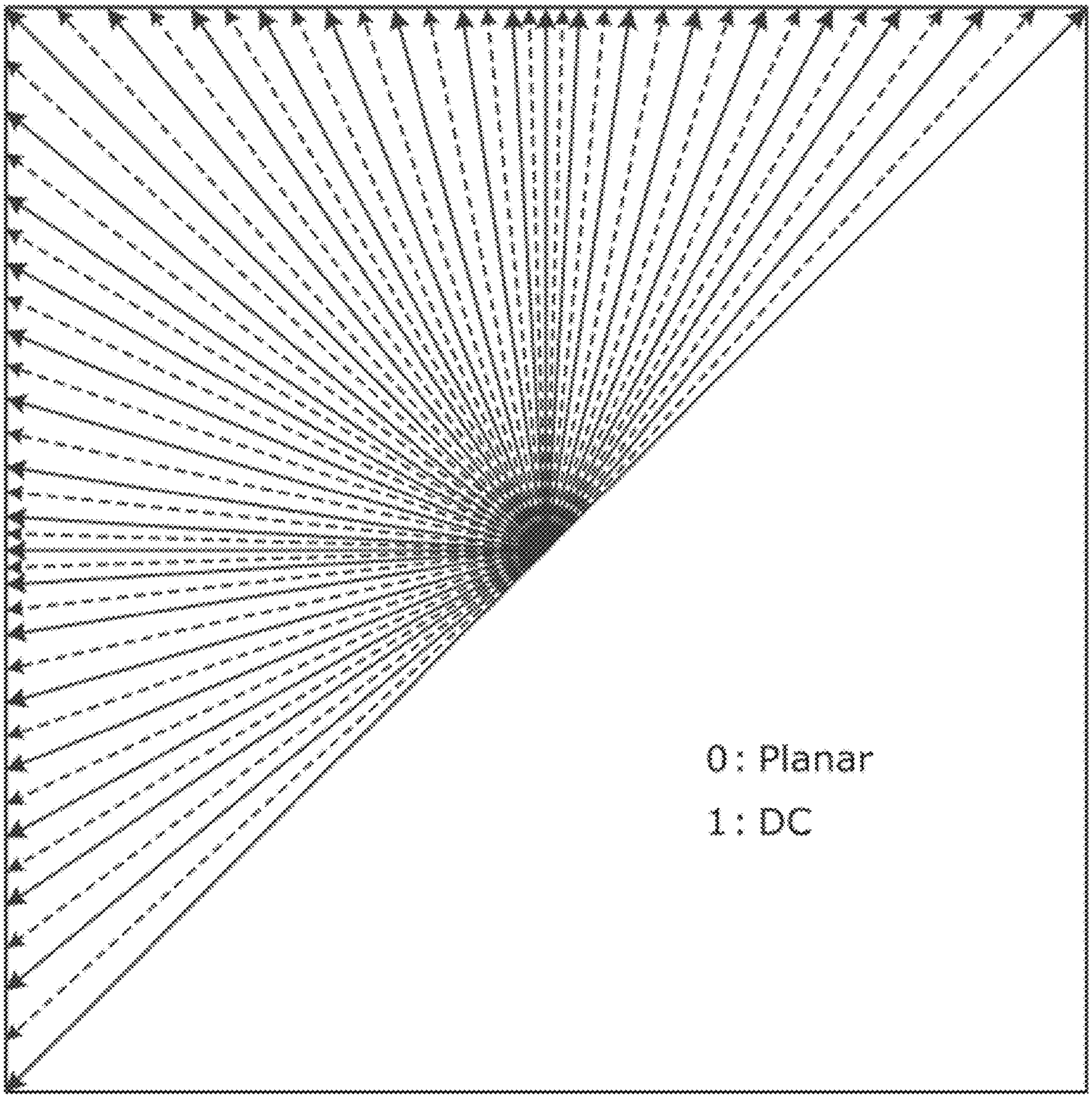
FIG. 31 is a conceptual diagram for illustrating sixty-seven intra prediction modes used in intra prediction in an embodiment.

The plurality of directional prediction modes include, for example, the thirty-three directional prediction modes defined in the H.265/HEVC standard. It is to be noted that the plurality of directional prediction modes may further include thirty-two directional prediction modes in addition to the thirty-three directional prediction modes (for a total of sixty-five directional prediction modes). FIG. 31 is a conceptual diagram for illustrating sixty-seven intra prediction modes in total that may be used in intra prediction (two non-directional prediction modes and sixty-five directional prediction modes). The solid arrows represent the thirty-three directions defined in the H.265/HEVC standard, and the dashed arrows represent the additional thirty-two directions (the two non-directional prediction modes are not illustrated in FIG. 31).

In various kinds of processing examples, a luma block may be referred to in intra prediction of a chroma block. In other words, a chroma component of the current block may be predicted based on a luma component of the current block. Such intra prediction is also referred to as cross-component linear model (CCLM) prediction. The intra prediction mode for a chroma block in which such a luma block is referred to (also referred to as, for example, a CCLM mode) may be added as one of the intra prediction modes for chroma blocks.

Intra predictor 124 may correct intra-predicted pixel values based on horizontal/vertical reference pixel gradients. Intra prediction accompanied by this sort of correcting is also referred to as position dependent intra prediction combination (PDPC). Information indicating whether to apply PDPC (referred to as, for example, a PDPC flag) is normally signaled at the CU level. It is to be noted that the signaling of such information does not necessarily need to be performed at the CU level, and may be performed at another level (for example, at the sequence level, picture level, slice level, tile level, or CTU level).

Figure 32:
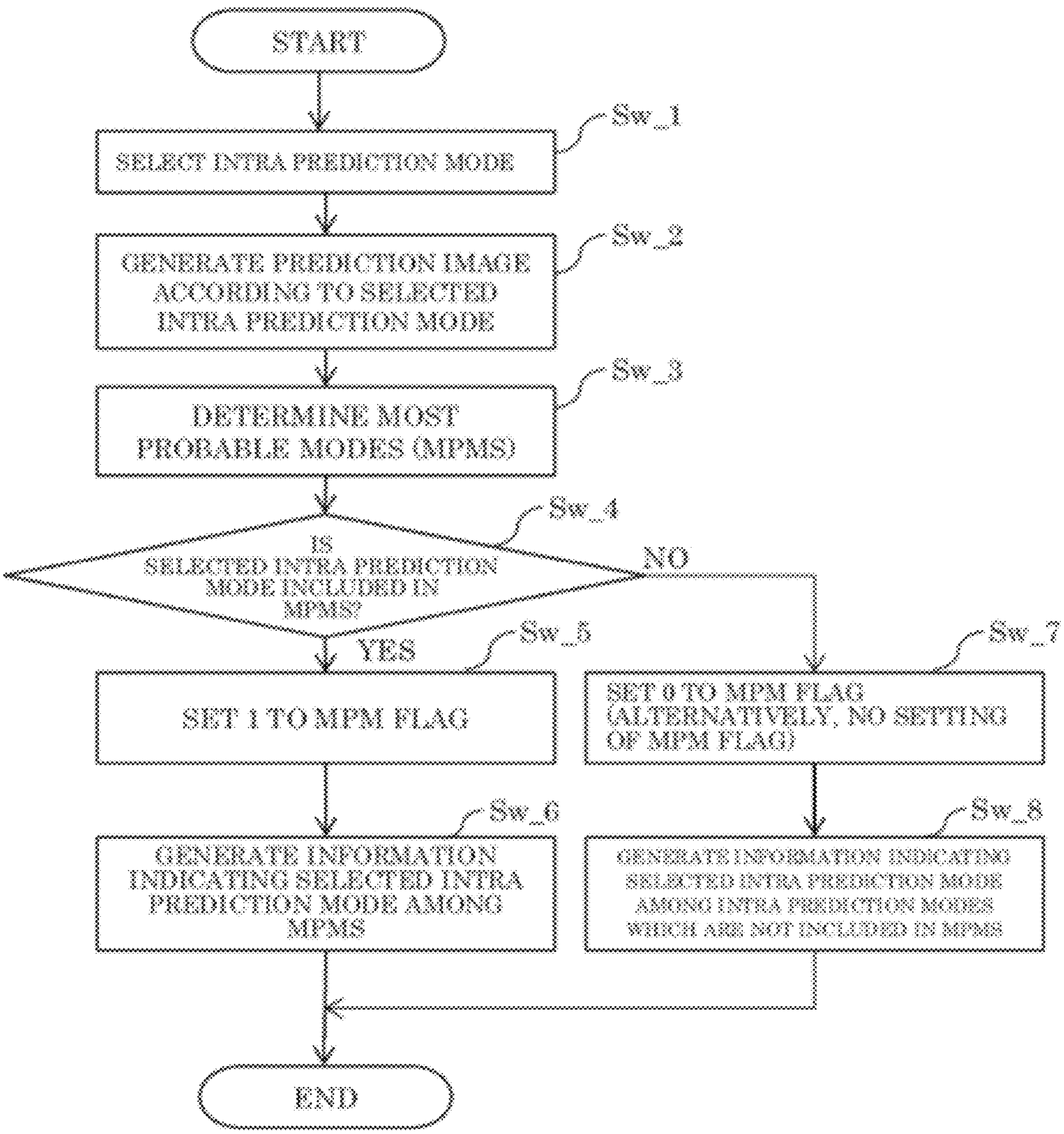
FIG. 32 is a flow chart illustrating one example of a process performed by an intra predictor.

FIG. 32 is a flow chart illustrating one example of a process performed by intra predictor 124.

Intra predictor 124 selects one intra prediction mode from a plurality of intra prediction modes (Step Sw_1). Intra predictor 124 then generates a prediction image according to the selected intra prediction mode (Step Sw_2). Next, intra predictor 124 determines most probable modes (MPMs) (Step Sw_3). MPMs include, for example, six intra prediction modes. For example, two modes among the six intra prediction modes may be planar mode and DC prediction mode, and the other four modes may be directional prediction modes. Intra predictor 124 determines whether the intra prediction mode selected in Step Sw_1 is included in the MPMs (Step Sw_4).

Here, when determining that the intra prediction mode selected in Step Sw_1 is included in the MPMs (Yes in Step Sw_4), intra predictor 124 sets an MPM flag to 1 (Step Sw_5), and generates information indicating the selected intra prediction mode among the MPMs (Step Sw_6). It is to be noted that the MPM flag set to 1 and the information indicating the intra prediction mode may be encoded as prediction parameters by entropy encoder 110.

When determining that the selected intra prediction mode is not included in the MPMs (No in Step Sw_4), intra predictor 124 sets the MPM flag to 0 (Step Sw_7). Alternatively, intra predictor 124 does not set any MPM flag. Intra predictor 124 then generates information indicating the selected intra prediction mode among at least one intra prediction mode which is not included in the MPMs (Step Sw_8). It is to be noted that the MPM flag set to 0 and the information indicating the intra prediction mode may be encoded as prediction parameters by entropy encoder 110. The information indicating the intra prediction mode indicates, for example, any one of 0 to 60.

(Intra Predictor)

Inter predictor 126 generates a prediction image (inter prediction image) by performing inter prediction (also referred to as inter frame prediction) of the current block by referring to a block or blocks in a reference picture, which is different from the current picture and is stored in frame memory 122. Inter prediction is performed in units of a current block or a current sub-block (for example, a 4×4 block) in the current block. The sub-block is included in the block and is a unit smaller than the block. The size of the sub-block may be in the form of a slice, brick, picture, etc.

For example, inter predictor 126 performs motion estimation in a reference picture for a current block or a current sub-block, and finds a reference block or a reference sub-block which best matches the current block or the current sub-block. Inter predictor 126 then obtains motion information (for example, a motion vector) which compensates a motion or a change from the reference block or the reference sub-block to the current block or the sub-block. Inter predictor 126 generates an inter prediction image of the current block or the sub-block by performing motion compensation (or motion prediction) based on the motion information. Inter predictor 126 outputs the generated inter prediction image to prediction controller 128.

The motion information used in motion compensation may be signaled as inter prediction signals in various forms. For example, a motion vector may be signaled. As another example, the difference between a motion vector and a motion vector predictor may be signaled.

(Reference Picture List)

Figure 33:
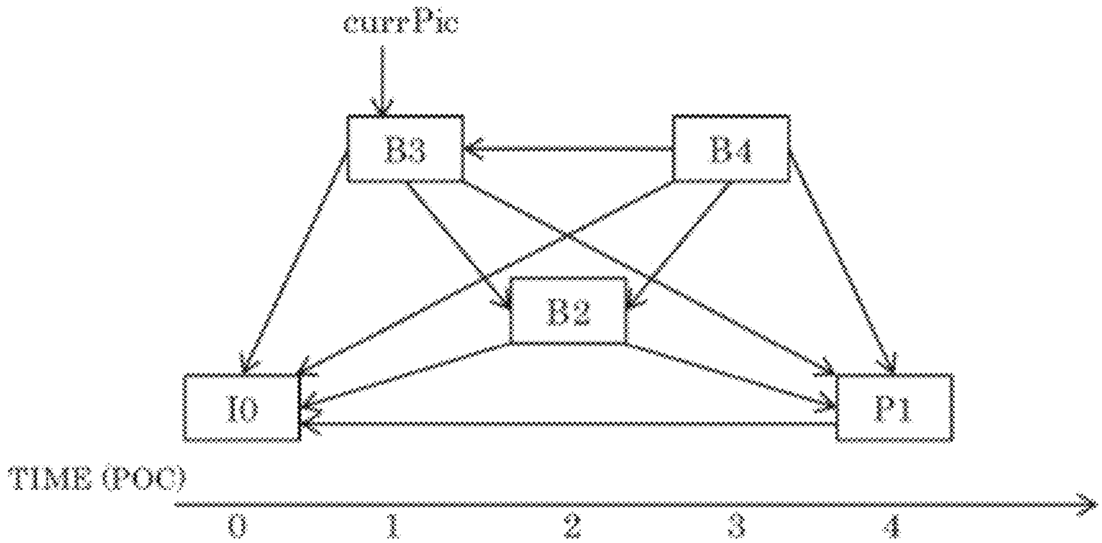
FIG. 33 is a conceptual diagram for illustrating examples of reference pictures.
Figure 34:
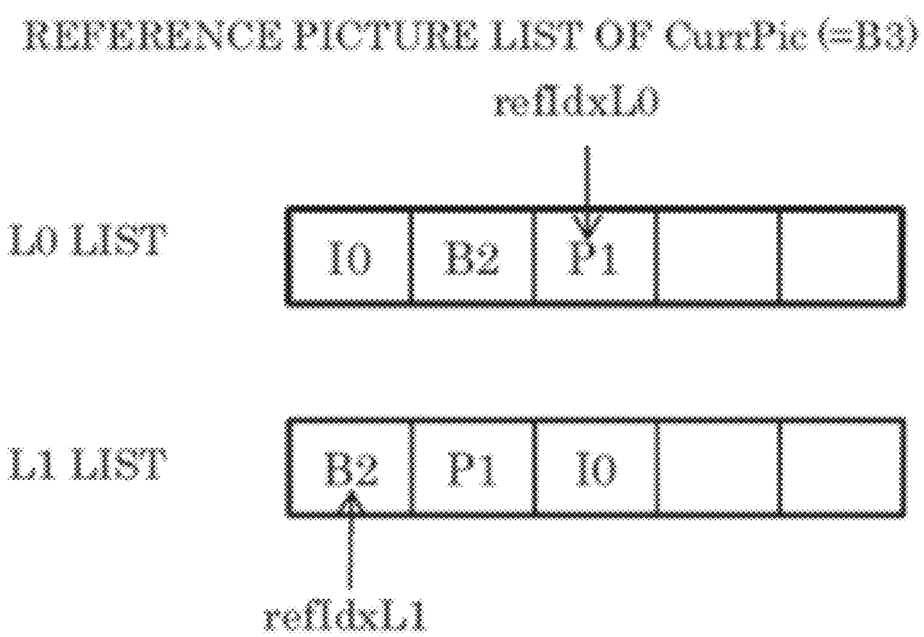
FIG. 34 is a conceptual diagram for illustrating examples of reference picture lists.

FIG. 33 is a conceptual diagram for illustrating examples of reference pictures. FIG. 34 is a conceptual diagram for illustrating examples of reference picture lists. A reference picture list is a list indicating at least one reference picture stored in frame memory 122. It is to be noted that, in FIG. 33, each of rectangles indicates a picture, each of arrows indicates a picture reference relationship, the horizontal axis indicates time, I, P, and B in the rectangles indicate an intra prediction picture, a uni-prediction picture, and a bi-prediction picture, respectively, and numerals in the rectangles indicate a decoding order. As illustrated in FIG. 33, the decoding order of the pictures is an order of I0, P1, B2, B3, and B4, and the display order of the pictures is an order of I0, B3, B2, B4, and P1. As illustrated in FIG. 34, the reference picture list is a list representing reference picture candidates. For example, one picture (or a slice) may include at least one reference picture list. For example, one reference picture list is used when a current picture is a uni-prediction picture, and two reference picture lists are used when a current picture is a bi-prediction picture. In the examples of FIGS. 33 and 34, picture B3 which is current picture currPic has two reference picture lists which are the L0 list and the L1 list. When current picture currPic is picture B3, reference picture candidates for current picture currPic are I0, P1, and B2, and the reference picture lists (which are the L0 list and the L1 list) indicate these pictures. Inter predictor 126 or prediction controller 128 specifies which picture in each reference picture list is to be actually referred to in form of a reference picture index refidxLx. In FIG. 34, reference pictures P1 and B2 are specified by reference picture indices refIdxL0 and refIdxL1.

Such a reference picture list may be generated for each unit such as a sequence, picture, slice, brick, CTU, or CU. In addition, among reference pictures indicated in reference picture lists, a reference picture index indicating a reference picture to be referred to in inter prediction may be signaled at the sequence level, picture level, slice level, brick level, CTU level, or CU level. In addition, a common reference picture list may be used in a plurality of inter prediction modes.

(Basic Flow of Inter Prediction)

Figure 35:
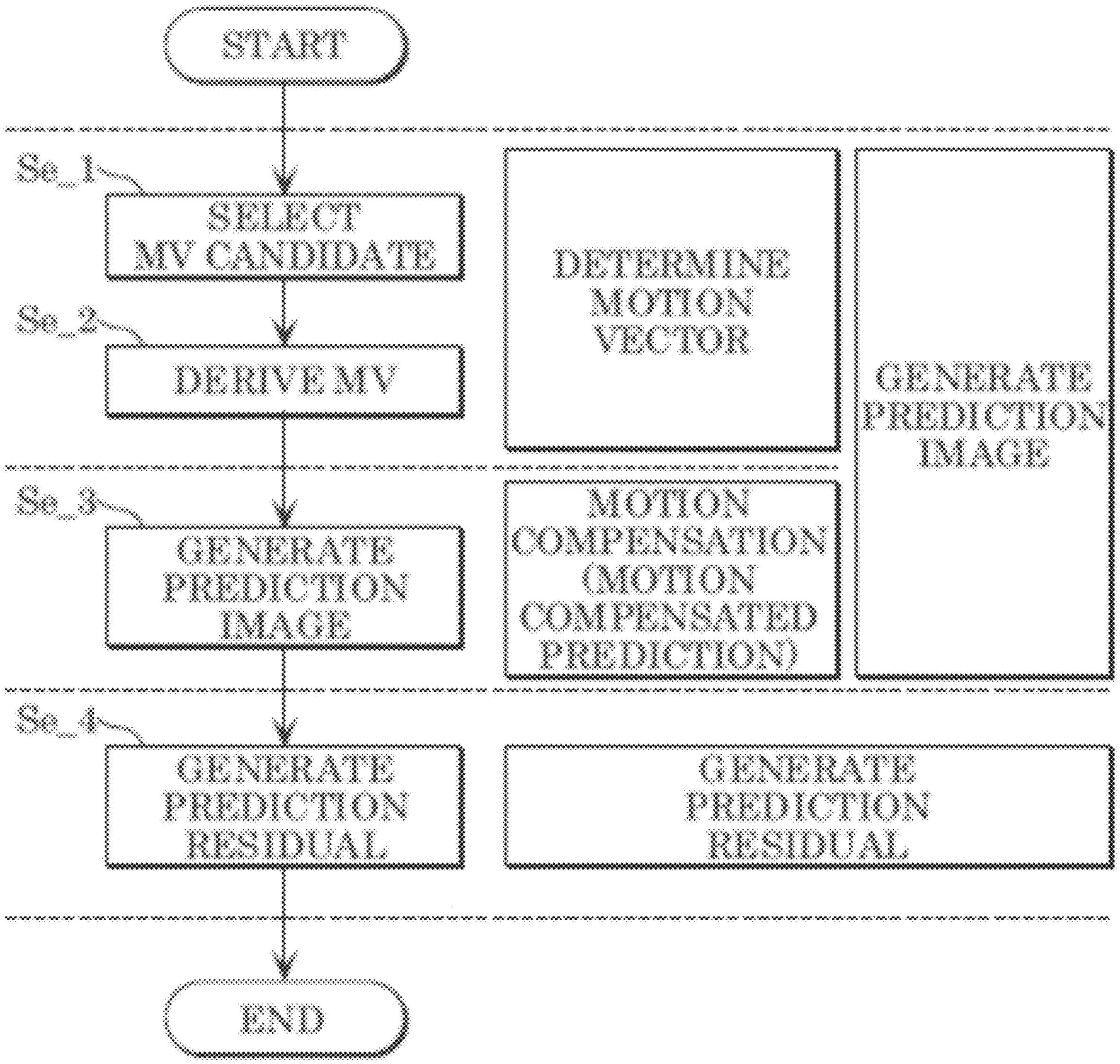
FIG. 35 is a flow chart illustrating an example basic processing flow of inter prediction.

FIG. 35 is a flow chart illustrating an example basic processing flow of a process of inter prediction.

First, inter predictor 126 generates a prediction signal (Steps Se_1 to Se_3). Next, subtractor 104 generates the difference between a current block and a prediction image as a prediction residual (Step Se_4).

Here, in the generation of the prediction image, inter predictor 126 generates the prediction image through determination of a motion vector (MV) of the current block (Steps Se_1 and Se_2) and motion compensation (Step Se_3). Furthermore, in determination of a MV, inter predictor 126 determines the MV through selection of a motion vector candidate (MV candidate) (Step Se_1) and derivation of a MV (Step Se_2). The selection of the MV candidate is made by, for example, inter predictor 126 generating a MV candidate list and selecting at least one MV candidate from the MV candidate list. It is to be noted that MVs derived in the past may be added to the MV candidate list. Alternatively, in derivation of a MV, inter predictor 126 may further select at least one MV candidate from the at least one MV candidate, and determine the selected at least one MV candidate as the MV for the current block. Alternatively, inter predictor 126 may determine the MV for the current block by performing estimation in a reference picture region specified by each of the selected at least one MV candidate. It is to be noted that the estimation in a reference picture region may be referred to as motion estimation.

In addition, although Steps Se_1 to Se_3 are performed by inter predictor 126 in the above-described example, a process that is for example Step Se_1, Step Se_2, or the like may be performed by another constituent element included in encoder 100.

It is to be noted that a MV candidate list may be generated for each process in inter prediction mode, or a common MV candidate list may be used in a plurality of inter prediction modes. The processes in Steps Se_3 and Se_4 correspond to Steps Sa_3 and Sa_4 illustrated in FIG. 9, respectively. The process in Step Se_3 corresponds to the process in Step Sd_1b in FIG. 30.

(Motion Vector Derivation Flow)

Figure 36:
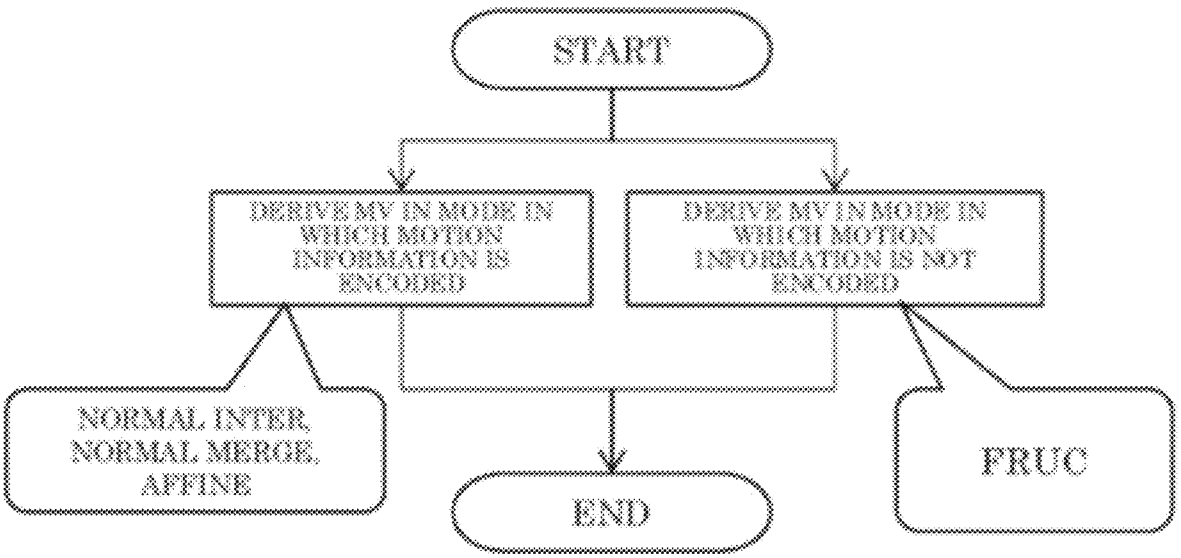
FIG. 36 is a flow chart illustrating one example of a process of derivation of motion vectors.

FIG. 36 is a flow chart illustrating one example of a process of derivation of motion vectors.

Inter predictor 126 may derive a MV of a current block in a mode for encoding motion information (for example, a MV). In this case, for example, the motion information may be encoded as a prediction parameter, and may be signaled. In other words, the encoded motion information is included in a stream.

Alternatively, inter predictor 126 may derive a MV in a mode in which motion information is not encoded. In this case, no motion information is included in the stream.

Here, MV derivation modes may include a normal inter mode, a normal merge mode, a FRUC mode, an affine mode, etc. which are described later. Modes in which motion information is encoded among the modes include the normal inter mode, the normal merge mode, the affine mode (specifically, an affine inter mode and an affine merge mode), etc. It is to be noted that motion information may include not only a MV but also motion vector predictor selection information which is described later. Modes in which no motion information is encoded include the FRUC mode, etc. Inter predictor 126 selects a mode for deriving a MV of the current block from the plurality of modes, and derives the MV of the current block using the selected mode.

Figure 37:
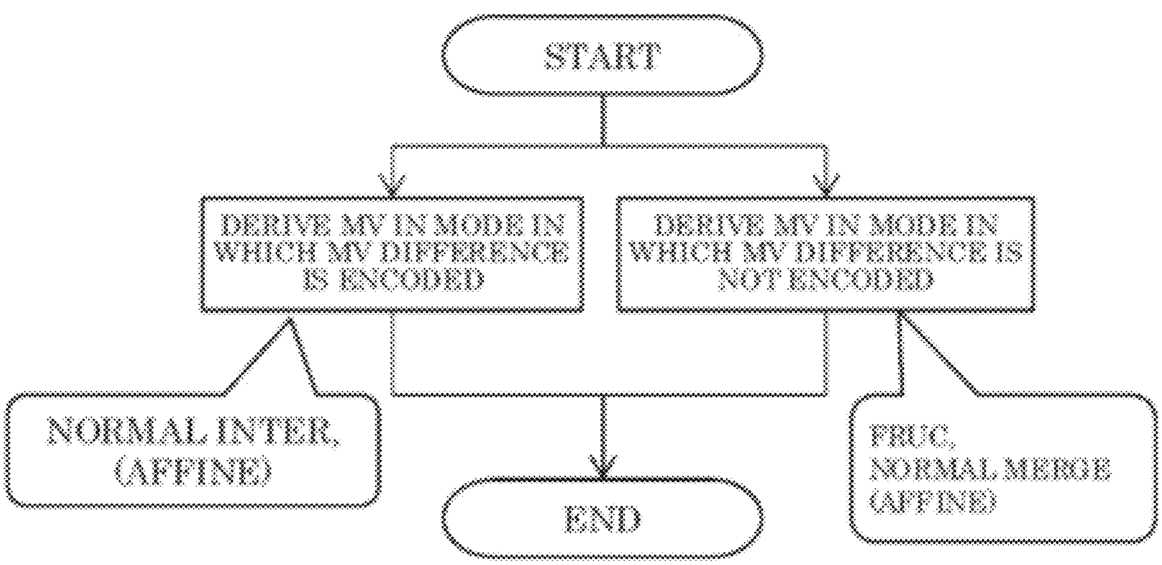
FIG. 37 is a flow chart illustrating another example of a process of derivation of motion vectors.

FIG. 37 is a flow chart illustrating another example of derivation of motion vectors.

Inter predictor 126 may derives a MV for a current block in a mode in which a MV difference is encoded. In this case, for example, the MV difference may be encoded as a prediction parameter, and may be signaled. In other words, the encoded MV difference is included in a stream. The MV difference is the difference between the MV of the current block and the MV predictor. It is to be noted that the MV predictor is a motion vector predictor.

Alternatively, inter predictor 126 may derive a MV in a mode in which no MV difference is encoded. In this case, no encoded MV difference is included in the stream.

Here, as described above, the MV derivation modes include the normal inter mode, the normal merge mode, the FRUC mode, the affine mode, etc. which are described later. Modes in which a MV difference is encoded among the modes include the normal inter mode, the affine mode (specifically, the affine inter mode), etc. Modes in which no MV difference is encoded include the FRUC mode, the normal merge mode, the affine mode (specifically, the affine merge mode), etc. Inter predictor 126 selects a mode for deriving a MV of the current block from the plurality of modes, and derives the MV of the current block using the selected mode.

(Motion Vector Derivation Modes)

Figure 38B:
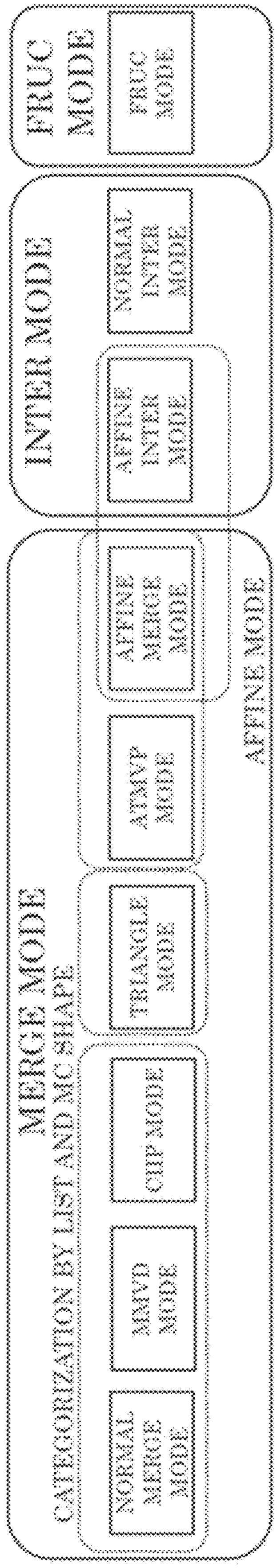
FIG. 38B is conceptual diagram for illustrating example characterizations of modes for MV derivation.

FIGS. 38A and 38B are conceptual diagrams for illustrating example categorization of modes for MV derivation. For example, as illustrated in FIG. 38A, MV derivation modes are roughly categorized into three modes according to whether to encode motion information and whether to encode MV differences. The three modes are inter mode, merge mode, and frame rate up-conversion (FRUC) mode. The inter mode is a mode in which motion estimation is performed, and in which motion information and a MV difference are encoded. For example, as illustrated in FIG. 38B, the inter mode includes affine inter mode and normal inter mode. The merge mode is a mode in which no motion estimation is performed, and in which a MV is selected from an encoded surrounding block and a MV for the current block is derived using the MV. The merge mode is a mode in which, basically, motion information is encoded and no MV difference is encoded. For example, as illustrated in FIG. 38B, the merge modes include normal merge mode (also referred to as normal merge mode or regular merge mode), merge with motion vector difference (MMVD) mode, combined inter merge/intra prediction (CIIP) mode, triangle mode, ATMVP mode, and affine merge mode. Here, a MV difference is encoded exceptionally in the MMVD mode among the modes included in the merge modes. It is to be noted that the affine merge mode and the affine inter mode are modes included in the affine modes. The affine mode is a mode for deriving, as a MV of a current block, a MV of each of a plurality of sub-blocks included in the current block, assuming affine transform. The FRUC mode is a mode which is for deriving a MV of the current block by performing estimation between encoded regions, and in which neither motion information nor any MV difference is encoded. It is to be noted that the respective modes will be described later in more detail.

It is to be noted that the categorization of the modes illustrated in FIGS. 38A and 38B are examples, and categorization is not limited thereto. For example, when a MV difference is encoded in CIIP mode, the CIIP mode is categorized into inter modes.

(MV Derivation>Normal Inter Mode)

The normal inter mode is an inter prediction mode for deriving a MV of a current block based on a block similar to the image of the current block from a reference picture region specified by a MV candidate. In this normal inter mode, a MV difference is encoded.

Figure 39:
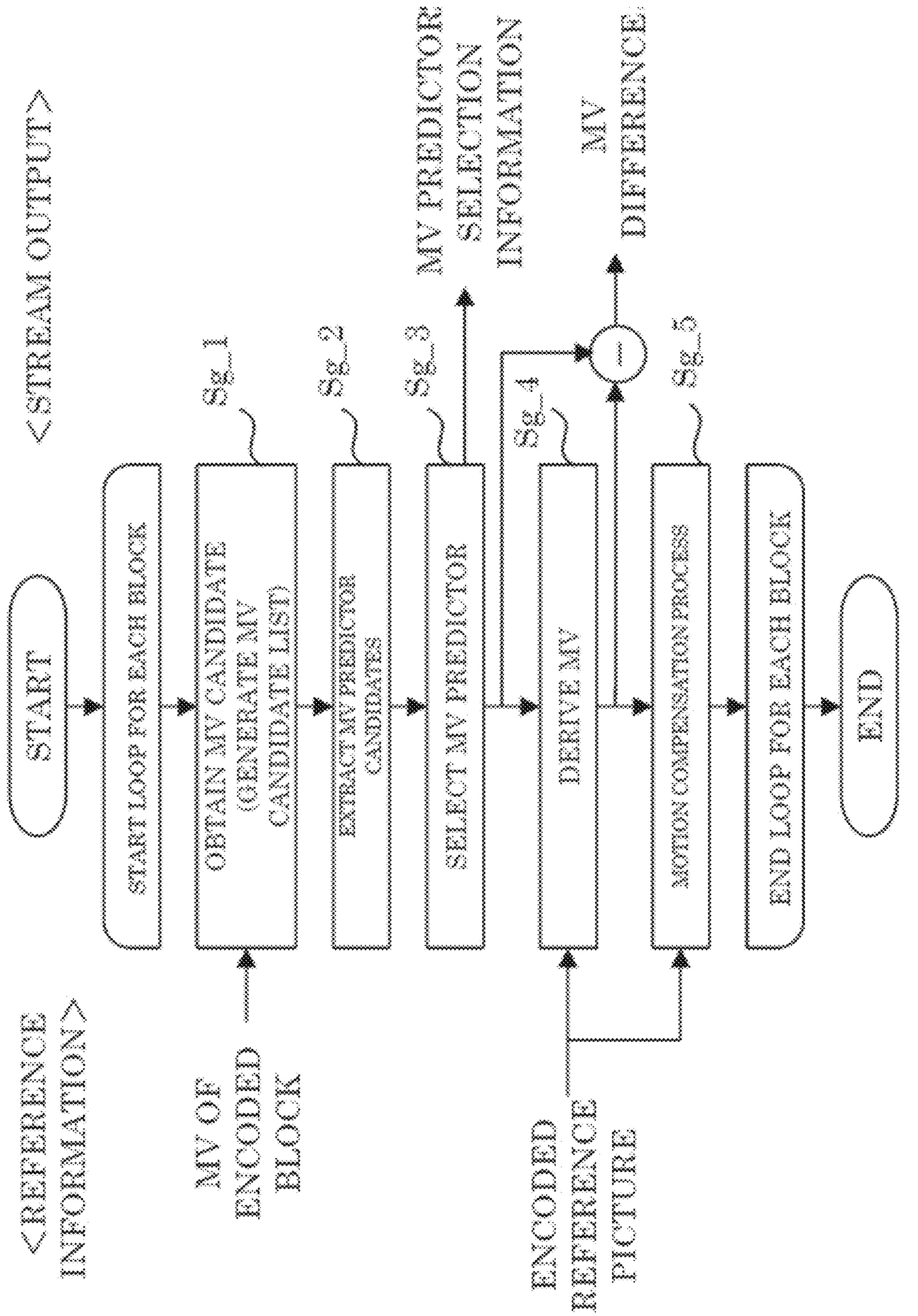
FIG. 39 is a flow chart illustrating an example of a process of inter prediction in normal inter mode.

FIG. 39 is a flow chart illustrating an example of a process of inter prediction in normal inter mode.

First, inter predictor 126 obtains a plurality of MV candidates for a current block based on information such as MVs of a plurality of encoded blocks temporally or spatially surrounding the current block (Step Sg_1). In other words, inter predictor 126 generates a MV candidate list.

Next, inter predictor 126 extracts N (an integer of 2 or larger) MV candidates from the plurality of MV candidates obtained in Step Sg_1, as motion vector predictor candidates (also referred to as MV predictor candidates) according to a determined priority order (Step Sg_2). It is to be noted that the priority order may be determined in advance for each of the N MV candidates.

Next, inter predictor 126 selects one motion vector predictor candidate from the N motion vector predictor candidates, as the motion vector predictor (also referred to as a MV predictor) of the current block (Step Sg_3). At this time, inter predictor 126 encodes, in a stream, motion vector predictor selection information for identifying the selected motion vector predictor. In other words, inter predictor 126 outputs the MV predictor selection information as a prediction parameter to entropy encoder 110 through prediction parameter generator 130.

Next, inter predictor 126 derives a MV of a current block by referring to an encoded reference picture (Step Sg_4). At this time, inter predictor 126 further encodes, in the stream, the difference value between the derived MV and the motion vector predictor as a MV difference. In other words, inter predictor 126 outputs the MV difference as a prediction parameter to entropy encoder 110 through prediction parameter generator 130. It is to be noted that the encoded reference picture is a picture including a plurality of blocks which have been reconstructed after being encoded.

Lastly, inter predictor 126 generates a prediction image for the current block by performing motion compensation of the current block using the derived MV and the encoded reference picture (Step Sg_5). The processes in Steps Sg_1 to Sg_5 are executed on each block. For example, when the processes in Steps Sg_1 to Sg_5 are executed on all the blocks in the slice, inter prediction of the slice using the normal inter mode finishes. For example, when the processes in Steps Sg_1 to Sg_5 are executed on all the blocks in the picture, inter prediction of the picture using the normal inter mode finishes. It is to be noted that not all the blocks included in the slice the processes may be subjected to in Steps Sg_1 to Sg_5, and inter prediction of the slice using the normal inter mode may finish when part of the blocks are subjected to the processes. This also applies to processes in Steps Sg_1 to Sg_5. Inter prediction of the picture using the normal inter mode may finish when the processes are executed on part of the blocks in the picture.

It is to be noted that the prediction image is an inter prediction signal as described above. In addition, information indicating the inter prediction mode (normal inter mode in the above example) used to generate the prediction image is, for example, encoded as a prediction parameter in an encoded signal.

It is to be noted that the MV candidate list may be also used as a list for use in another mode. In addition, the processes related to the MV candidate list may be applied to processes related to the list for use in another mode. The processes related to the MV candidate list include, for example, extraction or selection of a MV candidate from the MV candidate list, reordering of MV candidates, or deletion of a MV candidate.

(MV Derivation>Normal Merge Mode)

The normal merge mode is an inter prediction mode for selecting a MV candidate from a MV candidate list as a MV of a current block, thereby deriving the MV. It is to be noted that the normal merge mode is a type of merge mode and may simply be referred to as a merge mode. In this embodiment, the normal merge mode and the merge mode are distinguished, and the merge mode is used in a broader meaning.

Figure 40:
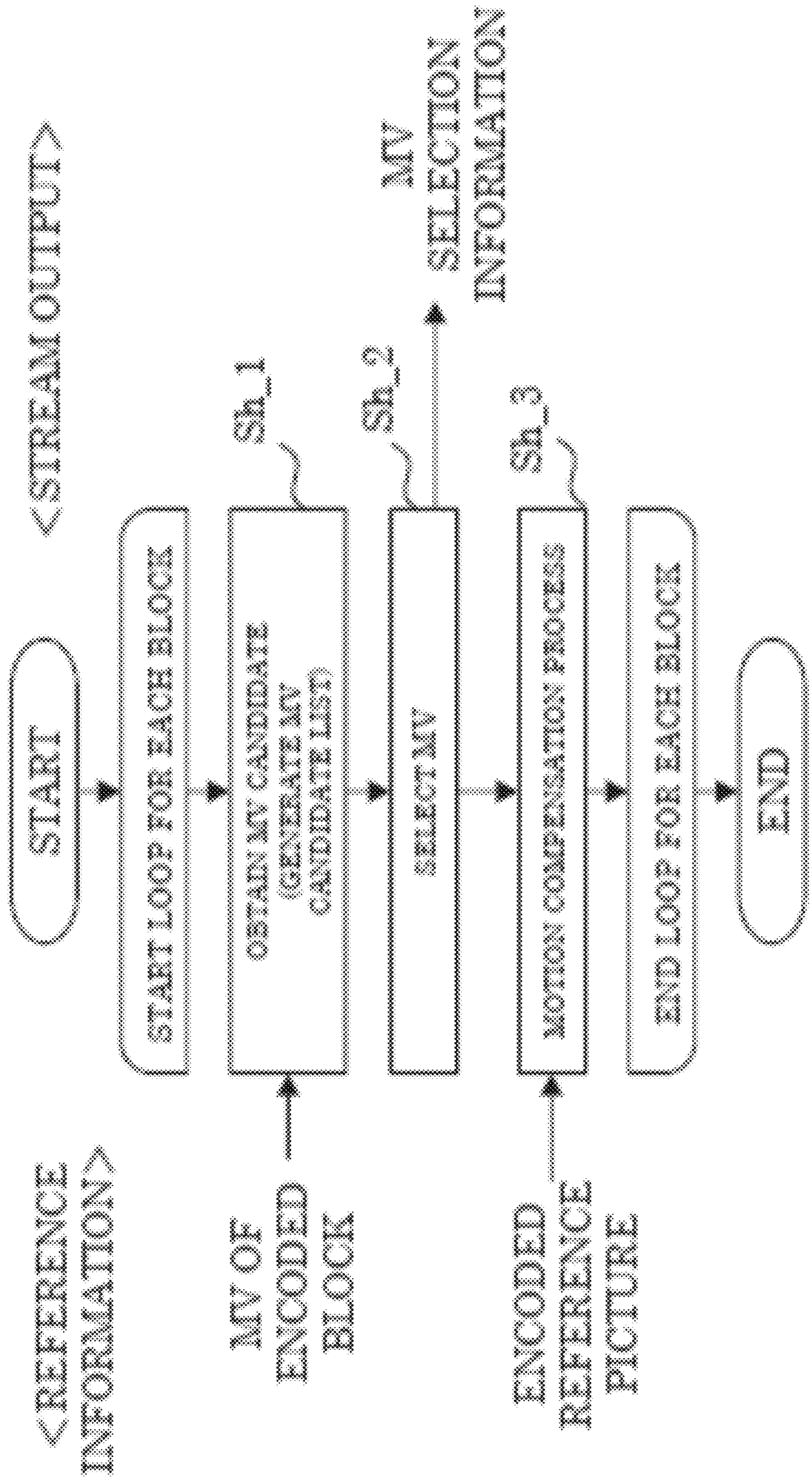
FIG. 40 is a flow chart illustrating an example of a process of inter prediction in normal merge mode.

FIG. 40 is a flow chart illustrating an example of inter prediction in normal merge mode.

First, inter predictor 126 obtains a plurality of MV candidates for a current block based on information such as MVs of a plurality of encoded blocks temporally or spatially surrounding the current block (Step Sh_1). In other words, inter predictor 126 generates a MV candidate list.

Next, inter predictor 126 selects one MV candidate from the plurality of MV candidates obtained in Step Sh_1, thereby deriving a MV of the current block (Step Sh_2). At this time, inter predictor 126 encodes, in a stream, MV selection information for identifying the selected MV candidate. In other words, inter predictor 126 outputs the MV selection information as a prediction parameter to entropy encoder 110 through prediction parameter generator 130.

Lastly, inter predictor 126 generates a prediction image for the current block by performing motion compensation of the current block using the derived MV and the encoded reference picture (Step Sh_3). The processes in Steps Sh_1 to Sh_3 are executed, for example, on each block. For example, when the processes in Steps Sh_1 to Sh_3 are executed on all the blocks in the slice, inter prediction of the slice using the normal merge mode finishes. In addition, when the processes in Steps Sh_1 to Sh_3 are executed on all the blocks in the picture, inter prediction of the picture using the normal merge mode finishes. It is to be noted that not all the blocks included in the slice may be subjected to the processes in Steps Sh_1 to Sh_3, and inter prediction of the slice using the normal merge mode may finish when part of the blocks are subjected to the processes. This also applies to processes in Steps Sh_1 to Sh_3. Inter prediction of the picture using the normal merge mode may finish when the processes are executed on part of the blocks in the picture.

In addition, information indicating the inter prediction mode (normal merge mode in the above example) used to generate the prediction image and included in the encoded signal is, for example, encoded as a prediction parameter in a stream.

Figure 41:
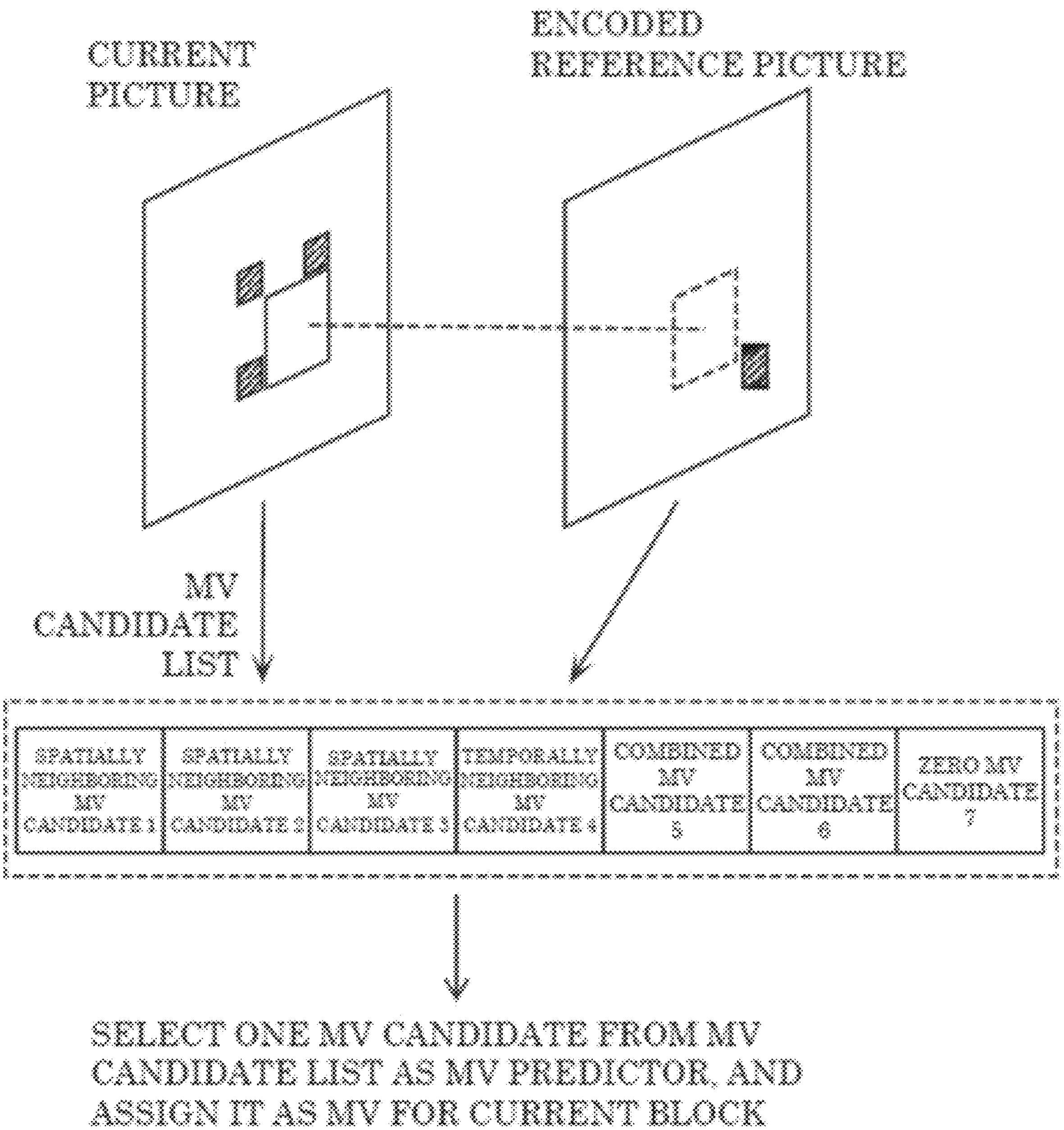
FIG. 41 is a conceptual diagram for illustrating one example of a motion vector derivation process in merge mode.

FIG. 41 is a conceptual diagram for illustrating one example of a motion vector derivation process of a current picture by a normal merge mode.

First, inter predictor 126 generates a MV candidate list in which MV candidates are registered. Examples of MV candidates include: spatially neighboring MV candidates which are MVs of a plurality of encoded blocks located spatially surrounding a current block; temporally neighboring MV candidates which are MVs of surrounding blocks on which the position of a current block in an encoded reference picture is projected; combined MV candidates which are MVs generated by combining the MV value of a spatially neighboring MV predictor and the MV value of a temporally neighboring MV predictor; and a zero MV candidate which is a MV having a zero value.

Next, inter predictor 126 selects one MV candidate from a plurality of MV candidates registered in a MV candidate list, and determines the MV candidate as the MV of the current block.

Furthermore, entropy encoder 110 writes and encodes, in a stream, merge_idx which is a signal indicating which MV candidate has been selected.

It is to be noted that the MV candidates registered in the MV candidate list described in FIG. 41 are examples. The number of MV candidates may be different from the number of MV candidates in the diagram, the MV candidate list may be configured in such a manner that some of the kinds of the MV candidates in the diagram may not be included, or that one or more MV candidates other than the kinds of MV candidates in the diagram are included.

A final MV may be determined by performing a dynamic motion vector refreshing (DMVR) to be described later using the MV of the current block derived by normal merge mode. It is to be noted that, in normal merge mode, motion information is encoded and no MV difference is encoded. In MMVD mode, one MV candidate is selected from a MV candidate list as in the case of normal merge mode, a MV difference is encoded. As illustrated in FIG. 38B, MMVD may be categorized into merge modes together with normal merge mode. It is to be noted that the MV difference in MMVD mode does not always need to be the same as the MV difference for use in inter mode. For example, MV difference derivation in MMVD mode may be a process that requires a smaller amount of processing than the amount of processing required for MV difference derivation in inter mode.

In addition, a combined inter merge/intra prediction (CIIP) mode may be performed. The mode is for overlapping a prediction image generated in inter prediction and a prediction image generated in intra prediction to generate a prediction image for a current block.

It is to be noted that the MV candidate list may be referred to as a candidate list. In addition, merge_idx is MV selection information.

(MV Derivation>HMVP Mode)

Figure 42:
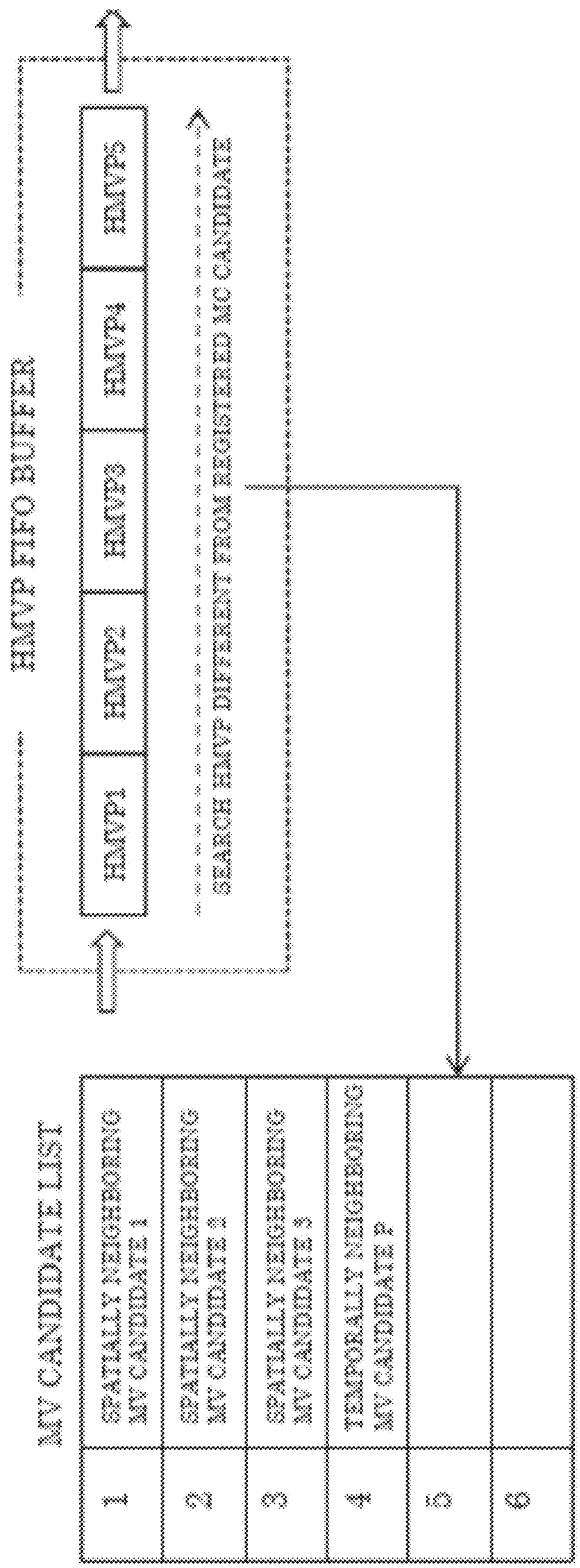
FIG. 42 is a conceptual diagram for illustrating one example of a MV derivation process for a current picture by HMVP merge mode.

FIG. 42 is a conceptual diagram for illustrating one example of a MV derivation process for a current picture using HMVP merge mode.

In normal merge mode, a MV for, for example, a CU which is a current block is determined by selecting one MV candidate from a MV list generated by referring to an encoded block (for example, a CU). Here, another MV candidate may be registered in the MV candidate list. The mode in which such another MV candidate is registered is referred to as HMVP mode.

In HMVP mode, MV candidates are managed using a first-in first-out (FIFO) server for HMVP, separately from the MV candidate list for normal merge mode.

In a FIFO buffer, motion information such as MVs of blocks processed in the past are stored newest first. In the management of the FIFO buffer, each time when one block is processed, the MV for the newest block (that is the CU processed immediately before) is stored in the FIFO buffer, and the MV of the oldest CU (that is, the CU processed earliest) is deleted from the FIFO buffer. In the example illustrated in FIG. 42, HMVP1 is the MV for the newest block, and HMVP5 is the MV for the oldest MV.

Inter predictor 126 then, for example, checks whether each MV managed in the FIFO buffer is a MV different from all the MV candidates which have been already registered in the MV candidate list for normal merge mode starting from HMVP1. When determining that the MV is different from all the MV candidates, inter predictor 126 may add the MV managed in the FIFO buffer in the MV candidate list for normal merge mode as a MV candidate. At this time, one or more of the MV candidates in the FIFO buffer may be registered (added to the MV candidate list).

By using the HMVP mode in this way, it is possible to add not only the MV of a block which neighbors the current block spatially or temporally but also a MV for a block processed in the past. As a result, the variation of MV candidates for normal merge mode is expanded, which increases the probability that coding efficiency can be increased.

It is to be noted that the MV may be motion information. In other words, information stored in the MV candidate list and the FIFO buffer may include not only MV values but also reference picture information, reference directions, the numbers of pictures, etc. In addition, the block may be, for example, a CU.

It is to be noted that the MV candidate list and the FIFO buffer illustrated in FIG. 42 are examples. The MV candidate list and FIFO buffer may be different in size from those in FIG. 42, or may be configured to register MV candidates in an order different from the one in FIG. 42. In addition, the process described here may be common between encoder 100 and decoder 200.

It is to be noted that the HMVP mode can be applied for modes other than the normal merge mode. For example, it is also possible that motion information such as MVs of blocks processed in affine mode in the past may be stored newest first, and may be used as MV candidates, which may facilitate better efficiency. The mode obtained by applying HMVP mode to affine mode may be referred to as history affine mode.

(MV Derivation>FRUC Mode)

Motion information may be derived at the decoder side without being signaled from the encoder side. For example, motion information may be derived by performing motion estimation at the decoder 200 side. In an embodiment, at the decoder side, motion estimation is performed without using any pixel value in a current block. Modes for performing motion estimation at the decoder 200 side without using any pixel value in a current block include a frame rate up-conversion (FRUC) mode, a pattern matched motion vector derivation (PMMVD) mode, etc.

Figure 43:
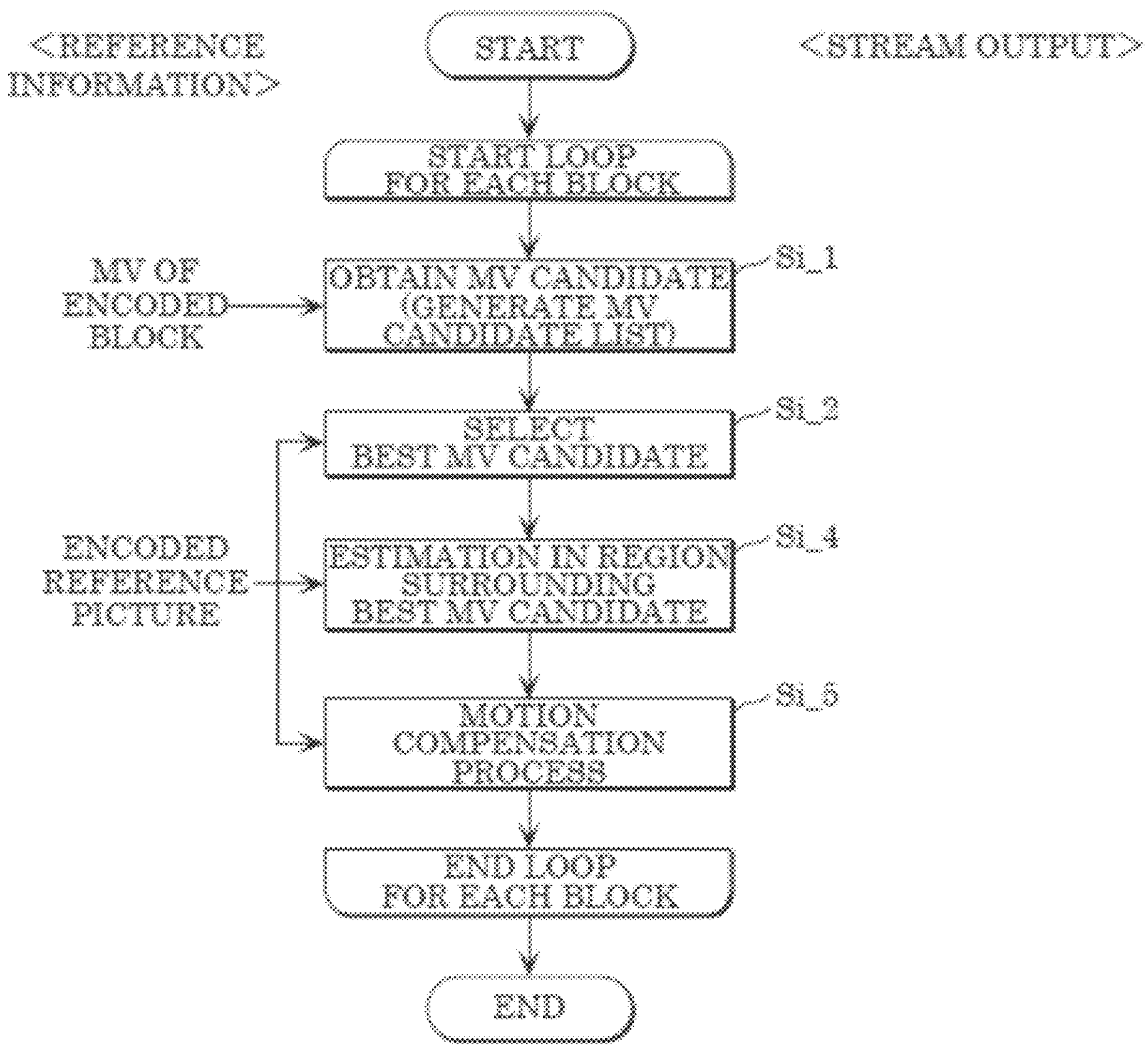
FIG. 43 is a flow chart illustrating one example of a frame rate up conversion (FRUC) process.

One example of a FRUC process in the form of a flow chart is illustrated in FIG. 43. First, a list which indicates, as MV candidates, MVs for encoded blocks each of which neighbors the current block spatially or temporally by referring to the MVs (the list may be a MV candidate list, and be also used as the MV candidate list for normal merge mode) (Step Si_1).

Next, a best MV candidate is selected from the plurality of MV candidates registered in the MV candidate list (Step Si_2). For example, the evaluation values of the respective MV candidates included in the MV candidate list are calculated, and one MV candidate is selected based on the evaluation values. Based on the selected motion vector candidates, a motion vector for the current block is then derived (Step Si_4). More specifically, for example, the selected motion vector candidate (best MV candidate) is derived directly as the motion vector for the current block. In addition, for example, the motion vector for the current block may be derived using pattern matching in a surrounding region of a position in a reference picture where the position in the reference picture corresponds to the selected motion vector candidate. In other words, estimation using the pattern matching and the evaluation values may be performed in the surrounding region of the best MV candidate, and when there is a MV that yields a better evaluation value, the best MV candidate may be updated to the MV that yields the better evaluation value, and the updated MV may be determined as the final MV for the current block. In some embodiments, updating of the motion vector which yields a better evaluation value may not be performed.

Lastly, inter predictor 126 generates a prediction image for the current block by performing motion compensation of the current block using the derived MV and the encoded reference picture (Step Si_5). The processes in Steps Si_1 to Si_5 are executed, for example, on each block. For example, when the processes in Steps Si_1 to Si_5 are executed on all the blocks in the slice, inter prediction of the slice using the FRUC mode finishes. For example, when the processes in Steps Si_1 to Si_5 are executed on all the blocks in the picture, inter prediction of the picture using the FRUC mode finishes. It is to be noted that not all the blocks included in the slice may be subjected to the processes in Steps Si_1 to Si_5, and inter prediction of the slice using the FRUC mode may finish when part of the blocks are subjected to the processes. When the processes in Steps Si_1 to Si_5 are executed on part of blocks included in a picture in a similar manner, inter prediction of the picture using the FRUC mode may finish.

A similar process may be performed in units of a sub-block.

Evaluation values may be calculated according to various kinds of methods. For example, a comparison is made between a reconstructed image in a region in a reference picture corresponding to a motion vector, and a reconstructed image in a determined region (the region may be, for example, a region in another reference picture or a region in a neighboring block of a current picture, as indicated below). The determined region may be predetermined.

The difference between the pixel values of the two reconstructed images may be used for an evaluation value of the motion vectors. It is to be noted that an evaluation value may be calculated using information other than the value of the difference.

Next, an example of pattern matching is described in detail. First, one MV candidate included in a MV candidate list (for example, a merge list) is selected as a start point of estimation by the pattern matching. For example, as the pattern matching, either a first pattern matching or a second pattern matching may be used. The first pattern matching and the second pattern matching may be referred to as bilateral matching and template matching, respectively.

(MV Derivation>FRUC>Bilateral Matching)

In the first pattern matching, pattern matching is performed between two blocks which are located along a motion trajectory of a current block and are included in two different reference pictures. Accordingly, in the first pattern matching, a region in another reference picture along the motion trajectory of the current block is used as a determined region for calculating the evaluation value of the above-described candidate. The determined region may be predetermined.

Figure 44:
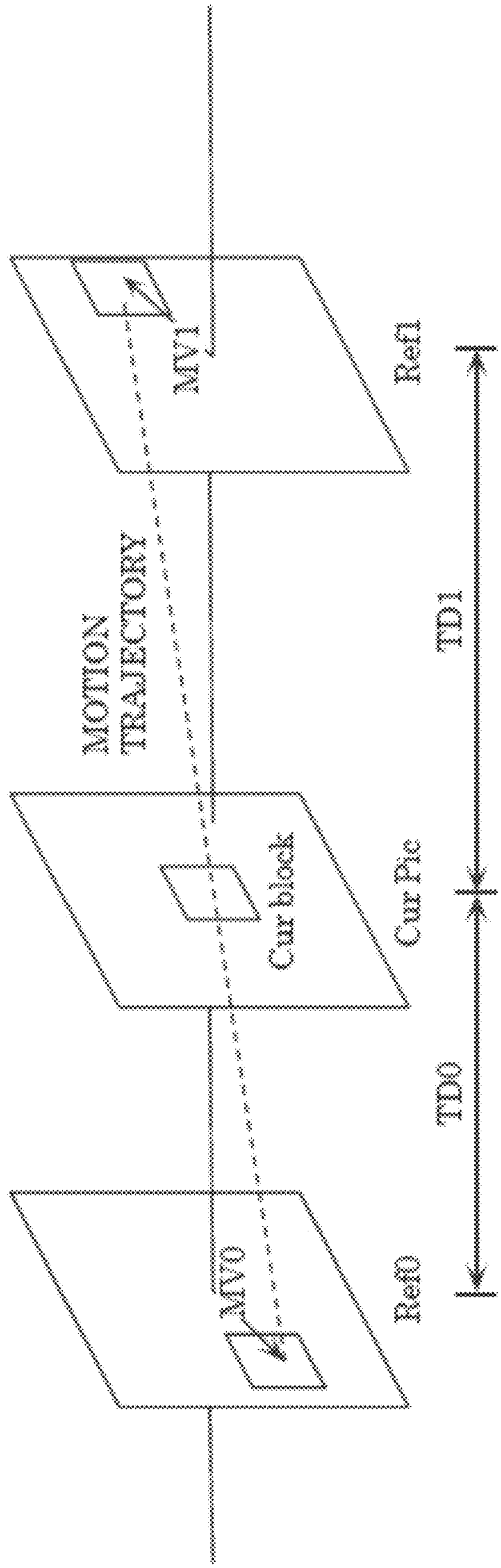
FIG. 44 is a conceptual diagram for illustrating one example of pattern matching (bilateral matching) between two blocks along a motion trajectory.

FIG. 44 is a conceptual diagram for illustrating one example of the first pattern matching (bilateral matching) between the two blocks in the two reference pictures along the motion trajectory. As illustrated in FIG. 44, in the first pattern matching, two motion vectors (MV0, MV1) are derived by estimating a pair which best matches among pairs in the two blocks included in the two different reference pictures (Ref0, Ref1) and located along the motion trajectory of the current block (Cur block). More specifically, a difference between the reconstructed image at a specified location in the first encoded reference picture (Ref0) specified by a MV candidate, and the reconstructed image at a specified location in the second encoded reference picture (Ref1) specified by a symmetrical MV obtained by scaling the MV candidate at a display time interval is derived for the current block, and an evaluation value is calculated using the value of the obtained difference. It is possible to select, as the final MV, the MV candidate which yields the best evaluation value among the plurality of MV candidates, and which is likely to produce good results.

In the assumption of a continuous motion trajectory, the motion vectors (MV0, MV1) specifying the two reference blocks are proportional to temporal distances (TD0, TD1) between the current picture (Cur Pic) and the two reference pictures (Ref0, Ref1). For example, when the current picture is temporally located between the two reference pictures and the temporal distances from the current picture to the respective two reference pictures are equal to each other, mirror-symmetrical bi-directional motion vectors are derived in the first pattern matching.

(MV Derivation>FRUC>Template Matching)

In the second pattern matching (template matching), pattern matching is performed between a block in a reference picture and a template in the current picture (the template is a block neighboring the current block in the current picture (the neighboring block is, for example, an upper and/or left neighboring block(s))). Accordingly, in the second pattern matching, the block neighboring the current block in the current picture is used as the determined region for calculating the evaluation value of the above-described MV candidate.

Figure 45:
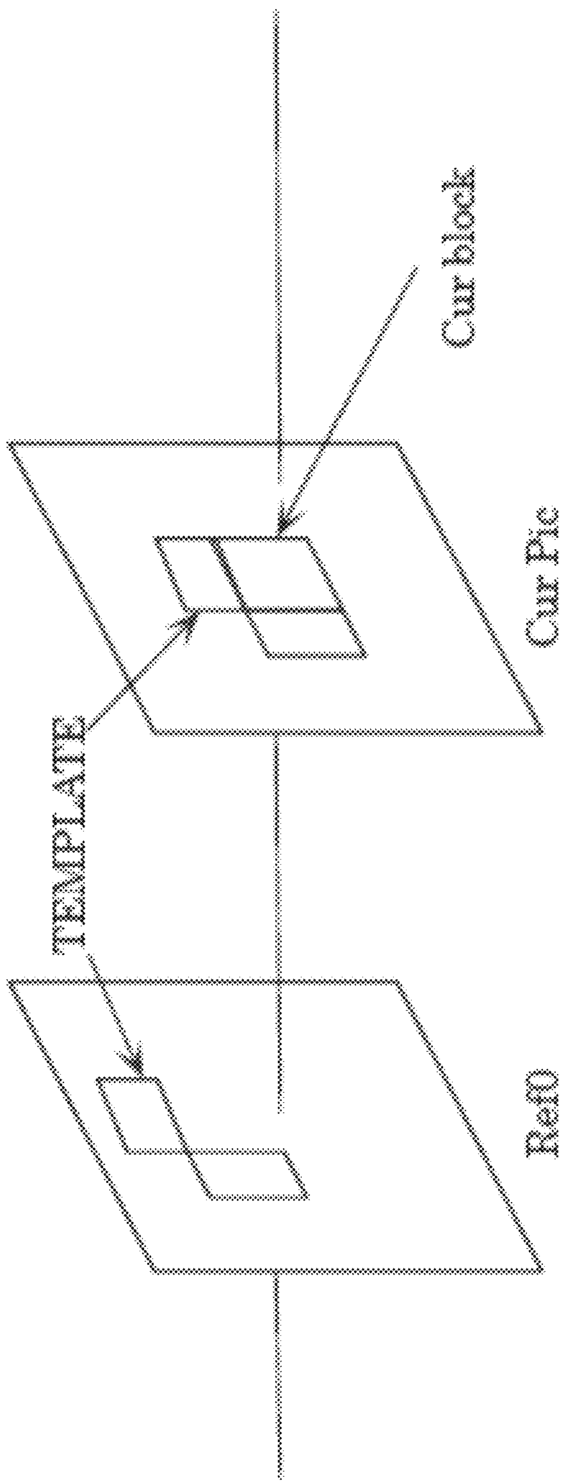
FIG. 45 is a conceptual diagram for illustrating one example of pattern matching (template matching) between a template in a current picture and a block in a reference picture.

FIG. 45 is a conceptual diagram for illustrating one example of pattern matching (template matching) between a template in a current picture and a block in a reference picture. As illustrated in FIG. 45, in the second pattern matching, the motion vector of the current block (Cur block) is derived by estimating, in the reference picture (Ref0), the block which best matches the block neighboring the current block in the current picture (Cur Pic). More specifically, the difference between a reconstructed image in an encoded region which neighbors both left and above or either left or above and a reconstructed image which is in a corresponding region in the encoded reference picture (Ref0) and is specified by a MV candidate is derived, and an evaluation value is calculated using the value of the obtained difference. The MV candidate which yields the best evaluation value among a plurality of MV candidates may be selected as the best MV candidate.

Such information indicating whether to apply the FRUC mode (referred to as, for example, a FRUC flag) may be signaled at the CU level. In addition, when the FRUC mode is applied (for example, when a FRUC flag is true), information indicating an applicable pattern matching method (e.g., the first pattern matching or the second pattern matching) may be signaled at the CU level. It is to be noted that the signaling of such information does not necessarily need to be performed at the CU level, and may be performed at another level (for example, at the sequence level, picture level, slice level, tile level, CTU level, or sub-block level).

(MV Derivation>Affine Mode)

The affine mode is a mode for generating a MV using affine transform. For example, a MV may be derived in units of a sub-block based on motion vectors of a plurality of neighboring blocks. This mode is also referred to as an affine motion compensation prediction mode.

Figure 46A:
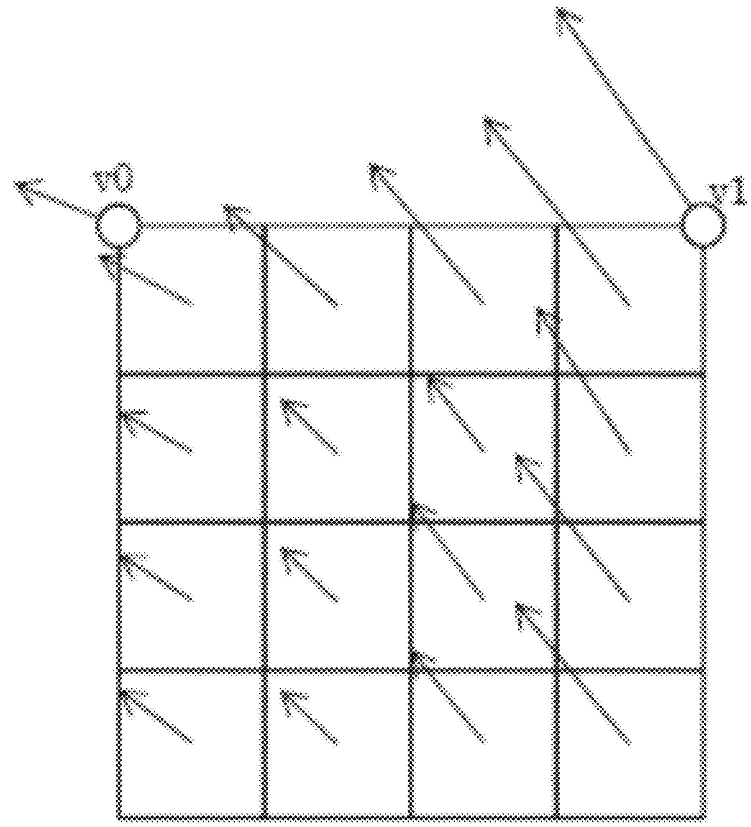
FIG. 46A is a conceptual diagram for illustrating one example of deriving a motion vector of each sub-block based on motion vectors of a plurality of neighboring blocks.

FIG. 46A is a conceptual diagram for illustrating one example of MV derivation in units of a sub-block based on motion vectors of a plurality of neighboring blocks. In FIG. 46A, the current block includes, for example, sixteen 4×4 sub-blocks. Here, motion vector $V_0$ at an upper-left corner control point in the current block is derived based on a motion vector of a neighboring block, and likewise, motion vector $V_1$ at an upper-right corner control point in the current block is derived based on a motion vector of a neighboring sub-block. Two motion vectors $v_0$ and $v_1$ may be projected according to an expression (1A) indicated below, and motion vectors ($v_x$, $v_y$) for the respective sub-blocks in the current block may be derived.

[Math. 1]

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x - \dfrac{(v_{1x} - v_{0x})}{w}y + v_{0y} \end{cases} \quad (1A)$$

Here, x and y indicate the horizontal position and the vertical position of the sub-block, respectively, and w indicates a determined weighting coefficient. The determined weighting coefficient may be predetermined.

Such information indicating the affine mode (for example, referred to as an affine flag) may be signaled at the CU level. It is to be noted that the signaling of the information indicating the affine mode does not necessarily need to be performed at the CU level, and may be performed at another level (for example, at the sequence level, picture level, slice level, tile level, CTU level, or sub-block level).

In addition, the affine mode may include several modes for different methods for deriving motion vectors at the upper-left and upper-right corner control points. For example, the affine mode include two modes which are the affine inter mode (also referred to as an affine normal inter mode) and the affine merge mode.

(MV Derivation>Affine Mode)

Figure 46B:
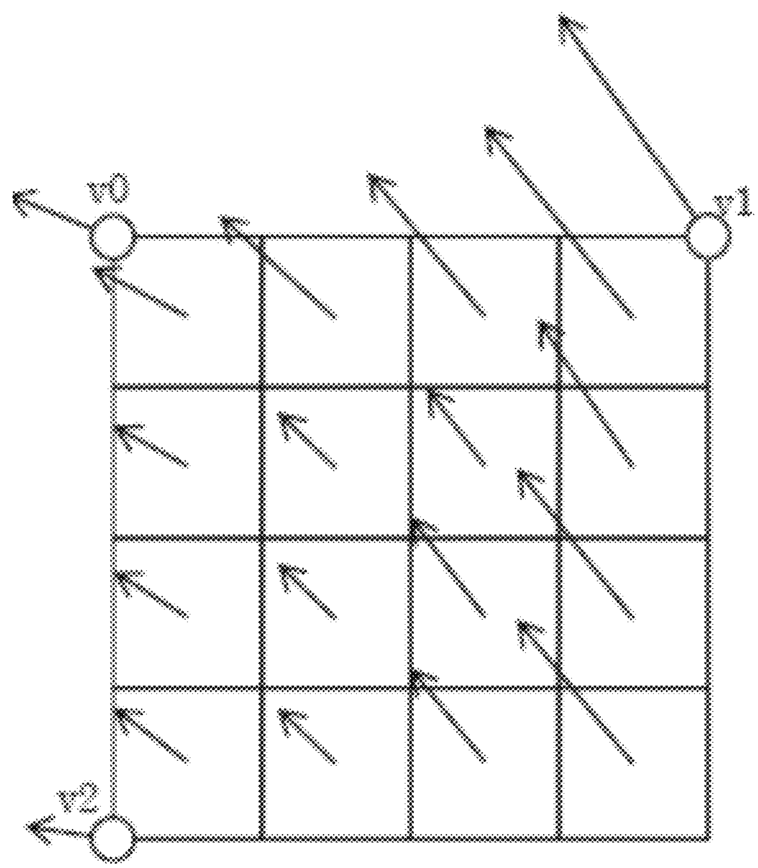
FIG. 46B is a conceptual diagram for illustrating one example of deriving a motion vector of each sub-block in affine mode in which three control points are used.

FIG. 46B is a conceptual diagram for illustrating one example of MV derivation in units of a sub-block in affine mode in which three control points are used. In FIG. 46B, the current block includes, for example, sixteen 4×4 blocks. Here, motion vector $V_0$ at the upper-left corner control point in the current block is derived based on a motion vector of a neighboring block. Here, motion vector $V_1$ at the upper-right corner control point in the current block is derived based on a motion vector of a neighboring block, and likewise motion vector $V_2$ at the lower-left corner control point for the current block is derived based on a motion vector of a neighboring block. Three motion vectors $v_0$, $v_1$, and $v_2$ may be projected according to an expression (1B) indicated below, and motion vectors ($v_x$, $v_y$) for the respective sub-blocks in the current block may be derived.

[Math. 2]

$$\begin{cases} v_x = \frac{(v_{1x} - v_{0x})}{w}x - \frac{(v_{2x} - v_{0y})}{h}y + v_{0x} \\ v_y = \frac{(v_{1y} - v_{0y})}{w}x - \frac{(v_{2y} - v_{0y})}{h}y + v_{0y} \end{cases} \quad (1B)$$

Here, x and y indicate the horizontal position and the vertical position of the sub-block, respectively, and w and h may be weighting coefficients, which may be predetermined weighting coefficients. In an embodiment, w may indicate the width of the current block, and h may indicate the height of the current block.

Affine modes in which different numbers of control points (for example, two and three control points) are used may be switched and signaled at the CU level. It is to be noted that information indicating the number of control points in affine mode used at the CU level may be signaled at another level (for example, the sequence level, picture level, slice level, tile level, CTU level, or sub-block level).

In addition, such an affine mode in which three control points are used may include different methods for deriving motion vectors at the upper-left, upper-right, and lower-left corner control points. For example, the affine modes in which three control points are used may include two modes which are the affine inter mode and the affine merge mode, as in the case of affine modes in which two control points are used.

It is to be noted that, in the affine modes, the size of each sub-block included in the current block may not be limited to 4×4 pixels, and may be another size. For example, the size of each sub-block may be 8×8 pixels.

(MV Derivation>Affine Mode>Control Point)

Figure 47A:
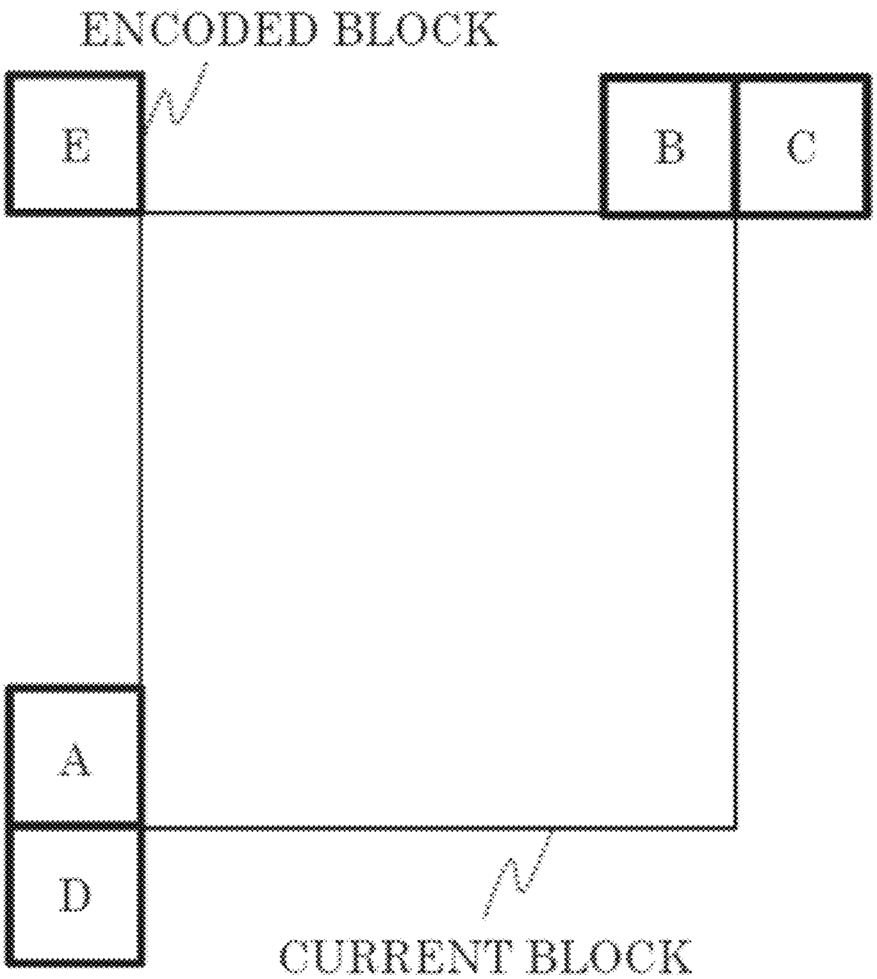
FIG. 47A is a conceptual diagram for illustrating an example MV derivation at control points in an affine mode.
Figure 47B:
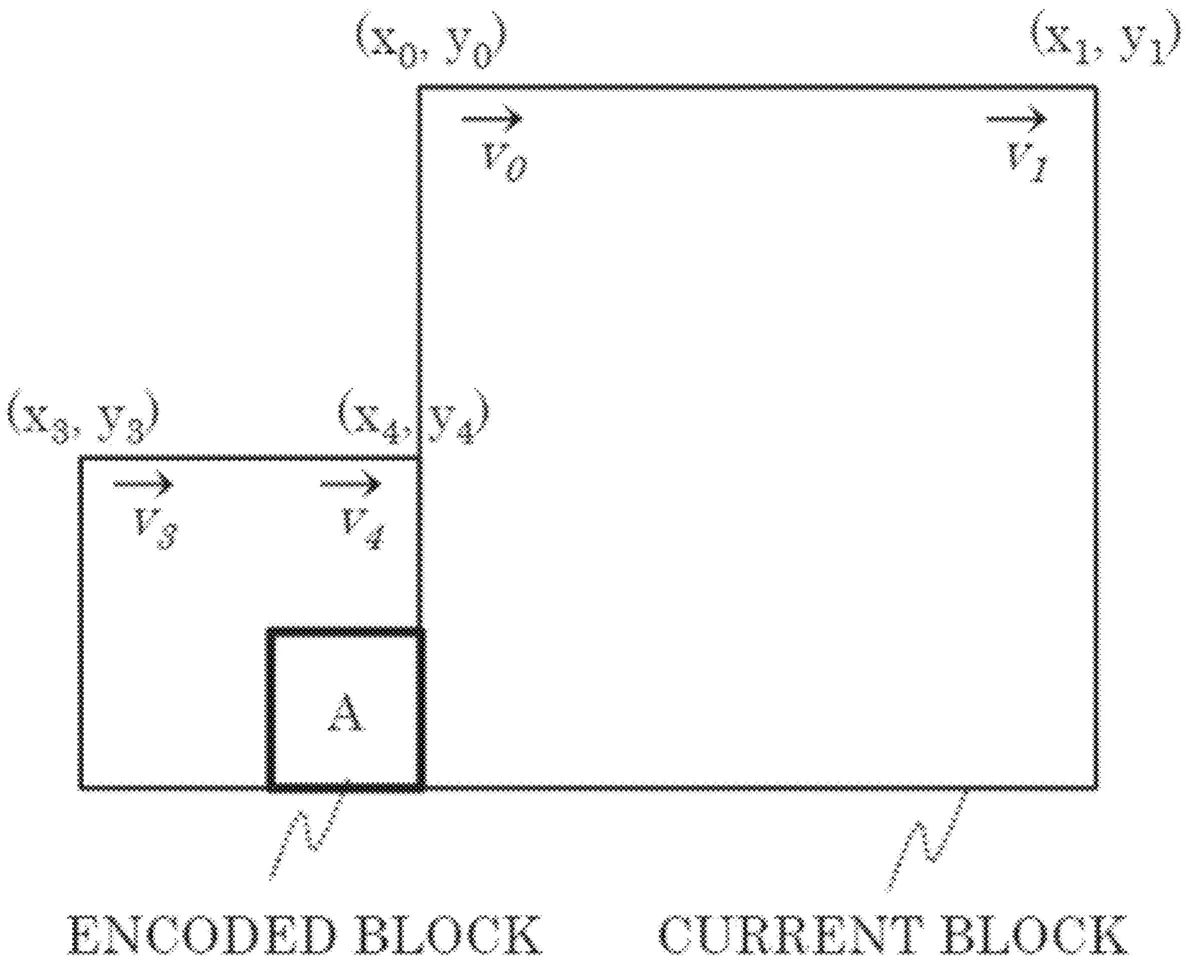
FIG. 47B is a conceptual diagram for illustrating an example MV derivation at control points in an affine mode.
Figure 47C:
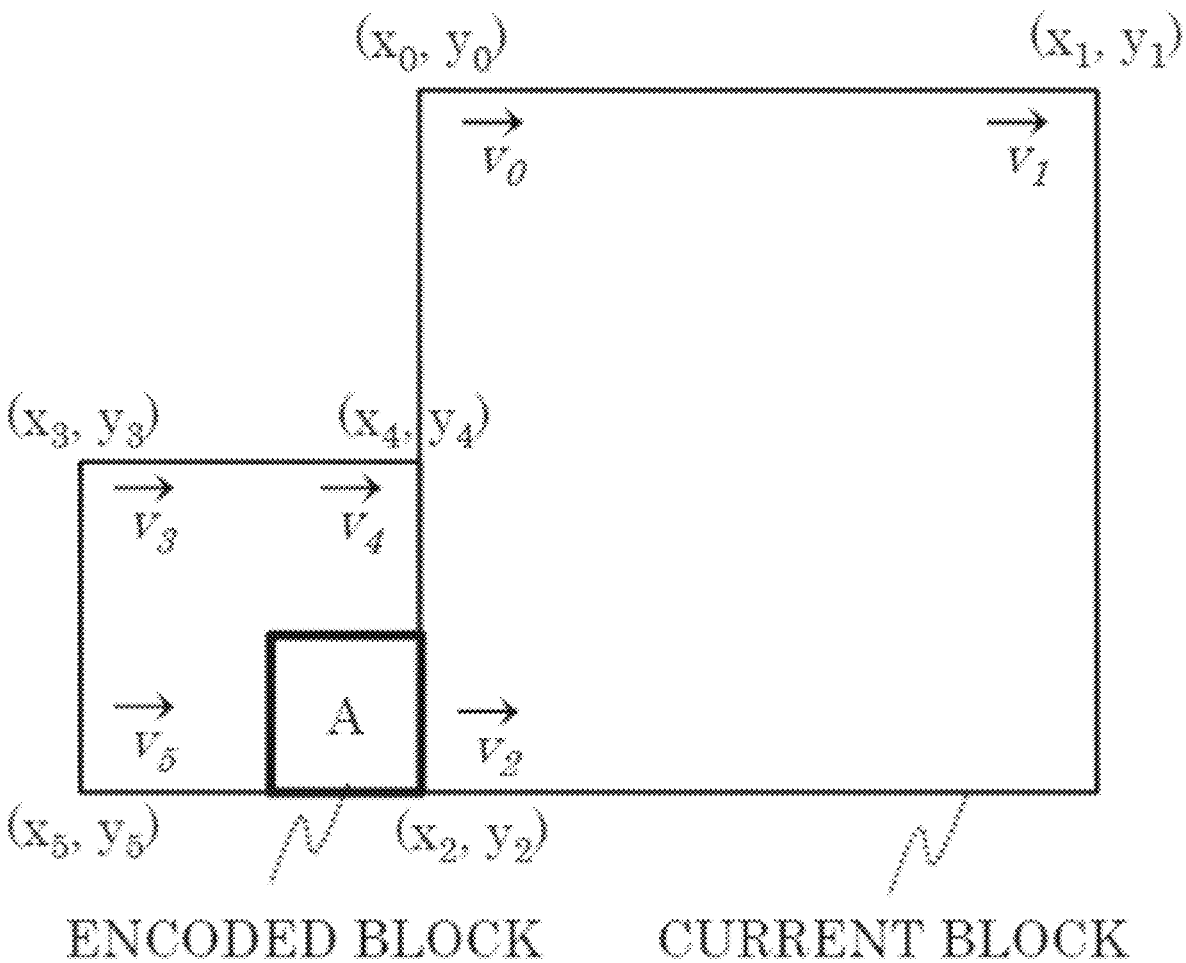
FIG. 47C is a conceptual diagram for illustrating an example MV derivation at control points in an affine mode.

FIG. 47A, FIG. 47B, and FIG. 47C are conceptual diagrams for illustrating examples of MV derivation at control points in an affine mode.

As illustrated in FIG. 47A, in the affine mode, for example, motion vector predictors at respective control points of a current block are calculated based on a plurality of motion vectors corresponding to blocks encoded according to the affine mode among encoded block A (left), block B (upper), block C (upper-right), block D (lower-left), and block E (upper-left) which neighbor the current block. More specifically, encoded block A (left), block B (upper), block C (upper-right), block D (lower-left), and block E (upper-left) are checked in the listed order, and the first effective block encoded according to the affine mode is identified. Motion vector predictors at the control points of the current block are calculated based on a plurality of motion vectors corresponding to the identified block.

For example, as illustrated in FIG. 47B, when block A which neighbors to the left of the current block has been encoded according to an affine mode in which two control points are used, motion vectors $v_3$ and $v_4$ projected at the upper-left corner position and the upper-right corner position of the encoded block including block A are derived. Motion vector $v_0$ at the upper-left corner control point of the current block and motion vector $v_1$ at the upper-right corner control point of the current block are then calculated from derived motion vectors $v_3$ and $v_4$.

For example, as illustrated in FIG. 47C, when block A which neighbors to the left of the current block has been encoded according to an affine mode in which three control points are used, motion vectors $v_3$, $v_4$, and $v_5$ projected at the upper-left corner position, the upper-right corner position, and the lower-left corner position of the encoded block including block A are derived. Motion vector $v_0$ at the upper-left corner control point of the current block, motion vector $v_1$ at the upper-right corner control point of the current block, and motion vector $v_2$ at the lower-left corner control point of the current block are then calculated from derived motion vectors $v_3$, $v_4$, and $v_5$.

The MV derivation methods illustrated in FIGS. 47A to 47C may be used in the MV derivation at each control point for the current block in Step Sk_1 illustrated in FIG. 50, or may be used for MV predictor derivation at each control point for the current block in Step Sj_1 illustrated in FIG. 51 described later.

Figure 48A:
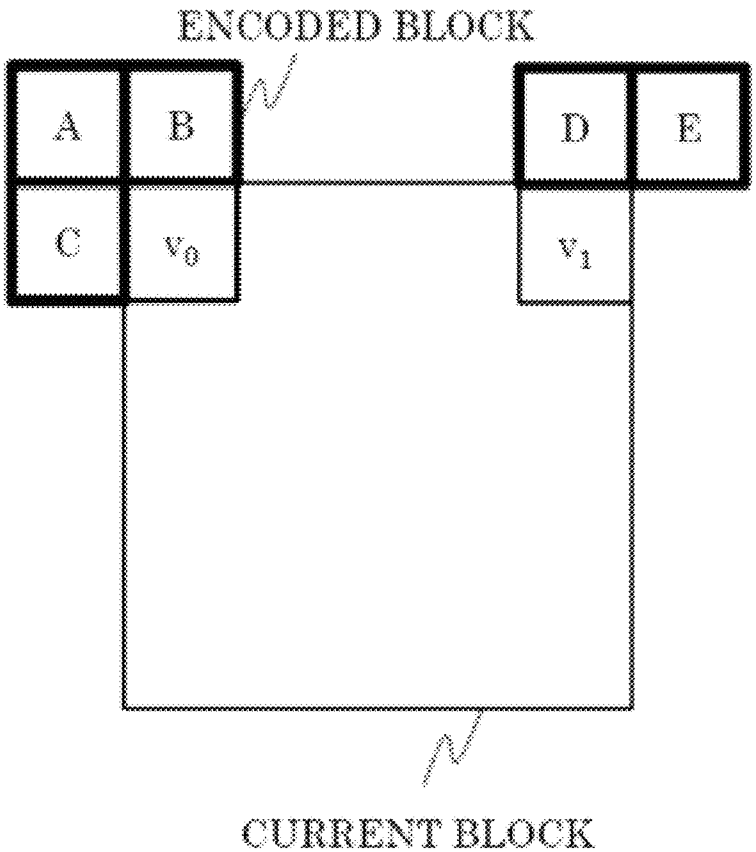
FIG. 48A is a conceptual diagram for illustrating an affine mode in which two control points are used.
Figure 48B:
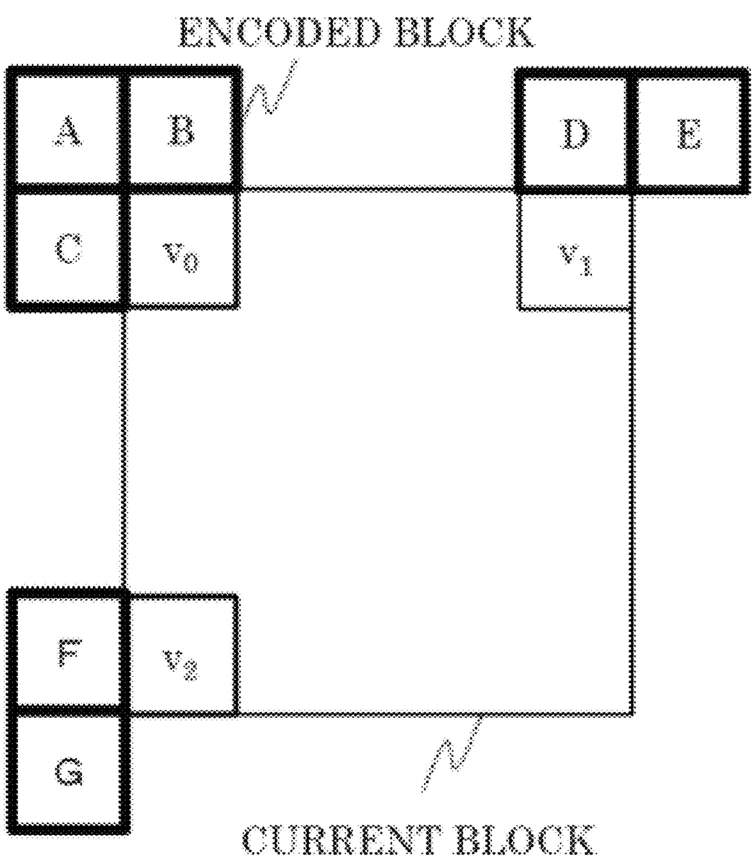
FIG. 48B is a conceptual diagram for illustrating an affine mode in which three control points are used.

FIGS. 48A and 48B are conceptual diagrams for illustrating examples of MV derivation at control points in affine mode.

FIG. 48A is a conceptual diagram for illustrating an example affine mode in which two control points are used.

In the affine mode, as illustrated in FIG. 48A, a MV selected from MVs at encoded block A, block B, and block C which neighbor the current block is used as motion vector $v_0$ at the upper-left corner control point for the current block. Likewise, a MV selected from MVs of encoded block D and block E which neighbor the current block is used as motion vector $v_1$ at the upper-right corner control point for the current block.

FIG. 48B is a conceptual diagram for illustrating an example affine mode in which three control points are used.

In the affine mode, as illustrated in FIG. 48B, a MV selected from MVs at encoded block A, block B, and block C which neighbor the current block is used as motion vector $v_0$ at the upper-left corner control point for the current block. Likewise, a MV selected from MVs of encoded block D and block E which neighbor the current block is used as motion vector $v_1$ at the upper-right corner control point for the current block. Furthermore, a MV selected from MVs of encoded block F and block G which neighbor the current block is used as motion vector $v_2$ at the lower-left corner control point for the current block.

It is to be noted that the MV derivation methods illustrated in FIGS. 48A and 48B may be used in the MV derivation at each control point for the current block in Step Sk_1 illustrated in FIG. 50 described later, or may be used for MV predictor derivation at each control point for the current block in Step Sj_1 illustrated in FIG. 51 described later.

Here, when affine modes in which different numbers of control points (for example, two and three control points) are used may be switched and signaled at the CU level, the number of control points for an encoded block and the number of control points for a current block may be different from each other.

Figure 49A:
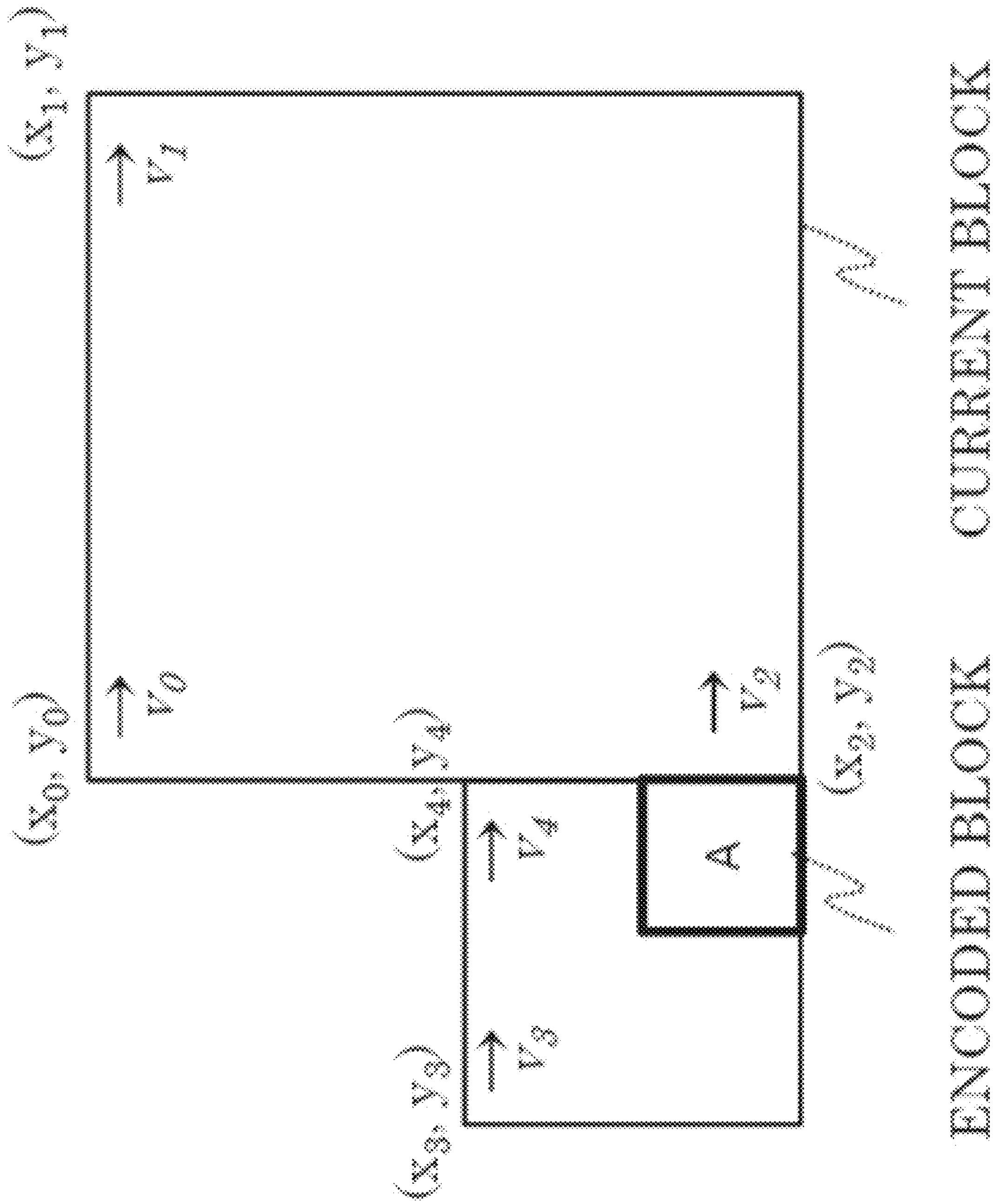
FIG. 49A is a conceptual diagram for illustrating one example of a method for MV derivation at control points when the number of control points for an encoded block and the number of control points for a current block are different from each other.
Figure 49B:
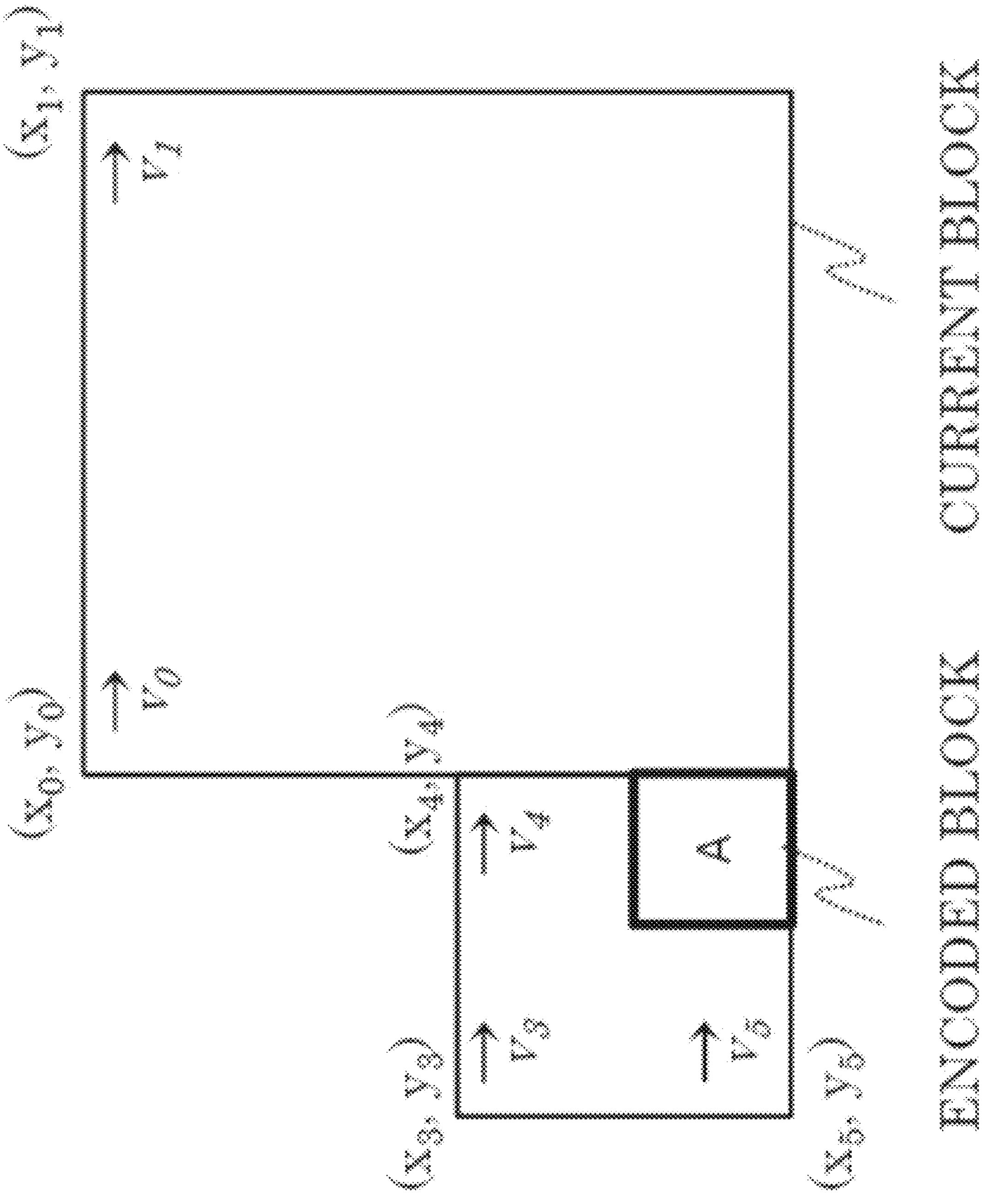
FIG. 49B is a conceptual diagram for illustrating another example of a method for MV derivation at control points when the number of control points for an encoded block and the number of control points for a current block are different from each other.

FIGS. 49A and 49B are conceptual diagrams for illustrating examples of a method for MV derivation at control points when the number of control points for an encoded block and the number of control points for a current block are different from each other.

For example, as illustrated in FIG. 49A, a current block has three control points at the upper-left corner, the upper-right corner, and the lower-left corner, and block A which neighbors to the left of the current block has been encoded according to an affine mode in which two control points are used. In this case, motion vectors $v_3$ and $v_4$ projected at the upper-left corner position and the upper-right corner position in the encoded block including block A are derived. Motion vector $v_0$ at the upper-left corner control point and motion vector $v_1$ at the upper-right corner control point for the current block are then calculated from derived motion vectors $v_3$ and $v_4$. Furthermore, motion vector $v_2$ at the lower-left corner control point is calculated from derived motion vectors $v_0$ and $v_1$.

For example, as illustrated in FIG. 49B, a current block has two control points at the upper-left corner and the upper-right corner, and block A which neighbors to the left of the current block has been encoded according to an affine mode in which three control points are used. In this case, motion vectors $v_3$, $v_4$, and $v_5$ projected at the upper-left corner position in the encoded block including block A, the upper-right corner position in the encoded block, and the lower-left corner position in the encoded block are derived. Motion vector $v_0$ at the upper-left corner control point for the current block and motion vector $v_1$ at the upper-right corner control point for the current block are then calculated from derived motion vectors $v_3$, $v_4$, and $v_5$.

It is to be noted that the MV derivation methods illustrated in FIGS. 49A and 49B may be used in the MV derivation at each control point for the current block in Step Sk_1 illustrated in FIG. 50 described later, or may be used for MV predictor derivation at each control point for the current block in Step Sj_1 illustrated in FIG. 51 described later.

(MV Derivation>Affine Mode>Affine Merge Mode)

Figure 50:
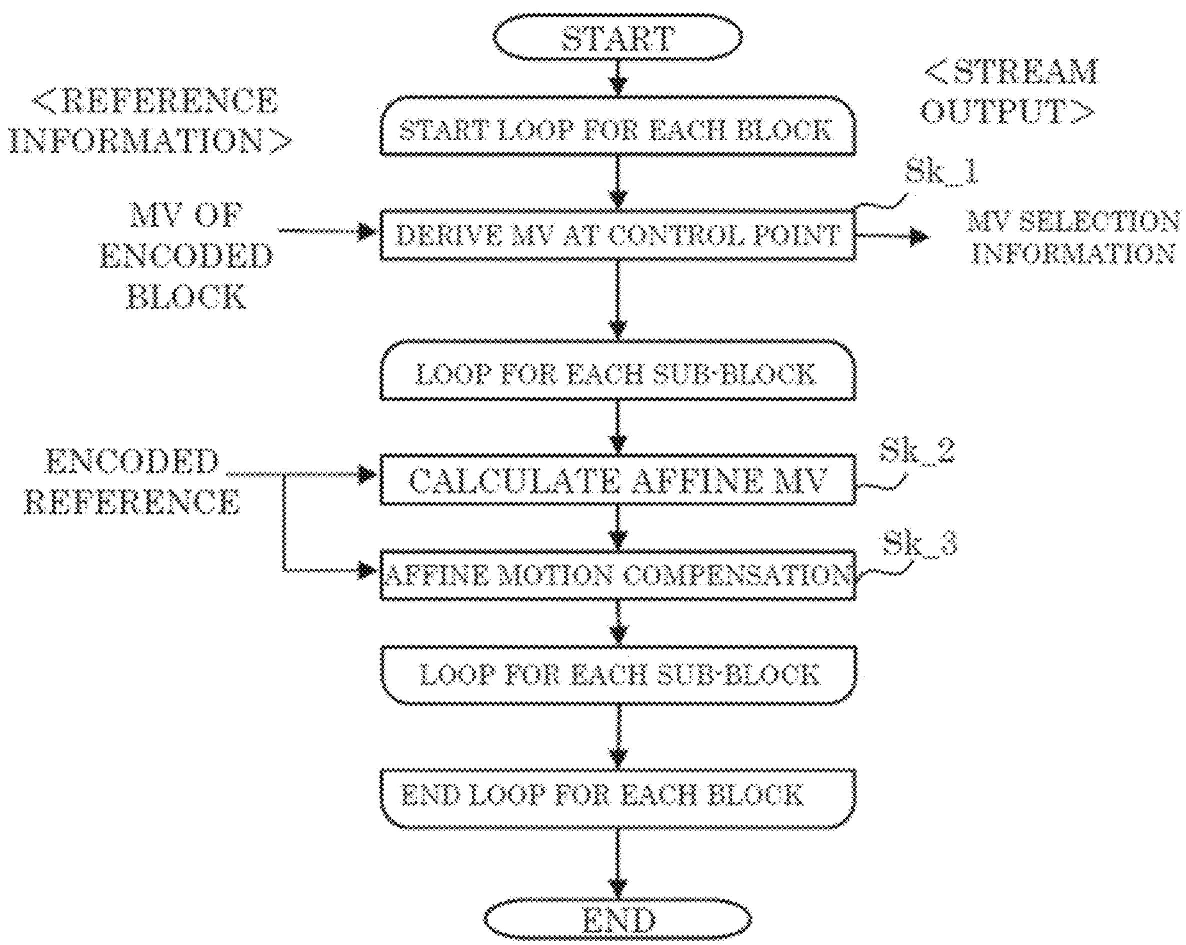
FIG. 50 is a flow chart illustrating one example of a process in affine merge mode.

FIG. 50 is a flow chart illustrating one example of a process in the affine merge mode.

In affine merge mode as illustrated, first, inter predictor 126 derives MVs at respective control points for a current block (Step Sk_1). The control points are an upper-left corner point of the current block and an upper-right corner point of the current block as illustrated in FIG. 46A, or an upper-left corner point of the current block, an upper-right corner point of the current block, and a lower-left corner point of the current block as illustrated in FIG. 46B. Inter predictor 126 may encode MV selection information for identifying two or three derived MVs in a stream.

For example, when MV derivation methods illustrated in FIGS. 47A to 47C are used, as illustrated in FIG. 47A, inter predictor 126 checks encoded block A (left), block B (upper), block C (upper-right), block D (lower-left), and block E (upper-left) in the listed order, and identifies the first effective block encoded according to the affine mode.

Inter predictor 126 derives the MV at the control point using the identified first effective block encoded according to the identified affine mode. For example, when block A is identified and block A has two control points, as illustrated in FIG. 47B, inter predictor 126 calculates motion vector $v_0$ at the upper-left corner control point of the current block and motion vector $v_1$ at the upper-right corner control point of the current block from motion vectors $v_3$ and $v_4$ at the upper-left corner of the encoded block including block A and the upper-right corner of the encoded block. For example, inter predictor 126 calculates motion vector $v_0$ at the upper-left corner control point of the current block and motion vector $v_1$ at the upper-right corner control point of the current block by projecting motion vectors $v_3$ and $v_4$ at the upper-left corner and the upper-right corner of the encoded block onto the current block.

Alternatively, when block A is identified and block A has three control points, as illustrated in FIG. 47C, inter predictor 126 calculates motion vector $v_0$ at the upper-left corner control point of the current block, motion vector $v_1$ at the upper-right corner control point of the current block, and motion vector $v_2$ at the lower-left corner control point of the current block from motion vectors $v_3$, $v_4$, and $v_5$ at the upper-left corner of the encoded block including block A, the upper-right corner of the encoded block, and the lower-left corner of the encoded block. For example, inter predictor 126 calculates motion vector $v_0$ at the upper-left corner control point of the current block, motion vector $v_1$ at the upper-right corner control point of the current block, and motion vector $v_2$ at the lower-left corner control point of the current block by projecting motion vectors $v_3$, $v_4$, and $v_5$ at the upper-left corner, the upper-right corner, and the lower-left corner of the encoded block onto the current block.

It is to be noted that, as illustrated in FIG. 49A described above, MVs at three control points may be calculated when block A is identified and block A has two control points, and that, as illustrated in FIG. 49B described above, MVs at two control points may be calculated when block A is identified and block A has three control points.

Next, inter predictor 126 performs motion compensation of each of a plurality of sub-blocks included in the current block. In other words, inter predictor 126 calculates a MV for each of a plurality of sub-blocks as an affine MV, for example using two motion vectors $v_0$ and $v_1$ and the above expression (1A) or three motion vectors $v_0$, $v_1$, and $v_2$ and the above expression (1B) (Step Sk_2). Inter predictor 126 then performs motion compensation of the sub-blocks using these affine MVs and encoded reference pictures (Step Sk_3). When the processes in Steps Sk_2 and Sk_3 are executed for each of all the sub-blocks included in the current block, the process for generating a prediction image using the affine merge mode for the current block finishes. In other words, motion compensation of the current block is performed to generate a prediction image of the current block.

It is to be noted that the above-described MV candidate list may be generated in Step Sk_1. The MV candidate list may be, for example, a list including MV candidates derived using a plurality of MV derivation methods for each control point. The plurality of MV derivation methods may be, for example, any combination of the MV derivation methods illustrated in FIGS. 47A to 47C, the MV derivation methods illustrated in FIGS. 48A and 48B, the MV derivation methods illustrated in FIGS. 49A and 49B, and other MV derivation methods.

It is to be noted that MV candidate lists may include MV candidates in a mode in which prediction is performed in units of a sub-block, other than the affine mode.

It is to be noted that, for example, a MV candidate list including MV candidates in an affine merge mode in which two control points are used and an affine merge mode in which three control points are used may be generated as a MV candidate list. Alternatively, a MV candidate list including MV candidates in the affine merge mode in which two control points are used and a MV candidate list including MV candidates in the affine merge mode in which three control points are used may be generated separately. Alternatively, a MV candidate list including MV candidates in one of the affine merge mode in which two control points are used and the affine merge mode in which three control points are used may be generated. The MV candidate(s) may be, for example, MVs for encoded block A (left), block B (upper), block C (upper-right), block D (lower-left), and block E (upper-left), or a MV for an effective block among the blocks.

It is to be noted that index indicating one of the MVs in a MV candidate list may be transmitted as MV selection information.

(MV Derivation>Affine Mode>Affine Inter Mode)

Figure 51:
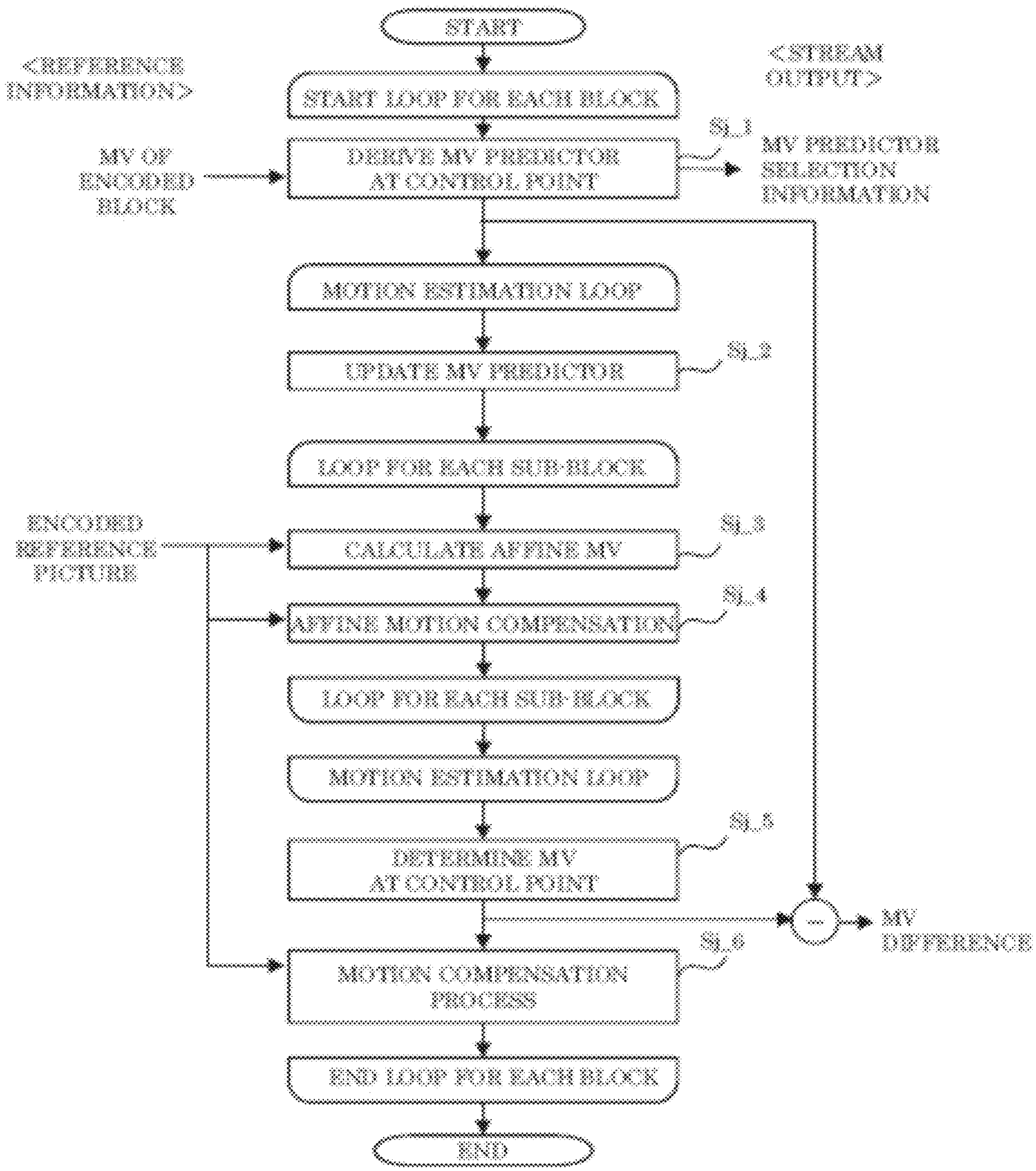
FIG. 51 is a flow chart illustrating one example of a process in affine inter mode.

FIG. 51 is a flow chart illustrating one example of a process in an affine inter mode.

In the affine inter mode, first, inter predictor 126 derives MV predictors ($v_0$, $v_1$) or ($v_0$, $v_1$, $v_2$) of respective two or three control points for a current block (Step Sj_1). The control points may be, for example, an upper-left corner point for the current block, an upper-right corner point of the current block, and an upper-right corner point for the current block as illustrated in FIG. 46A or FIG. 46B.

For example, when the MV derivation methods illustrated in FIGS. 48A and 48B are used, inter predictor 126 derives the MV predictors ($v_0$, $v_1$) or ($v_0$, $v_1$, $v_2$) at respective two or three control points for the current block by selecting MVs of any of the blocks among encoded blocks in the vicinity of the respective control points for the current block illustrated in FIG. 48A or FIG. 48B. At this time, inter predictor 126 encodes, in a stream, MV predictor selection information for identifying the selected two or three MV predictors.

For example, inter predictor 126 may determine, using a cost evaluation or the like, the block from which a MV as a MV predictor at a control point is selected from among encoded blocks neighboring the current block, and may write, in a bitstream, a flag indicating which MV predictor has been selected. In other words, inter predictor 126 outputs, as a prediction parameter, the MV predictor selection information such as a flag to entropy encoder 110 through prediction parameter generator 130.

Next, inter predictor 126 performs motion estimation (Step Sj_3 and Sj_4) while updating the MV predictor selected or derived in Step Sj_1 (Step Sj_2). In other words, inter predictor 126 calculates, as an affine MV, a MV of each of sub-blocks which corresponds to an updated MV predictor, using the expression (1A) or expression (1B) described above (Step Sj_3). Inter predictor 126 then performs motion compensation of the sub-blocks using these affine MVs and encoded reference pictures (Step Sj_4). The processes in Step Sj_3 and Sj_4 are executed on all the blocks in the current block when a MV predictor is updated in Step Sj_2. As a result, for example, inter predictor 126 determines the MV predictor which yields the smallest cost as the MV at a control point in a motion estimation loop (Step Sj_5). At this time, inter predictor 126 further encodes, in the stream, the difference value between the determined MV and the MV predictor as a MV difference. In other words, inter predictor 126 outputs the MV difference as a prediction parameter to entropy encoder 110 through prediction parameter generator 130.

Lastly, inter predictor 126 generates a prediction image for the current block by performing motion compensation of the current block using the determined MV and the encoded reference picture (Step Sj_6).

It is to be noted that the above-described MV candidate list may be generated in Step Sj_1. The MV candidate list may be, for example, a list including MV candidates derived using a plurality of MV derivation methods for each control point. The plurality of MV derivation methods may be, for example, any combination of the MV derivation methods illustrated in FIGS. 47A to 47C, the MV derivation methods illustrated in FIGS. 48A and 48B, the MV derivation methods illustrated in FIGS. 49A and 49B, and other MV derivation methods.

It is to be noted that MV candidate lists may include MV candidates in a mode in which prediction is performed in units of a sub-block, other than the affine mode.

It is to be noted that, for example, a MV candidate list including MV candidates in an affine inter mode in which two control points are used and an affine inter mode in which three control points are used may be generated as a MV candidate list. Alternatively, a MV candidate list including MV candidates in the affine inter mode in which two control points are used and a MV candidate list including MV candidates in the affine inter mode in which three control points are used may be generated separately. Alternatively, a MV candidate list including MV candidates in one of the affine inter mode in which two control points are used and the affine inter mode in which three control points are used may be generated. The MV candidate(s) may be, for example, MVs for encoded block A (left), block B (upper), block C (upper-right), block D (lower-left), and block E (upper-left), or a MV for an effective block among the blocks.

It is to be noted that index indicating one of the MV candidates in a MV candidate list may be transmitted as MV predictor selection information.

(MV Derivation>Triangle Mode)

Inter predictor 126 generates one rectangular prediction image for a current rectangular block in the above example. However, inter predictor 126 may generate a plurality of prediction images each having a shape different from a rectangle for the current rectangular block, and may combine the plurality of prediction images to generate the final rectangular prediction image. The shape different from a rectangle may be, for example, a triangle.

Figure 52A:
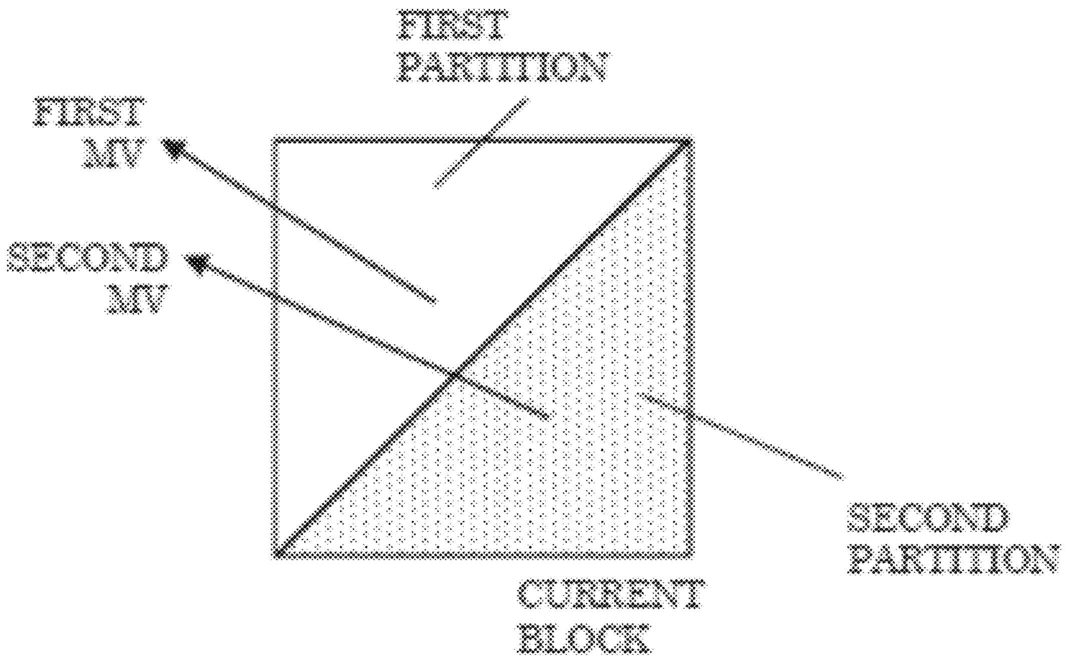
FIG. 52A is a conceptual diagram for illustrating generation of two triangular prediction images.

FIG. 52A is a conceptual diagram for illustrating generation of two triangular prediction images.

Inter predictor 126 generates a triangular prediction image by performing motion compensation of a first partition having a triangular shape in a current block by using a first MV of the first partition, to generate a triangular prediction image. Likewise, inter predictor 126 generates a triangular prediction image by performing motion compensation of a second partition having a triangular shape in a current block by using a second MV of the second partition, to generate a triangular prediction image. Inter predictor 126 then generates a prediction image having the same rectangular shape as the rectangular shape of the current block by combining these prediction images.

It is to be noted that a first prediction image having a rectangular shape corresponding to a current block may be generated as a prediction image for a first partition, using a first MV. In addition, a second prediction image having a rectangular shape corresponding to a current block may be generated as a prediction image for a second partition, using a second MV. A prediction image for the current block may be generated by performing a weighted addition of the first prediction image and the second prediction image. It is to be noted that the part which is subjected to the weighted addition may be a partial region across the boundary between the first partition and the second partition.

Figure 52B:
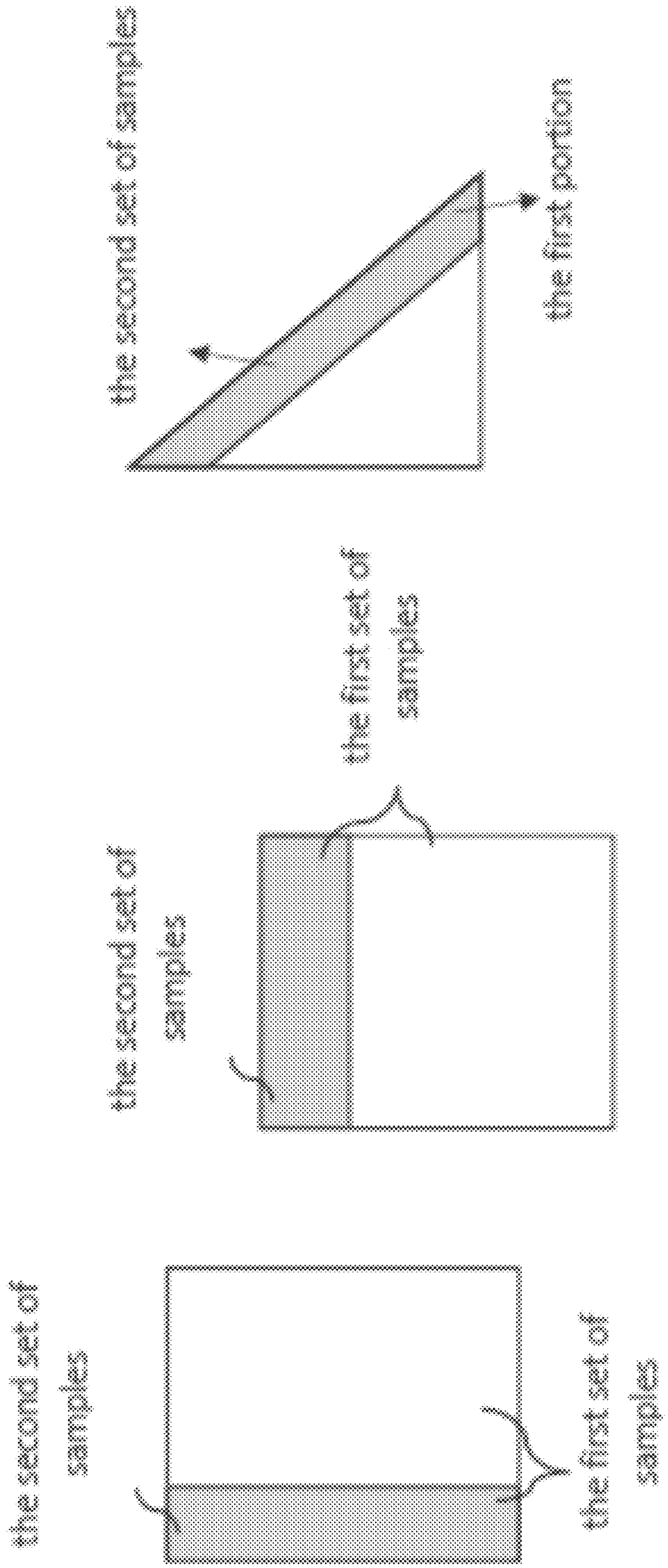
FIG. 52B is a conceptual diagram for illustrating examples of a first portion of a first partition which overlaps with a second partition, and first and second sets of samples which may be weighted as part of a correction process.

FIG. 52B is a conceptual diagram for illustrating examples of a first portion of a first partition which overlaps with a second partition, and first and second sets of samples which may be weighted as part of a correction process. The first portion may be, for example, one quarter of the width or height of the first partition. In another example, the first portion may have a width corresponding to N samples adjacent to an edge of the first partition, where N is an integer greater than zero, for example, N may be the integer 2. As illustrated, the left example of FIG. 52B shows a rectangular partition having a rectangular portion with a width which is one fourth of the width of the first partition, with the first set of samples including samples outside of the first portion and samples inside of the first portion, and the second set of samples including samples within the first portion. The center example of FIG. 52B shows a rectangular partition having a rectangular portion with a height which is one fourth of the height of the first partition, with the first set of samples including samples outside of the first portion and samples inside of the first portion, and the second set of samples including samples within the first portion. The right example of FIG. 52B shows a triangular partition having a polygonal portion with a height which corresponds to two samples, with the first set of samples including samples outside of the first portion and samples inside of the first portion, and the second set of samples including samples within the first portion.

Figure 52C:
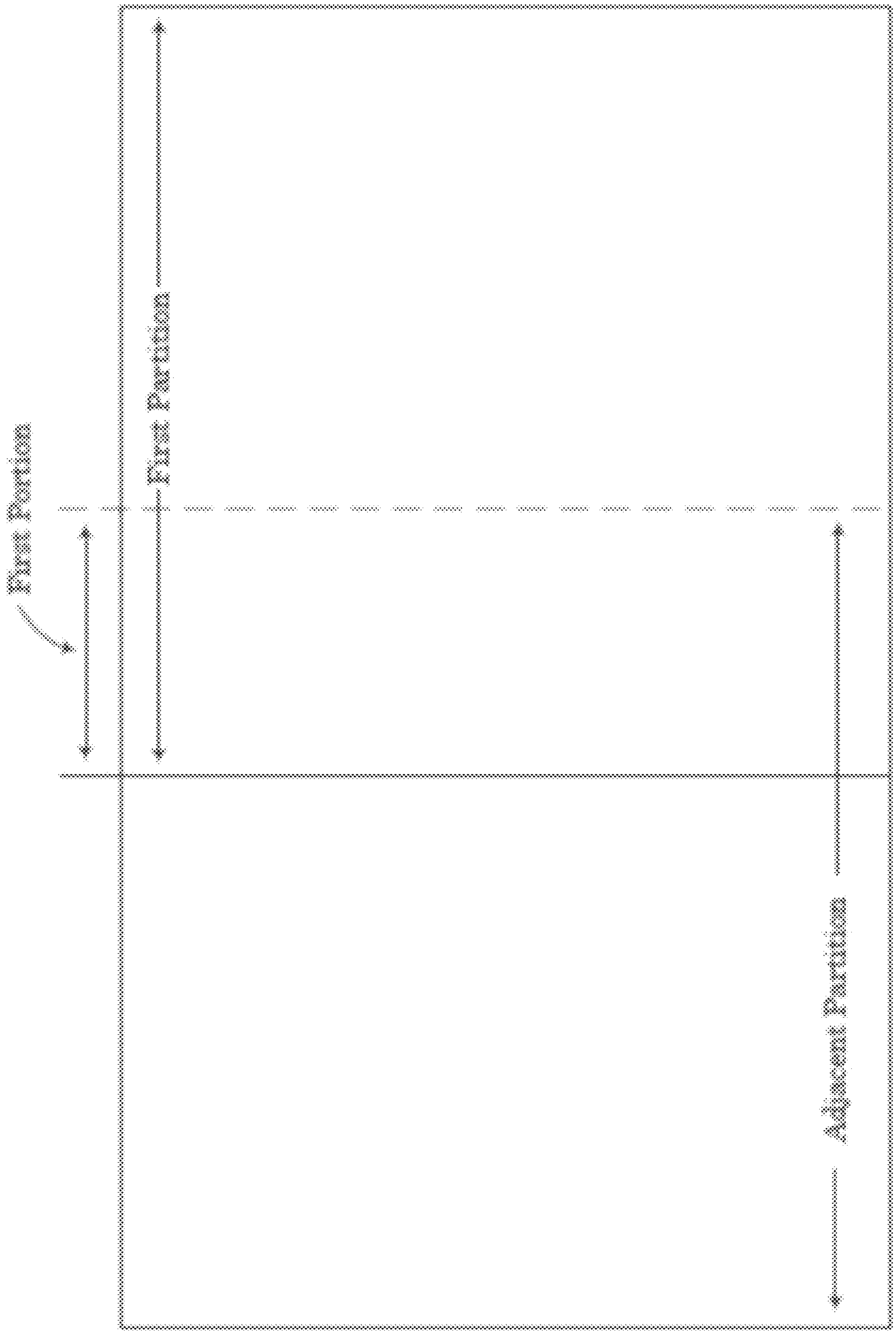
FIG. 52C is a conceptual diagram for illustrating a first portion of a first partition, which is a portion of the first partition that overlaps with a portion of an adjacent partition.

The first portion may be a portion of the first partition which overlaps with an adjacent partition. FIG. 52C is a conceptual diagram for illustrating a first portion of a first partition, which is a portion of the first partition that overlaps with a portion of an adjacent partition. For ease of illustration, a rectangular partition having an overlapping portion with a spatially adjacent rectangular partition is shown. Partitions having other shapes, such as triangular partitions, may be employed, and the overlapping portions may overlap with a spatially or temporally adjacent partition.

In addition, although an example is given in which a prediction image is generated for each of two partitions using inter prediction, a prediction image may be generated for at least one partition using intra prediction.

Figure 53:
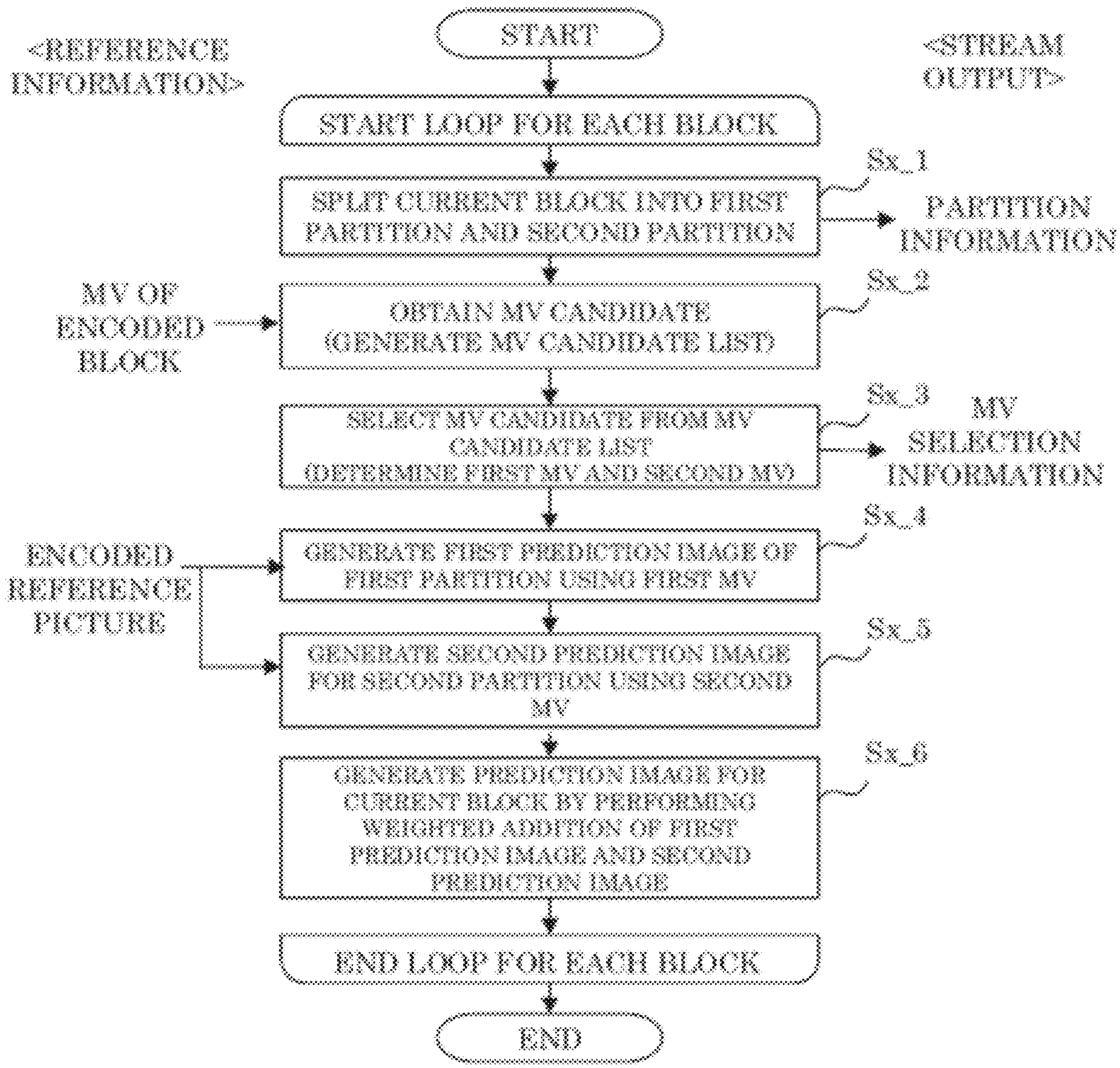
FIG. 53 is a flow chart illustrating one example of a process in a triangle mode.

FIG. 53 is a flow chart illustrating one example of a process in a triangle mode.

In the triangle mode, first, inter predictor 126 splits the current block into the first partition and the second partition (Step Sx_1). At this time, inter predictor 126 may encode, in a stream, partition information which is information related to the splitting into the partitions as a prediction parameter. In other words, inter predictor 126 may output the partition information as the prediction parameter to entropy encoder 110 through prediction parameter generator 130.

First, inter predictor 126 obtains a plurality of MV candidates for a current block based on information such as MVs of a plurality of encoded blocks temporally or spatially surrounding the current block (Step Sx_2). In other words, inter predictor 126 generates a MV candidate list.

Inter predictor 126 then selects the MV candidate for the first partition and the MV candidate for the second partition as a first MV and a second MV, respectively, from the plurality of MV candidates obtained in Step Sx_1 (Step Sx_3). At this time, inter predictor 126 encodes, in a stream, MV selection information for identifying the selected MV candidate as a prediction parameter. In other words, inter predictor 126 outputs the MV selection information as a prediction parameter to entropy encoder 110 through prediction parameter generator 130.

Next, inter predictor 126 generates a first prediction image by performing motion compensation using the selected first MV and an encoded reference picture (Step Sx_4). Likewise, inter predictor 126 generates a second prediction image by performing motion compensation using the selected second MV and an encoded reference picture (Step Sx_5).

Lastly, inter predictor 126 generates a prediction image for the current block by performing a weighted addition of the first prediction image and the second prediction image (Step Sx_6).

It is to be noted that, although the first partition and the second partition are triangles in the example illustrated in FIG. 52A, the first partition and the second partition may be trapezoids, or other shapes different from each other. Furthermore, although the current block includes two partitions in the examples illustrated in FIGS. 52A and 52C, the current block may include three or more partitions.

In addition, the first partition and the second partition may overlap with each other. In other words, the first partition and the second partition may include the same pixel region. In this case, a prediction image for a current block may be generated using a prediction image in the first partition and a prediction image in the second partition.

In addition, although the example in which the prediction image is generated for each of the two partitions using inter prediction has been illustrated, a prediction image may be generated for at least one partition using intra prediction.

It is to be noted that the MV candidate list for selecting the first MV and the MV candidate list for selecting the second MV may be different from each other, or the MV candidate list for selecting the first MV may be also used as the MV candidate list for selecting the second MV.

It is to be noted that partition information may include an index indicating the splitting direction in which at least a current block is split into a plurality of partitions. The MV selection information may include an index indicating the selected first MV and an index indicating the selected second MV. One index may indicate a plurality of pieces of information. For example, one index collectively indicating a part or the entirety of partition information and a part or the entirety of MV selection information may be encoded.

(MV Derivation>ATMVP Mode)

Figure 54:
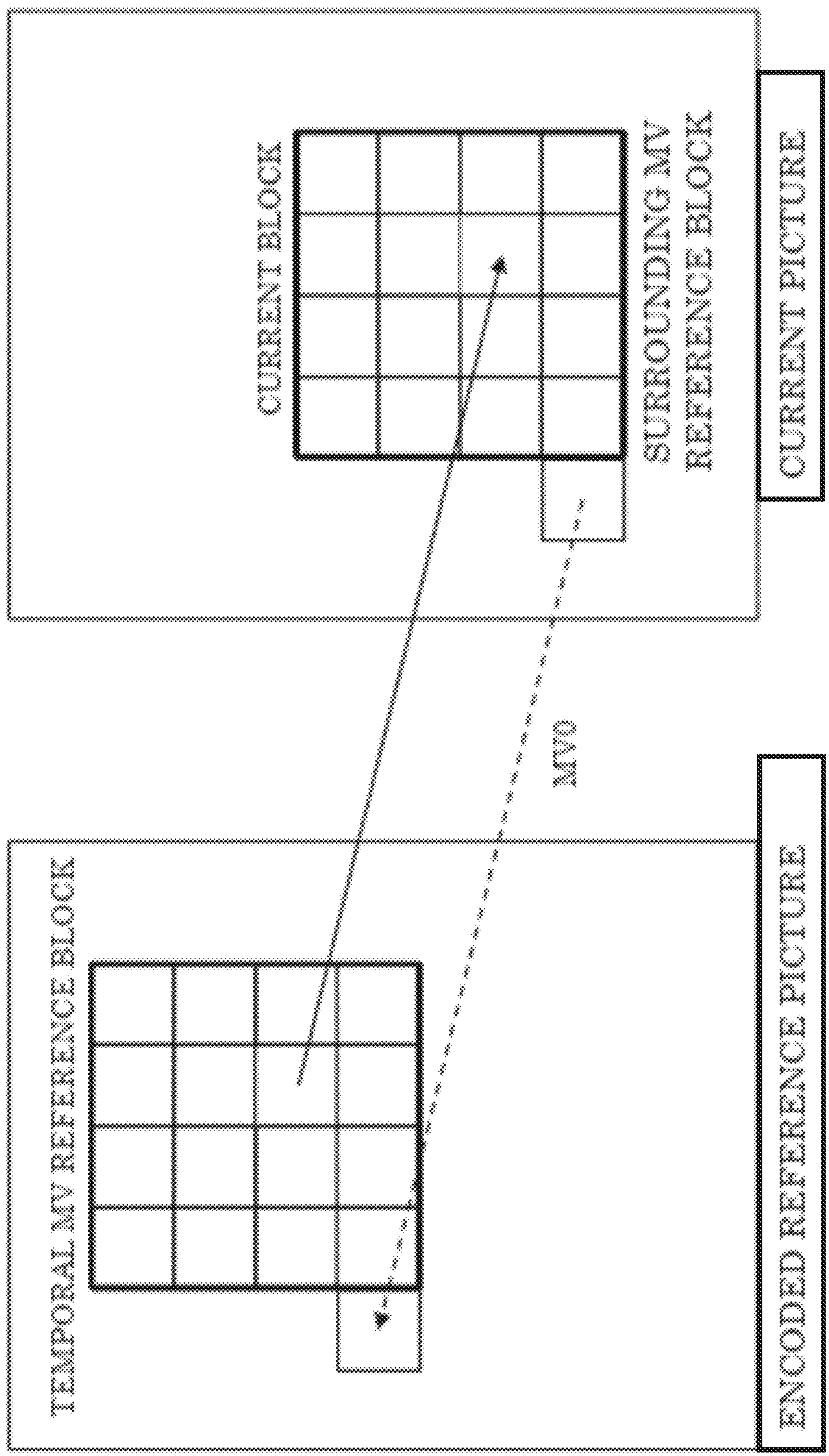
FIG. 54 is a conceptual diagram for illustrating one example of an Advanced Temporal Motion Vector Prediction (ATMVP) mode in which a MV is derived in units of a sub-block.

FIG. 54 is a conceptual diagram for illustrating one example of an Advanced Temporal Motion Vector Prediction (ATMVP) mode in which a MV is derived in units of a sub-block.

The ATMVP mode is a mode categorized into the merge mode. For example, in the ATMVP mode, a MV candidate for each sub-block is registered in a MV candidate list for use in normal merge mode.

More specifically, in the ATMVP mode, first, as illustrated in FIG. 54, a temporal MV reference block associated with a current block is identified in an encoded reference picture specified by a MV (MV0) of a neighboring block located at the lower-left position with respect to the current block. Next, in each sub-block in the current block, the MV used to encode the region corresponding to the sub-block in the temporal MV reference block is identified. The MV identified in this way is included in a MV candidate list as a MV candidate for the sub-block in the current block. When the MV candidate for each sub-block is selected from the MV candidate list, the sub-block is subjected to motion compensation in which the MV candidate is used as the MV for the sub-block. In this way, a prediction image for each sub-block is generated.

Although the block located at the lower-left position with respect the current block is used as a surrounding MV reference block in the example illustrated in FIG. 54, it is to be noted that another block may be used. In addition, the size of the sub-block may be 4×4 pixels, 8×8 pixels, or another size. The size of the sub-block may be switched for a unit such as a slice, brick, picture, etc.

(MV Derivation>DMVR)

Figure 55:
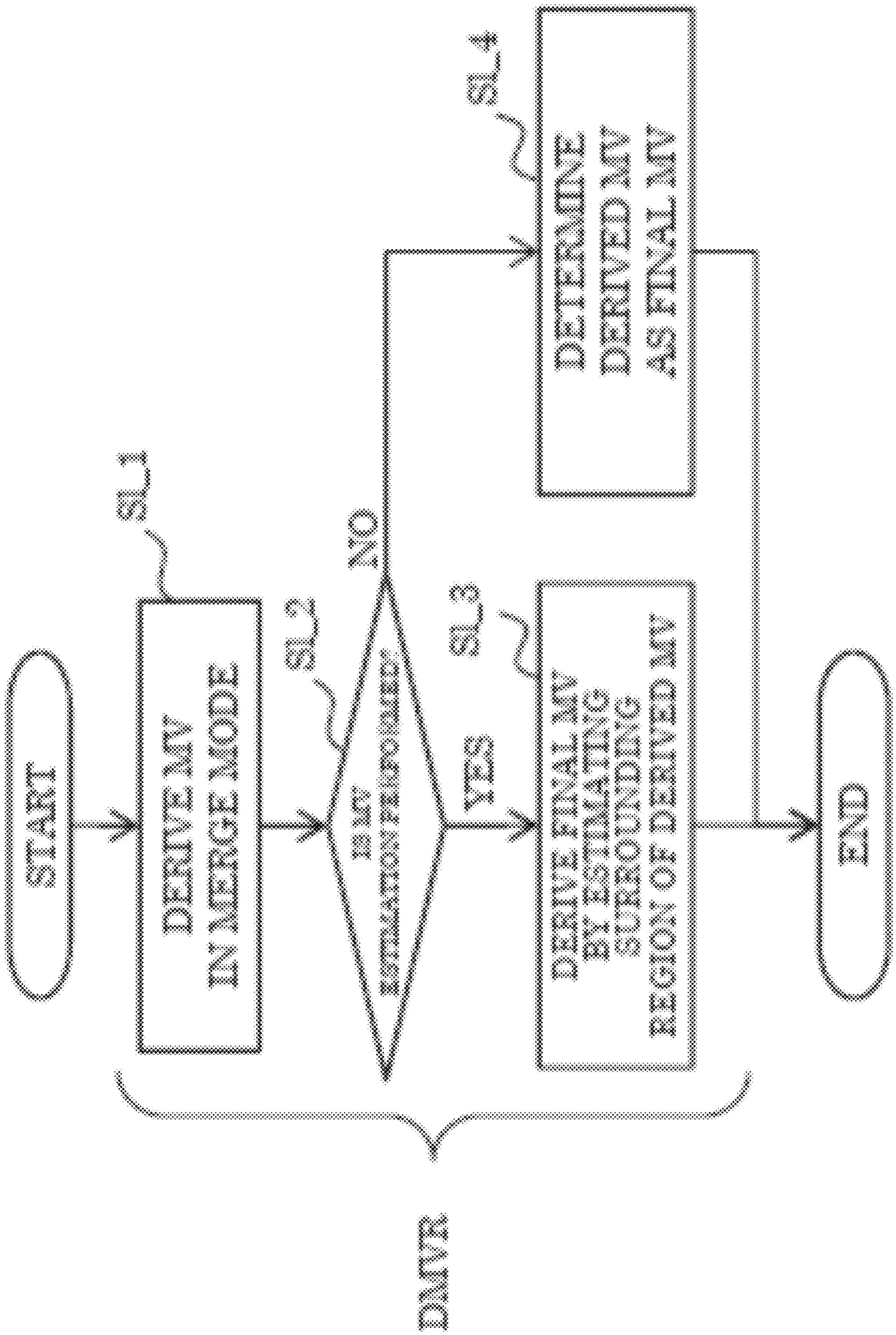
FIG. 55 is a flow chart illustrating a relationship between a merge mode and dynamic motion vector refreshing (DMVR).

FIG. 55 is a flow chart illustrating a relationship between the merge mode and Decoder Motion Vector Refinement DMVR.

Inter predictor 126 derives a motion vector for a current block according to the merge mode (Step Sl_1). Next, inter predictor 126 determines whether to perform estimation of a motion vector, that is, motion estimation (Step Sl_2). Here, when determining not to perform motion estimation (No in Step Sl_2), inter predictor 126 determines the motion vector derived in Step Sl_1 as the final motion vector for the current block (Step Sl_4). In other words, in this case, the motion vector of the current block is determined according to the merge mode.

When determining to perform motion estimation in Step Sl_1 (Yes in Step Sl_2), inter predictor 126 derives the final motion vector for the current block by estimating a surrounding region of the reference picture specified by the motion vector derived in Step Sl_1 (Step Sl_3). In other words, in this case, the motion vector of the current block is determined according to the DMVR.

Figure 56:
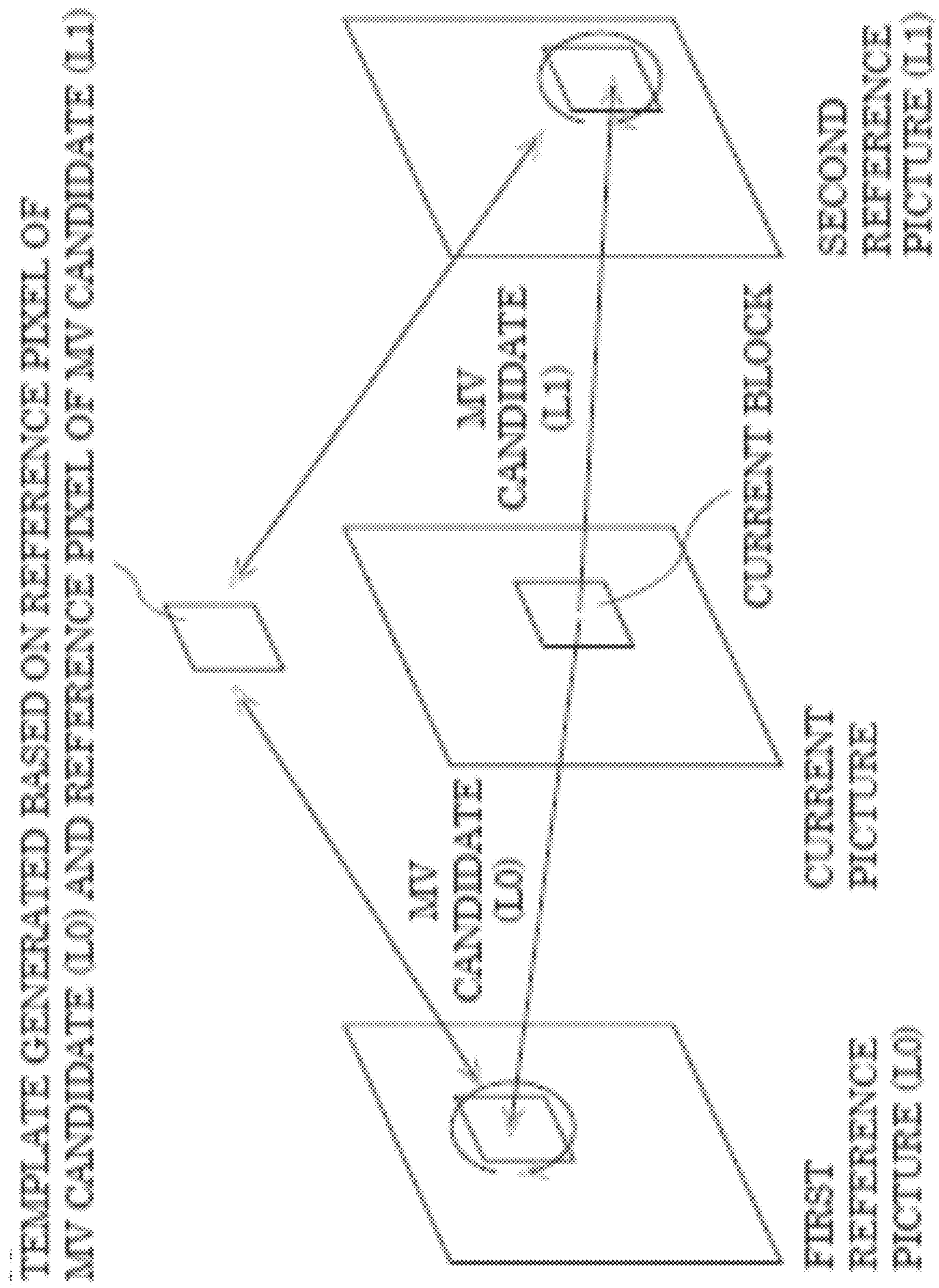
FIG. 56 is a conceptual diagram for illustrating one example of DMVR.

FIG. 56 is a conceptual diagram for illustrating one example of a DMVR process for determining a MV.

First, in the merge mode for example, MV candidates (L0 and L1) are selected for the current block. A reference pixel is identified from a first reference picture (L0) which is an encoded picture in the L0 list according to the MV candidate (L0). Likewise, a reference pixel is identified from the second reference picture (L1) which is an encoded picture in the L1 list according to the MV candidate (L1). A template is generated by calculating an average of these reference pixels.

Next, each of the surrounding regions of MV candidates of the first reference picture (L0) and the second reference picture (L1) are estimated using the template, and the MV which yields the smallest cost is determined to be the final MV. It is to be noted that the cost may be calculated, for example, using a difference value between each of the pixel values in the template and a corresponding one of the pixel values in the estimation region, the values of MV candidates, etc.

Exactly the same processes described here do not always need to be performed. Other process for enabling derivation of the final MV by estimation in surrounding regions of MV candidates may be used.

Figure 57:
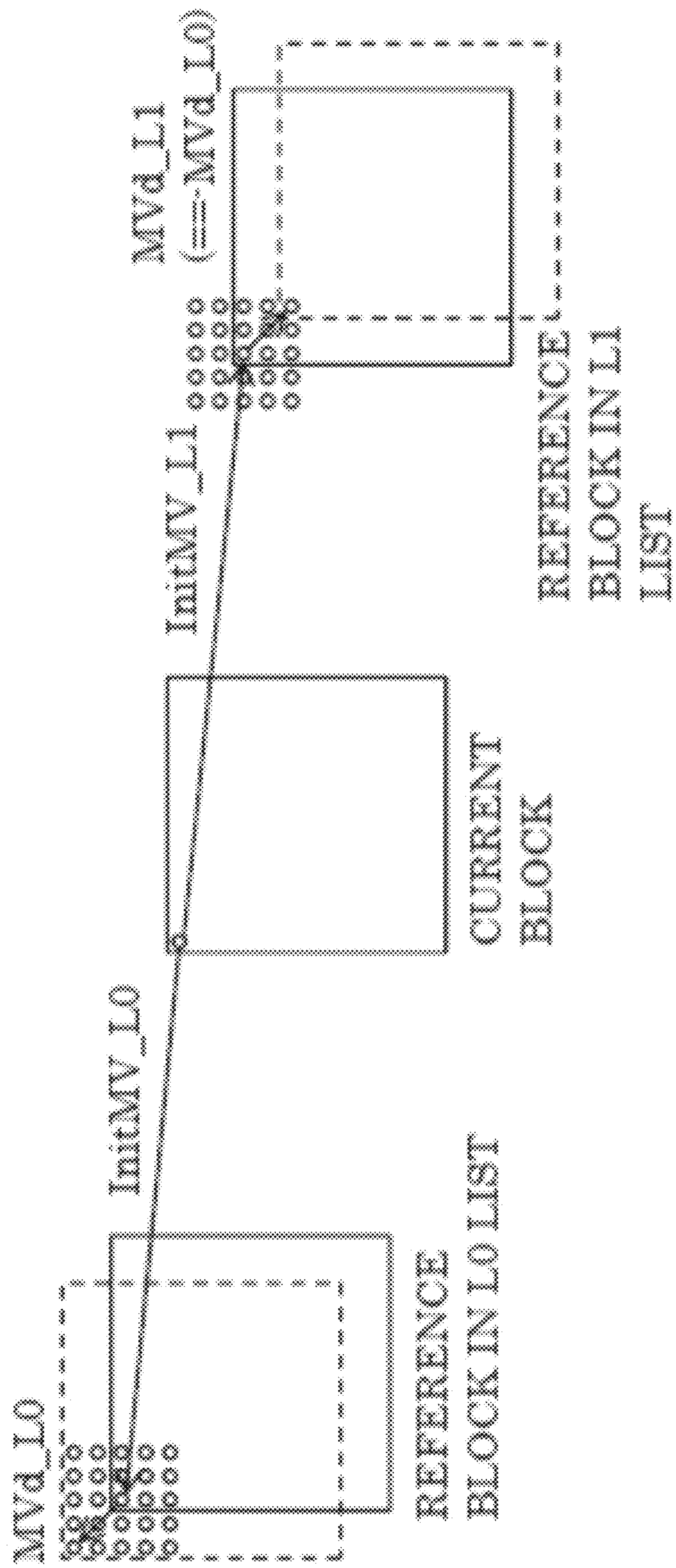
FIG. 57 is a conceptual diagram for illustrating another example of DMVR for determining a MV.

FIG. 57 is a conceptual diagram for illustrating another example of DMVR for determining a MV. Unlike the example of DMVR illustrated in FIG. 56, in the example illustrated in FIG. 57, costs are calculated without generating a template.

First, inter predictor 126 estimates a surrounding region of a reference block included in each of reference pictures in the L0 list and L1 list, based on an initial MV which is a MV candidate obtained from each MV candidate list. For example, as illustrated in FIG. 57, the initial MV corresponding to the reference block in the L0 list is InitMV_L0, and the initial MV corresponding to the reference block in the L1 list is InitMV_L1. In motion estimation, inter predictor 126 first sets the search position for the reference picture in the L0 list. Based on the position indicated by the vector difference indicating the search position to be set, specifically, the initial MV (that is, InitMV_L0, the vector difference to the search position is MVd_L0. Inter predictor 126 then determines the estimation position in the reference picture in the L1 list. This search position is indicated by the vector difference to the search position from the position indicated by the initial MV (that is, InitMV_L1). More specifically, inter predictor 126 determines the vector difference as MVd_L1 by mirroring of MVd_L0. In other words, inter predictor 126 determines the position which is symmetrical with respect to the position indicated by the initial MV to be the search position in each reference picture in the L0 list and the L1 list. Inter predictor 126 calculates, for each search position, the total sum of the absolute differences (SADs) between values of pixels at search positions in blocks as a cost, and finds out the search position that yields the smallest cost.

Figure 58A:
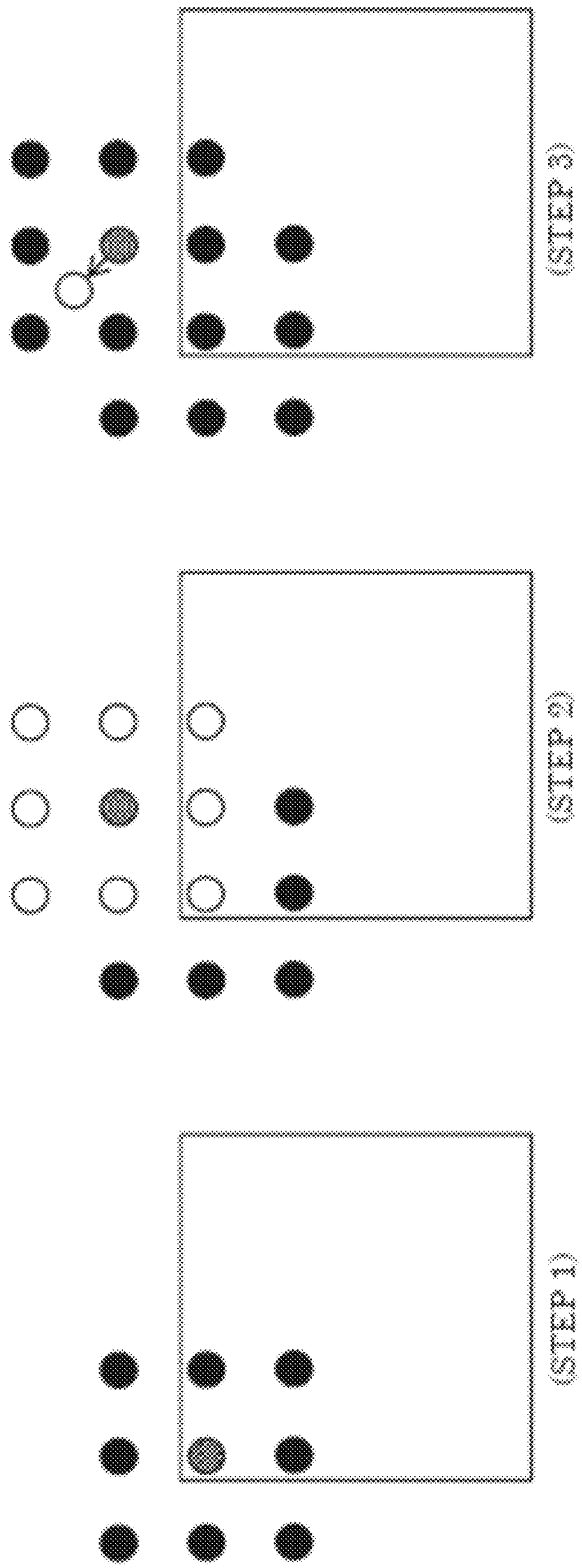
FIG. 58A is a conceptual diagram for illustrating one example of motion estimation in DMVR.
Figure 58B:
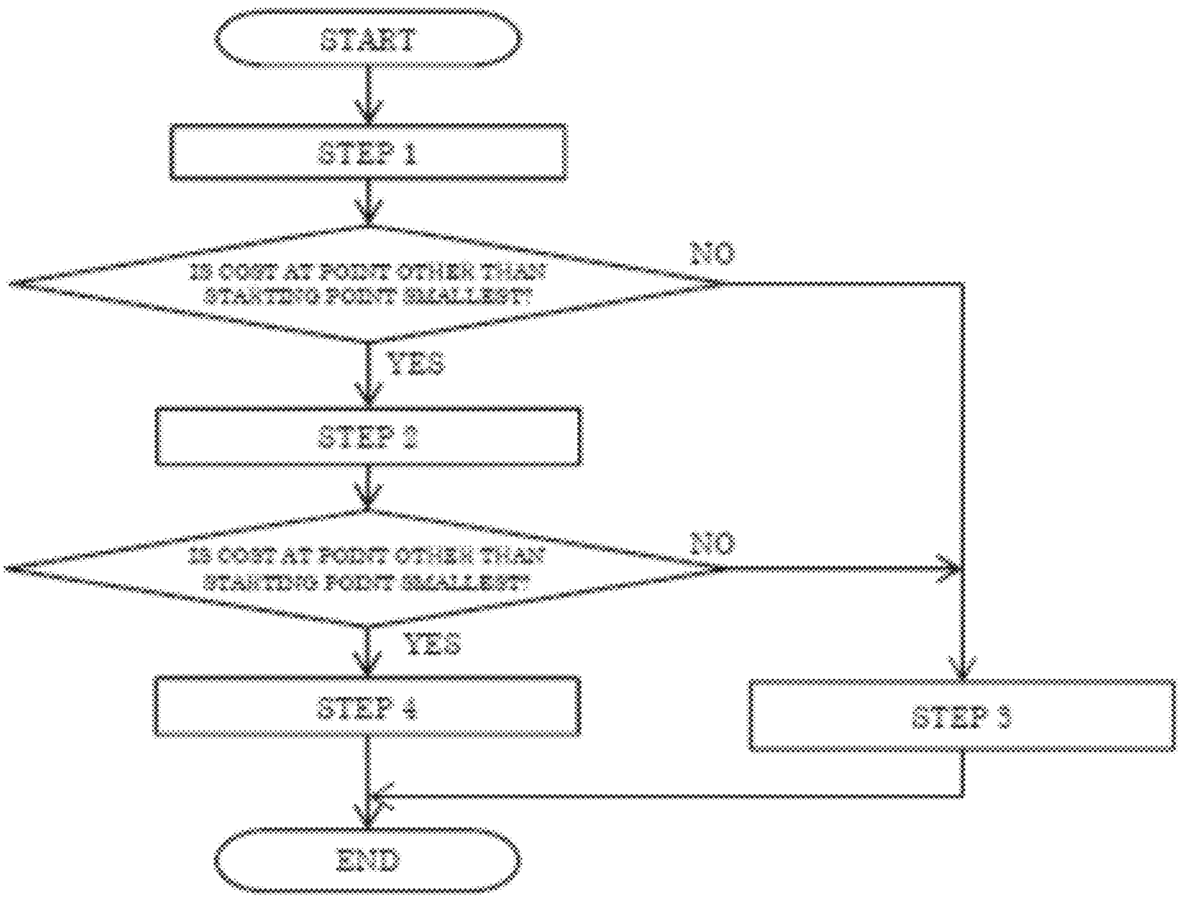
FIG. 58B is a flow chart illustrating one example of a process of motion estimation in DMVR.

FIG. 58A is a conceptual diagram for illustrating one example of motion estimation in DMVR, and FIG. 58B is a flow chart illustrating one example of a process of motion estimation.

First, in Step 1, inter predictor 126 calculates the cost between the search position (also referred to as a starting point) indicated by the initial MV and eight surrounding search positions. Inter predictor 126 then determines whether the cost at each of the search positions other than the starting point is the smallest. Here, when determining that the cost at the search position other than the starting point is the smallest, inter predictor 126 changes a target to the search position at which the smallest cost is obtained, and performs the process in Step 2. When the cost at the starting point is the smallest, inter predictor 126 skips the process in Step 2 and performs the process in Step 3.

In Step 2, inter predictor 126 performs the search similar to the process in Step 1, regarding, as a new starting point, the search position after the target change according to the result of the process in Step 1. Inter predictor 126 then determines whether the cost at each of the search positions other than the starting point is the smallest. Here, when determining that the cost at the search position other than the starting point is the smallest, inter predictor 126 performs the process in Step 4. When the cost at the starting point is the smallest, inter predictor 126 performs the process in Step 3.

In Step 4, inter predictor 126 regards the search position at the starting point as the final search position, and determines the difference between the position indicated by the initial MV and the final search position to be a vector difference.

In Step 3, inter predictor 126 determines the pixel position at sub-pixel accuracy at which the smallest cost is obtained, based on the costs at the four points located at upper, lower, left, and right positions with respect to the starting point in Step 1 or Step 2, and regards the pixel position as the final search position. The pixel position at the sub-pixel accuracy is determined by performing weighted addition of each of the four upper, lower, left, and right vectors ((0, 1), (0, −1), (−1, 0), and (1, 0)), using, as a weight, the cost at a corresponding one of the four search positions. Inter predictor 126 then determines the difference between the position indicated by the initial MV and the final search position to be the vector difference.

(Motion Compensation>BIO/OBMC/LIC)

Motion compensation involves a mode for generating a prediction image, and correcting the prediction image. The mode is, for example, bi-directional optical flow (BIO), overlapped block motion compensation (OBMC), local illumination compensation (LIC), to be described later, etc.

Figure 59:
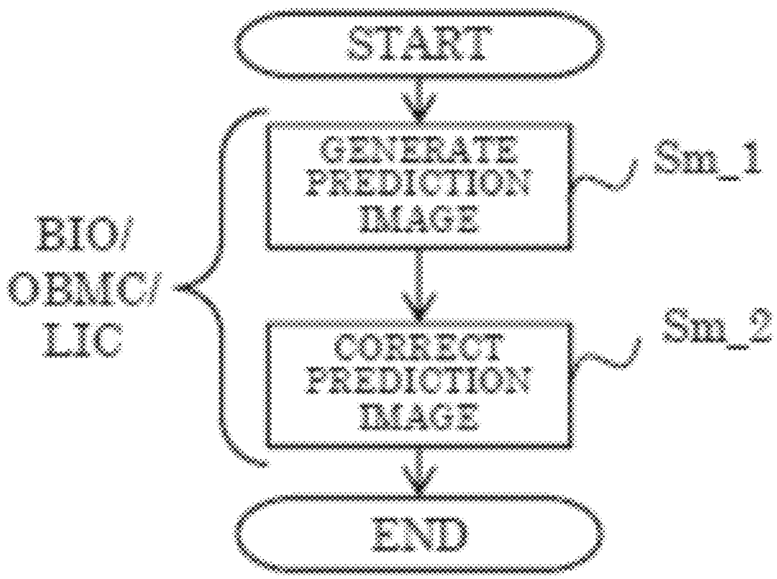
FIG. 59 is a flow chart illustrating one example of a process of generation of a prediction image.

FIG. 59 is a flow chart illustrating one example of a process of generation of a prediction image.

Inter predictor 126 generates a prediction image (Step Sm_1), and corrects the prediction image, for example, according to, for example, any of the modes described above (Step Sm_2).

Figure 60:
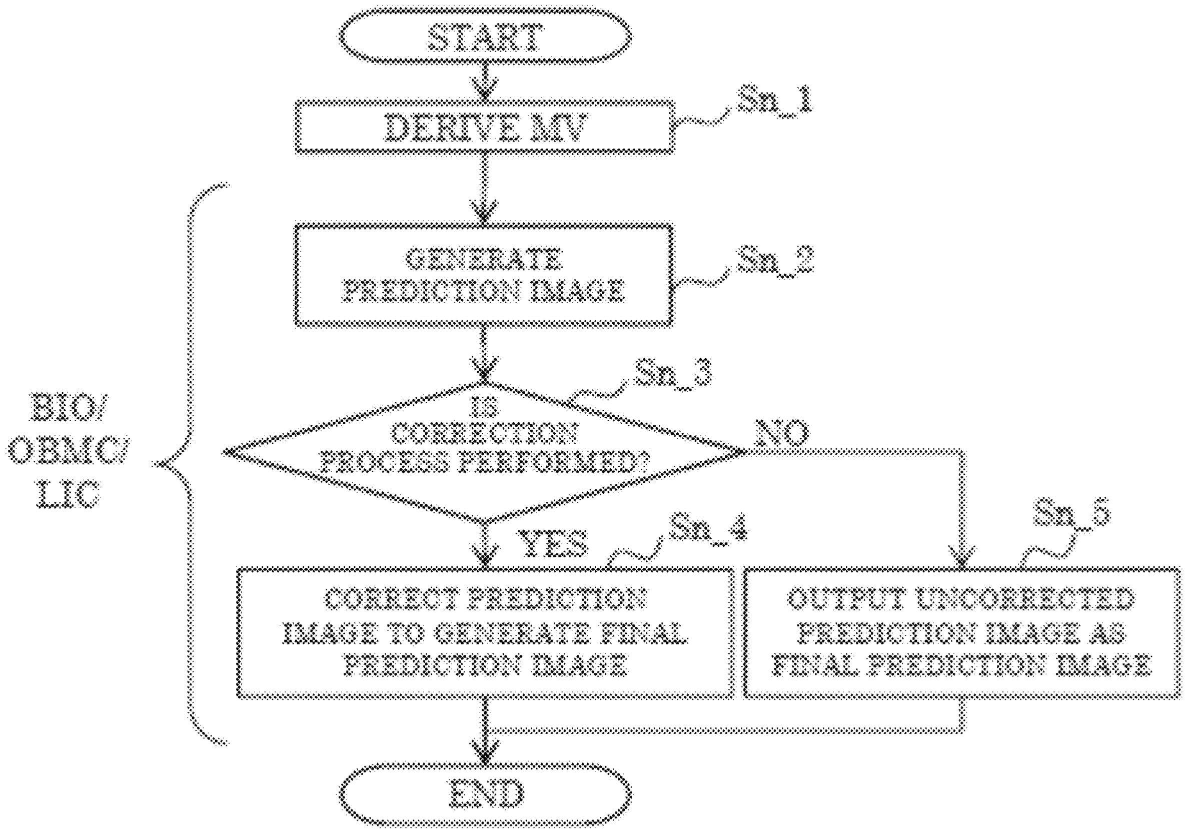
FIG. 60 is a flow chart illustrating another example of a process of generation of a prediction image.

FIG. 60 is a flow chart illustrating another example of a process of generation of a prediction image.

Inter predictor 126 determines a motion vector of a current block (Step Sn_1). Next, inter predictor 126 generates a prediction image using the motion vector (Step Sn_2), and determines whether to perform a correction process (Step Sn_3). Here, when determining to perform a correction process (Yes in Step Sn_3), inter predictor 126 generates the final prediction image by correcting the prediction image (Step Sn_4). It is to be noted that, in LIC described later, luminance and chrominance may be corrected in Step Sn_4. When determining not to perform a correction process (No in Step Sn_3), inter predictor 126 outputs the prediction image as the final prediction image without correcting the prediction image (Step Sn_5).

(Motion Compensation>OBMC)

It is to be noted that an inter prediction image may be generated using motion information for a neighboring block in addition to motion information for the current block obtained by motion estimation. More specifically, an inter prediction image may be generated for each sub-block in a current block by performing weighted addition of a prediction image based on the motion information obtained by motion estimation (in a reference picture) and a prediction image based on the motion information of the neighboring block (in the current picture). Such inter prediction (motion compensation) is also referred to as overlapped block motion compensation (OBMC) or an OBMC mode.

In OBMC mode, information indicating a sub-block size for OBMC (referred to as, for example, an OBMC block size) may be signaled at the sequence level. Moreover, information indicating whether to apply the OBMC mode (referred to as, for example, an OBMC flag) may be signaled at the CU level. It is to be noted that the signaling of such information does not necessarily need to be performed at the sequence level and CU level, and may be performed at another level (for example, at the picture level, slice level, brick level, CTU level, or sub-block level).

Figure 61:
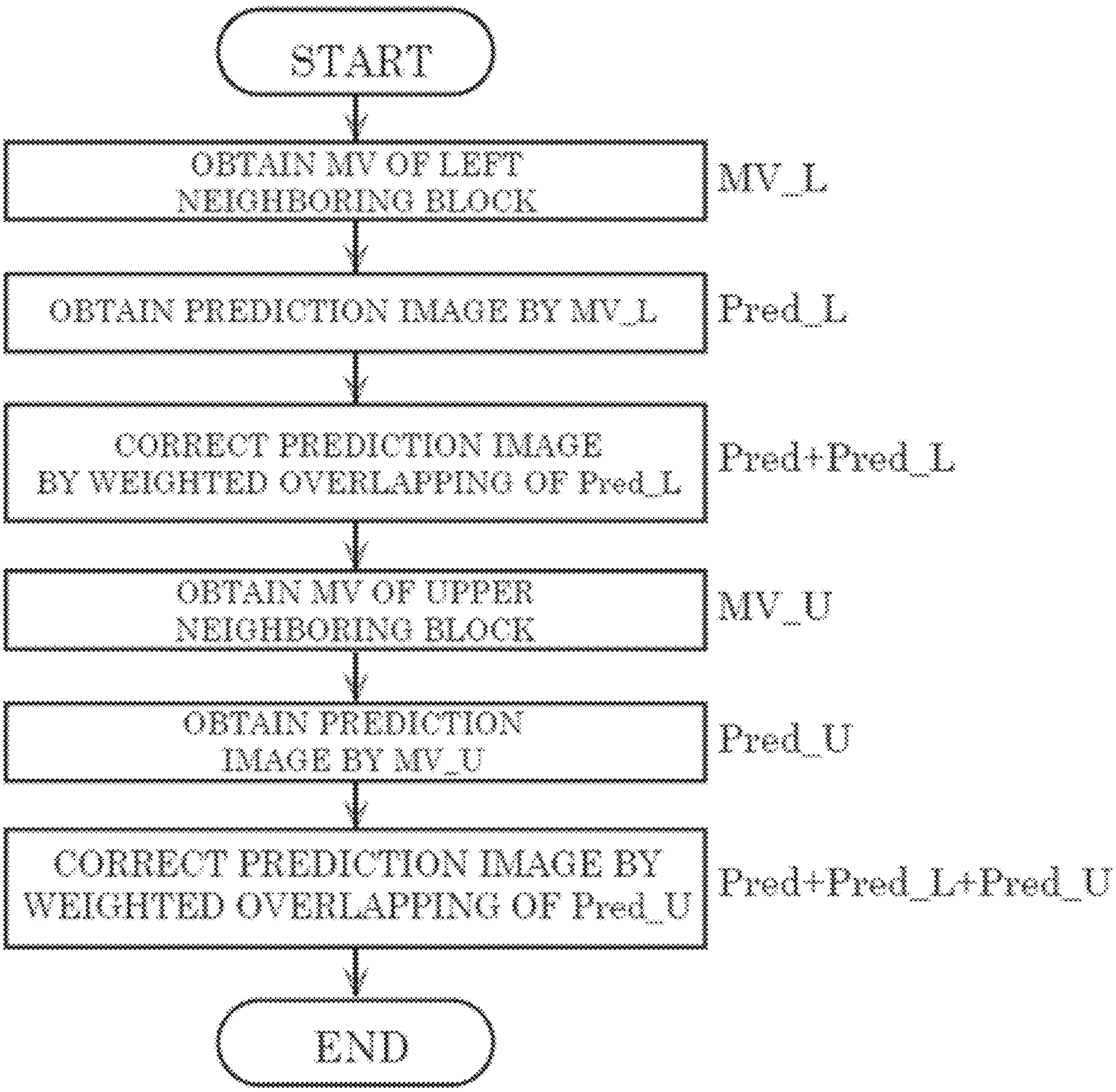
FIG. 61 is a flow chart illustrating one example of a correction process of a prediction image by overlapped block motion compensation (OBMC).
Figure 62:
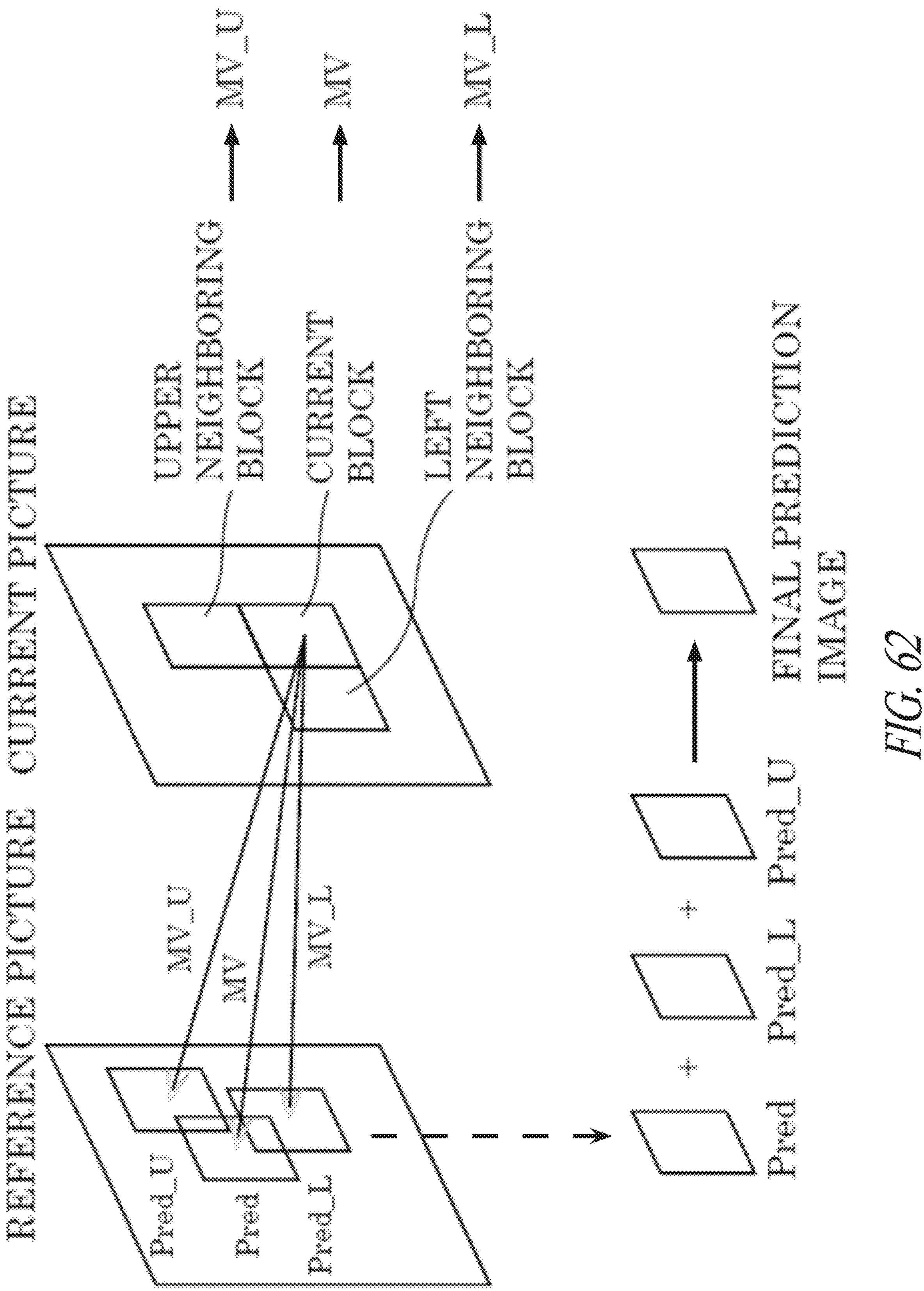
FIG. 62 is a conceptual diagram for illustrating one example of a prediction image correction process by OBMC.

The OBMC mode will be described in further detail. FIGS. 61 and 62 are a flow chart and a conceptual diagram for illustrating an outline of a prediction image correction process performed by OBMC.

First, as illustrated in FIG. 62, a prediction image (Pred) by normal motion compensation is obtained using a MV assigned to a current block. In FIG. 62, the arrow "MV" points a reference picture, and indicates what the current block of the current picture refers to in order to obtain the prediction image.

Next, a prediction image (Pred_L) is obtained by applying a motion vector (MV_L) which has been already derived for the encoded block neighboring to the left of the current block to the current block (re-using the motion vector for the current block). The motion vector (MV_L) is indicated by an arrow "MV_L" indicating a reference picture from a current block. A first correction of a prediction image is performed by overlapping two prediction images Pred and Pred_L. This provides an effect of blending the boundary between neighboring blocks.

Likewise, a prediction image (Pred_U) is obtained by applying a MV (MV_U) which has been already derived for the encoded block neighboring above the current block to the current block (re-using the MV for the current block). The MV (MV_U) is indicated by an arrow "MV_U" indicating a reference picture from a current block. A second correction of a prediction image is performed by overlapping the prediction image Pred_U to the prediction images (for example, Pred and Pred_L) on which the first correction has been performed. This provides an effect of blending the boundary between neighboring blocks. The prediction image obtained by the second correction is the one in which the boundary between the neighboring blocks has been blended (smoothed), and thus is the final prediction image of the current block.

Although the above example is a two-path correction method using left and upper neighboring blocks, it is to be noted that the correction method may be three—or more—path correction method using also the right neighboring block and/or the lower neighboring block.

It is to be noted that the region in which such overlapping is performed may be only part of a region near a block boundary instead of the pixel region of the entire block.

It is to be noted that the prediction image correction process according to OBMC for obtaining one prediction image Pred from one reference picture by overlapping additional prediction image Pred_L and Pred_U have been described above. However, when a prediction image is corrected based on a plurality of reference images, a similar process may be applied to each of the plurality of reference pictures. In such a case, after corrected prediction images are obtained from the respective reference pictures by performing OBMC image correction based on the plurality of reference pictures, the obtained corrected prediction images are further overlapped to obtain the final prediction image.

It is to be noted that, in OBMC, a current block unit may be a PU or a sub-block unit obtained by further splitting the PU.

One example of a method for determining whether to apply OBMC is a method for using an obmc_flag which is a signal indicating whether to apply OBMC. As one specific example, encoder 100 may determine whether the current block belongs to a region having complicated motion. Encoder 100 sets the obmc_flag to a value of "1" when the block belongs to a region having complicated motion and applies OBMC when encoding, and sets the obmc_flag to a value of "0" when the block does not belong to a region having complicated motion and encodes the block without applying OBMC. Decoder 200 switches between application and non-application of OBMC by decoding the obmc_flag written in a stream.

(Motion Compensation>BIO)

Next, a MV derivation method is described. First, a mode for deriving a MV based on a model assuming uniform linear motion is described. This mode is also referred to as a bi-directional optical flow (BIO) mode. In addition, this bi-directional optical flow may be written as BDOF instead of BIO.

Figure 63:
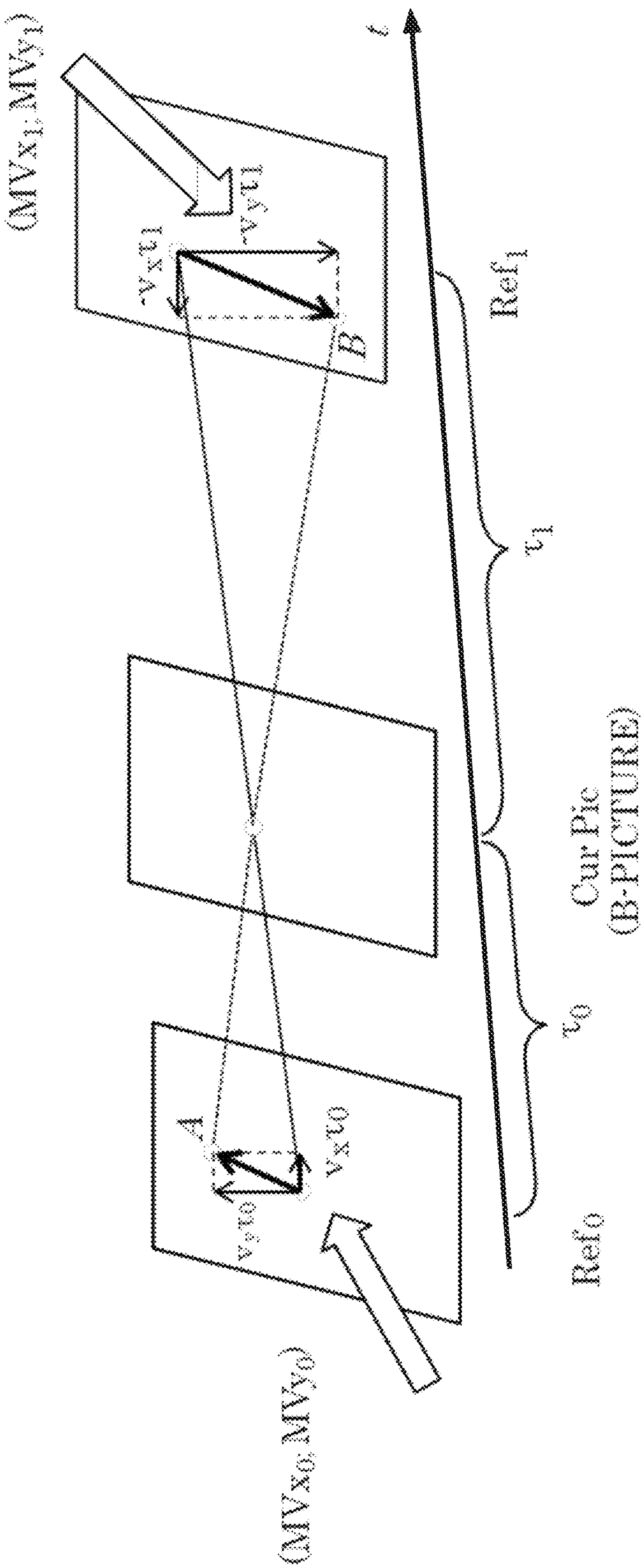
FIG. 63 is a conceptual diagram for illustrating a model assuming uniform linear motion.

FIG. 63 is a conceptual diagram for illustrating a model assuming uniform linear motion. In FIG. 63, ($v_x$, $v_y$) indicates a velocity vector, and τ0 and τ1 indicate temporal distances between a current picture (Cur Pic) and two reference pictures ($Ref_0$, $Ref_1$). ($MV_{x0}$, $MV_{y0}$) indicate MVs corresponding to reference picture $Ref_0$, and ($MV_{x1}$, $MV_{y1}$) indicate MVs corresponding to reference picture Ref1.

Here, under the assumption of uniform linear motion exhibited by a velocity vector ($v_x$, $v_y$), ($MV_{x0}$, $MV_{y0}$) and ($MV_{x1}$, $MV_{y1}$) are represented as ($v_{x\tau0}$, $v_{y\tau0}$) and ($-v_{x\tau1}$, $-v_{y\tau1}$), respectively, and the following optical flow equation (2) is given.

[Math. 3]

$$\partial I^{(k)}/\partial t + v_x \partial I^{(k)}/\partial x + v_y \partial I^{(k)}/\partial y = 0 \quad (2)$$

Here, I(k) indicates a motion-compensated luma value of reference picture k (k=0, 1) after motion compensation. This optical flow equation shows that the sum of (i) the time derivative of the luma value, (ii) the product of the horizontal velocity and the horizontal component of the spatial gradient of a reference image, and (iii) the product of the vertical velocity and the vertical component of the spatial gradient of a reference image is equal to zero. A motion vector of each block obtained from, for example, a MV candidate list may be corrected in units of a pixel, based on a combination of the optical flow equation and Hermite interpolation.

It is to be noted that a motion vector may be derived on the decoder side 200 using a method other than deriving a motion vector based on a model assuming uniform linear motion. For example, a motion vector may be derived in units of a sub-block based on motion vectors of a plurality of neighboring blocks.

Figure 64:
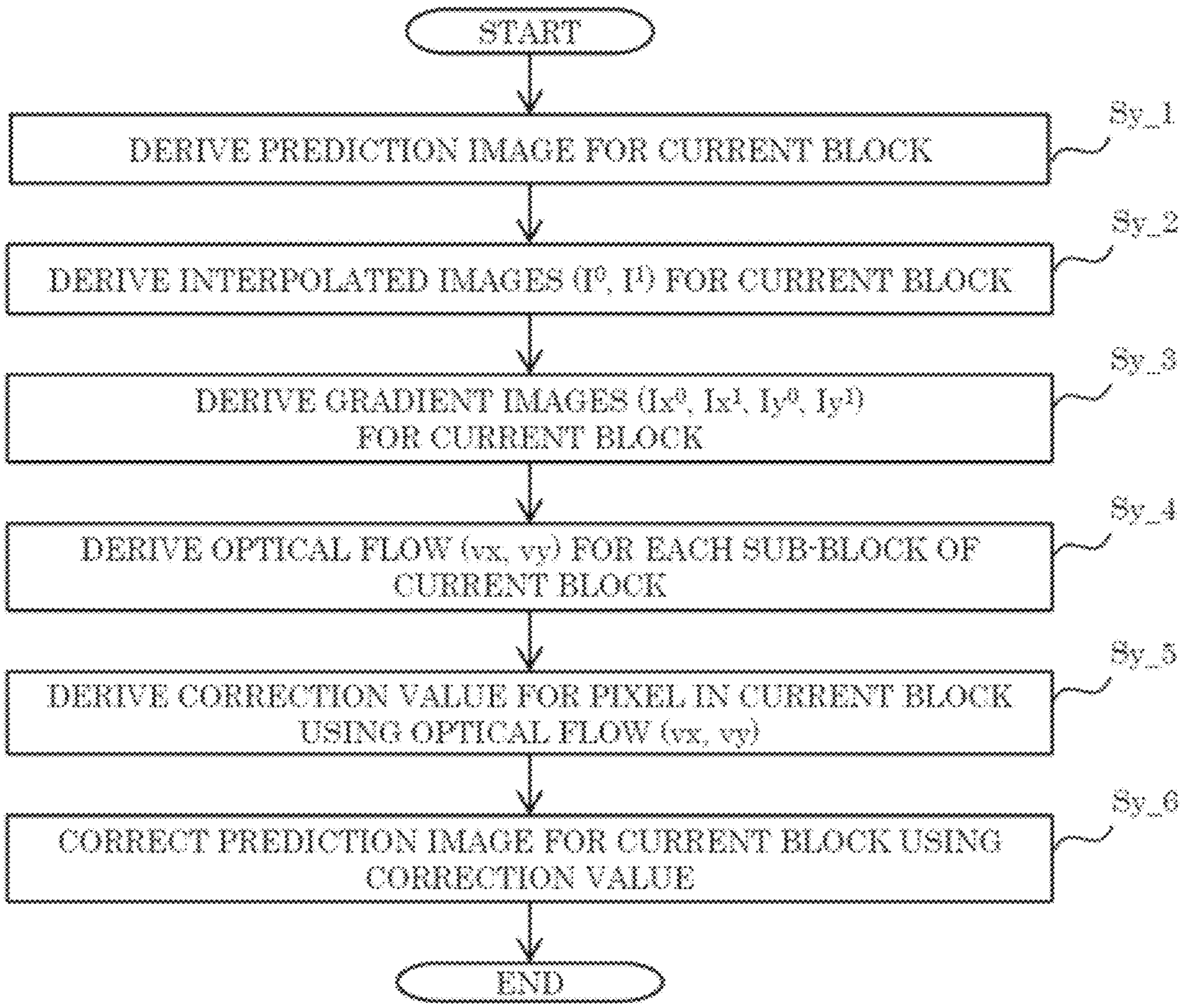
FIG. 64 is a flow chart illustrating one example of a process of inter prediction according to BIO.
Figure 65:
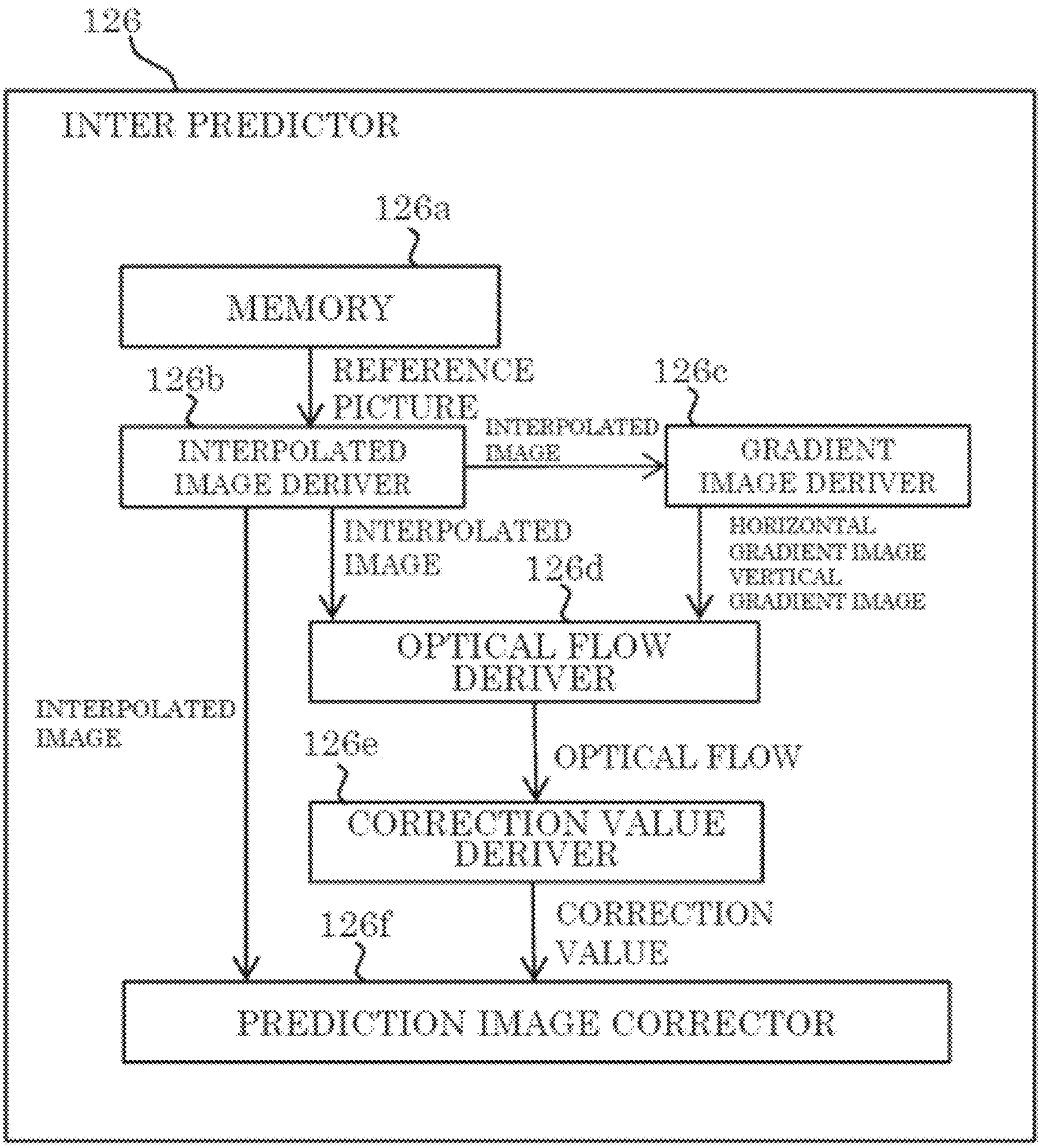
FIG. 65 is a functional block diagram illustrating one example of a configuration of an inter predictor which may perform inter prediction according to BIO.

FIG. 64 is a flow chart illustrating one example of a process of inter prediction according to BIO. FIG. 65 is a functional block diagram illustrating one example of a configuration of inter predictor 126 which may perform inter prediction according to BIO.

As illustrated in FIG. 65, inter predictor 126 includes, for example, memory 126*a*, interpolated image deriver 126*b*, gradient image deriver 126*c*, optical flow deriver 126*d*, correction value deriver 126*e*, and prediction image corrector 126*f*. It is to be noted that memory 126*a* may be frame memory 122.

Inter predictor 126 derives two motion vectors ($M_0$, $M_1$), using two reference pictures ($Ref_0$, $Ref_1$) different from the picture (Cur Pic) including a current block. Inter predictor 126 then derives a prediction image for the current block using the two motion vectors ($M_0$, $M_1$) (Step Sy_1). It is to be noted that motion vector $M_0$ is motion vector ($MV_{x0}$, $MV_{y0}$) corresponding to reference picture $Ref_0$, and motion vector $M_1$ is motion vector ($MV_{x1}$, $MV_{y1}$) corresponding to reference picture $Ref_1$.

Next, interpolated image deriver 126*b* derives interpolated image $I^0$ for the current block, using motion vector $M_0$ and reference picture $L_0$ by referring to memory 126*a*. Next, interpolated image deriver 126*b* derives interpolated image $I^1$ for the current block, using motion vector $M_1$ and reference picture $L_1$ by referring to memory 126*a* (Step Sy_2). Here, interpolated image $I^0$ is an image included in reference picture $Ref_0$ and to be derived for the current block, and interpolated image $I^1$ is an image included in reference picture $Ref_1$ and to be derived for the current block. Each of interpolated image $I^0$ and interpolated image $I^1$ may be the same in size as the current block. Alternatively, each of interpolated image $I^0$ and interpolated image $I^1$ may be an image larger than the current block. Furthermore, interpolated image $I^0$ and interpolated image $I^1$ may include a prediction image obtained by using motion vectors ($M_0$, $M_1$) and reference pictures ($L_0$, $L_1$) and applying a motion compensation filter.

In addition, gradient image deriver 126*c* derives gradient images ($Ix^0$, $Ix^1$, $Iy^0$, $Iy^1$) of the current block, from interpolated image $I^0$ and interpolated image 11 (Step Sy_3). It is to be noted that the gradient images in the horizontal direction are ($Ix^0$, $Ix^1$), and the gradient images in the vertical direction are ($Iy^0$, $Iy^1$). Gradient image deriver 126*c* may derive each gradient image by, for example, applying a gradient filter to the interpolated images. The gradient image may indicate the amount of spatial change in pixel value along the horizontal direction, along the vertical direction, or both.

Next, optical flow deriver 126*d* derives, for each sub-block of the current block, an optical flow ($v_x$, $v_y$) which is a velocity vector, using the interpolated images ($I^0$, $I^1$) and the gradient images ($Ix^0$, $Ix^1$, $Iy^0$, $Iy^1$) (Step Sy_4). The optical flow indicates coefficients for correcting the amount of spatial pixel movement, and may be referred to as a local motion estimation value, a corrected motion vector, or a corrected weighting vector. As one example, a sub-block may be 4×4 pixel sub-CU. It is to be noted that the optical flow derivation may be performed for each pixel unit, or the like, instead of being performed for each sub-block.

Next, inter predictor 126 corrects a prediction image for the current block using the optical flow ($v_x$, $v_y$). For example, correction value deriver 126*e* derives a correction value for the value of a pixel included in a current block, using the optical flow ($v_x$, $v_y$) (Step Sy_5). Prediction image corrector 126*f* may then correct the prediction image for the current block using the correction value (Step Sy_6). It is to be noted that the correction value may be derived in units of a pixel, or may be derived in units of a plurality of pixels or in units of a sub-block.

It is to be noted that the BIO process flow is not limited to the process disclosed in FIG. 64. For example, only part of the processes disclosed in FIG. 64 may be performed, or a different process may be added or used as a replacement, or the processes may be executed in a different processing order, etc.

(Motion Compensation>LIC)

Next, one example of a mode for generating a prediction image (prediction) using a local illumination compensation (LIC) process is described.

Figure 66A:
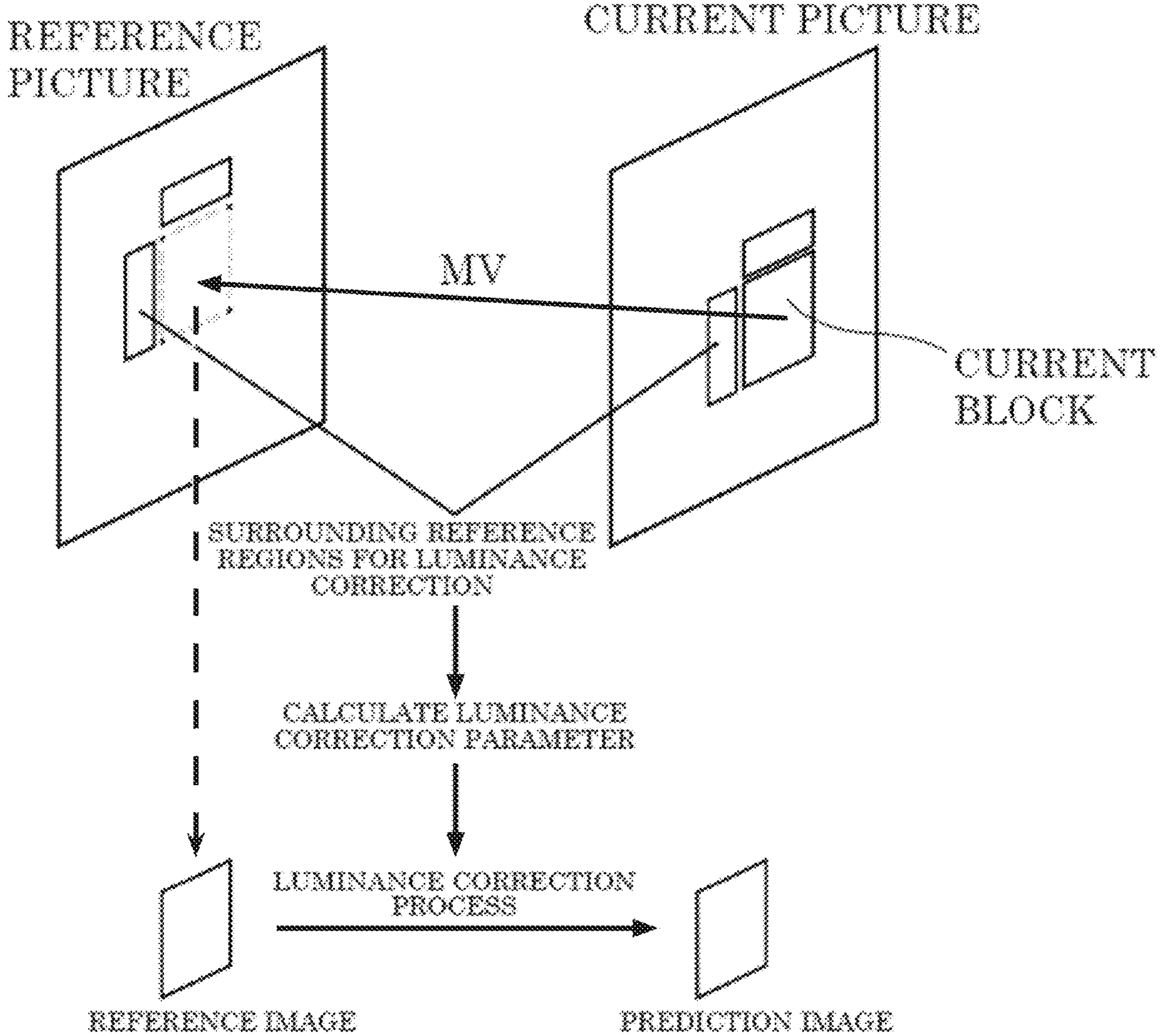
FIG. 66A is a conceptual diagram for illustrating one example of process of a prediction image generation method using a luminance correction process performed by LIC.
Figure 66B:
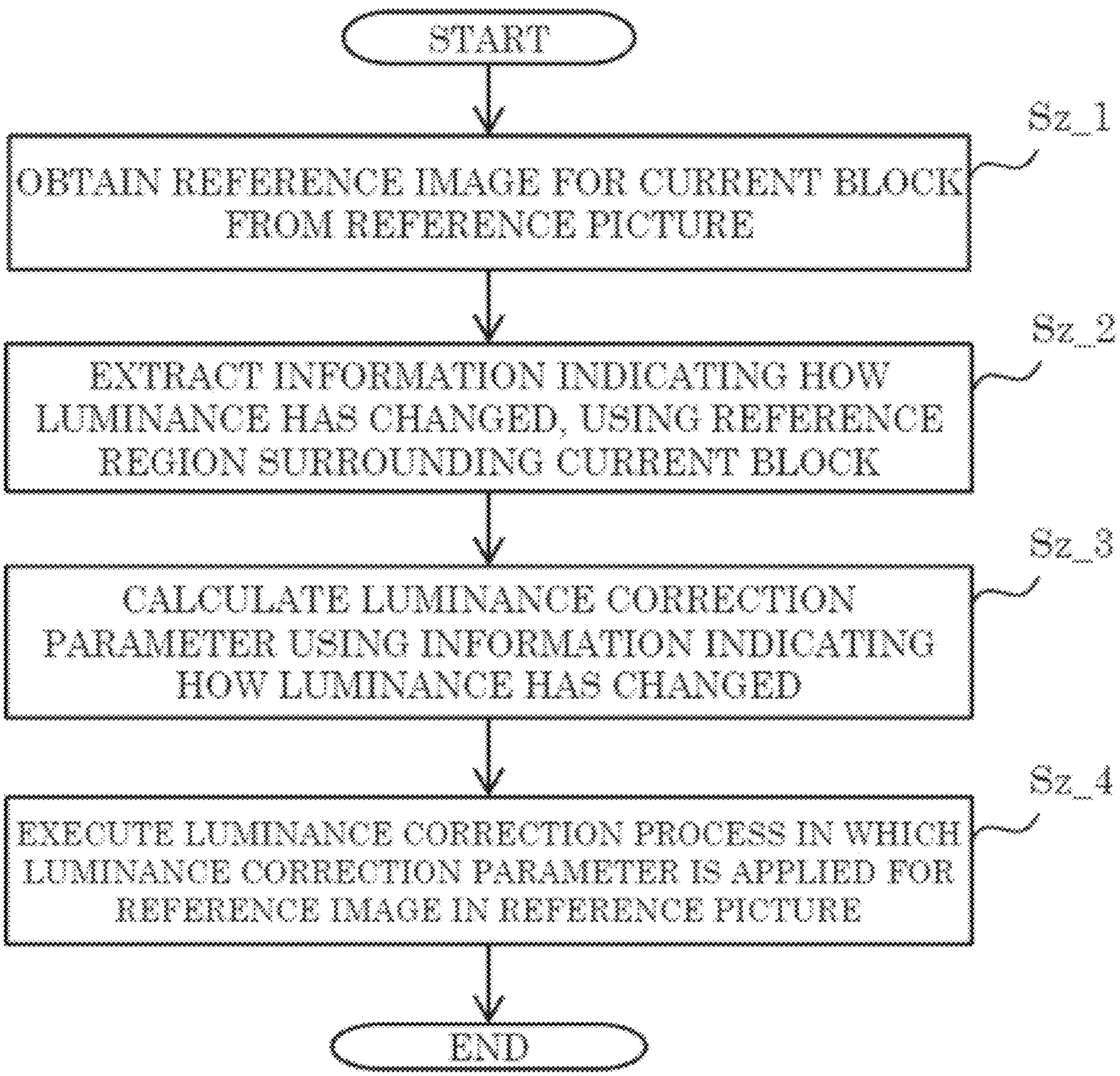
FIG. 66B is a flow chart illustrating one example of a process of prediction image generation method using the LIC.

FIG. 66A is a conceptual diagram for illustrating one example of process of a prediction image generation method using a luminance correction process performed by LIC. FIG. 66B is a flow chart illustrating one example of a process of prediction image generation method using the LIC.

First, inter predictor 126 derives a MV from an encoded reference picture, and obtains a reference image corresponding to the current block (Step Sz_1).

Next, inter predictor 126 extracts, for the current block, information indicating how the luma value has changed between the current block and the reference picture (Step Sz_2). This extraction is performed based on the luma pixel values of the encoded left neighboring reference region (surrounding reference region) and the encoded upper neighboring reference region (surrounding reference region) in the current picture, and the luma pixel values at the corresponding positions in the reference picture specified by the derived MVs. Inter predictor 126 calculates a luminance correction parameter, using the information indicating how the luma value has changed (Step Sz_3).

Inter predictor 126 generates a prediction image for the current block by performing a luminance correction process in which the luminance correction parameter is applied to the reference image in the reference picture specified by the MV (Step Sz_4). In other words, the prediction image which is the reference image in the reference picture specified by the MV is subjected to the correction based on the luminance correction parameter. In this correction, luminance may be corrected, or chrominance may be corrected, or both. In other words, a chrominance correction parameter may be calculated using information indicating how chrominance has changed, and a chrominance correction process may be performed.

It is to be noted that the shape of the surrounding reference region illustrated in FIG. 66A is one example; another shape may be used.

Moreover, although the process in which a prediction image is generated from a single reference picture has been described here, cases in which a prediction image is generated from a plurality of reference pictures can be described in the same manner. The prediction image may be generated after performing a luminance correction process of the reference images obtained from the reference pictures in the same manner as described above.

One example of a method for determining whether to apply LIC is a method for using a lic_flag which is a signal indicating whether to apply the LIC. As one specific example, encoder 100 determines whether the current block belongs to a region having a luminance change. Encoder 100 sets the lic_flag to a value of "1" when the block belongs to a region having a luminance change and applies LIC when encoding, and sets the lic_flag to a value of "0" when the block does not belong to a region having a luminance change and performs encoding without applying LIC. Decoder 200 may decode the lic_flag written in the stream and decode the current block by switching between application and non-application of LIC in accordance with the flag value.

One example of a different method of determining whether to apply a LIC process is a determining method in accordance with whether a LIC process has been applied to a surrounding block. As one specific example, when a current block has been processed in merge mode, inter predictor 126 determines whether an encoded surrounding block selected in MV derivation in merge mode has been encoded using LIC. Inter predictor 126 performs encoding by switching between application and non-application of LIC according to the result. It is to be noted that, also in this example, the same processes are applied in processes at the decoder 200 side.

The luminance correction (LIC) process has been described with reference to FIGS. 66A and 66B, and is further described below.

First, inter predictor 126 derives a MV for obtaining a reference image corresponding to a current block to be encoded from a reference picture which is an encoded picture.

Next, inter predictor 126 extracts information indicating how the luma value of the reference picture has been changed to the luma value of the current picture, using the luma pixel values of encoded surrounding reference regions which neighbor to the left of and above the current block and the luma values in the corresponding positions in the reference pictures specified by MVs, and calculates a luminance correction parameter. For example, it is assumed that the luma pixel value of a given pixel in the surrounding reference region in the current picture is p0, and that the luma pixel value of the pixel corresponding to the given pixel in the surrounding reference region in the reference picture is p1. Inter predictor 126 calculates coefficients A and B for optimizing $A\times p1+B=p0$ as the luminance correction parameter for a plurality of pixels in the surrounding reference region.

Next, inter predictor 126 performs a luminance correction process using the luminance correction parameter for the reference image in the reference picture specified by the MV, to generate a prediction image for the current block. For example, it is assumed that the luma pixel value in the reference image is p2, and that the luminance-corrected luma pixel value of the prediction image is p3. Inter predictor 126 generates the prediction image after being subjected to the luminance correction process by calculating $A\times p2+B=p3$ for each of the pixels in the reference image.

For example, a region having a determined number of pixels extracted from each of an upper neighboring pixel and a left neighboring pixel may be used as a surrounding reference region. In addition, the surrounding reference region is not limited to a region which neighbors the current block, and may be a region which does not neighbor the current block. In the example illustrated in FIG. 66A, the surrounding reference region in the reference picture may be a region specified by another MV in a current picture, from a surrounding reference region in the current picture. For example, the other MV may be a MV in a surrounding reference region in the current picture.

Although operations performed by encoder 100 have been described here, it is to be noted that decoder 200 performs similar operations.

It is to be noted that LIC may be applied not only to luma but also to chroma. At this time, a correction parameter may be derived individually for each of Y, Cb, and Cr, or a common correction parameter may be used for any of Y, Cb, and Cr.

In addition, the LIC process may be applied in units of a sub-block. For example, a correction parameter may be derived using a surrounding reference region in a current sub-block and a surrounding reference region in a reference sub-block in a reference picture specified by a MV of the current sub-block.

(Prediction Controller)

Prediction controller 128 selects one of an intra prediction signal (an image or a signal output from intra predictor 124) and an inter prediction signal (an image or a signal output from inter predictor 126), and outputs the selected prediction image to subtractor 104 and adder 116 as a prediction signal.

(Prediction Parameter Generator)

Prediction parameter generator 130 may output information related to intra prediction, inter prediction, selection of a prediction image in prediction controller 128, etc. as a prediction parameter to entropy encoder 110. Entropy encoder 110 may generate a stream, based on the prediction parameter which is input from prediction parameter generator 130 and quantized coefficients which are input from quantizer 108. The prediction parameter may be used in decoder 200. Decoder 200 may receive and decode the stream, and perform the same processes as the prediction processes performed by intra predictor 124, inter predictor 126, and prediction controller 128. The prediction parameter may include, for example, (i) a selection prediction signal (for example, a MV, a prediction type, or a prediction mode used by intra predictor 124 or inter predictor 126), or (ii) an optional index, a flag, or a value which is based on a prediction process performed in each of intra predictor 124, inter predictor 126, and prediction controller 128, or which indicates the prediction process.

(Decoder)

Figure 67:
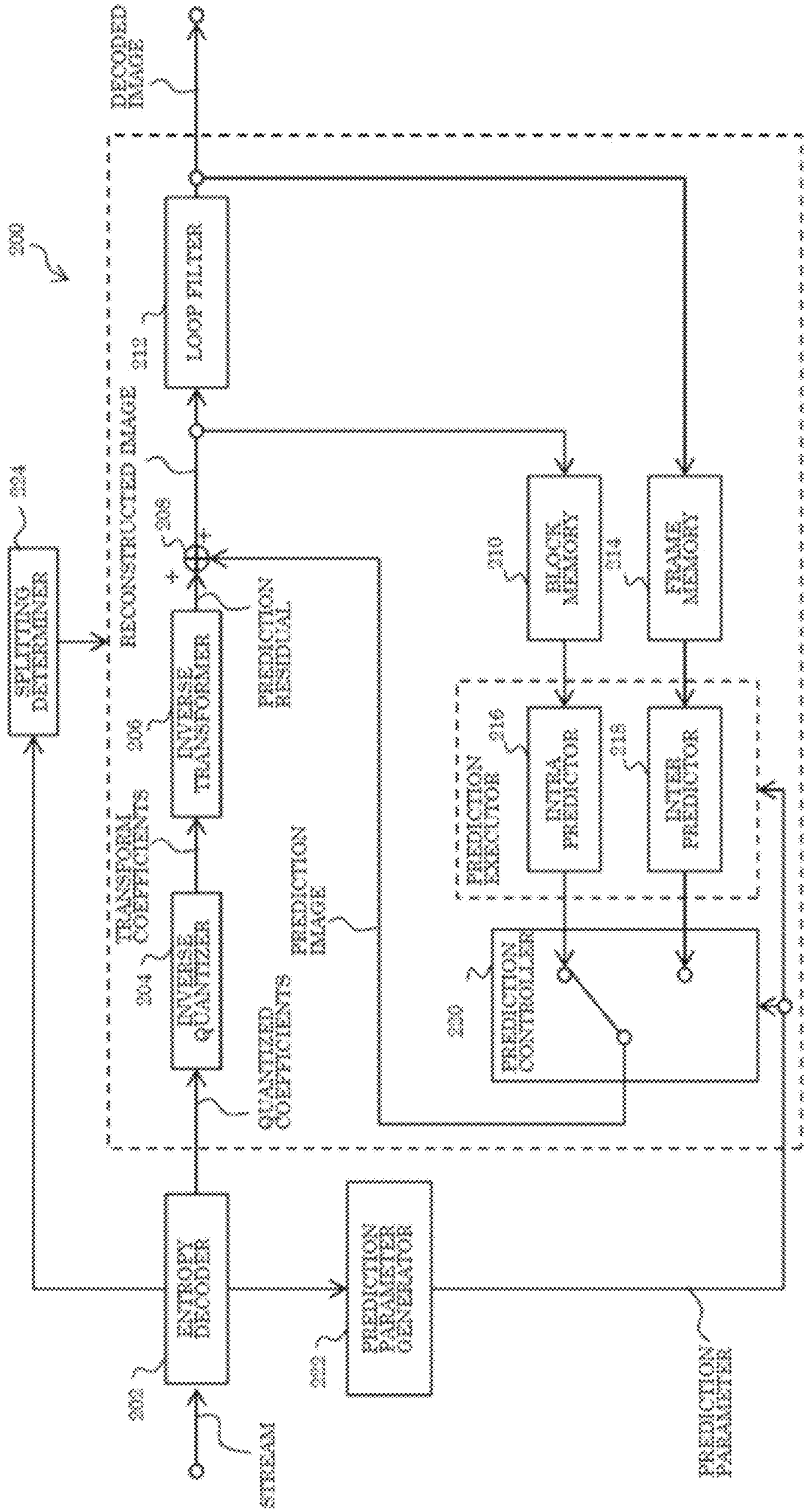
FIG. 67 is a block diagram illustrating a configuration of a decoder according to an embodiment.

Next, decoder 200 capable of decoding a stream output from encoder 100 described above is described. FIG. 67 is a block diagram illustrating a configuration of decoder 200 according to this embodiment. Decoder 200 is an apparatus which decodes a stream that is an encoded image in units of a block.

As illustrated in FIG. 67, decoder 200 includes entropy decoder 202, inverse quantizer 204, inverse transformer 206, adder 208, block memory 210, loop filter 212, frame memory 214, intra predictor 216, inter predictor 218, prediction controller 220, prediction parameter generator 222, and splitting determiner 224. It is to be noted that intra predictor 216 and inter predictor 218 are configured as part of a prediction executor.

(Mounting Example of Decoder)

Figure 68:
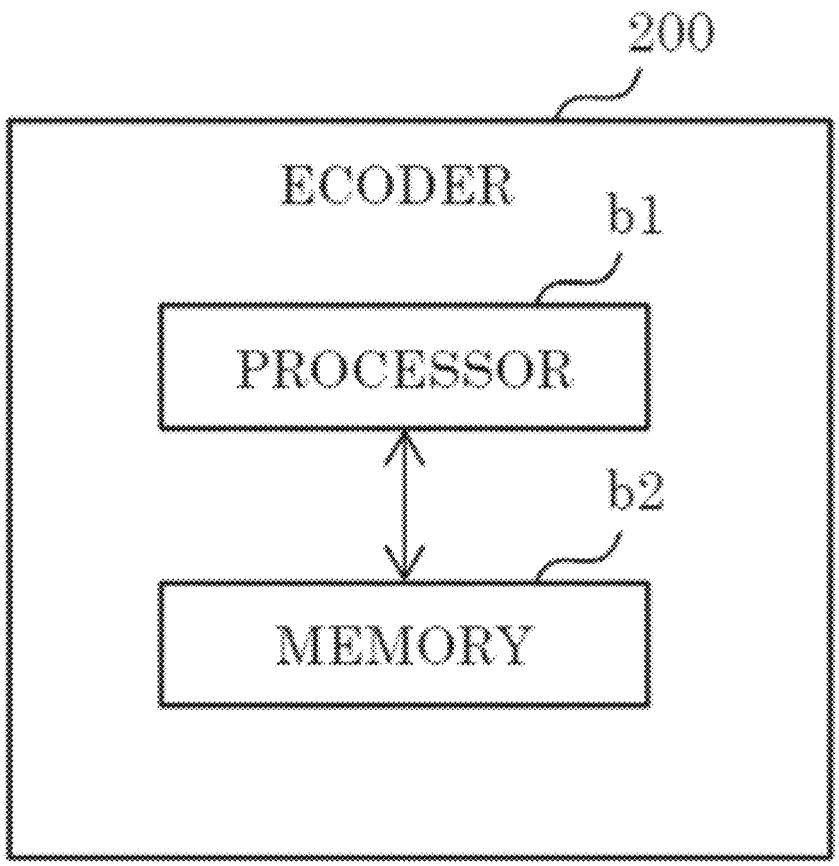
FIG. 68 is a functional block diagram illustrating a mounting example of a decoder.

FIG. 68 is a functional block diagram illustrating a mounting example of decoder 200. Decoder 200 includes processor b1 and memory b2. For example, the plurality of constituent elements of decoder 200 illustrated in FIG. 67 are mounted on processor b1 and memory b2 illustrated in FIG. 68.

Processor b1 is circuitry which performs information processing and is coupled to memory b2. For example, processor b1 is a dedicated or general electronic circuit which decodes a stream. Processor b1 may be a processor such as a CPU. In addition, processor b1 may be an aggregate of a plurality of electronic circuits. In addition, for example, processor b1 may take the roles of two or more constituent elements other than a constituent element for storing information out of the plurality of constituent elements of decoder 200 illustrated in FIG. 67, etc.

Memory b2 is dedicated or general memory for storing information that is used by processor b1 to decode a stream. Memory b2 may be electronic circuitry, and may be connected to processor b1. In addition, memory b2 may be included in processor b1. In addition, memory b2 may be an aggregate of a plurality of electronic circuits. In addition, memory b2 may be a magnetic disc, an optical disc, or the like, or may be represented as a storage, a recording medium, or the like. In addition, memory b2 may be a non-volatile memory, or a volatile memory.

For example, memory b2 may store an image or a stream. In addition, memory b2 may store a program for causing processor b1 to decode a stream.

In addition, for example, memory b2 may take the roles of two or more constituent elements for storing information out of the plurality of constituent elements of decoder 200 illustrated in FIG. 67, etc. More specifically, memory b2 may take the roles of block memory 210 and frame memory 214 illustrated in FIG. 67. More specifically, memory b2 may store a reconstructed image (specifically, a reconstructed block, a reconstructed picture, or the like).

It is to be noted that, in decoder 200, not all of the plurality of constituent elements illustrated in FIG. 67, etc. may be implemented, and not all the processes described herein may be performed. Part of the constituent elements indicated in FIG. 67, etc. may be included in another device, or part of the processes described herein may be performed by another device.

Hereinafter, an overall flow of the processes performed by decoder 200 is described, and then each of the constituent elements included in decoder 200 is described. It is to be noted that, some of the constituent elements included in decoder 200 perform the same processes as performed by some of encoder 100, and thus the same processes are not repeatedly described in detail. For example, inverse quantizer 204, inverse transformer 206, adder 208, block memory 210, frame memory 214, intra predictor 216, inter predictor 218, prediction controller 220, and loop filter 212 included in decoder 200 perform similar processes as performed by inverse quantizer 112, inverse transformer 114, adder 116, block memory 118, frame memory 122, intra predictor 124, inter predictor 126, prediction controller 128, and loop filter 120 included in decoder 200, respectively.

(Overall Flow of Decoding Process)

Figure 69:
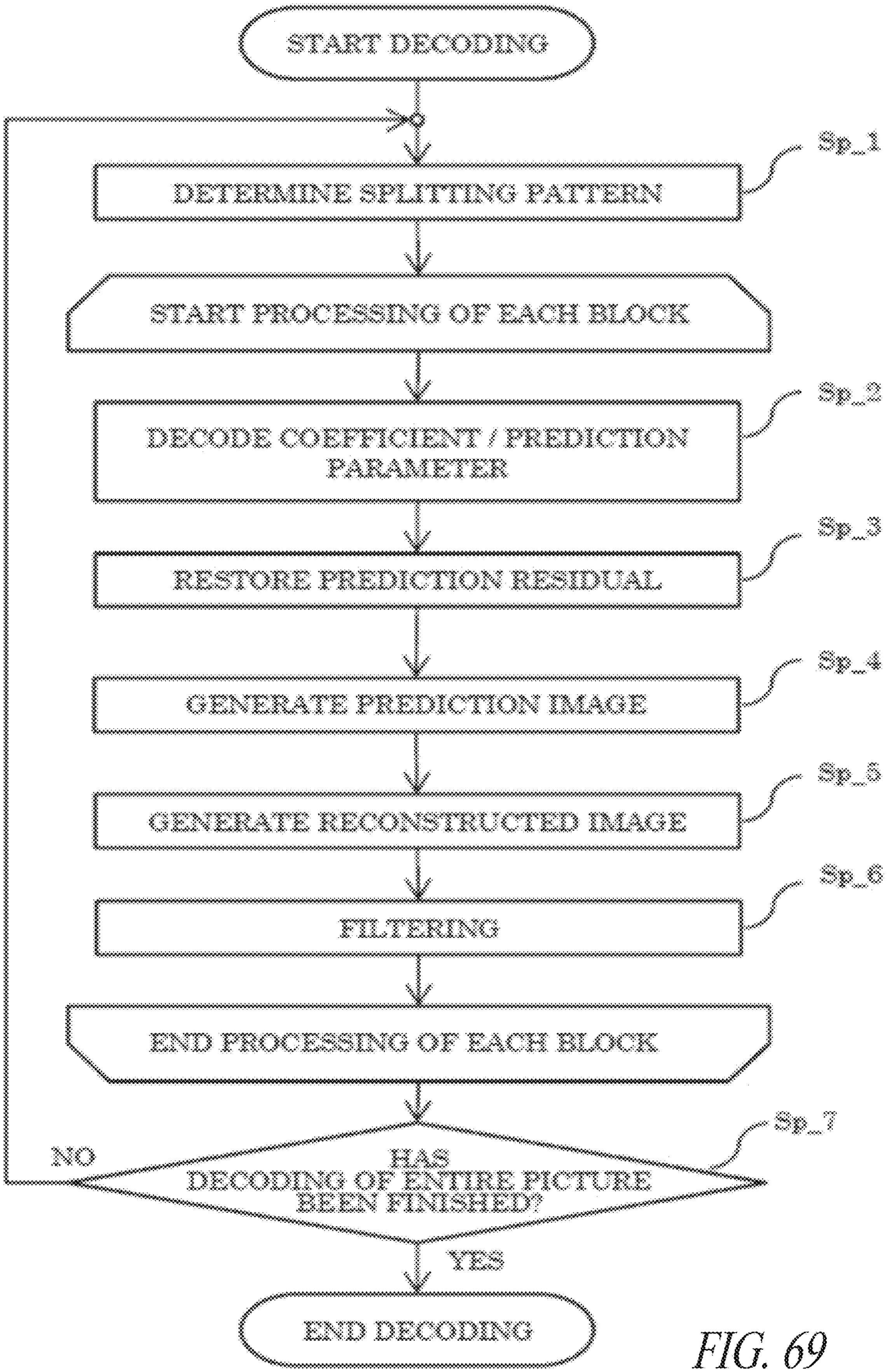
FIG. 69 is a flow chart illustrating one example of an overall decoding process performed by the decoder.

FIG. 69 is a flow chart illustrating one example of an overall decoding process performed by decoder 200.

First, splitting determiner 224 in decoder 200 determines a splitting pattern of each of a plurality of fixed-size blocks (128×128 pixels) included in a picture, based on a parameter which is input from entropy decoder 202 (Step Sp_1). This splitting pattern is a splitting pattern selected by encoder 100. Decoder 200 then performs processes of Step Sp_2 to Sp_6 for each of a plurality of blocks of the splitting pattern.

Entropy decoder 202 decodes (specifically, entropy decodes) encoded quantized coefficients and a prediction parameter of a current block (Step Sp_2).

Next, inverse quantizer 204 performs inverse quantization of the plurality of quantized coefficients and inverse transformer 206 performs inverse transform of the result, to restore prediction residuals (that is, a difference block) (Step Sp_3).

Next, the prediction executor including all or part of intra predictor 216, inter predictor 218, and prediction controller 220 generates a prediction signal of the current block (Step Sp_4).

Next, adder 208 adds the prediction image to a prediction residual to generate a reconstructed image (also referred to as a decoded image block) of the current block (Step Sp_5).

When the reconstructed image is generated, loop filter 212 performs filtering of the reconstructed image (Step Sp_6).

Decoder 200 then determines whether decoding of the entire picture has been finished (Step Sp_7). When determining that the decoding has not yet been finished (No in Step Sp_7), decoder 200 repeats to the processes starting with Step Sp_1.

It is to be noted that the processes of these Steps Sp_1 to Sp_7 may be performed sequentially by decoder 200, or two or more of the processes may be performed in parallel. The processing order of the two or more of the processes may be modified.

(Splitting Determiner)

Figure 70:
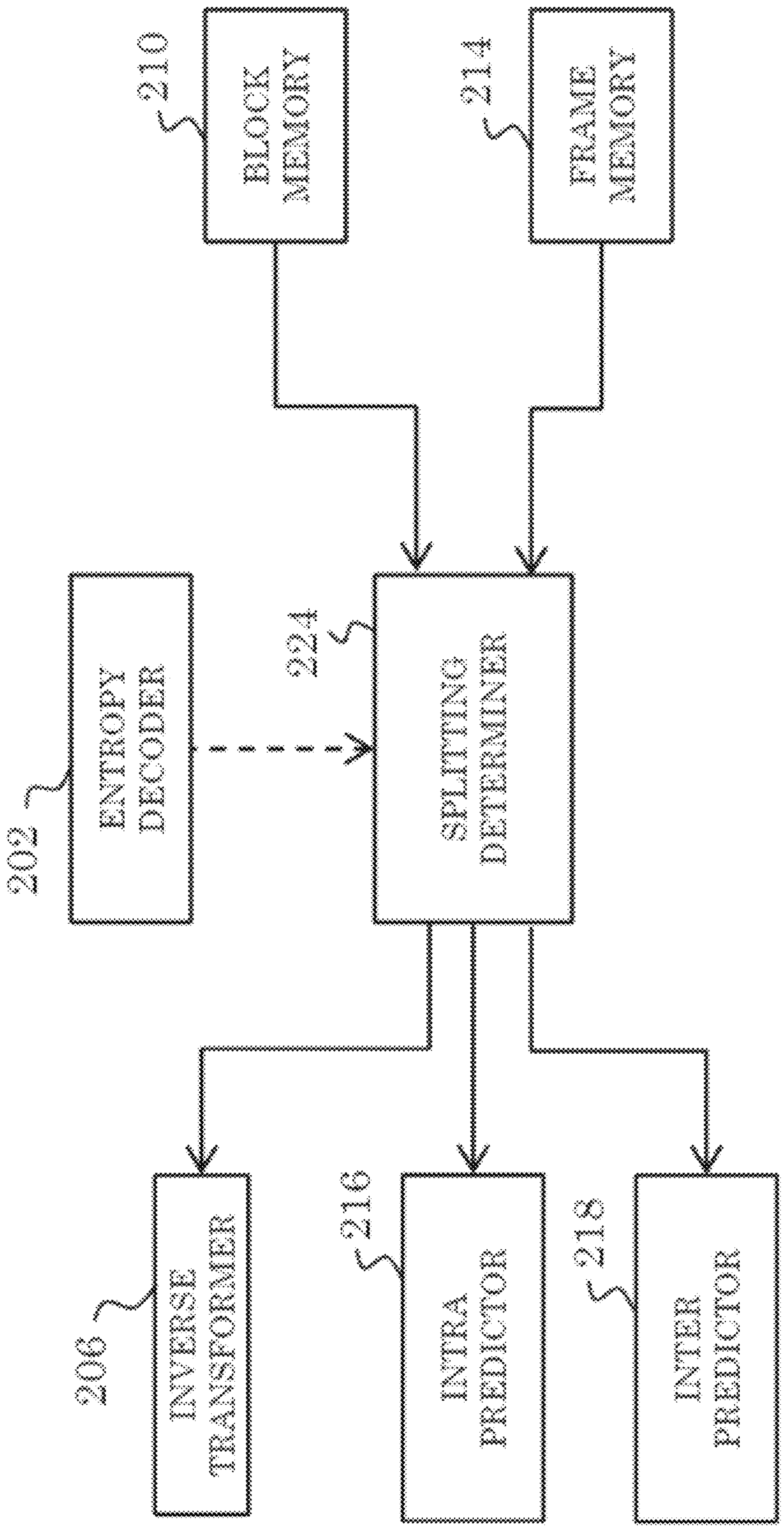
FIG. 70 is a conceptual diagram for illustrating a relationship between a splitting determiner and other constituent elements.

FIG. 70 is a conceptual diagram for illustrating a relationship between splitting determiner 224 and other constituent elements in an embodiment. Splitting determiner 224 may perform the following processes as examples.

For example, splitting determiner 224 collects block information from block memory 210 or frame memory 214, and furthermore obtains a parameter from entropy decoder 202. Splitting determiner 224 may then determine the splitting pattern of a fixed-size block, based on the block information and the parameter. Splitting determiner 224 may then output the information indicating the determined splitting pattern to inverse transformer 206, intra predictor 216, and inter predictor 218. Inverse transformer 206 may perform inverse transform of transform coefficients, based on the splitting pattern indicated by the information from splitting determiner 224. Intra predictor 216 and inter predictor 218 may generate a prediction image, based on the splitting pattern indicated by the information from splitting determiner 224.

(Entropy Decoder)

Figure 71:
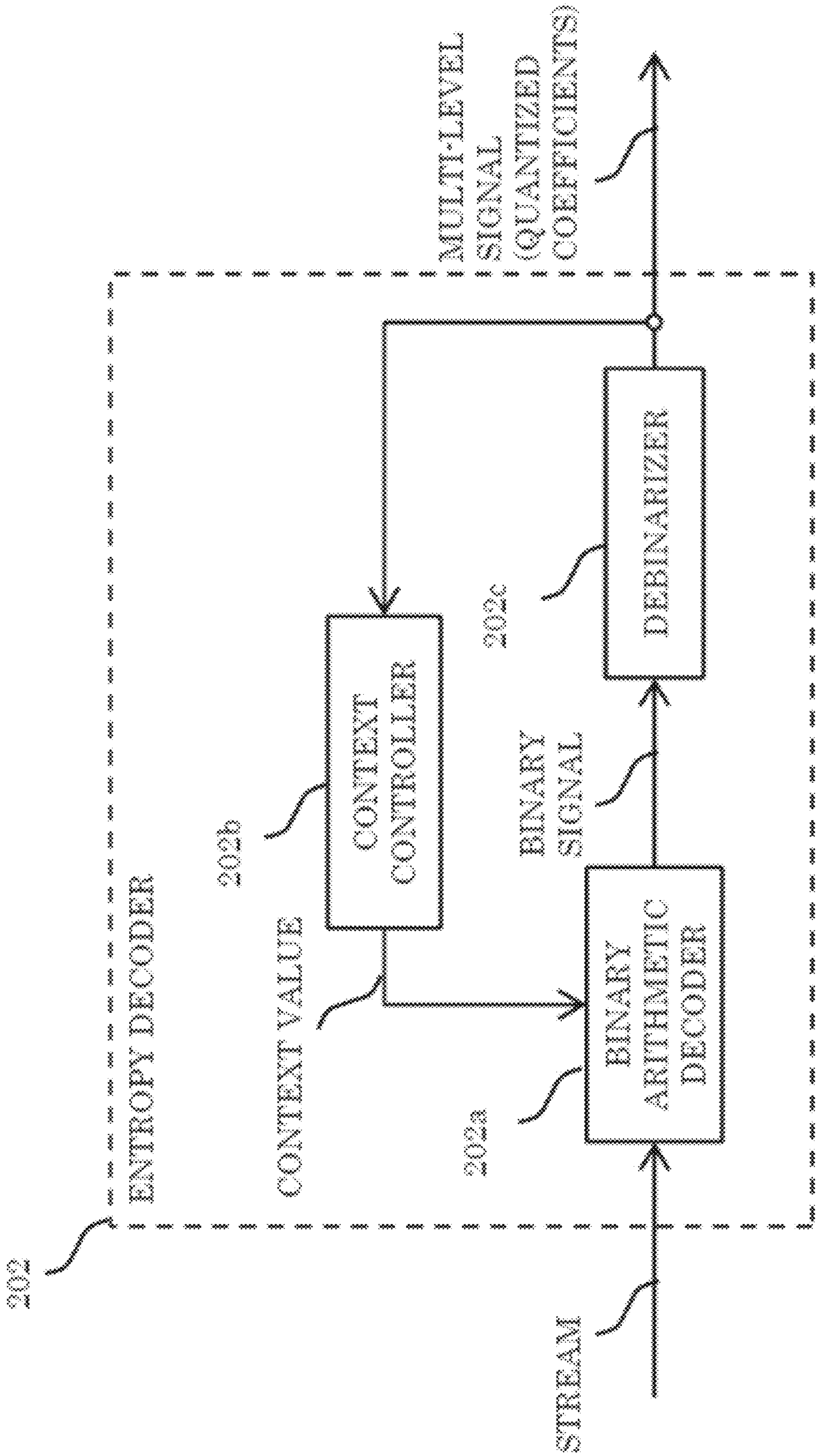
FIG. 71 is a block diagram illustrating one example of a configuration of an entropy decoder.

FIG. 71 is a block diagram illustrating one example of a configuration of entropy decoder 202.

Entropy decoder 202 generates quantized coefficients, a prediction parameter, and a parameter related to a splitting pattern, by entropy decoding the stream. For example, CABAC is used in the entropy decoding. More specifically, entropy decode 202 includes, for example, binary arithmetic decoder 202*a*, context controller 202*b*, and debinarizer 202*c*. Binary arithmetic decoder 202*a* arithmetically decodes the stream using a context value derived by context controller 202*b* to a binary signal. Context controller 202*b* derives a context value according to a feature or a surrounding state of a syntax element, that is an occurrence probability of a binary signal, in the same manner as performed by context controller 110*b* of encoder 100. Debinarizer 202*c* performs debinarization for transforming the binary signal output from binary arithmetic decoder 202*a* to a multi-level signal indicating quantized coefficients as described above. This binarization may be performed according to the binarization method described above.

With this, entropy decoder 202 outputs quantized coefficients of each block to inverse quantizer 204. Entropy decoder 202 may output a prediction parameter included in a stream (see FIG. 1) to intra predictor 216, inter predictor 218, and prediction controller 220. Intra predictor 216, inter predictor 218, and prediction controller 220 are capable of executing the same prediction processes as those performed by intra predictor 124, inter predictor 126, and prediction controller 128 at the encoder 100 side.

Figure 72:
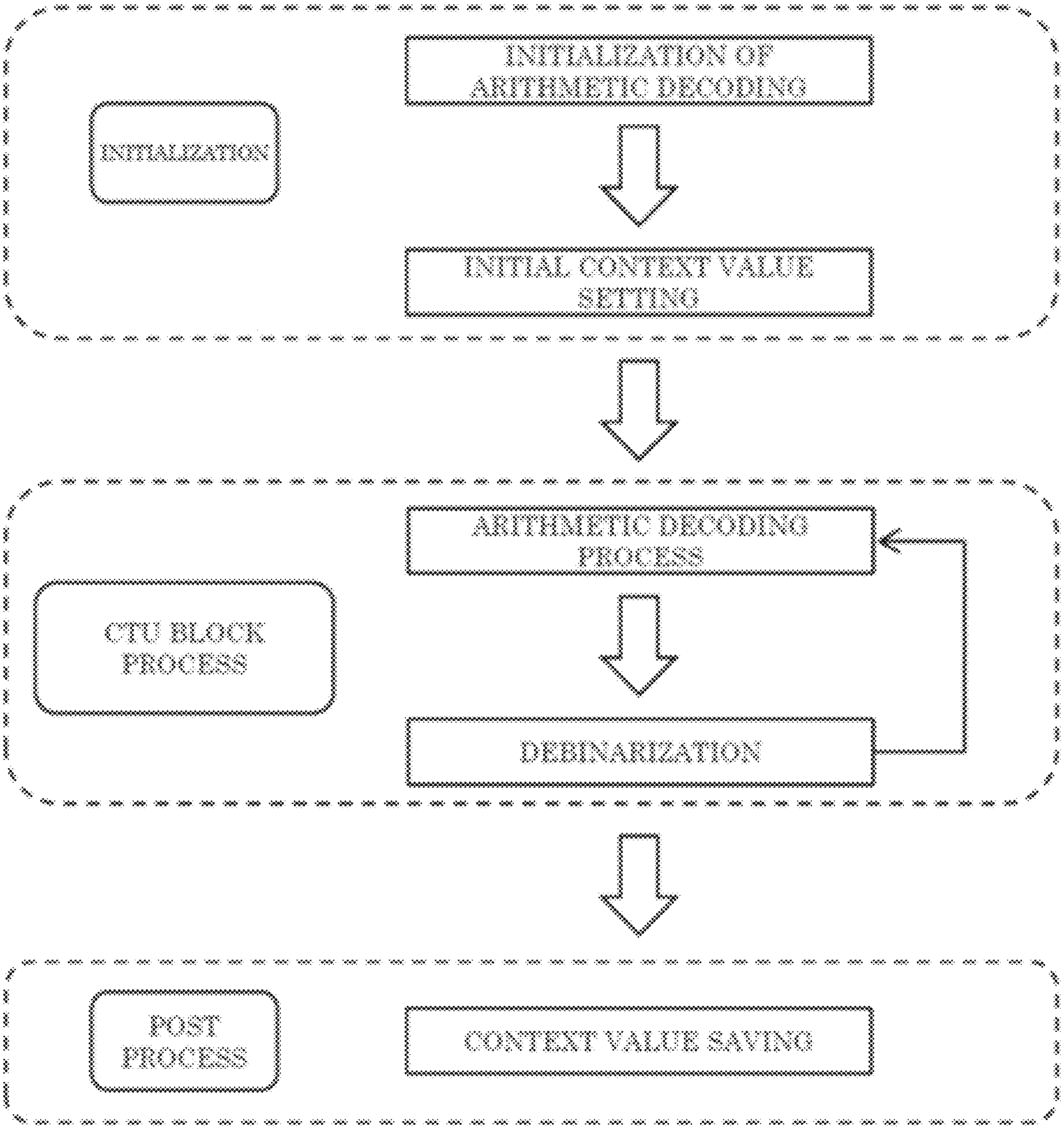
FIG. 72 is a conceptual diagram for illustrating an example flow of a CABAC process in the entropy decoder.

FIG. 72 is a conceptual diagram for illustrating a flow of an example CABAC process in entropy decoder 202.

First, initialization is performed in CABAC in entropy decoder 202. In the initialization, initialization in binary arithmetic decoder 202*a* and setting of an initial context value are performed. Binary arithmetic decoder 202*a* and debinarizer 202*c* then execute arithmetic decoding and debinarization of, for example, encoded data of a CTU. At this time, context controller 202*b* updates the context value each time arithmetic decoding is performed. Context controller 202*b* then saves the context value as a post process. The saved context value is used, for example, to initialize the context value for the next CTU.

(Inverse Quantizer)

Inverse quantizer 204 inverse quantizes quantized coefficients of a current block which are inputs from entropy decoder 202. More specifically, inverse quantizer 204 inverse quantizes the quantized coefficients of the current block, based on quantization parameters corresponding to the quantized coefficients. Inverse quantizer 204 then outputs the inverse quantized transform coefficients (that are transform coefficients) of the current block to inverse transformer 206.

Figure 73:
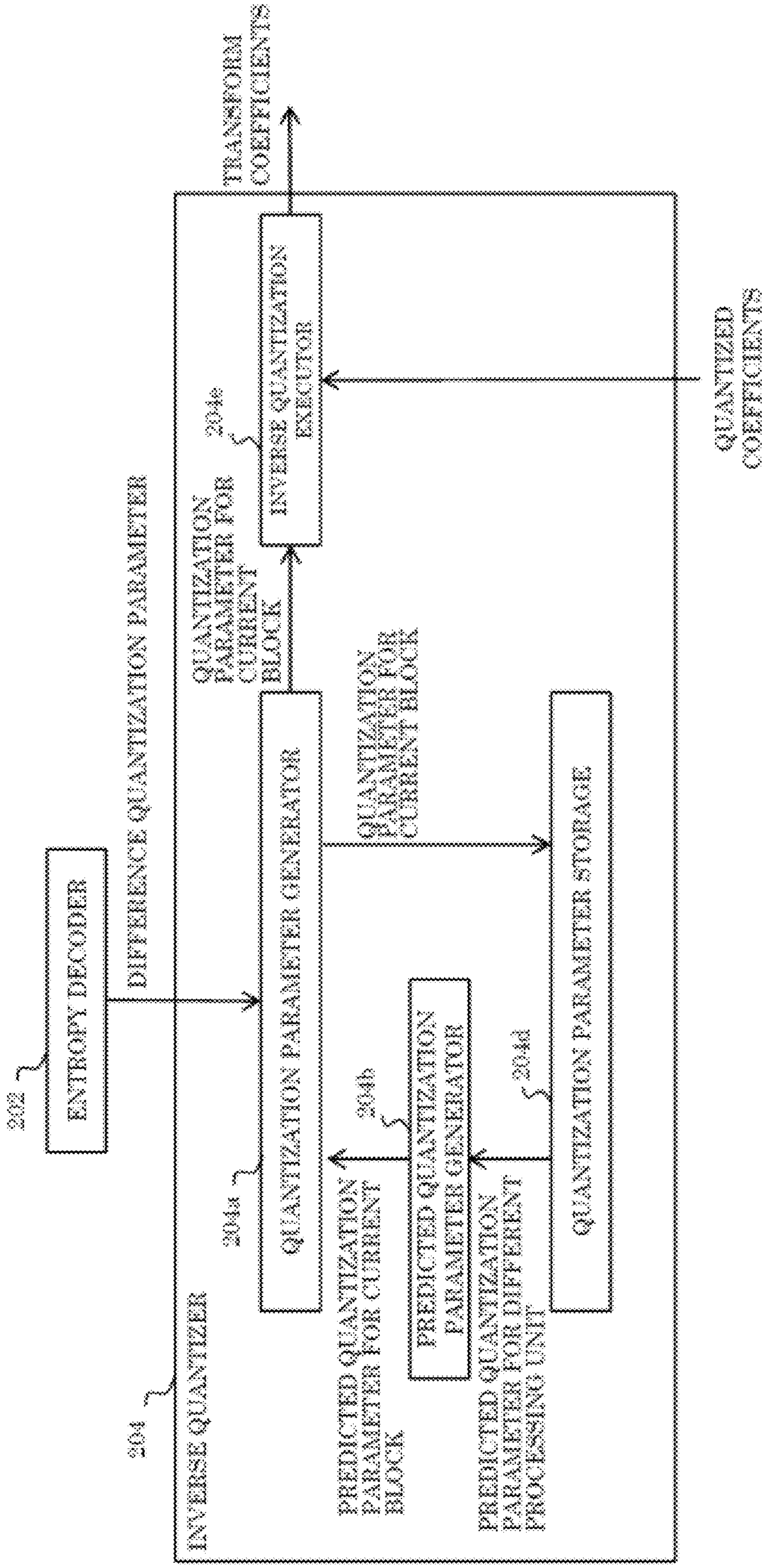
FIG. 73 is a block diagram illustrating one example of a configuration of an inverse quantizer.

FIG. 73 is a block diagram illustrating one example of a configuration of inverse quantizer 204.

Inverse quantizer 204 includes, for example, quantization parameter generator 204*a*, predicted quantization parameter generator 204*b*, quantization parameter storage 204*d*, and inverse quantization executor 204*e*.

Figure 74:
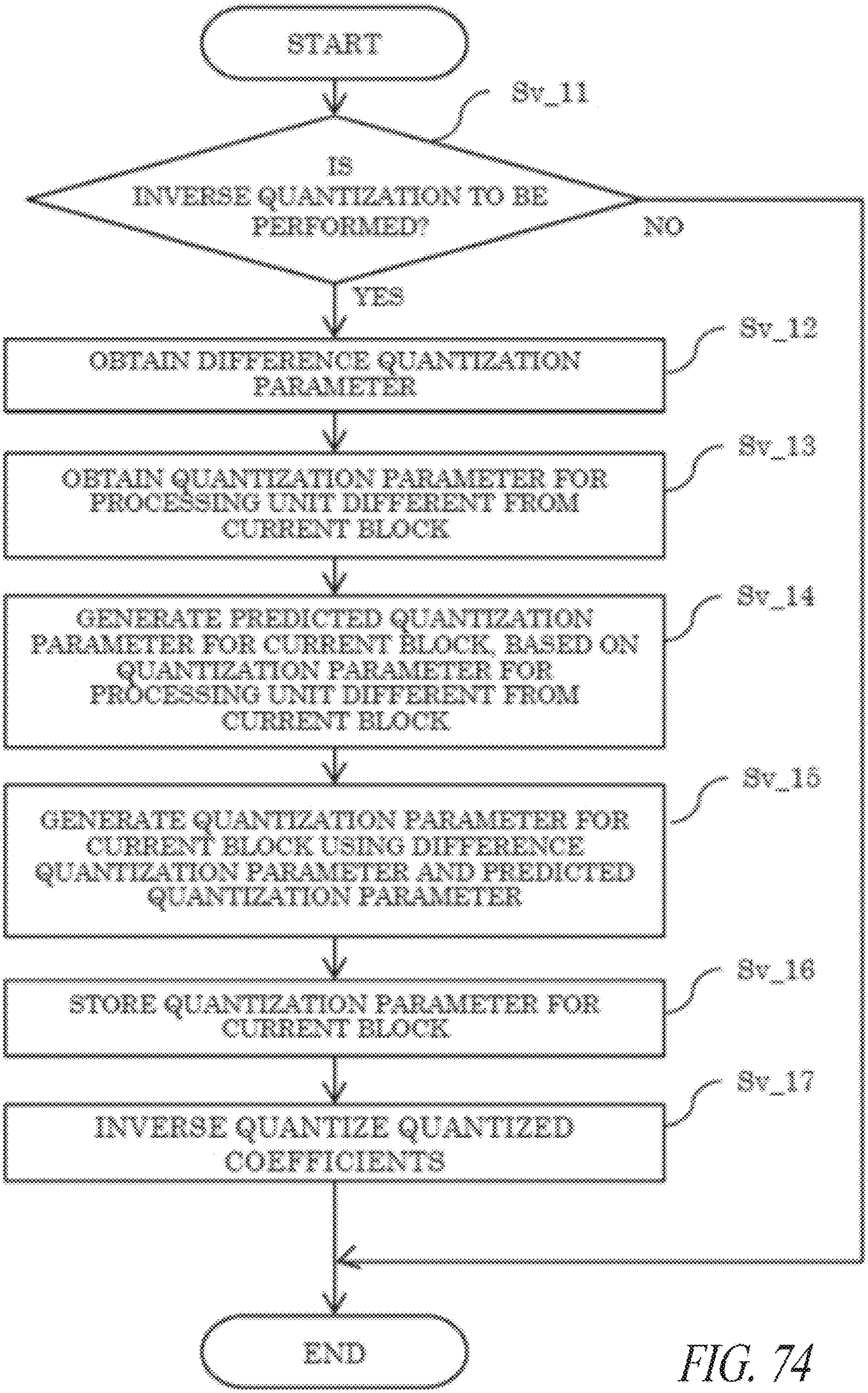
FIG. 74 is a flow chart illustrating one example of a process of inverse quantization performed by the inverse quantizer.

FIG. 74 is a flow chart illustrating one example of a process of inverse quantization performed by inverse quantizer 204.

Inverse quantizer 204 may perform an inverse quantization process as one example for each CU based on the flow illustrated in FIG. 74. More specifically, quantization parameter generator 204*a* determines whether to perform inverse quantization (Step Sv_11). Here, when determining to perform inverse quantization (Yes in Step Sv_11), quantization parameter generator 204*a* obtains a difference quantization parameter for the current block from entropy decoder 202 (Step Sv_12).

Next, predicted quantization parameter generator 204*b* then obtains a quantization parameter for a processing unit different from the current block from quantization parameter storage 204*d* (Step Sv_13). Predicted quantization parameter generator 204*b* generates a predicted quantization parameter of the current block based on the obtained quantization parameter (Step Sv_14).

Quantization parameter generator 204*a* then generates a quantization parameter for the current block based on the difference quantization parameter for the current block obtained from entropy decoder 202 and the predicted quantization parameter for the current block generated by predicted quantization parameter generator 204*b* (Step Sv_15). For example, the difference quantization parameter for the current block obtained from entropy decoder 202 and the predicted quantization parameter for the current block generated by predicted quantization parameter generator 204*b* may be added together to generate the quantization parameter for the current block. In addition, quantization parameter generator 204*a* stores the quantization parameter for the current block in quantization parameter storage 204*d* (Step Sv_16).

Next, inverse quantization executor 204*e* inverse quantizes the quantized coefficients of the current block into transform coefficients, using the quantization parameter generated in Step Sv_15 (Step Sv_17).

It is to be noted that the difference quantization parameter may be decoded at the bit sequence level, picture level, slice level, brick level, or CTU level. In addition, the initial value of the quantization parameter may be decoded at the sequence level, picture level, slice level, brick level, or CTU level. At this time, the quantization parameter may be generated using the initial value of the quantization parameter and the difference quantization parameter.

It is to be noted that inverse quantizer 204 may include a plurality of inverse quantizers, and may inverse quantize the quantized coefficients using an inverse quantization method selected from a plurality of inverse quantization methods.

(Inverse Transformer)

Inverse transformer 206 restores prediction residuals by inverse transforming the transform coefficients which are inputs from inverse quantizer 204.

For example, when information parsed from a stream indicates that EMT or AMT is to be applied (for example, when an AMT flag is true), inverse transformer 206 inverse transforms the transform coefficients of the current block based on information indicating the parsed transform type.

Moreover, for example, when information parsed from a stream indicates that NSST is to be applied, inverse transformer 206 applies a secondary inverse transform to the transform coefficients.

Figure 75:
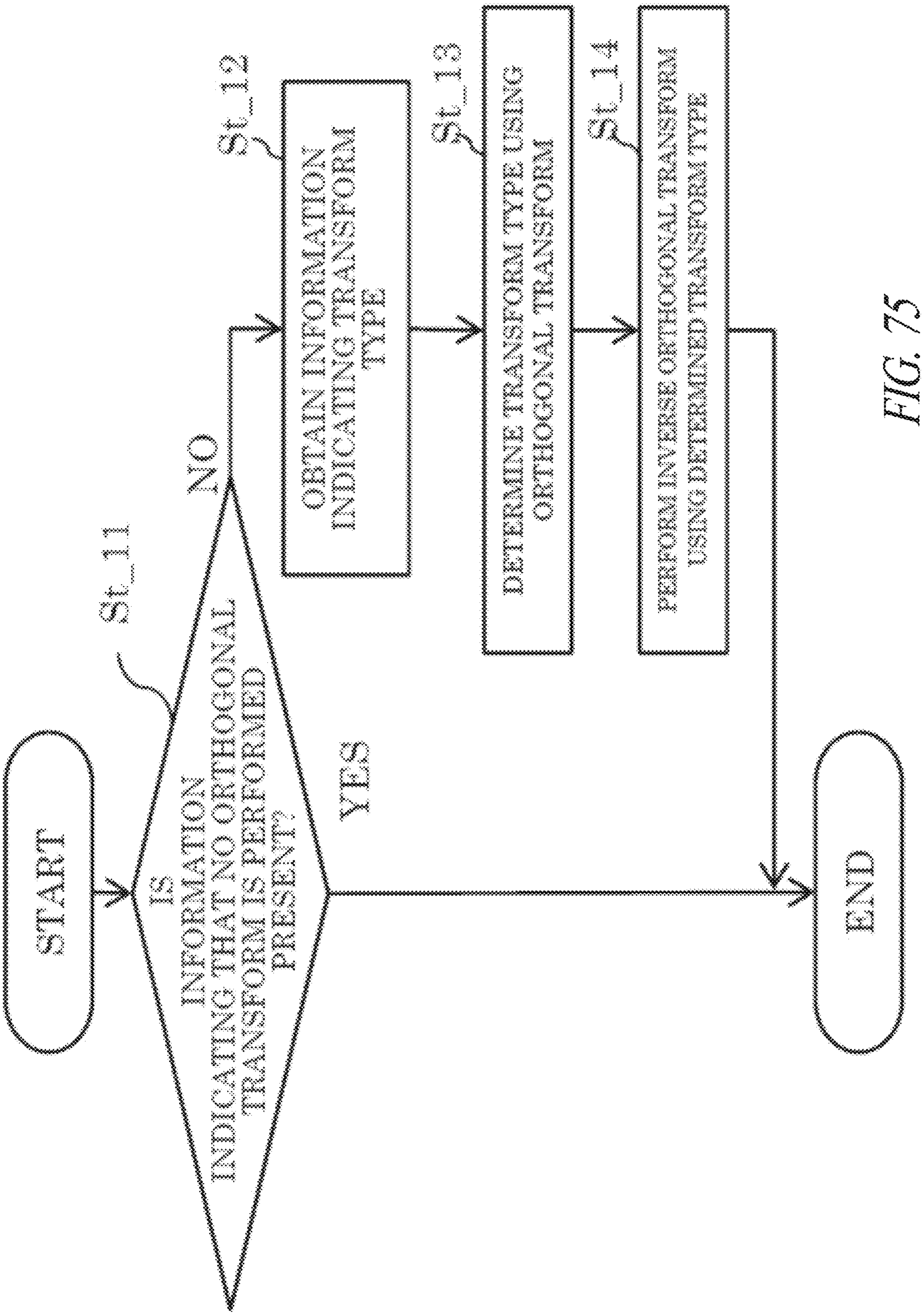
FIG. 75 is a flow chart illustrating one example of a process performed by an inverse transformer.

FIG. 75 is a flow chart illustrating one example of a process performed by inverse transformer 206.

For example, inverse transformer 206 determines whether information indicating that no orthogonal transform is performed is present in a stream (Step St_11). Here, when determining that no such information is present (No in Step St_11) (e.g.: the absence of any indication as to whether an orthogonal transform is performed; the presence of an indication that an orthogonal transform is to be performed); inverse transformer 206 obtains the information indicating the transform type decoded by entropy decoder 202 (Step St_12). Next, based on the information, inverse transformer 206 determines the transform type used for the orthogonal transform in encoder 100 (Step St_13). Inverse transformer 206 then performs inverse orthogonal transform using the determined transform type (Step St_14). As illustrated in FIG. 75, when determining that information indicating that no orthogonal transform is performed is present (Yes in Step St_11) (e.g., an express indication that no orthogonal transform is performed; the absence of an indication an orthogonal transform is performed), no orthogonal transform is performed.

Figure 76:
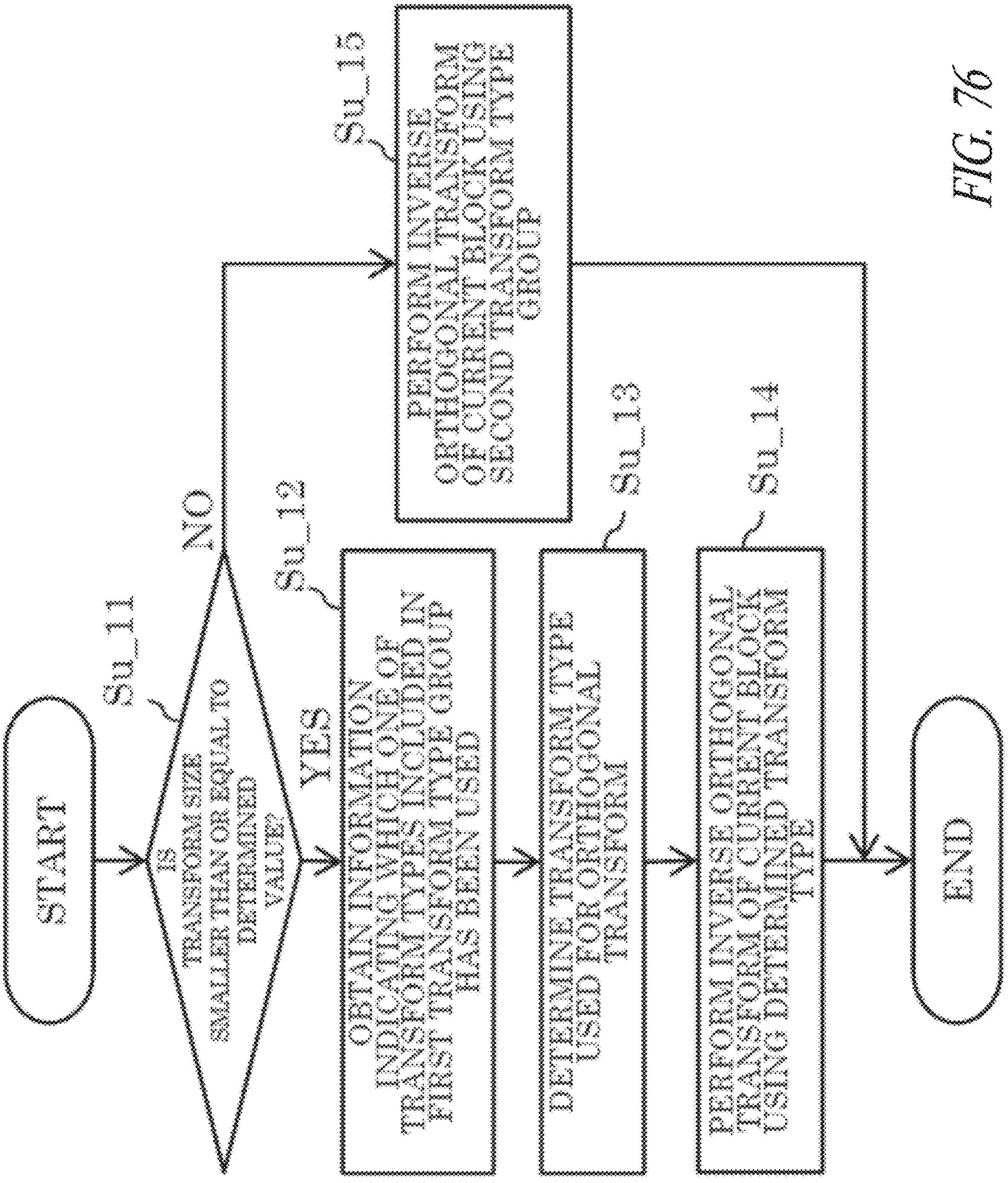
FIG. 76 is a flow chart illustrating another example of a process performed by the inverse transformer.

FIG. 76 is a flow chart illustrating one example of a process performed by inverse transformer 206.

For example, inverse transformer 206 determines whether a transform size is smaller than or equal to a determined value (Step Su_11). The determined value may be predetermined. Here, when determining that the transform size is smaller than or equal to a determined value (Yes in Step Su_11), inverse transformer 206 obtains, from entropy decoder 202, information indicating which transform type has been used by encoder 100 among the at least one transform type included in the first transform type group (Step Su_12). It is to be noted that such information is decoded by entropy decoder 202 and output to inverse transformer 206.

Based on the information, inverse transformer 206 determines the transform type used for the orthogonal transform in encoder 100 (Step Su_13). Inverse transformer 206 then inverse orthogonal transforms the transform coefficients of the current block using the determined transform type (Step Su_14). When determining that a transform size is not smaller than or equal to the determined value (No in Step Su_11), inverse transformer 206 inverse transforms the transform coefficients of the current block using the second transform type group (Step Su_15).

It is to be noted that the inverse orthogonal transform by inverse transformer 206 may be performed according to the flow illustrated in FIG. 75 or FIG. 76 for each TU as one example. In addition, inverse orthogonal transform may be performed by using a defined transform type without decoding information indicating a transform type used for orthogonal transform. The defined transform type may be a predefined transform type or a default transform type. In addition, the transform type may be specifically DST7, DCT8, or the like. In an inverse orthogonal transform, an inverse transform basis function corresponding to the transform type is used.

(Adder)

Adder 208 reconstructs the current block by adding a prediction residual which is an input from inverse transformer 206 and a prediction image which is an input from prediction controller 220. In other words, a reconstructed image of the current block is generated. Adder 208 then outputs the reconstructed image of the current block to block memory 210 and loop filter 212.

(Block Memory)

Block memory 210 is storage for storing a block which is included in a current picture and may be referred to in intra prediction. More specifically, block memory 210 stores a reconstructed image output from adder 208.

(Loop Filter)

Loop filter 212 applies a loop filter to the reconstructed image generated by adder 208, and outputs the filtered reconstructed image to frame memory 214 and provides an output of the decoder 200, e.g., and output to a display device, etc.

When information indicating ON or OFF of an ALF parsed from a stream indicates that an ALF is ON, one filter from among a plurality of filters may be selected, for example, based on the direction and activity of local gradients, and the selected filter is applied to the reconstructed image.

Figure 77:
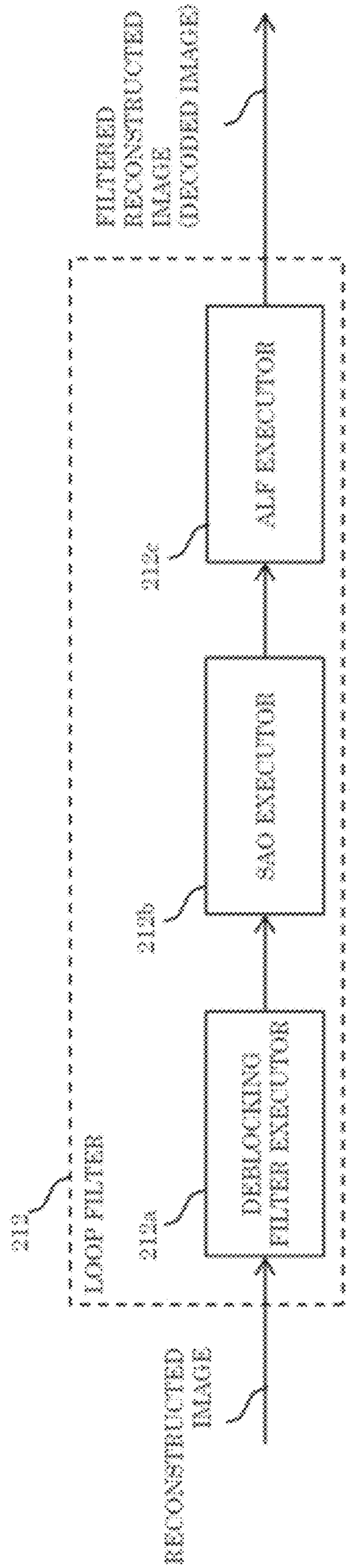
FIG. 77 is a block diagram illustrating one example of a configuration of a loop filter.

FIG. 77 is a block diagram illustrating one example of a configuration of loop filter 212. It is to be noted that loop filter 212 has a configuration similar to the configuration of loop filter 120 of encoder 100.

For example, as illustrated in FIG. 77, loop filter 212 includes deblocking filter executor 212*a*, SAO executor 212*b*, and ALF executor 212*c*. Deblocking filter executor 212*a* performs a deblocking filter process on the reconstructed image. SAO executor 212*b* performs a SAO process on the reconstructed image after being subjected to the deblocking filter process. ALF executor 212*c* performs an ALF process on the reconstructed image after being subjected to the SAO process. It is to be noted that loop filter 212 does not always need to include all the constituent elements disclosed in FIG. 77, and may include only part of the constituent elements. In addition, loop filter 212 may be configured to perform the above processes in a processing order different from the one disclosed in FIG. 77, may not perform all of the processes illustrated in FIG. 77, etc.

(Frame Memory)

Frame memory 214 is, for example, storage for storing reference pictures for use in inter prediction, and may also be referred to as a frame buffer. More specifically, frame memory 214 stores a reconstructed image filtered by loop filter 212.

(Predictor (Intra Predictor, Inter Predictor, Prediction Controller))

Figure 78:
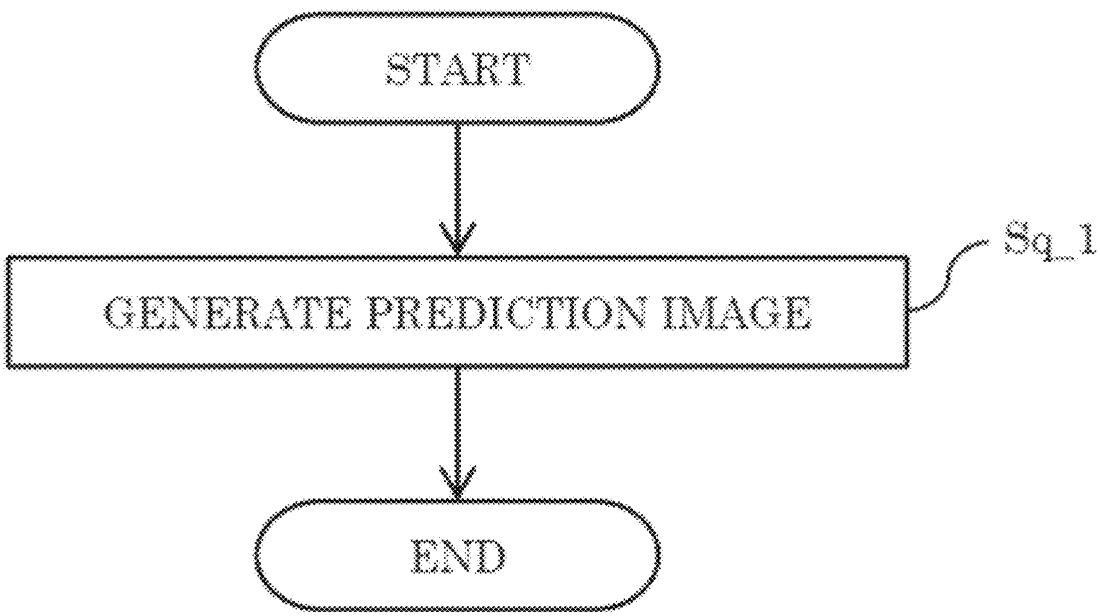
FIG. 78 is a flow chart illustrating one example of a process performed by a predictor of the decoder.

FIG. 78 is a flow chart illustrating one example of a process performed by a predictor of decoder 200. It is to be noted that the prediction executor may include all or part of the following constituent elements: intra predictor 216; inter predictor 218; and prediction controller 220. The prediction executor includes, for example, intra predictor 216 and inter predictor 218.

The predictor generates a prediction image of a current block (Step Sq_1). This prediction image is also referred to as a prediction signal or a prediction block. It is to be noted that the prediction signal is, for example, an intra prediction signal or an inter prediction signal. More specifically, the predictor generates the prediction image of the current block using a reconstructed image which has been already obtained for another block through generation of a prediction image, restoration of a prediction residual, and addition of a prediction image. The predictor of decoder 200 generates the same prediction image as the prediction image generated by the predictor of encoder 100. In other words, the prediction images are generated according to a method common between the predictors or mutually corresponding methods.

The reconstructed image may be, for example, an image in a reference picture, or an image of a decoded block (that is, the other block described above) in a current picture which is the picture including the current block. The decoded block in the current picture is, for example, a neighboring block of the current block.

Figure 79:
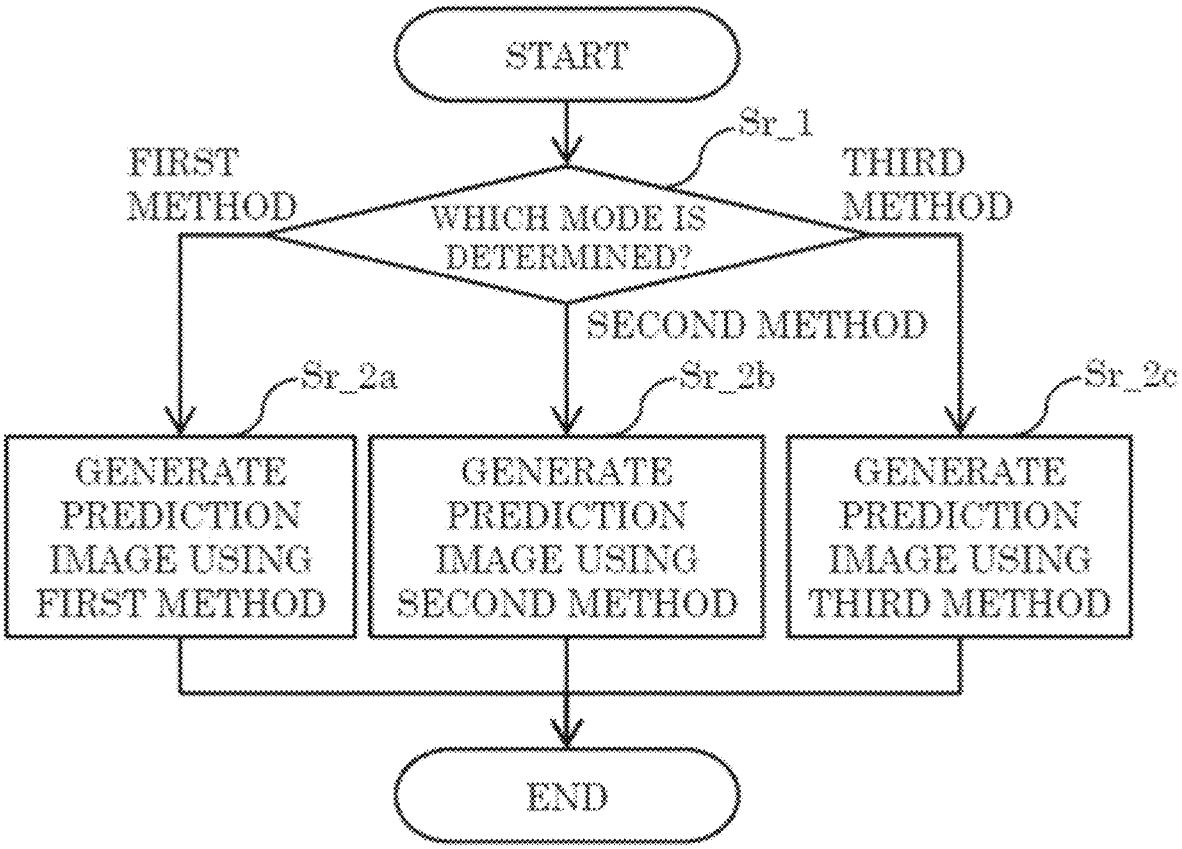
FIG. 79 is a flow chart illustrating another example of a process performed by the predictor of the decoder.

FIG. 79 is a flow chart illustrating another example of a process performed by the predictor of decoder 200.

The predictor determines either a method or a mode for generating a prediction image (Step Sr_1). For example, the method or mode may be determined based on, for example, a prediction parameter, etc.

When determining a first method as a mode for generating a prediction image, the predictor generates a prediction image according to the first method (Step Sr_2 a). When determining a second method as a mode for generating a prediction image, the predictor generates a prediction image according to the second method (Step Sr_2 b). When determining a third method as a mode for generating a prediction image, the predictor generates a prediction image according to the third method (Step Sr_2 c).

The first method, the second method, and the third method may be mutually different methods for generating a prediction image. Each of the first to third methods may be an inter prediction method, an intra prediction method, or another prediction method. The above-described reconstructed image may be used in these prediction methods.

Figure 80A:
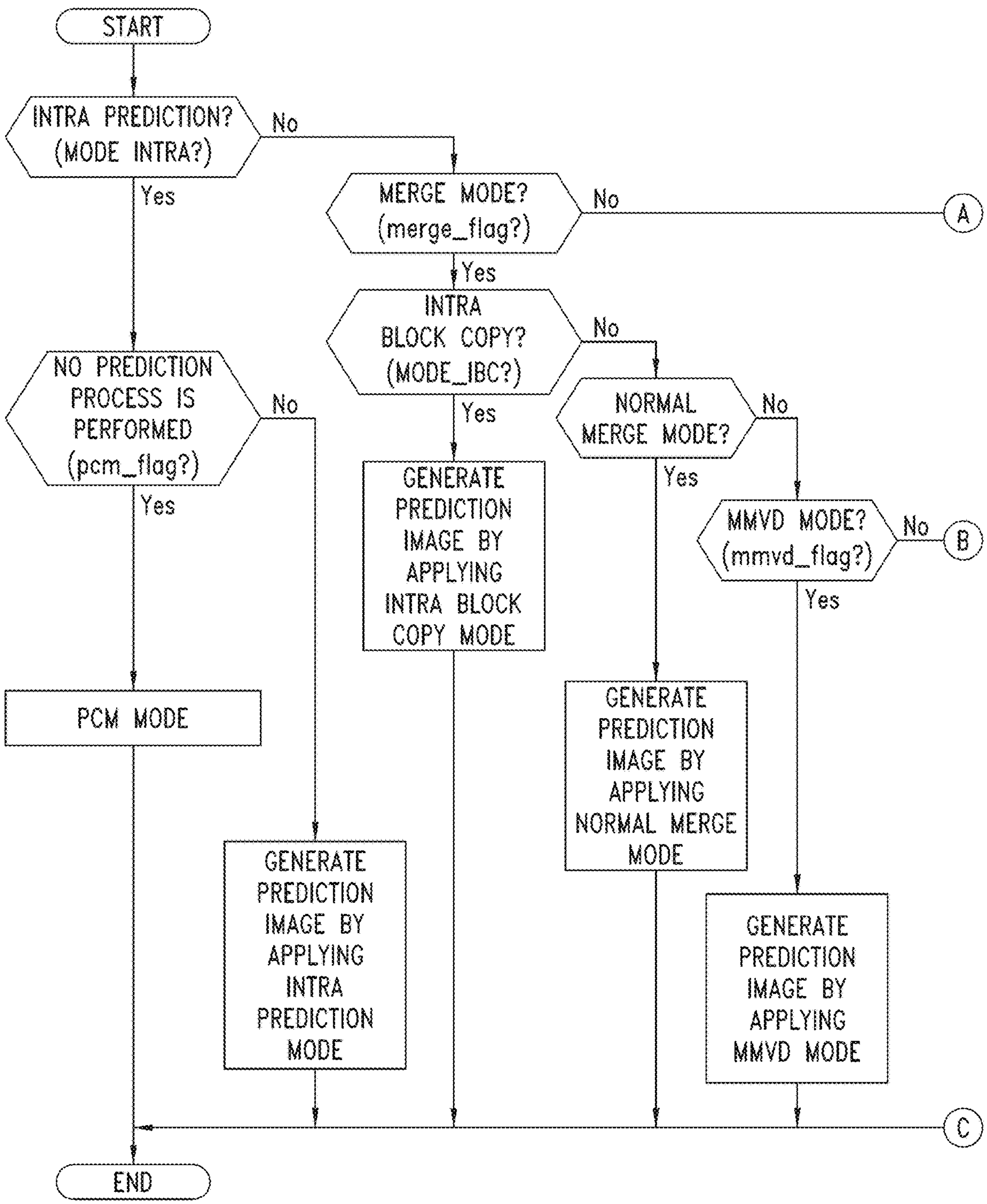
FIG. 80A is a flow chart illustrating another example of a process performed by the predictor of the decoder.
Figure 80B:
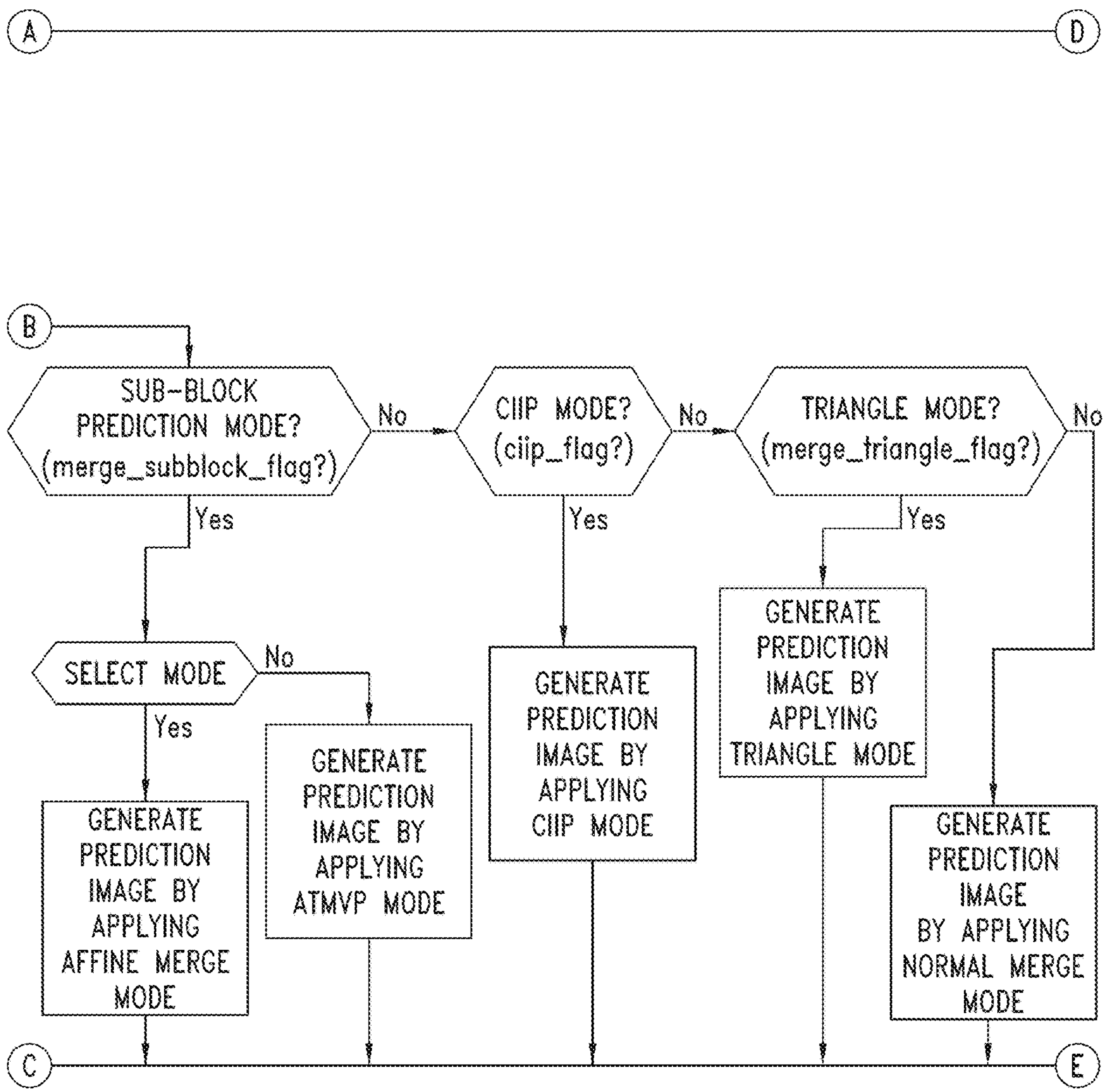
FIG. 80B is a flow chart illustrating another example of a process performed by the predictor of the decoder.
Figure 80C:
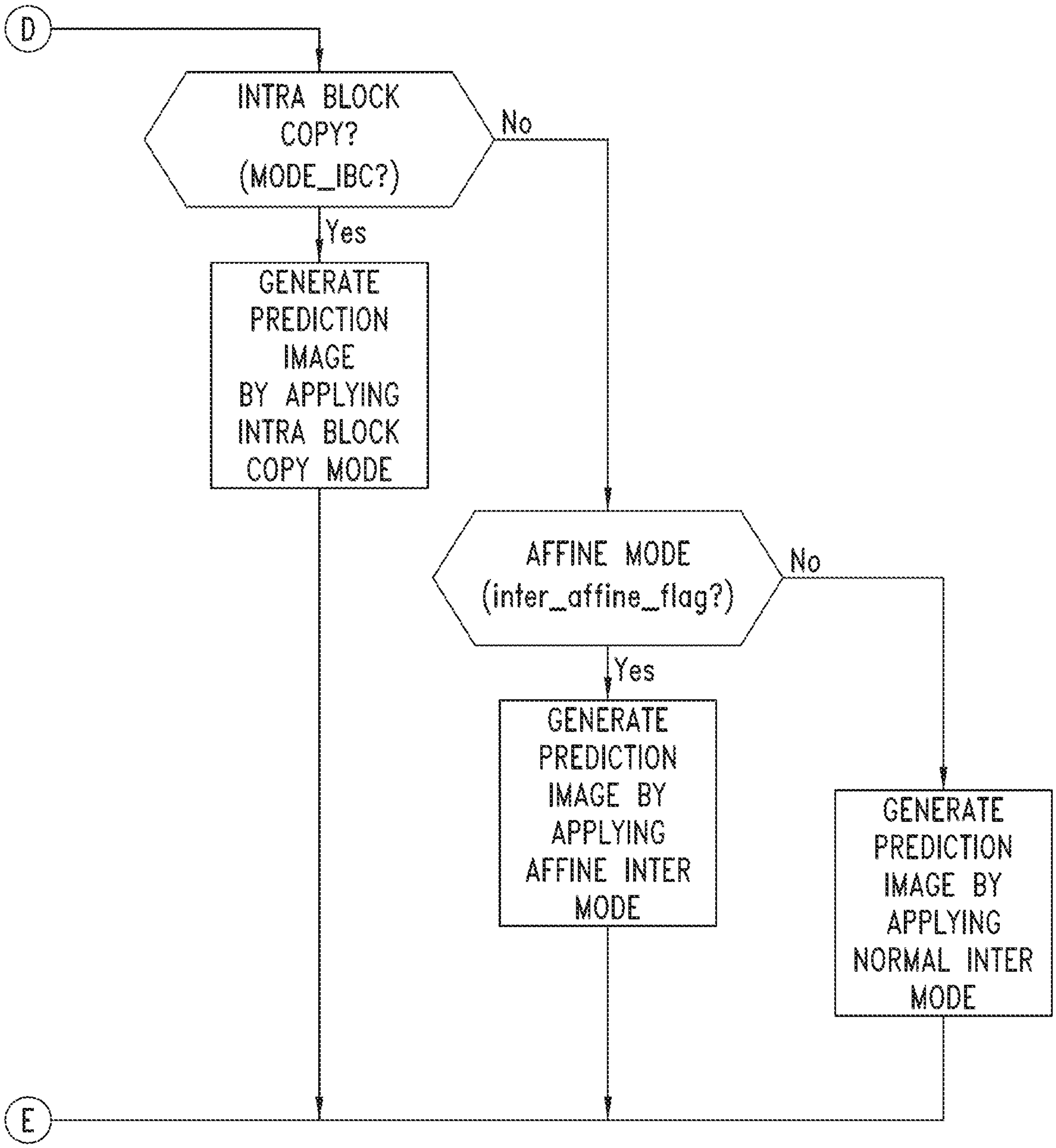
FIG. 80C is a flow chart illustrating another example of a process performed by the predictor of the decoder.

FIGS. 80A to 80C (collectively, FIG. 80) are a flow chart illustrating another example of a process performed by a predictor of decoder 200.

The predictor may perform a prediction process according to the flow illustrated in FIG. 80 as one example. It is to be noted that intra block copy illustrated in FIG. 80 is one mode which belongs to inter prediction, and in which a block included in a current picture is referred to as a reference image or a reference block. In other words, a picture different from the current picture is not referred to in intra block copy. In addition, the PCM mode illustrated in FIG. 80 is one mode which belongs to intra prediction, and in which no transform and quantization is performed.

(Intra Predictor)

Intra predictor 216 performs intra prediction by referring to a block in a current picture stored in block memory 210, based on the intra prediction mode parsed from the stream, to generate a prediction image of a current block (that is, an intra prediction block). More specifically, intra predictor 216 performs intra prediction by referring to pixel values (for example, luma and/or chroma values) of a block or blocks neighboring the current block to generate an intra prediction image, and then outputs the intra prediction image to prediction controller 220.

It is to be noted that when an intra prediction mode in which a luma block is referred to in intra prediction of a chroma block is selected, intra predictor 216 may predict the chroma component of the current block based on the luma component of the current block.

Moreover, when information parsed from a stream indicates that PDPC is to be applied, intra predictor 216 corrects intra predicted pixel values based on horizontal/vertical reference pixel gradients.

Figure 81:
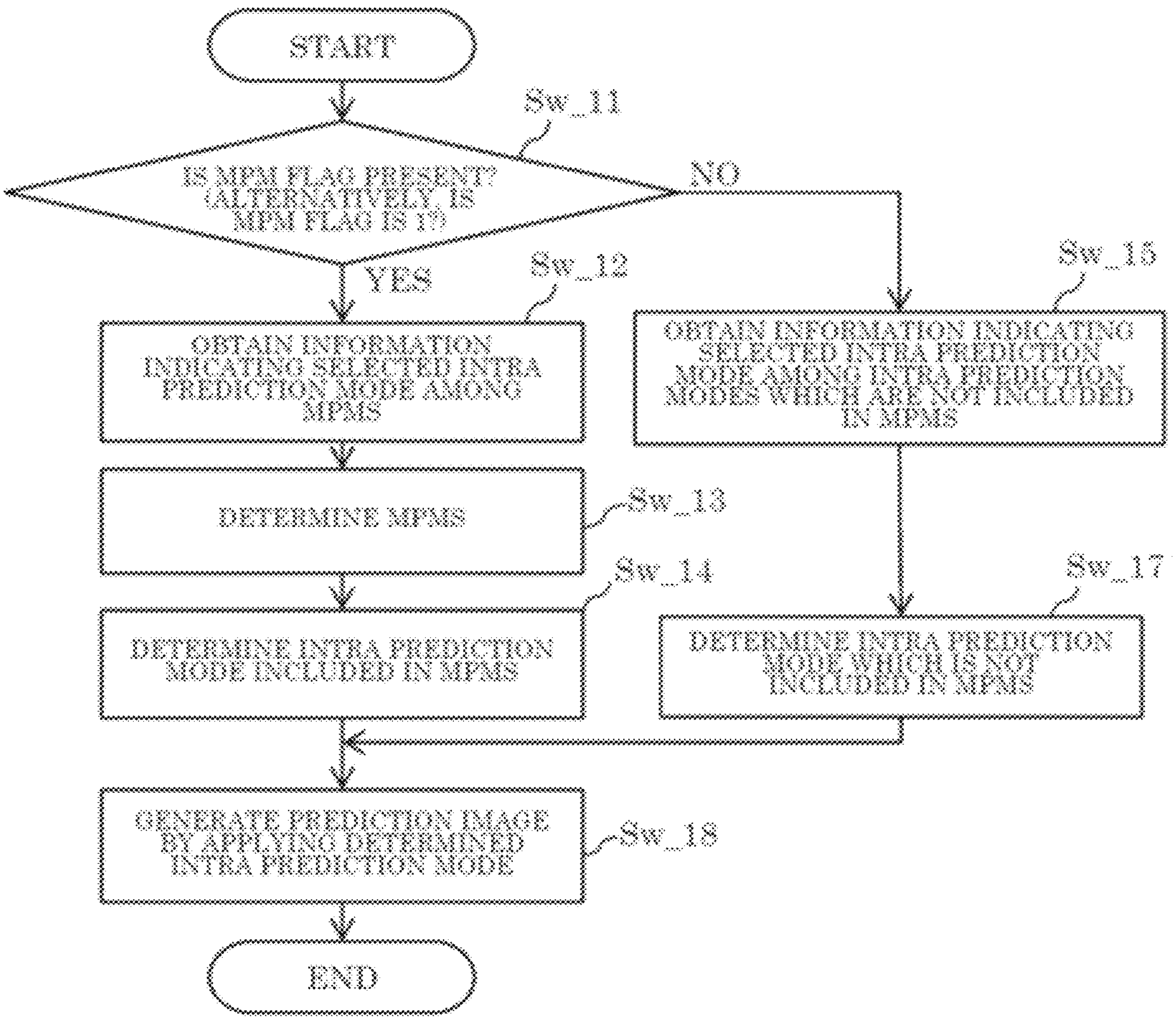
FIG. 81 is a diagram illustrating one example of a process performed by an intra predictor of the decoder.

FIG. 81 is a diagram illustrating one example of a process performed by intra predictor 216 of decoder 200.

Intra predictor 216 first determines whether an MPM is to be employed. As illustrated in FIG. 81, intra predictor 216 determines whether an MPM flag indicating 1 is present in the stream (Step Sw_11). Here, when determining that the MPM flag indicating 1 is present (Yes in Step Sw_11), intra predictor 216 obtains, from entropy decoder 202, information indicating the intra prediction mode selected in encoder 100 among MPMs. It is to be noted that such information is decoded by entropy decoder 202 and output to intra predictor 216. Next, intra predictor 216 determines the MPMs (Step Sw_13). MPMs include, for example, six intra prediction modes. Intra predictor 216 then determines the intra prediction mode which is included in a plurality of intra prediction modes included in the MPMs and is indicated by the information obtained in Step Sw_12 (Step Sw_14).

When determining that no MPM flag indicating 1 is present (No in Step Sw_11), intra predictor 216 obtains information indicating the intra prediction mode selected in encoder 100 (Step Sw_15). In other words, intra predictor 216 obtains, from entropy decoder 202, information indicating the intra prediction mode selected in encoder 100 from among the at least one intra prediction mode which is not included in the MPMs. It is to be noted that such information is decoded by entropy decoder 202 and output to intra predictor 216. Intra predictor 216 then determines the intra prediction mode which is not included in a plurality of intra prediction modes included in the MPMs and is indicated by the information obtained in Step Sw_15 (Step Sw_17).

Intra predictor 216 generates a prediction image according to the intra prediction mode determined in Step Sw_14 or Step Sw_17 (Step Sw_18).

(Inter Predictor)

Inter predictor 218 predicts the current block by referring to a reference picture stored in frame memory 214. Prediction is performed in units of a current block or a current sub-block in the current block. It is to be noted that the sub-block is included in the block and is a unit smaller than the block. The size of the sub-block may be 4×4 pixels, 8×8 pixels, or another size. The size of the sub-block may be switched for a unit such as a slice, brick, picture, etc.

For example, inter predictor 218 generates an inter prediction image of a current block or a current sub-block by performing motion compensation using motion information (for example, a MV) parsed from a stream (for example, a prediction parameter output from entropy decoder 202), and outputs the inter prediction image to prediction controller 220.

When the information parsed from the stream indicates that the OBMC mode is to be applied, inter predictor 218 generates the inter prediction image using motion information of a neighboring block in addition to motion information of the current block obtained through motion estimation.

Moreover, when the information parsed from the stream indicates that the FRUC mode is to be applied, inter predictor 218 derives motion information by performing motion estimation in accordance with a pattern matching method (e.g., bilateral matching or template matching) parsed from the stream. Inter predictor 218 then performs motion compensation (prediction) using the derived motion information.

Moreover, when the BIO mode is to be applied, inter predictor 218 derives a MV based on a model assuming uniform linear motion. In addition, when the information parsed from the stream indicates that the affine mode is to be applied, inter predictor 218 derives a MV for each sub-block, based on the MVs of a plurality of neighboring blocks.

(MV Derivation Flow)

Figure 82:
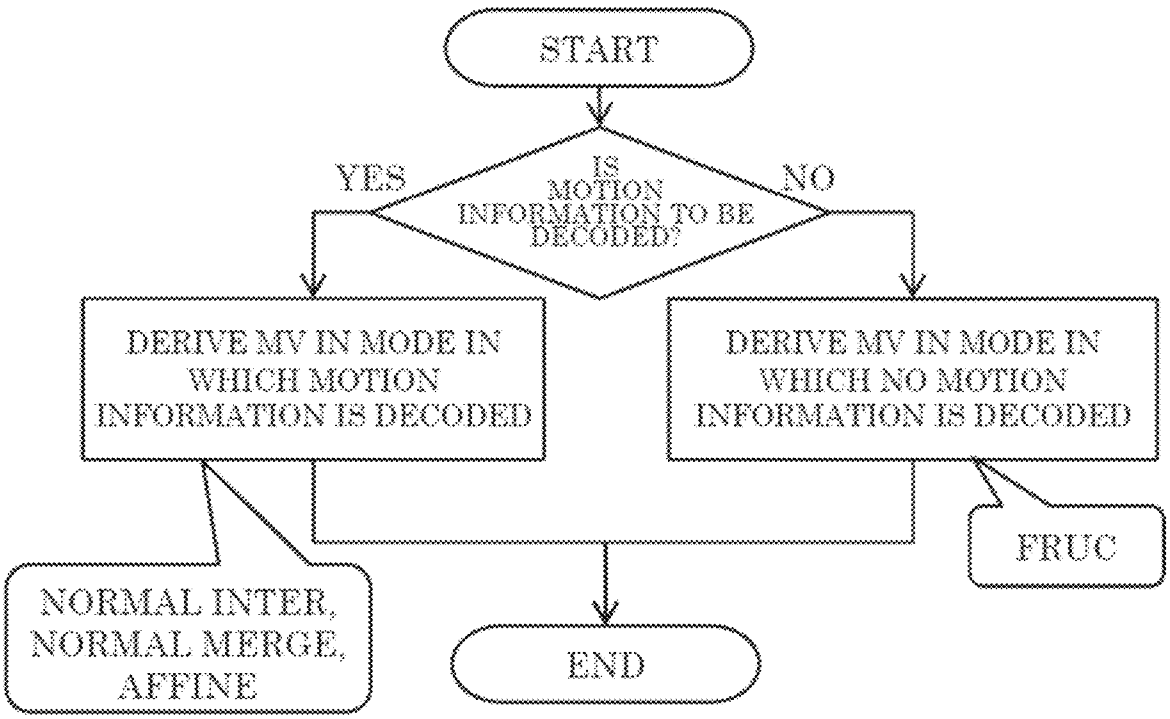
FIG. 82 is a flow chart illustrating one example of a process of MV derivation in the decoder.

FIG. 82 is a flow chart illustrating one example of a process of MV derivation in decoder 200.

Inter predictor 218 determines, for example, whether to decode motion information (for example, a MV). For example, inter predictor 218 may make the determination according to the prediction mode included in the stream, or may make the determination based on other information included in the stream. Here, when determining to decode motion information, inter predictor 218 derives a MV for a current block in a mode in which the motion information is decoded. When determining not to decode motion information, inter predictor 218 derives a MV in a mode in which no motion information is decoded.

Here, MV derivation modes include a normal inter mode, a normal merge mode, a FRUC mode, an affine mode, etc. which are described later. Modes in which motion information is decoded among the modes include the normal inter mode, the normal merge mode, the affine mode (specifically, an affine inter mode and an affine merge mode), etc. It is to be noted that motion information may include not only a MV but also MV predictor selection information which is described later. Modes in which no motion information is decoded include the FRUC mode, etc. Inter predictor 218 selects a mode for deriving a MV for the current block from the plurality of modes, and derives the MV for the current block using the selected mode.

Figure 83:
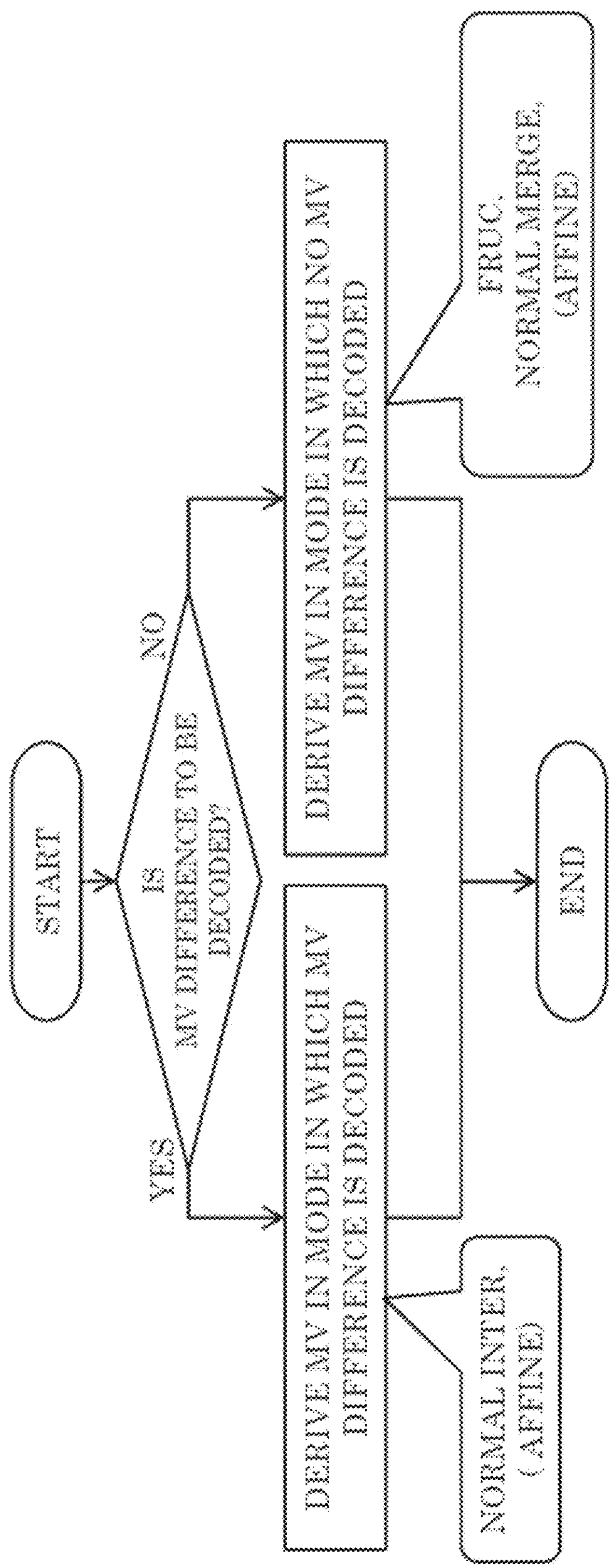
FIG. 83 is a flow chart illustrating another example of a process of MV derivation in the decoder.

FIG. 83 is a flow chart illustrating one example of a process of MV derivation in decoder 200.

For example, inter predictor 218 may determine whether to decode a MV difference, that is for example, may make the determination according to the prediction mode included in the stream, or may make the determination based on other information included in the stream. Here, when determining to decode a MV difference, inter predictor 218 may derive a MV for a current block in a mode in which the MV difference is decoded. In this case, for example, the MV difference included in the stream is decoded as a prediction parameter.

When determining not to decode any MV difference, inter predictor 218 derives a MV in a mode in which no MV difference is decoded. In this case, no encoded MV difference is included in the stream.

Here, as described above, the MV derivation modes include the normal inter mode, the normal merge mode, the FRUC mode, the affine mode, etc. which are described later. Modes in which a MV difference is encoded among the modes include the normal inter mode and the affine mode (specifically, the affine inter mode), etc. Modes in which no MV difference is encoded include the FRUC mode, the normal merge mode, the affine mode (specifically, the affine merge mode), etc. Inter predictor 218 selects a mode for deriving a MV for the current block from the plurality of modes, and derives the MV for the current block using the selected mode.

(MV Derivation>Normal Inter Mode)

For example, when information parsed from a stream indicates that the normal inter mode is to be applied, inter predictor 218 derives a MV based on the information parsed from the stream and performs motion compensation (prediction) using the MV.

Figure 84:
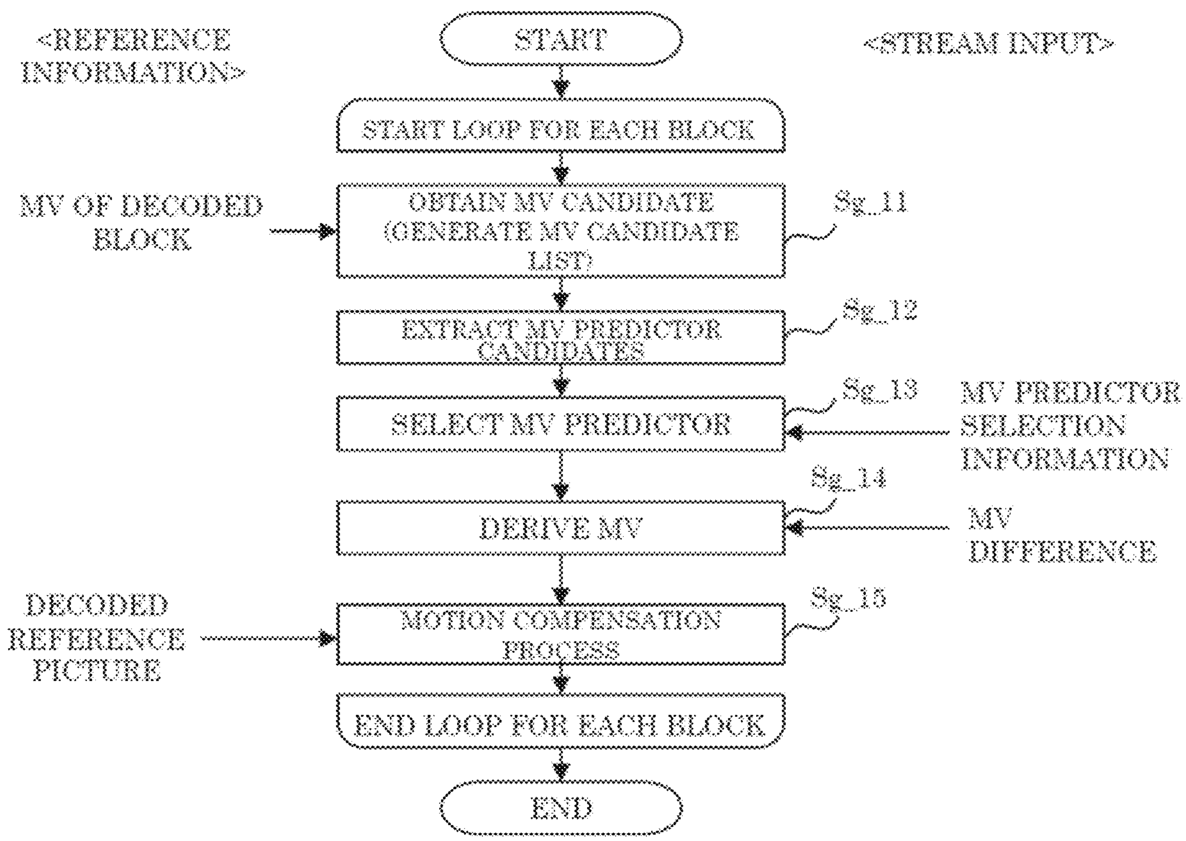
FIG. 84 is a flow chart illustrating an example of a process of inter prediction by normal inter mode in the decoder.

FIG. 84 is a flow chart illustrating an example of a process of inter prediction by normal inter mode in decoder 200.

Inter predictor 218 of decoder 200 performs motion compensation for each block. First, inter predictor 218 obtains a plurality of MV candidates for a current block based on information such as MVs of a plurality of decoded blocks temporally or spatially surrounding the current block (Step Sg_11). In other words, inter predictor 218 generates a MV candidate list.

Next, inter predictor 218 extracts N (an integer of 2 or larger) MV candidates from the plurality of MV candidates obtained in Step Sg_11, as motion vector predictor candidates (also referred to as MV predictor candidates) according to the determined ranks in priority order (Step Sg_12). It is to be noted that the ranks in priority order may be determined in advance for the respective N MV predictor candidates and may be predetermined.

Next, inter predictor 218 decodes the MV predictor selection information from the input stream, and selects one MV predictor candidate from the N MV predictor candidates as the MV predictor for the current block using the decoded MV predictor selection information (Step Sg_13).

Next, inter predictor 218 decodes a MV difference from the input stream, and derives a MV for the current block by adding a difference value which is the decoded MV difference and the selected MV predictor (Step Sg_14).

Lastly, inter predictor 218 generates a prediction image for the current block by performing motion compensation of the current block using the derived MV and the decoded reference picture (Step Sg_15). The processes in Steps Sg_11 to Sg_15 are executed on each block. For example, when the processes in Steps Sg_11 to Sg_15 are executed on each of all the blocks in the slice, inter prediction of the slice using the normal inter mode finishes. For example, when the processes in Steps Sg_11 to Sg_15 are executed on each of all the blocks in the picture, inter prediction of the picture using the normal inter mode finishes. It is to be noted that not all the blocks included in the slice may be subjected to the processes in Steps Sg_11 to Sg_15, and inter prediction of the slice using the normal inter mode may finish when part of the blocks are subjected to the processes. This also applies to pictures in Steps Sg_11 to Sg_15. Inter prediction of the picture using the normal inter mode may finish when the processes are executed on part of the blocks in the picture.

(MV Derivation>Normal Merge Mode)

For example, when information parsed from a stream indicates that the normal merge mode is to be applied, inter predictor 218 derives a MV and performs motion compensation (prediction) using the MV.

Figure 85:
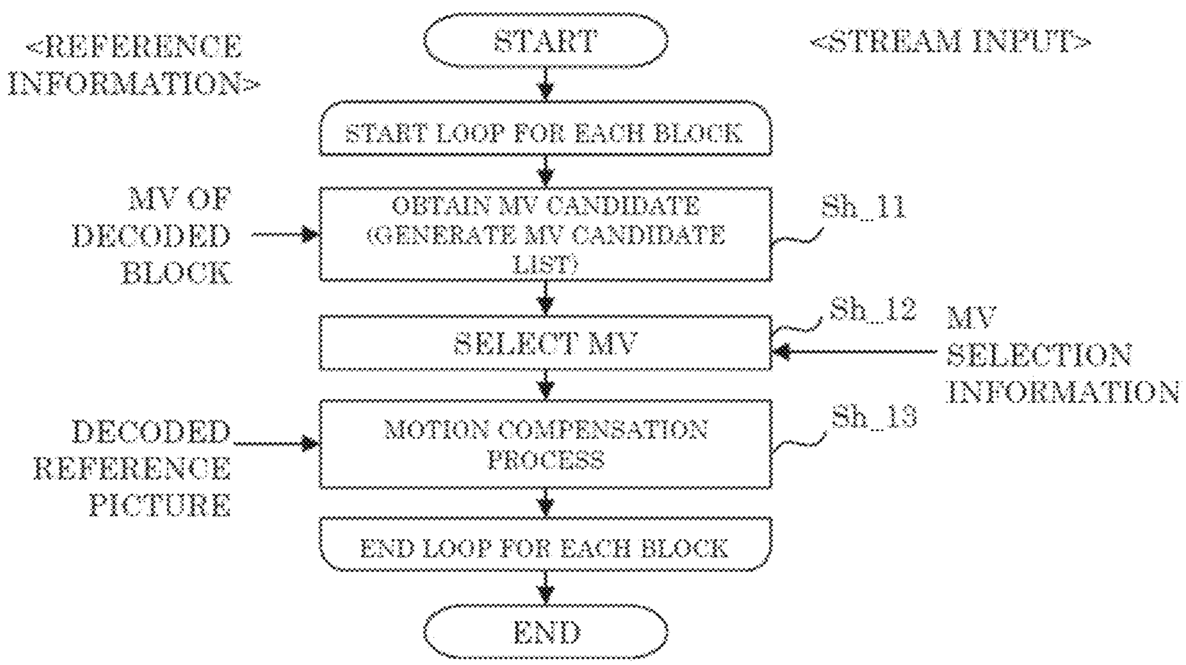
FIG. 85 is a flow chart illustrating an example of a process of inter prediction by normal merge mode in the decoder.

FIG. 85 is a flow chart illustrating an example of a process of inter prediction by normal merge mode in decoder 200.

First, inter predictor 218 obtains a plurality of MV candidates for a current block based on information such as MVs of a plurality of decoded blocks temporally or spatially surrounding the current block (Step Sh_11). In other words, inter predictor 218 generates a MV candidate list.

Next, inter predictor 218 selects one MV candidate from the plurality of MV candidates obtained in Step Sh_11, deriving a MV for the current block (Step Sh_12). More specifically, inter predictor 218 obtains MV selection information included as a prediction parameter in a stream, and selects the MV candidate identified by the MV selection information as the MV for the current block.

Lastly, inter predictor 218 generates a prediction image for the current block by performing motion compensation of the current block using the derived MV and the decoded reference picture (Step Sh_13). The processes in Steps Sh_11 to Sh_13 are executed, for example, on each block. For example, when the processes in Steps Sh_11 to Sh_13 are executed on each of all the blocks in the slice, inter prediction of the slice using the normal merge mode finishes. In addition, when the processes in Steps Sh_11 to Sh_13 are executed on each of all the blocks in the picture, inter prediction of the picture using the normal merge mode finishes. It is to be noted that not all the blocks included in the slice are subjected to the processes in Steps Sh_11 to Sh_13, and inter prediction of the slice using the normal merge mode may finish when part of the blocks are subjected to the processes. This also applies to pictures in Steps Sh_11 to Sh_13. Inter prediction of the picture using the normal merge mode may finish when the processes are executed on part of the blocks in the picture.

(MV Derivation>FRUC Mode)

For example, when information parsed from a stream indicates that the FRUC mode is to be applied, inter predictor 218 derives a MV in the FRUC mode and performs motion compensation (prediction) using the MV. In this case, the motion information is derived at the decoder 200 side without being signaled from the encoder 100 side. For example, decoder 200 may derive the motion information by performing motion estimation. In this case, decoder 200 performs motion estimation without using any pixel values in a current block.

Figure 86:
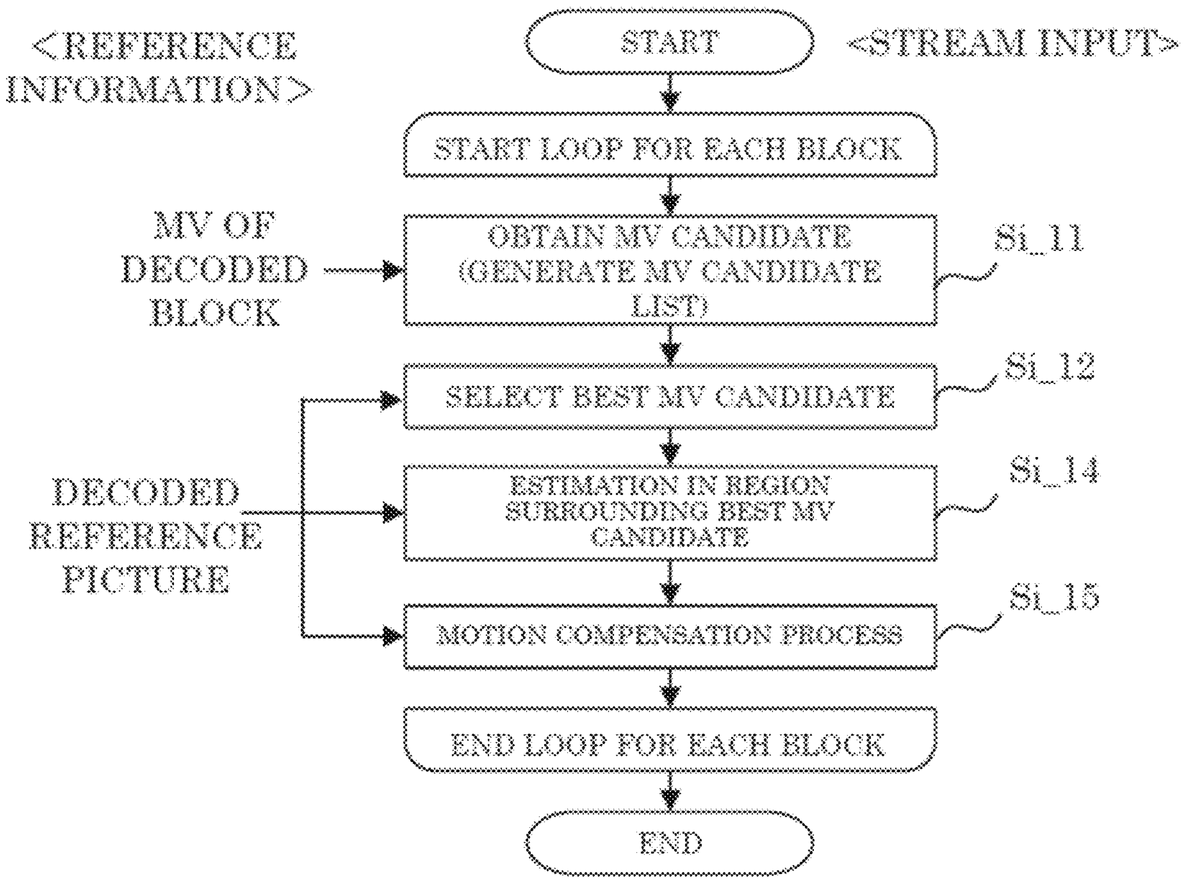
FIG. 86 is a flow chart illustrating an example of a process of inter prediction by FRUC mode in the decoder.

FIG. 86 is a flow chart illustrating an example of a process of inter prediction by FRUC mode in decoder 200.

First, inter predictor 218 generates a list indicating MVs of decoded blocks spatially or temporally neighboring the current block by referring to the MVs as MV candidates (the list is a MV candidate list, and may, for example, be used also as a MV candidate list for normal merge mode (Step Si_11). Next, a best MV candidate is selected from the plurality of MV candidates registered in the MV candidate list (Step Si_12). For example, inter predictor 218 calculates the evaluation value of each MV candidate included in the MV candidate list, and selects one of the MV candidates as the best MV candidate based on the evaluation values. Based on the selected best MV candidates, inter predictor 218 then derives a MV for the current block (Step Si_14). More specifically, for example, the selected best MV candidates are directly derived as the MV for the current block. In addition, for example, the MV for the current block may be derived using pattern matching in a surrounding region of a position which is included in a reference picture and corresponds to the selected best MV candidate. In other words, estimation using the pattern matching in a reference picture and the evaluation values may be performed in the surrounding region of the best MV candidate, and when there is a MV that yields a better evaluation value, the best MV candidate may be updated to the MV that yields the better evaluation value, and the updated MV may be determined as the final MV for the current block. In an embodiment, updating to a MV that yields a better evaluation value may not be performed.

Lastly, inter predictor 218 generates a prediction image for the current block by performing motion compensation of the current block using the derived MV and the decoded reference picture (Step Si_15). The processes in Steps Si_11 to Si_15 are executed, for example, on each block. For example, when the processes in Steps Si_11 to Si_15 are executed on each of all the blocks in the slice, inter prediction of the slice using the FRUC mode finishes. For example, when the processes in Steps Si_11 to Si_15 are executed on each of all the blocks in the picture, inter prediction of the picture using the FRUC mode finishes. Each sub-block may be processed similarly to the case of each block.

(MV Derivation>FRUC Mode)

For example, when information parsed from a stream indicates that the affine merge mode is to be applied, inter predictor 218 derives a MV in the affine merge mode and performs motion compensation (prediction) using the MV.

Figure 87:
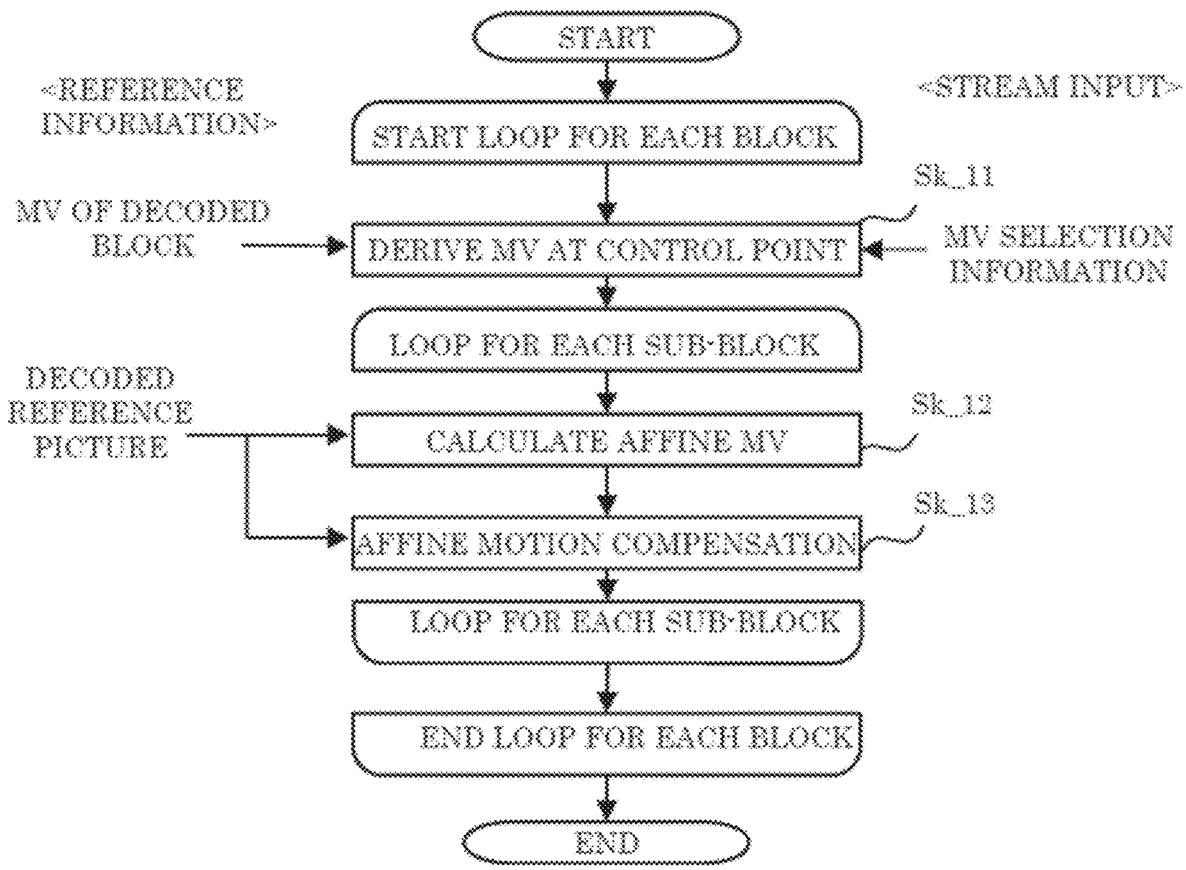
FIG. 87 is a flow chart illustrating an example of a process of inter prediction by affine merge mode in the decoder.

FIG. 87 is a flow chart illustrating an example of a process of inter prediction by the affine merge mode in decoder 200.

In the affine merge mode, first, inter predictor 218 derives MVs at respective control points for a current block (Step Sk_11). The control points are an upper-left corner point of the current block and an upper-right corner point of the current block as illustrated in FIG. 46A, or an upper-left corner point of the current block, an upper-right corner point of the current block, and a lower-left corner point of the current block as illustrated in FIG. 46B.

For example, when the MV derivation methods illustrated in FIGS. 47A to 47C are used, as illustrated in FIG. 47A, inter predictor 218 checks decoded block A (left), block B (upper), block C (upper-right), block D (lower-left), and block E (upper-left) in this order, and identifies the first effective block decoded according to the affine mode. Inter predictor 218 derives the MV at the control point using the identified first effective block decoded according to the affine mode. For example, when block A is identified and block A has two control points, as illustrated in FIG. 47B, inter predictor 218 calculates motion vector v0 at the upper-left corner control point of the current block and motion vector v1 at the upper-right corner control point of the current block from motion vectors v3 and v4 at the upper-left corner and the upper-right corner of the decoded block including block A. In this way, the MV at each control point is derived.

It is to be noted that, as illustrated in FIG. 49A, MVs at three control points may be calculated when block A is identified and block A has two control points, and that, as illustrated in FIG. 49B, MVs at two control points may be calculated when block A is identified and when block A has three control points.

In addition, when MV selection information is included as a prediction parameter in a stream, inter predictor 218 may derive the MV at each control point for the current block using the MV selection information.

Next, inter predictor 218 performs motion compensation of each of a plurality of sub-blocks included in the current block. In other words, inter predictor 218 calculates a MV for each of a plurality of sub-blocks as an affine MV, using either two motion vectors v0 and v1 and the above expression (1A) or three motion vectors v0, v1, and v2 and the above expression (1B) (Step Sk_12). Inter predictor 218 then performs motion compensation of the sub-blocks using these affine MVs and decoded reference pictures (Step Sk_13). When the processes in Steps Sk_12 and Sk_13 are executed for each of the sub-blocks included in the current block, the inter prediction using the affine merge mode for the current block finishes. In other words, motion compensation of the current block is performed to generate a prediction image of the current block.

It is to be noted that the above-described MV candidate list may be generated in Step Sk_11. The MV candidate list may be, for example, a list including MV candidates derived using a plurality of MV derivation methods for each control point. The plurality of MV derivation methods may, for example, be any combination of the MV derivation methods illustrated in FIGS. 47A to 47C, the MV derivation methods illustrated in FIGS. 48A and 48B, the MV derivation methods illustrated in FIGS. 49A and 49B, and other MV derivation methods.

It is to be noted that a MV candidate list may include MV candidates in a mode in which prediction is performed in units of a sub-block, other than the affine mode.

It is to be noted that, for example, a MV candidate list including MV candidates in an affine merge mode in which two control points are used and an affine merge mode in which three control points are used may be generated as a MV candidate list. Alternatively, a MV candidate list including MV candidates in the affine merge mode in which two control points are used and a MV candidate list including MV candidates in the affine merge mode in which three control points are used may be generated separately. Alternatively, a MV candidate list including MV candidates in one of the affine merge mode in which two control points are used and the affine merge mode in which three control points are used may be generated.

(MV Derivation>Affine Inter Mode)

For example, when information parsed from a stream indicates that the affine inter mode is to be applied, inter predictor 218 derives a MV in the affine inter mode and performs motion compensation (prediction) using the MV.

Figure 88:
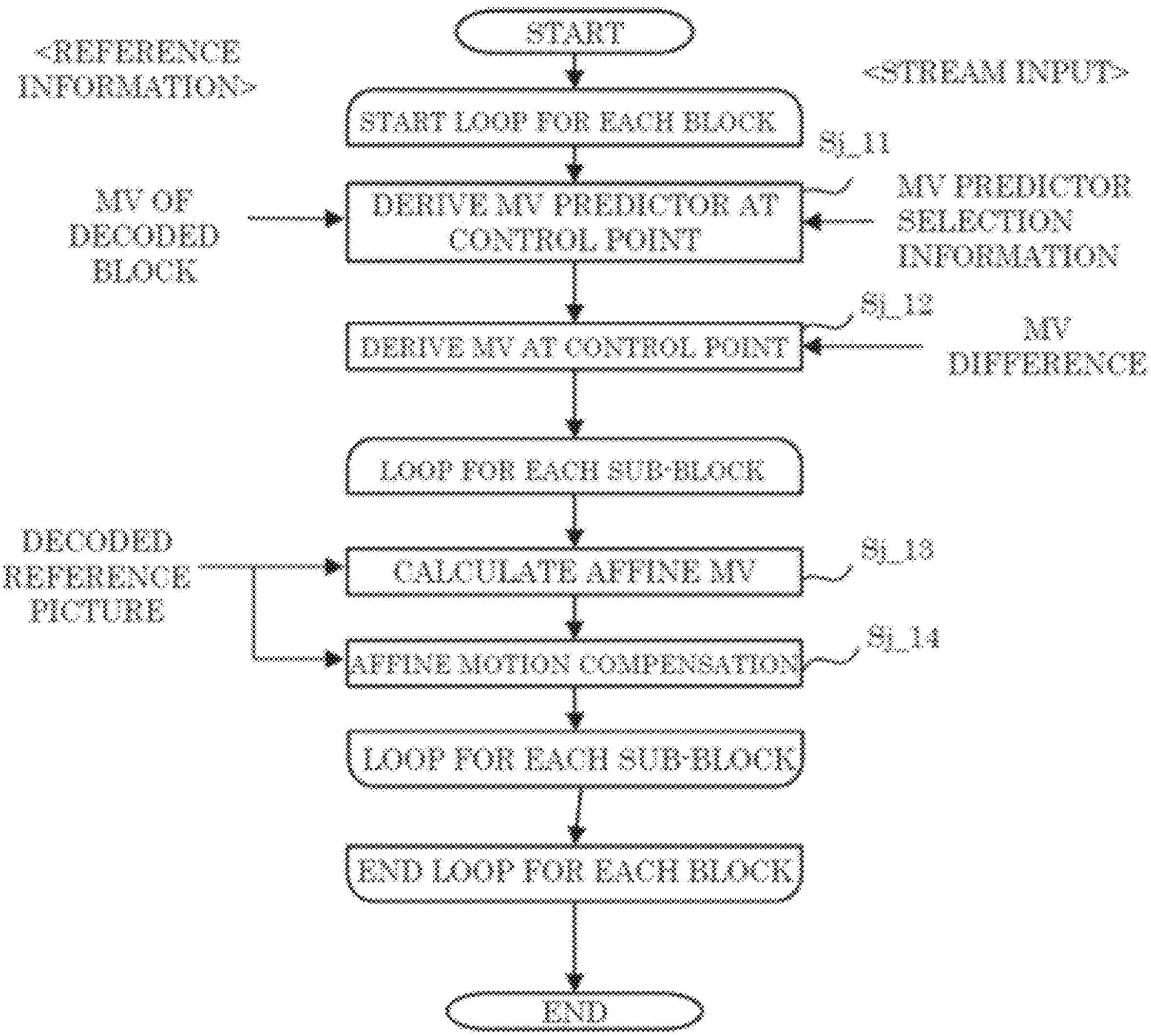
FIG. 88 is a flow chart illustrating an example of a process of inter prediction by affine inter mode in the decoder.

FIG. 88 is a flow chart illustrating an example of a process of inter prediction by the affine inter mode in decoder 200.

In the affine inter mode, first, inter predictor 218 derives MV predictors (v0, v1) or (v0, v1, v2) of respective two or three control points for a current block (Step Sj_11). The control points are an upper-left corner point of the current block, an upper-right corner point of the current block, and a lower-left corner point of the current block as illustrated in FIG. 46A or FIG. 46B.

Inter predictor 218 obtains MV predictor selection information included as a prediction parameter in the stream, and derives the MV predictor at each control point for the current block using the MV identified by the MV predictor selection information. For example, when the MV derivation methods illustrated in FIGS. 48A and 48B are used, inter predictor 218 derives the motion vector predictors (v0, v1) or (v0, v1, v2) at control points for the current block by selecting the MV of the block identified by the MV predictor selection information among decoded blocks in the vicinity of the respective control points for the current block illustrated in either FIG. 48A or FIG. 48B.

Next, inter predictor 218 obtains each MV difference included as a prediction parameter in the stream, and adds the MV predictor at each control point for the current block and the MV difference corresponding to the MV predictor (Step Sj_12). In this way, the MV at each control point for the current block is derived.

Next, inter predictor 218 performs motion compensation of each of the plurality of sub-blocks included in the current block. In other words, inter predictor 218 calculates a MV for each of a plurality of sub-blocks as an affine MV, using either two motion vectors v0 and v1 and the above expression (1A) or three motion vectors v0, v1, and v2 and the above expression (1B) (Step Sj_13). Inter predictor 218 then performs motion compensation of the sub-blocks using these affine MVs and decoded reference pictures (Step Sj_14). When the processes in Steps Sj_13 and Sj_14 are executed for each of the sub-blocks included in the current block, the inter prediction using the affine merge mode for the current block finishes. In other words, motion compensation of the current block is performed to generate a prediction image of the current block.

It is to be noted that the above-described MV candidate list may be generated in Step Sj_11 as in Step Sk_11.

(MV Derivation>Triangle Mode)

For example, when information parsed from a stream indicates that the triangle mode is to be applied, inter predictor 218 derives a MV in the triangle mode and performs motion compensation (prediction) using the MV.

Figure 89:
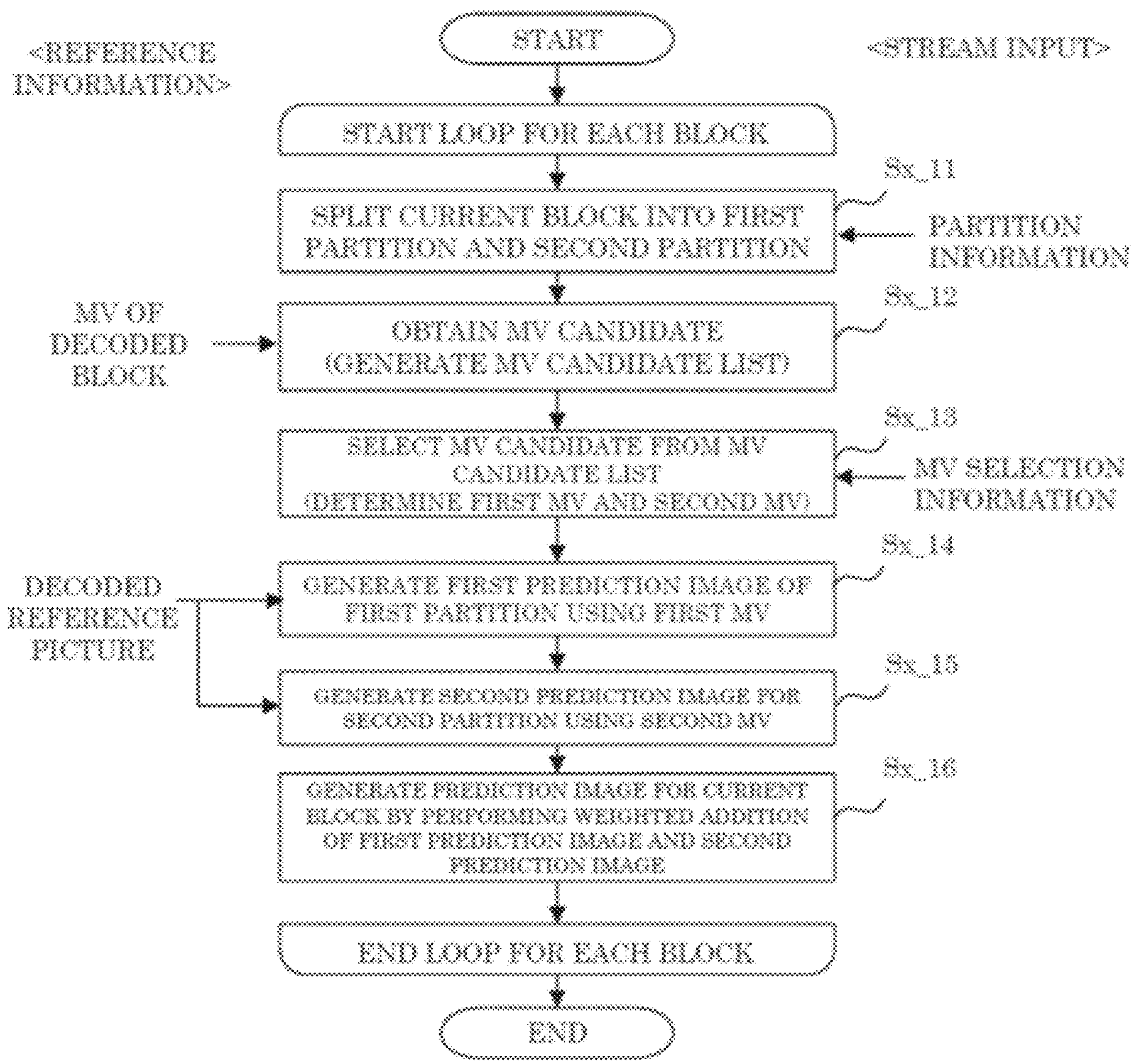
FIG. 89 is a flow chart illustrating an example of a process of inter prediction by triangle mode in the decoder.

FIG. 89 is a flow chart illustrating an example of a process of inter prediction by the triangle mode in decoder 200.

In the triangle mode, first, inter predictor 218 splits the current block into the first partition and the second partition (Step Sx_11). For example, inter predictor 218 may obtain, from the stream, partition information which is information related to the splitting as a prediction parameter. Inter predictor 218 may then split a current block into a first partition and a second partition according to the partition information.

Next, inter predictor 218 obtains a plurality of MV candidates for a current block based on information such as MVs of a plurality of decoded blocks temporally or spatially surrounding the current block (Step Sx_12). In other words, inter predictor 218 generates a MV candidate list.

Inter predictor 218 then selects the MV candidate for the first partition and the MV candidate for the second partition as a first MV and a second MV, respectively, from the plurality of MV candidates obtained in Step Sx_11 (Step Sx_13). At this time, inter predictor 218 may obtain, from the stream, MV selection information for identifying each selected MV candidate as a prediction parameter. Inter predictor 218 may then select the first MV and the second MV according to the MV selection information.

Next, inter predictor 218 generates a first prediction image by performing motion compensation using the selected first MV and a decoded reference picture (Step Sx_14). Likewise, inter predictor 218 generates a second prediction image by performing motion compensation using the selected second MV and a decoded reference picture (Step Sx_15).

Lastly, inter predictor 218 generates a prediction image for the current block by performing a weighted addition of the first prediction image and the second prediction image (Step Sx_16).

(MV Estimation>DMVR)

For example, information parsed from a stream indicates that DMVR is to be applied, inter predictor 218 performs motion estimation using DMVR.

Figure 90:
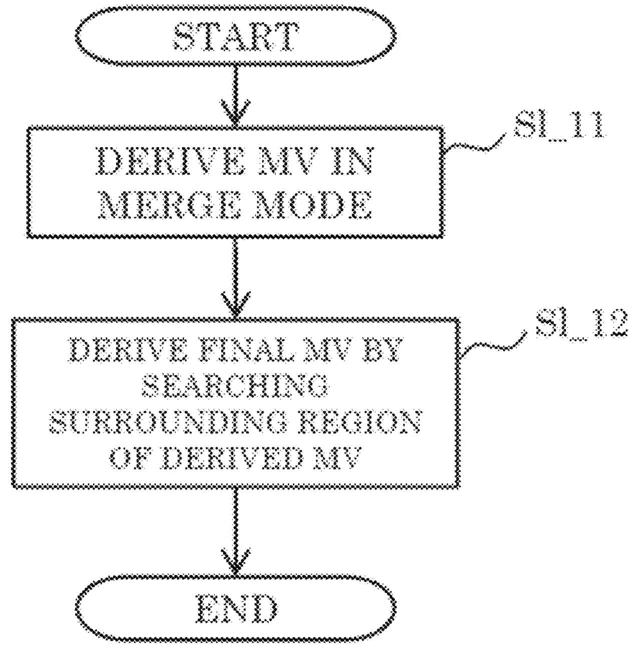
FIG. 90 is a flow chart illustrating an example of a process of motion estimation by DMVR in the decoder.

FIG. 90 is a flow chart illustrating an example of a process of motion estimation by DMVR in decoder 200.

Inter predictor 218 derives a MV for a current block according to the merge mode (Step Sl_11). Next, inter predictor 218 derives the final MV for the current block by searching the region surrounding the reference picture indicated by the MV derived in Sl_11 (Step Sl_12). In other words, in this case, the MV of the current block is determined according to the DMVR.

Figure 91:
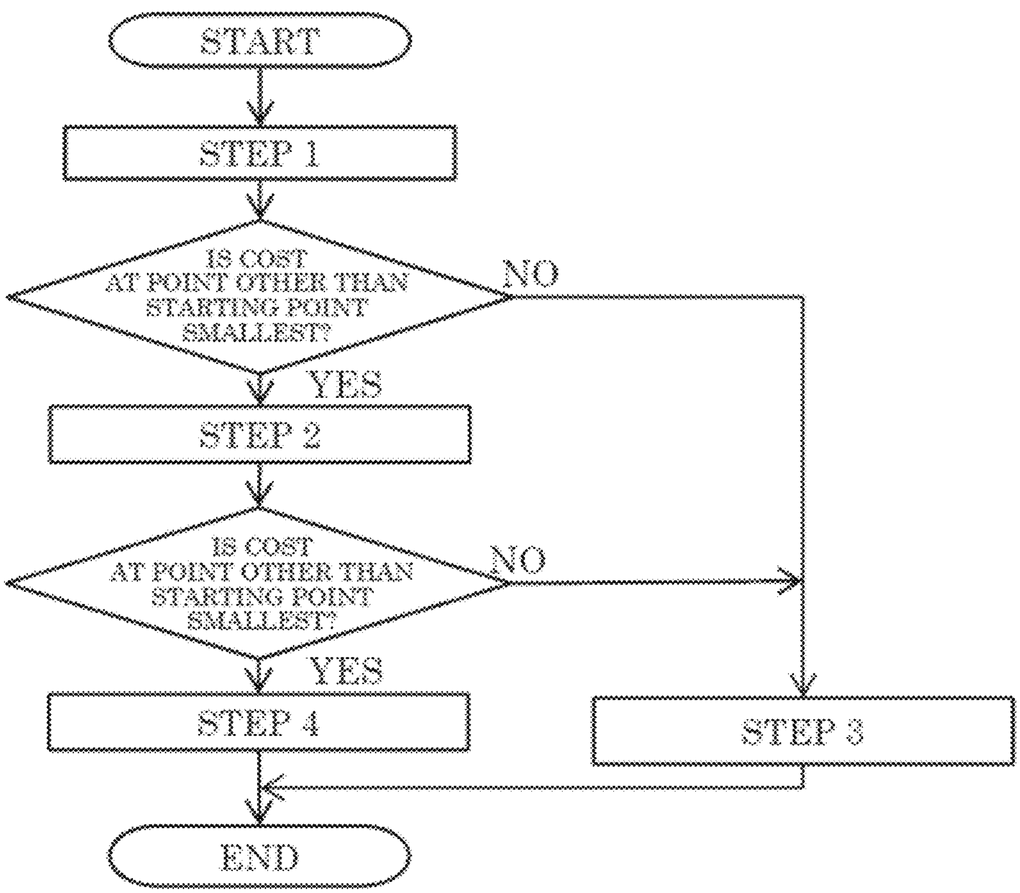
FIG. 91 is a flow chart illustrating one example process of motion estimation by DMVR in the decoder.

FIG. 91 is a flow chart illustrating an example of a process of motion estimation by DMVR in decoder 200, and is the same as FIG. 58B.

First, in Step 1 illustrated in FIGS. 58A, inter predictor 218 calculates the cost between the search position (also referred to as a starting point) indicated by the initial MV and eight surrounding search positions. Inter predictor 218 then determines whether the cost at each of the search positions other than the starting point is the smallest. Here, when determining that the cost at one of the search positions other than the starting point is the smallest, inter predictor 218 changes a target to the search position at which the smallest cost is obtained, and performs the process in Step 2 illustrated in FIG. 58. When the cost at the starting point is the smallest, inter predictor 218 skips the process in Step 2 illustrated in FIG. 58A and performs the process in Step 3.

In Step 2 illustrated in FIG. 58A, inter predictor 218 performs search similar the process in Step 1, regarding the search position after the target change as new starting point according to the result of the process in Step 1. Inter predictor 218 then determines whether the cost at each of the search positions other than the starting point is the smallest. Here, when determining that the cost at one of the search positions other than the starting point is the smallest, inter predictor 218 performs the process in Step 4. When the cost at the starting point is the smallest, inter predictor 218 performs the process in Step 3.

In Step 4, inter predictor 218 regards the search position at the starting point as the final search position, and determines the difference between the position indicated by the initial MV and the final search position to be a vector difference.

In Step 3 illustrated in FIG. 58A, inter predictor 218 determines the pixel position at sub-pixel accuracy at which the smallest cost is obtained, based on the costs at the four points located at upper, lower, left, and right positions with respect to the starting point in Step 1 or Step 2, and regards the pixel position as the final search position.

The pixel position at the sub-pixel accuracy is determined by performing weighted addition of each of the four upper, lower, left, and right vectors ((0, 1), (0, −1), (−1, 0), and (1, 0)), using, as a weight, the cost at a corresponding one of the four search positions. Inter predictor 218 then determines the difference between the position indicated by the initial MV and the final search position to be the vector difference.

(Motion Compensation>BIO/OBMC/LIC)

For example, when information parsed from a stream indicates that correction of a prediction image is to be performed, upon generating a prediction image, inter predictor 218 corrects the prediction image based on the mode for the correction. The mode is, for example, one of BIO, OBMC, and LIC described above.

Figure 92:
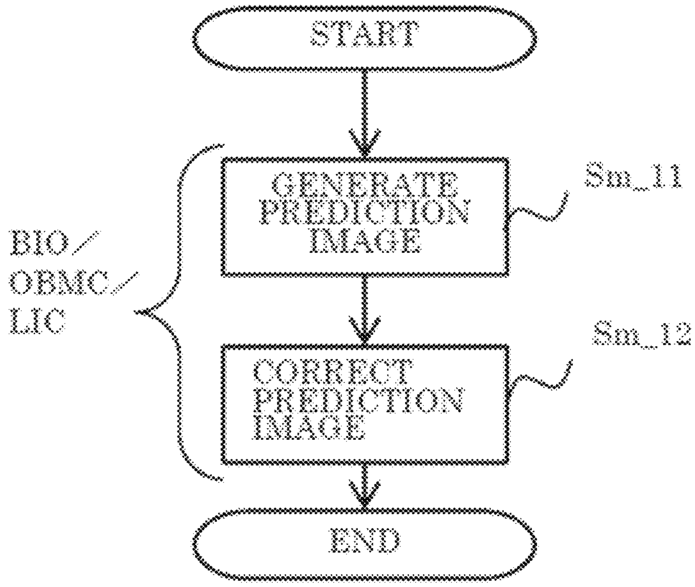
FIG. 92 is a flow chart illustrating one example of a process of generation of a prediction image in the decoder.

FIG. 92 is a flow chart illustrating one example of a process of generation of a prediction image in decoder 200.

Inter predictor 218 generates a prediction image (Step Sm_11), and corrects the prediction image according to any of the modes described above (Step Sm_12).

Figure 93:
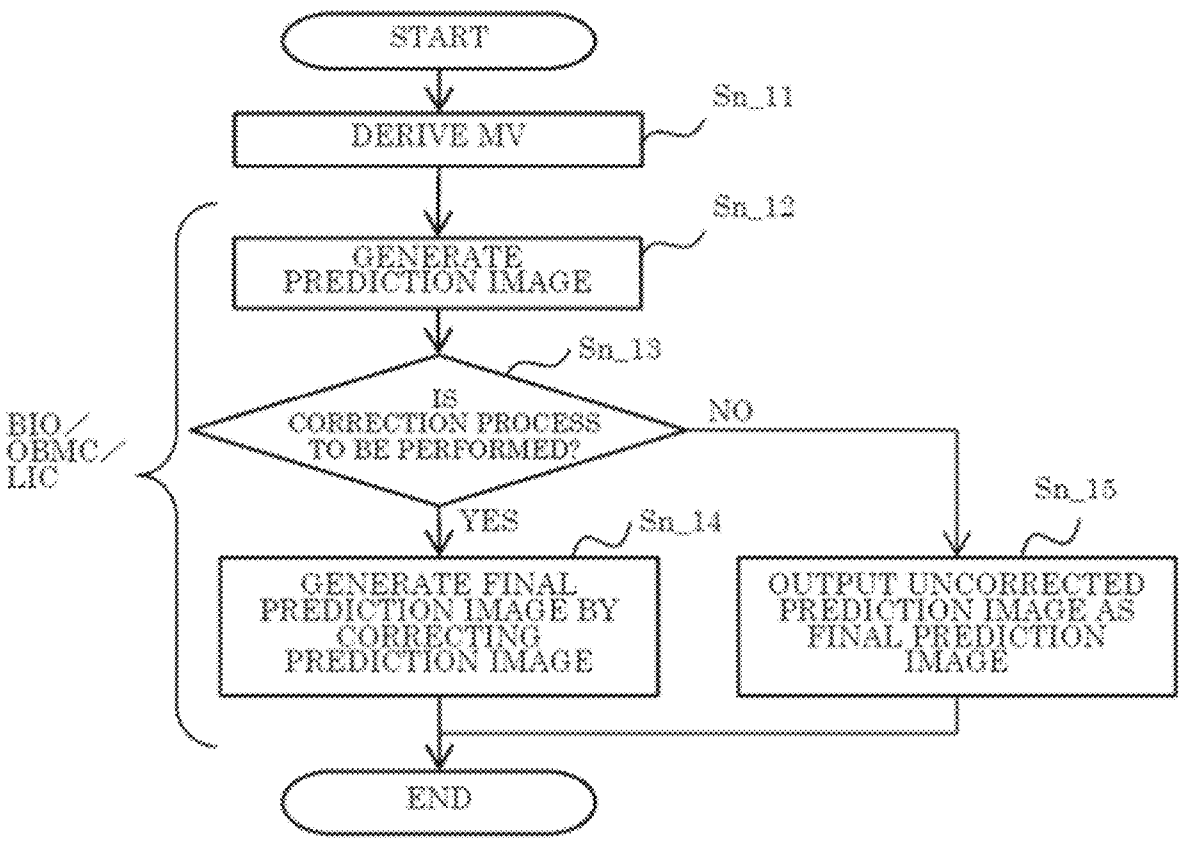
FIG. 93 is a flow chart illustrating another example of a process of generation of a prediction image in the decoder.

FIG. 93 is a flow chart illustrating another example of a process of generation of a prediction image in decoder 200.

Inter predictor 218 derives a MV for a current block (Step Sn_11). Next, inter predictor 218 generates a prediction image using the MV (Step Sn_12), and determines whether to perform a correction process (Step Sn_13). For example, inter predictor 218 obtains a prediction parameter included in the stream, and determines whether to perform a correction process based on the prediction parameter. This prediction parameter is, for example, a flag indicating whether one or more of the above-described modes is to be applied. Here, when determining to perform a correction process (Yes in Step Sn_13), inter predictor 218 generates the final prediction image by correcting the prediction image (Step Sn_14). It is to be noted that, in LIC, luminance and chrominance may be corrected in Step Sn_14. When determining not to perform a correction process (No in Step Sn_13), inter predictor 218 outputs the final prediction image without correcting the prediction image (Step Sn_15).

(Motion Compensation>OBMC)

For example, when information parsed from a stream indicates that OBMC is to be performed, upon generating a prediction image, inter predictor 218 corrects the prediction image according to the OBMC.

Figure 94:
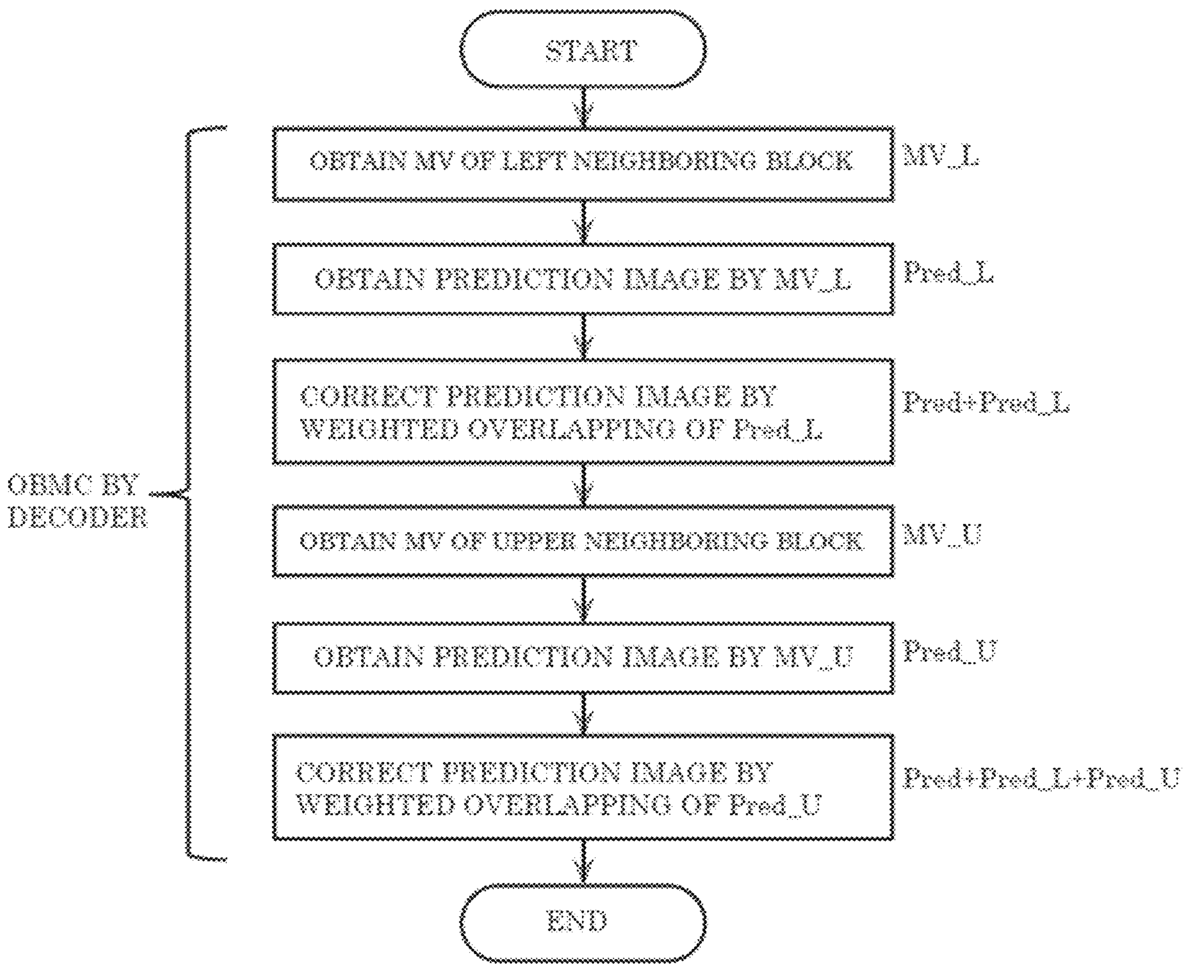
FIG. 94 is a flow chart illustrating an example of a process of correction of a prediction image by OBMC in the decoder.

FIG. 94 is a flow chart illustrating an example of a process of correction of a prediction image by OBMC in decoder 200. It is to be noted that the flow chart in FIG. 94 indicates the correction flow of a prediction image using the current picture and the reference picture illustrated in FIG. 62.

First, as illustrated in FIG. 62, inter predictor 218 obtains a prediction image (Pred) by normal motion compensation using a MV assigned to the current block.

Next, inter predictor 218 obtains a prediction image (Pred_L) by applying a motion vector (MV_L) which has been already derived for the decoded block neighboring to the left of the current block to the current block (re-using the motion vector for the current block). Inter predictor 218 then performs a first correction of a prediction image by overlapping two prediction images Pred and Pred_L. This provides an effect of blending the boundary between neighboring blocks.

Likewise, inter predictor 218 obtains a prediction image (Pred_U) by applying a MV (MV_U) which has been already derived for the decoded block neighboring above the current block to the current block (re-using the motion vector for the current block). Inter predictor 218 then performs a second correction of a prediction image by overlapping the prediction image Pred_U to the prediction images (for example, Pred and Pred_L) on which the first correction has been performed. This provides an effect of blending the boundary between neighboring blocks. The prediction image obtained by the second correction is the one in which the boundary between the neighboring blocks has been blended (smoothed), and thus is the final prediction image of the current block.

(Motion Compensation>BIO)

For example, when information parsed from a stream indicates that BIO is to be performed, upon generating a prediction image, inter predictor 218 corrects the prediction image according to the BIO.

Figure 95:
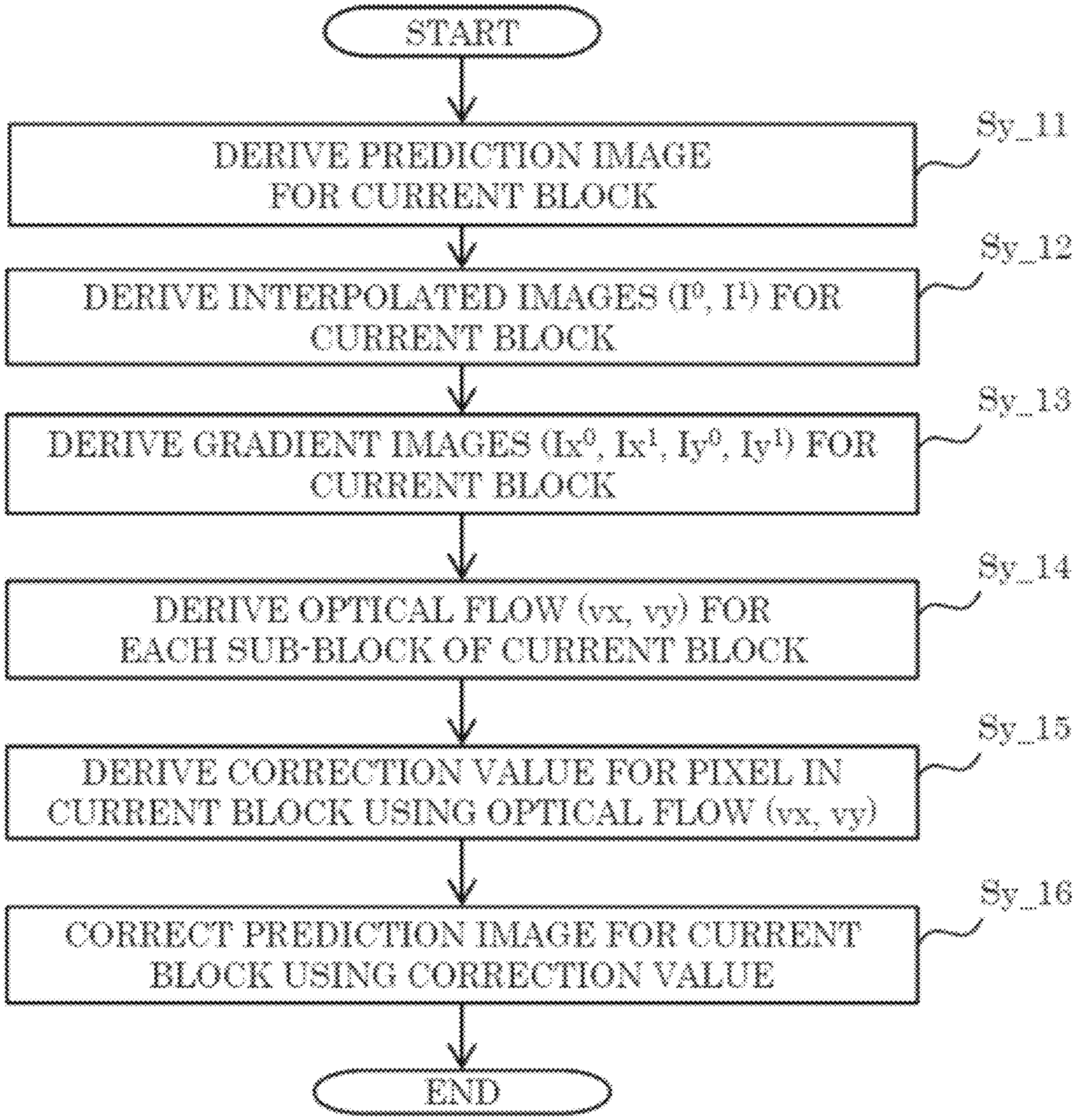
FIG. 95 is a flow chart illustrating an example of a process of correction of a prediction image by BIO in the decoder.

FIG. 95 is a flow chart illustrating an example of a process of correction of a prediction image by the BIO in decoder 200.

As illustrated in FIG. 63, inter predictor 218 derives two motion vectors ($M_0$, $M_1$), using two reference pictures ($Ref_0$, $Ref_1$) different from the picture (Cur Pic) including a current block. Inter predictor 218 then derives a prediction image for the current block using the two motion vectors ($M_0$, $M_1$) (Step Sy_11). It is to be noted that motion vector $M_0$ is a motion vector ($MV_{x0}$, $MV_{y0}$) corresponding to reference picture $Ref_0$, and motion vector $M_1$ is a motion vector ($MV_{x1}$, $MV_{y1}$) corresponding to reference picture $Ref_1$.

Next, inter predictor 218 derives interpolated image $I^0$ for the current block using motion vector $M_0$ and reference picture $L_0$. In addition, inter predictor 218 derives interpolated image $I^1$ for the current block using motion vector $M_1$ and reference picture $L_1$ (Step Sy_12). Here, interpolated image $I^0$ is an image included in reference picture $Ref_0$ and to be derived for the current block, and interpolated image $I^1$ is an image included in reference picture $Ref_1$ and to be derived for the current block. Each of interpolated image $I^0$ and interpolated image $I^1$ may be the same in size as the current block. Alternatively, each of interpolated image $I^0$ and interpolated image $I^1$ may be an image larger than the current block. Furthermore, interpolated image $I^0$ and interpolated image $I^1$ may include a prediction image obtained by using motion vectors ($M_0$, $M_1$) and reference pictures ($L_0$, $L_1$) and applying a motion compensation filter.

In addition, inter predictor 218 derives gradient images ($Ix^0$, $Ix^1$, $Iy^0$, $Iy^1$) of the current block, from interpolated image $I^0$ and interpolated image 11 (Step Sy_13). It is to be noted that the gradient images in the horizontal direction are ($Ix^0$, $Ix^1$), and the gradient images in the vertical direction are ($Iy^0$, $Iy^1$). Inter predictor 218 may derive the gradient images by, for example, applying a gradient filter to the interpolated images. The gradient images may be the ones each of which indicates the amount of spatial change in pixel value along the horizontal direction or the amount of spatial change in pixel value along the vertical direction.

Next, inter predictor 218 derives, for each sub-block of the current block, an optical flow (vx, vy) which is a velocity vector, using the interpolated images (10, 11) and the gradient images ($Ix^0$, $Ix^1$, $Iy^0$, $Iy^1$) (Step Sy_14). As one example, a sub-block may be 4×4 pixel sub-CU.

Next, inter predictor 218 corrects a prediction image for the current block using the optical flow (vx, vy). For example, inter predictor 218 derives a correction value for the value of a pixel included in a current block, using the optical flow (vx, vy) (Step Sy_15). Inter predictor 218 may then correct the prediction image for the current block using the correction value (Step Sy_16). It is to be noted that the correction value may be derived in units of a pixel, or may be derived in units of a plurality of pixels or in units of a sub-block, etc.

It is to be noted that the BIO process flow is not limited to the process disclosed in FIG. 95. Only part of the processes disclosed in FIG. 95 may be performed, or a different process may be added or used as a replacement, or the processes may be executed in a different processing order.

(Motion Compensation>LIC)

For example, when information parsed from a stream indicates that LIC is to be performed, upon generating a prediction image, inter predictor 218 corrects the prediction image according to the LIC.

Figure 96:
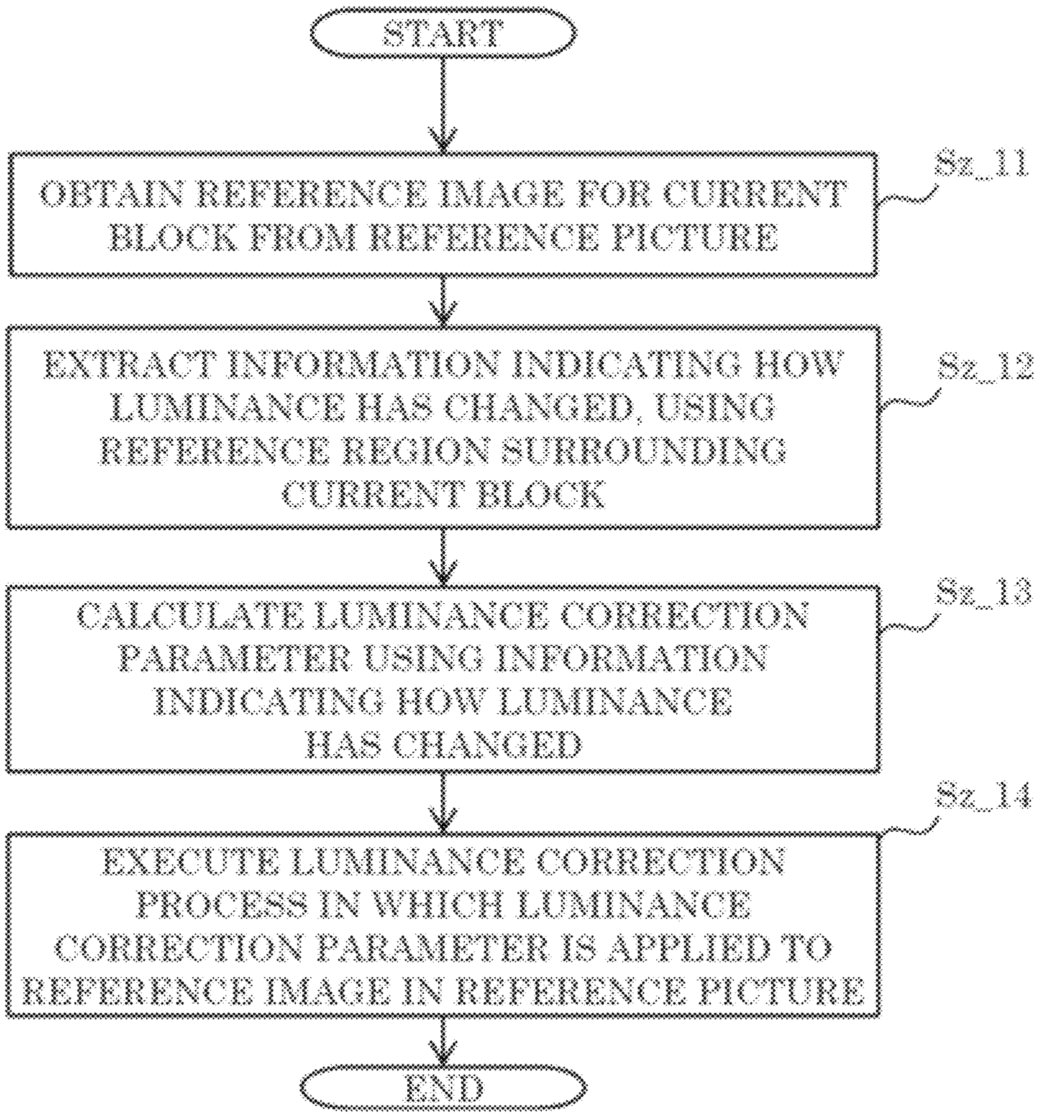
FIG. 96 is a flow chart illustrating an example of a process of correction of a prediction image by LIC in the decoder.

FIG. 96 is a flow chart illustrating an example of a process of correction of a prediction image by the LIC in decoder 200.

First, inter predictor 218 obtains a reference image corresponding to a current block from a decoded reference picture using a MV (Step Sz_11).

Next, inter predictor 218 extracts, for the current block, information indicating how the luminance value has changed between the current picture and the reference picture (Step Sz_12). This extraction may be performed based on the luma pixel values for the decoded left neighboring reference region (surrounding reference region) and the decoded upper neighboring reference region (surrounding reference region), and the luma pixel values at the corresponding positions in the reference picture specified by the derived MVs. Inter predictor 218 calculates a luminance correction parameter, using the information indicating how the luma value changed (Step Sz_13).

Inter predictor 218 generates a prediction image for the current block by performing a luminance correction process in which the luminance correction parameter is applied to the reference image in the reference picture specified by the MV (Step Sz_14). In other words, the prediction image which is the reference image in the reference picture specified by the MV is subjected to the correction based on the luminance correction parameter. In this correction, luminance may be corrected, or chrominance may be corrected.

(Prediction Controller)

Prediction controller 220 selects an intra prediction image or an inter prediction image, and outputs the selected image to adder 208. As a whole, the configurations, functions, and processes of prediction controller 220, intra predictor 216, and inter predictor 218 at the decoder 200 side may correspond to the configurations, functions, and processes of prediction controller 128, intra predictor 124, and inter predictor 126 at the encoder 100 side.

First Aspect

Figure 97:
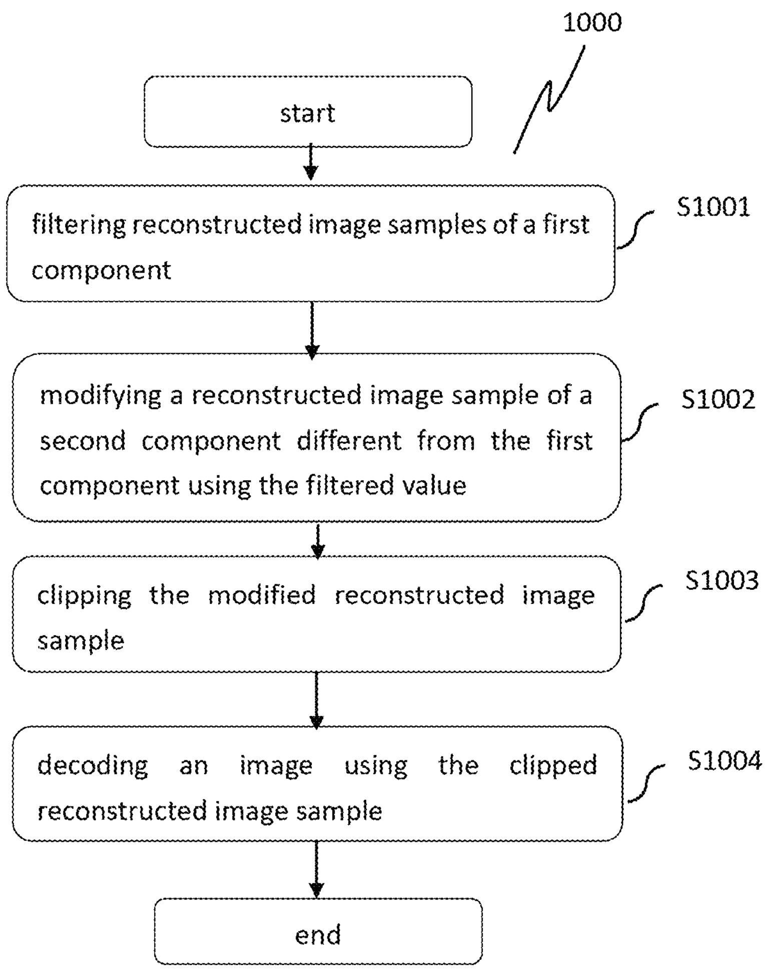
FIG. 97 is a flow chart of a sample process flow of decoding an image applying a CCALF (cross component adaptive loop filtering) process according to a first aspect.

FIG. 97 is a flow chart of an example of a process flow 1000 of decoding an image using a CCALF (cross component adaptive loop filtering) process according to a first aspect. The process flow 1000 may be performed, for example, by the decoder 200 of FIG. 67, etc.

In step S1001, a filtering process is applied to reconstructed image samples of a first component. The first component may be, for example, a luma component. The luma component may be represented as a Y component. The reconstructed image samples of luma may be the output signals of an ALF process. The output signals of an ALF may be reconstructed luma samples generated through a SAO process. In some embodiments, this filtering process performed in step S1001 may be represented as a CCALF process. The numbers of the reconstructed luma samples may be the same as the number of coefficients of a filter to be used in the CCALF process. In other embodiments, a clipping process may be performed on the filtered reconstructed luma samples.

In step S1002, a reconstructed image sample of a second component is modified. The second component may be a chroma component. The chroma component may be represented as a Cb and/or Cr component. The reconstructed image samples of chroma may be the output signals of an ALF process. The output signals of an ALF may be reconstructed chroma samples generated through a SAO process. The modified reconstructed image sample may be the sum of the reconstructed samples of chroma and the filtered reconstructed samples of luma, which are the output of step S1001. In other words, the modification process may be performed by adding the filtered value of the reconstructed luma samples generated by the CCALF process of step S1001 to the filtered value of the reconstructed chroma samples generated by an ALF process. In some embodiments, a clipping process may be performed on the reconstructed chroma samples. The first component and the second component may belong to the same block or may belong to different blocks.

In step S1003, the value of the modified reconstructed image sample of a chroma component is clipped. By performing the clipping process, the value of samples may be guaranteed to be in a determined range. Further, the clipping may facilitate better convergence in the process of least square optimization, etc., to minimize the difference between a residual (a difference between the original sample value and the reconstructed sample value) and the filtered value of chroma samples in order to determine filter coefficients.

In step S1004, an image is decoded using the clipped reconstructed image sample of a chroma component. In some embodiments, step S1003 need not be performed. In this case, an image is decoded using the modified reconstructed chroma sample which is not clipped.

Figure 98:
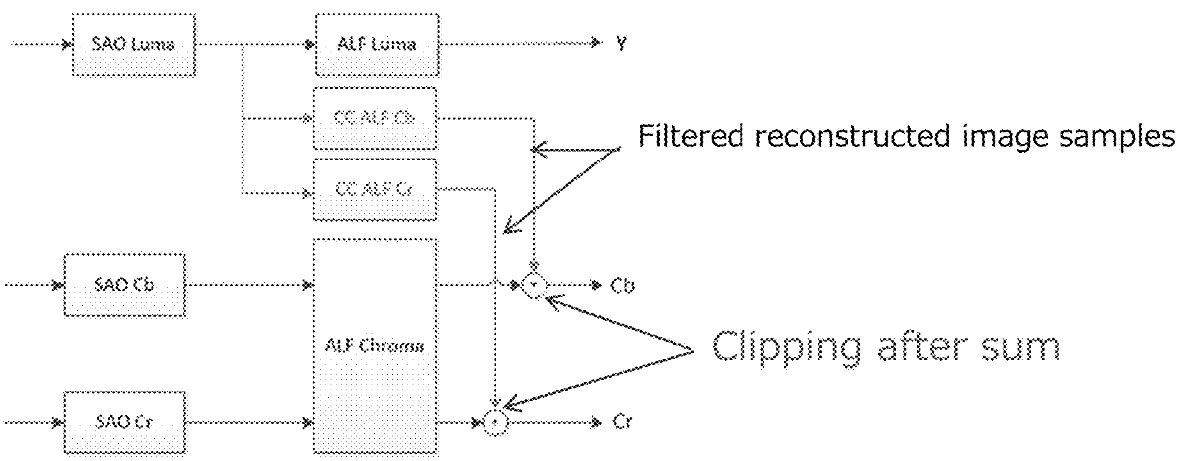
FIG. 98 is a block diagram illustrating a configuration of an encoder and a decoder according to an embodiment.

FIG. 98 is a block diagram illustrating a configuration of an encoder and a decoder according to an embodiment. In this embodiment, a clipping process is applied to a modified reconstructed image sample of a chroma component, as in step S1003 of FIG. 97. For example, the modified reconstructed image sample may be clipped to be in a range of [0, 1023] for a 10 bit output. When filtered reconstructed image samples of a luma component generated by the CCALF process are clipped, it may not be necessary to clip the modified reconstructed image sample of a chroma component in some embodiments.

Figure 99:
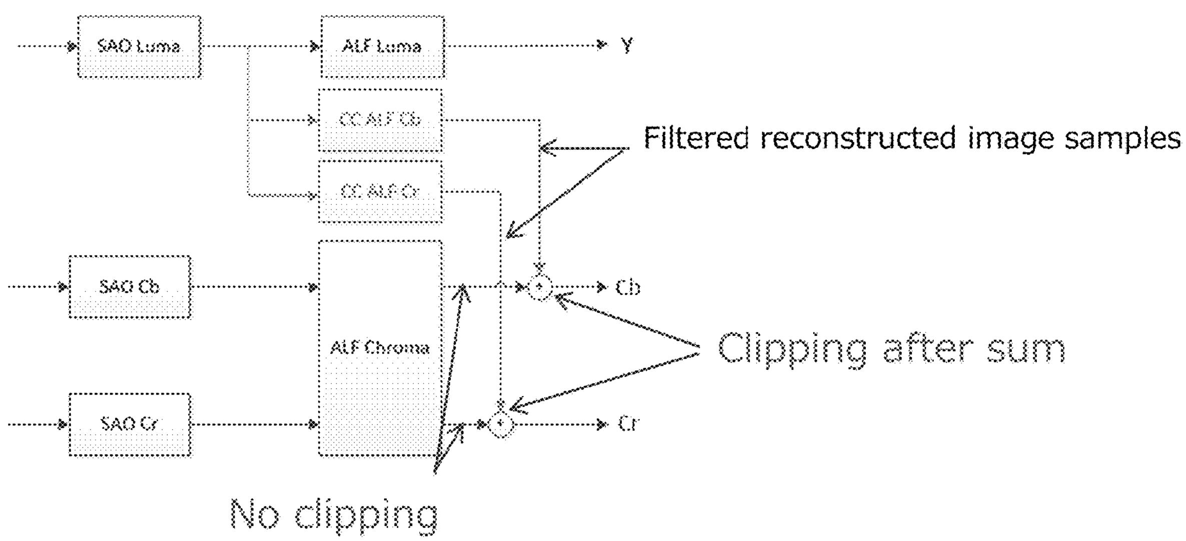
FIG. 99 is a block diagram illustrating a configuration of an encoder and a decoder according to an embodiment.

FIG. 99 is a block diagram illustrating a configuration of an encoder and a decoder according to an embodiment. In this embodiment, a clipping process is applied to a modified reconstructed image sample of a chroma component, as in step S1003 of FIG. 97. A clipping process is not applied to filtered reconstructed luma samples generated by the CCALF process. The filtered value of the reconstructed chroma samples generated by an ALF process need not be clipped, as shown by "No clipping" in FIG. 99. In other words, the reconstructed image sample to be modified is generated using a filtered value (ALF chroma) and a difference value (CCALF Cb/Cr), wherein no clipping is applied to the output of the generated sample value.

Figure 100:
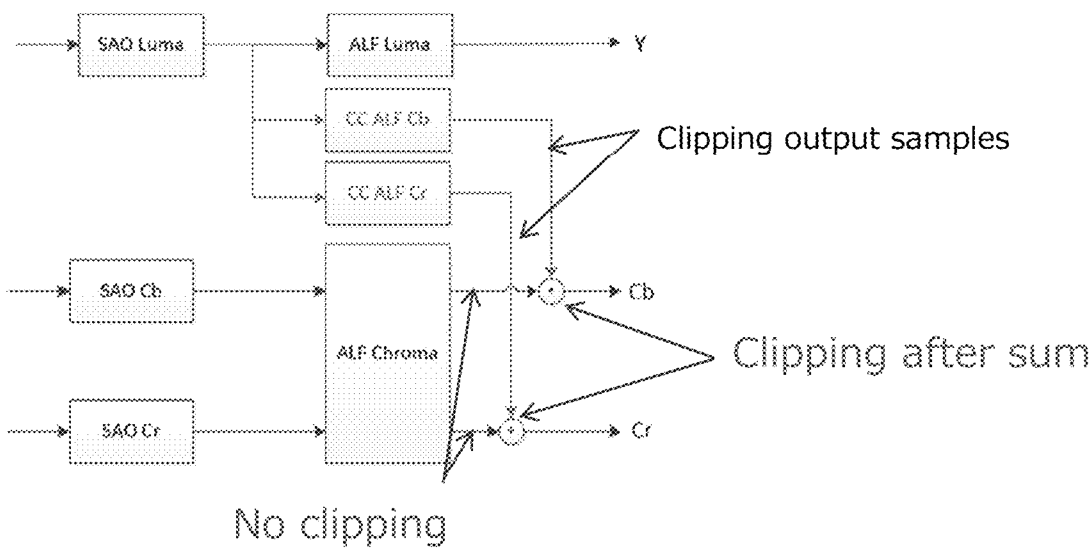
FIG. 100 is a block diagram illustrating a configuration of an encoder and a decoder according to an embodiment.

FIG. 100 is a block diagram illustrating a configuration of an encoder and a decoder according to an embodiment. In this embodiment, a clipping process is applied to filtered reconstructed luma samples generated by the CCALF process ("Clipping output samples") and modified reconstructed image samples of a chroma component ("Clipping after sum"). The filtered value of the reconstructed chroma samples generated by an ALF process is not clipped ("No clipping"). As an example, a clipped range applied to the filtered reconstructed image sample of a luma component may be [−2^15, 2^15-1] or [−2^7, 2^7-1].

Figure 101:
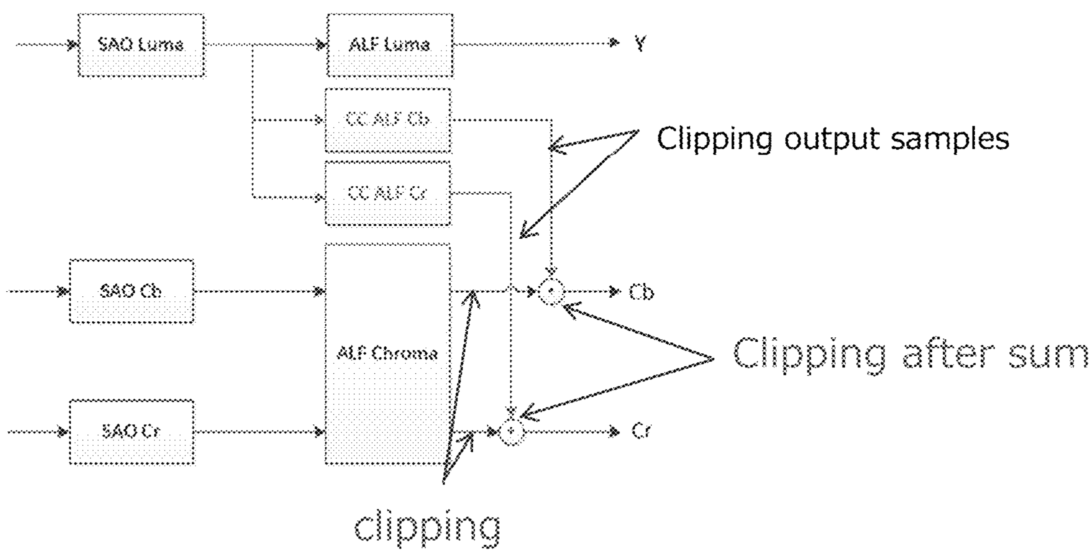

FIG. 101 shows another example in which a clipping process is applied to filtered reconstructed luma samples generated by the CCALF process ("Clipping output samples"), to modified reconstructed image samples of a chroma component ("Clipping after sum"), and to filtered reconstructed chroma samples generated by an ALF process ("clipping"). In other words, output values from the CCALF process and the ALF Chroma process are separately clipped, and clipped again after they are summed. In this embodiment, the modified reconstructed image sample of a chroma component need not be clipped. As an example, the final output from the ALF Chroma process may be clipped to a 10 bit value. As an example, a clipped range applied to the filtered reconstructed image samples of a luma component may be [−2^15, 2^15-1] or [−2^7, 2^7-1]. This range may be fixed or may be adaptively determined. In either case, the rage can be signaled in header information, for example, in SPS (Sequence Parameter set) or APS (Adaptation Parameter set). In the case when a non-linear ALF is used, clipping parameters may be defined for "Clipping after sum" in FIG. 101.

The reconstructed image samples of a luma component to be filtered by the CCALF process may be neighboring samples which are adjacent to a current reconstructed image sample of a chroma component. That is, the modified current reconstructed image sample may be generated by adding a filtered value of neighboring image samples of a luma component located adjacent to the current image sample to the filtered value of the current image sample of a chroma component. The filtered value of image samples of a luma component may be represented as a difference value.

Processes disclosed in this aspect may reduce hardware internal memory size required to store filtered image sample values.

Second Aspect

Figure 102:
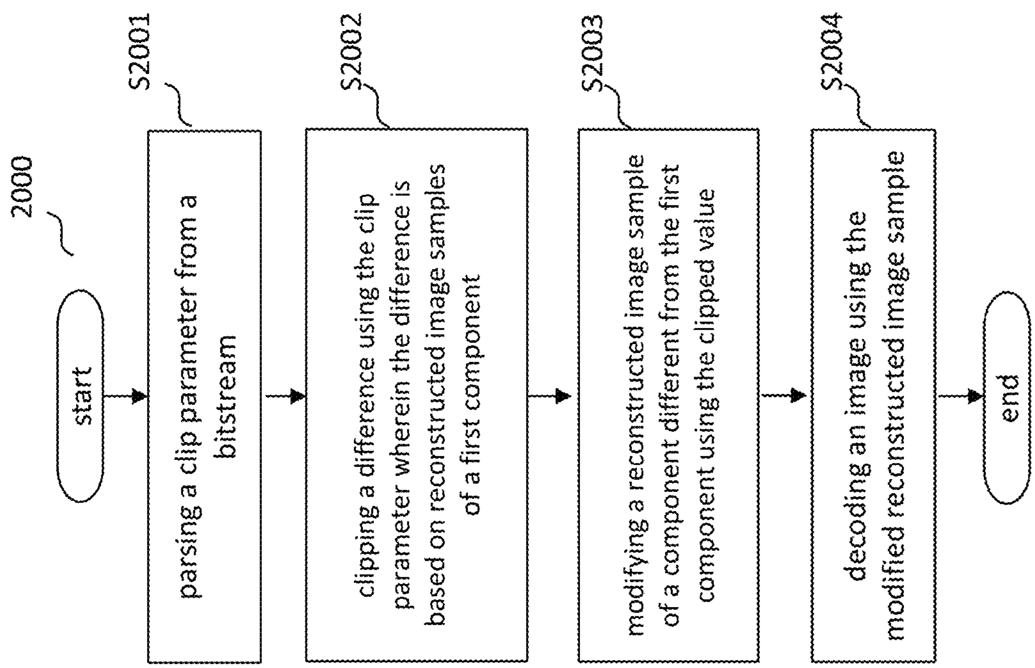

FIG. 102 is a flow chart of an example of a process flow 2000 of decoding an image applying a CCALF process using defined information, according to a second aspect. The process flow 2000 may be performed, for example, by the decoder 200 of FIG. 67, etc.

Figure 103:
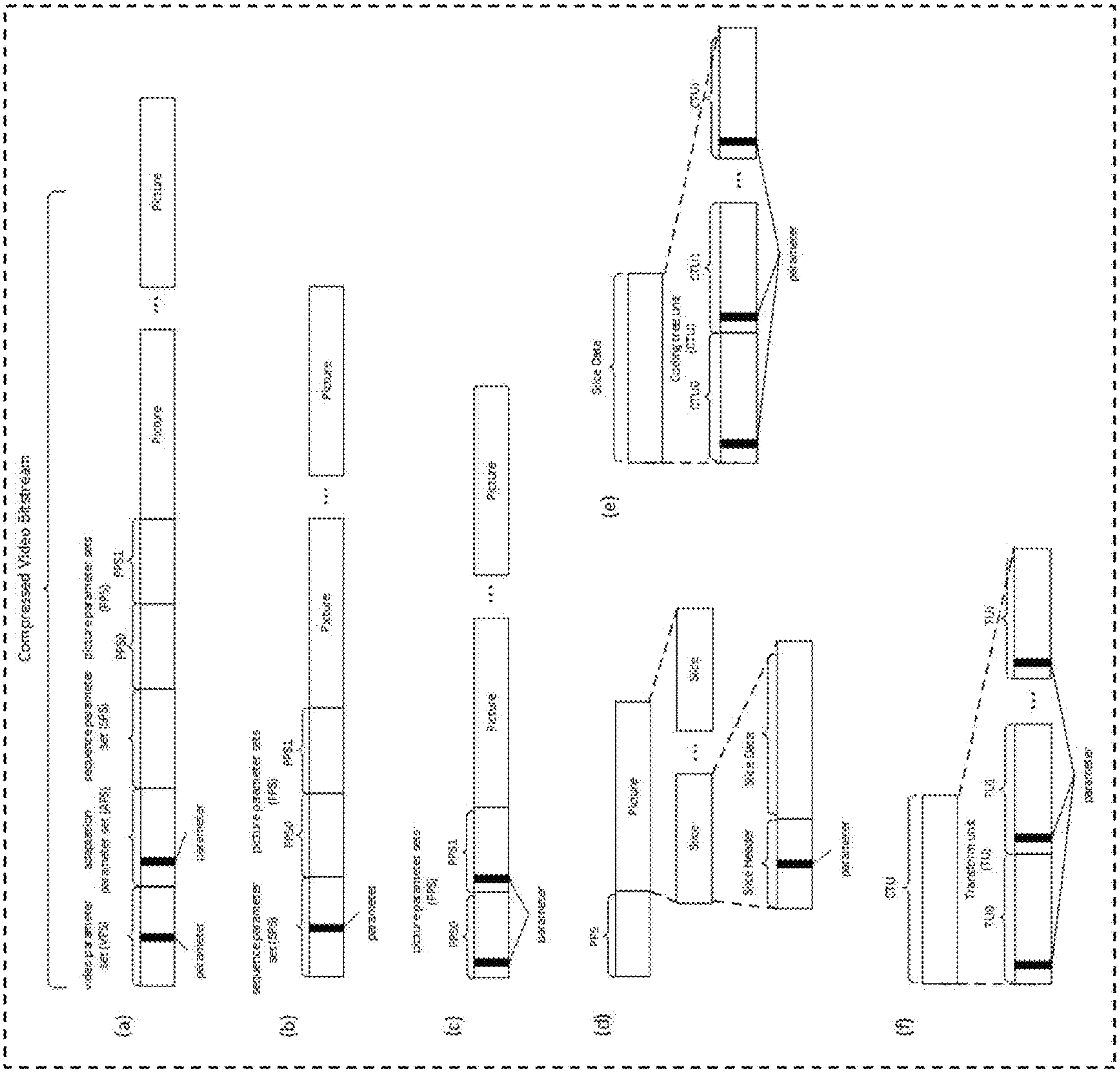

In step S2001, a clip parameter is parsed from a bitstream. The clip parameter may be parsed from a VPS, APS, SPS, PPS, slice header, at CTU or TU level, as described in FIG. 103. FIG. 103 is a conceptual diagram indicating location(s) of clip parameters. A parameter described in FIG. 103 may be replaced by a different type of clip parameter, a flag, or an index. Two or more clip parameters may be parsed from two or more parameter sets in the bitstream.

In step S2002, a difference is clipped using the clip parameter. The difference is generated based on reconstructed image samples of a first component (e.g., the difference value (CCALF Cb/Cr) in FIGS. 98-101). As an example, the first component is a luma component and the difference is filtered reconstructed luma samples generated by the CCALF process. In this case, a clipping process is applied to the filtered reconstructed luma samples using a parsed clip parameter.

The clip parameter restricts a value to be within a desired range. If a desired range is [−3, 3], for an example, value 5 is clipped to 3 using operation clip(−3, 3, 5). In this example, value −3 is the lower range and value 3 is the upper range.

The clip parameter may indicate an index to derive a lower range and an upper range, as shown in (i) of FIG. 104. In this example, ccalf_luma_clip_idx[ ] is the index, −range_array[ ] is the lower range, and range_array[ ] is the upper range. In this example, range_array[ ] is a determined range array which may be different from the range array used for an ALF. The determined range array may be predetermined.

The clip parameter may indicate a lower range and an upper range, as shown in (ii) of FIG. 104. In this example, −ccalf_luma_clip_low_range[ ] is the lower range, and ccalf_luma_clip_up_range[ ] is the upper range.

The clip parameter may indicate a common range for both a lower range and an upper range, as shown in (iii) of FIG. 104. In this example, −ccalf_luma_clip_range is the lower range, and ccalf_luma_clip_range is the upper range.

The difference is generated by multiplying, dividing, adding or subtracting at least two reconstructed image samples of the first component. The two reconstructed image samples, for example, may come from current and neighboring image samples or two neighboring image samples. The locations of the current and neighboring image samples may be predetermined.

In step S2003, a reconstructed image sample of a second component different from the first component is modified using the clipped value. The clipped value may be a clipped value of a reconstructed image sample of a luma component. The second component may be a chroma component. The modification may include an operation to multiply, divide, add or subtract the clipped value with respect to the reconstructed image sample of the second component.

In step S2004, an image is decoded using the modified reconstructed image sample.

In the present disclosure, one or more clip parameters for cross component adaptive loop filtering are signaled in a bitstream. With this signaling, the syntax of cross component adaptive loop filtering and the syntax of adaptive loop filter can be combined for syntax simplification. Furthermore, with this signaling, the design of cross component adaptive loop filtering may be more flexible for coding efficiency improvement.

The clip parameters may be defined or predefined for both encoder and decoder without being signaled. The clip parameters may also be derived using luma information without being signaled. For example, the clip parameters corresponding to a large clip range may be derived if a strong gradient or edge is detected in a luma reconstructed image, and the clip parameters corresponding to a short clip range may be derived if a weak gradient or edge is detected in a luma reconstructed image.

Third Aspect

Figure 105:
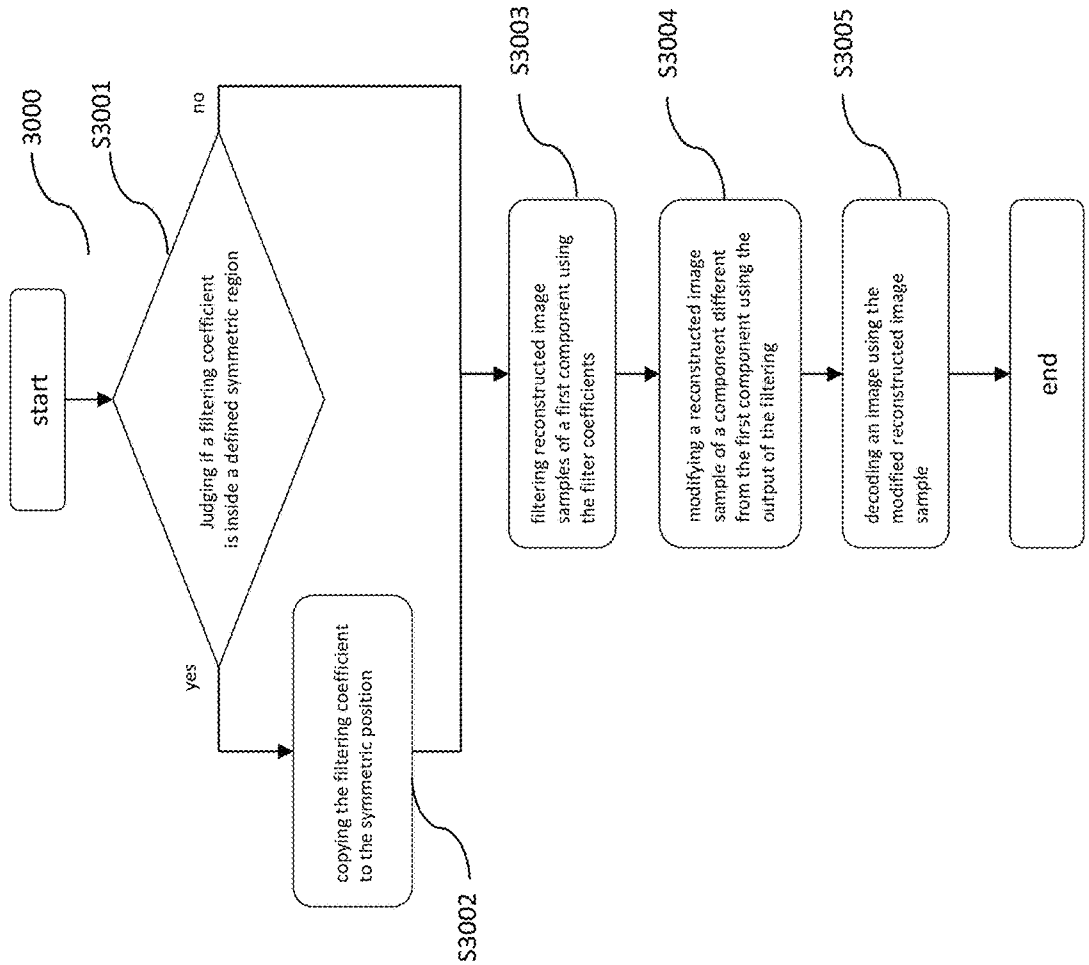

FIG. 105 is a flow chart of an example of a process flow 3000 of decoding an image applying CCALF process using a filter coefficient according to a third aspect. The process flow 3000 may be performed, for example, by the decoder 200 of FIG. 67, etc. A filter coefficient is used in a filtering step of a CCALF process to generate a filtered reconstructed image sample of a luma component.

In step S3001, it is determined whether a filtering coefficient is located inside a defined symmetric region of a filter. Optionally, an additional step of judging if a shape of the filter coefficients is symmetric or not may be performed. Information indicating whether the sample of filter coefficients is symmetric or not may be coded into a bitstream. If the shape is symmetric, the locations of coefficients that are inside the symmetric region may be determined or predetermined.

In step S3002, if the filtering coefficient is inside a defined symmetric region (Yes in step S3001), the filter coefficient is copied to the symmetric position and a set of filter coefficients is generated.

In step S3003, the filter coefficients are used to filter the reconstructed image samples of a first component. A first component may be a luma component.

In step S3004, an output of the filtering is used to modify a reconstructed image sample of a second component different from the first component. The second component may be a chroma component.

In step S3005, an image is decoded using the modified reconstructed image sample.

If filter coefficients are not symmetric (No in step S3001), all the filter coefficients can be coded from a bitstream and a set of the filter coefficients may be generated without copying.

This aspect may reduce the amount of information to be coded into the bitstream. That is, only one of the filter coefficients that are symmetric may need to be coded in the bitstream.

FIGS. 106, 107, 108, 109, and 110 are conceptual diagrams of examples indicating locations of filter coefficients to be used in a CCALF process. In these examples, some coefficients included in a set of coefficients are signaled, assuming symmetry exists.

Figure 106:
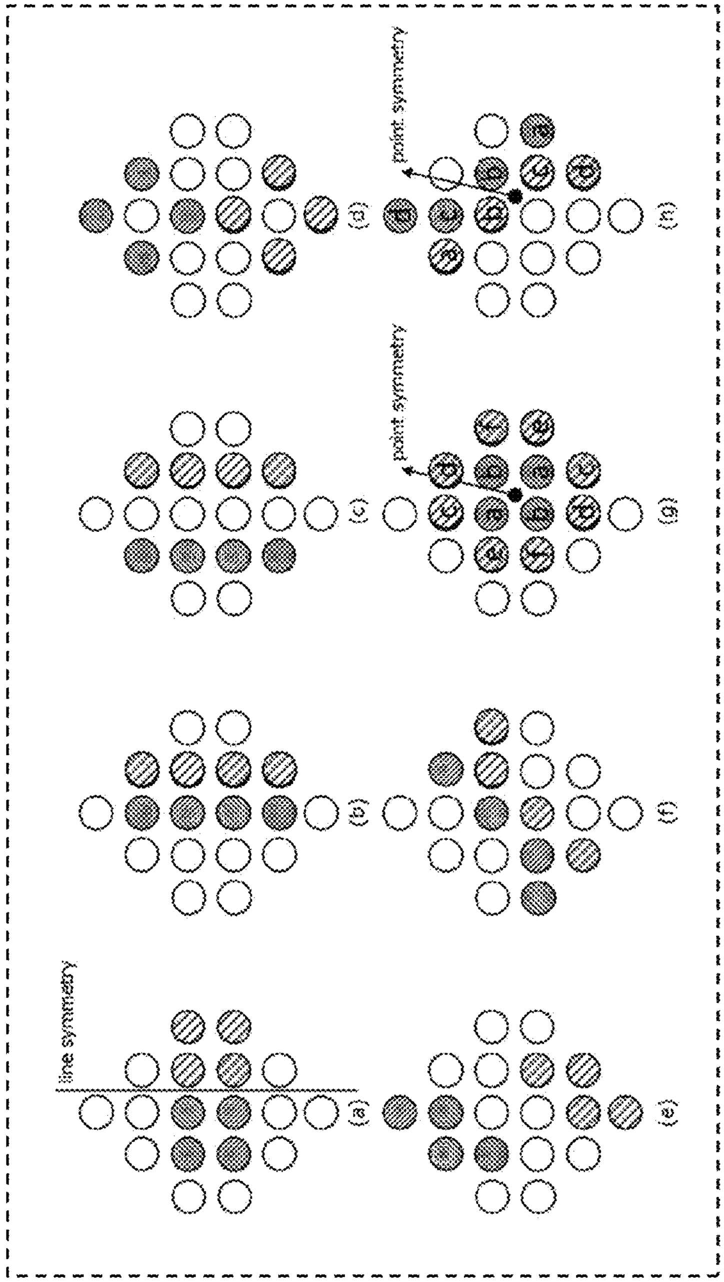

Specifically, examples (a), (b), (c), and (d) of FIG. 106 indicate examples in which a part of a set of CCALF coefficients (marked by diagonal lines and grid patterns) is located inside a defined symmetric region. In these examples, symmetric regions have line-symmetric shape. Only some marked coefficients (marked by diagonal lines or grid patterns) and white colored coefficients may be coded into a bitstream and other coefficients may be generated by using coded coefficients. As other examples, only marked coefficients may be generated and used in a filtering process. Other white colored coefficients (not marked by any pattern) need not be used in a filtering process.

Examples (e), (f), (g), and (h) of FIG. 106 indicate examples in which the shape of the symmetric region is horizontal, vertical, diagonal, along with a direction, point symmetric, or point symmetric with a direction.

In these figures, only a part of the coefficients that are marked by diagonal lines or grid patterns may need to be coded. Locations of coefficients to be coded may be determined or predetermined. For example, coefficients may be coded in determined scanning order and the one appears first may be coded first. The coefficient in the symmetric region whose coefficient is not coded may be copied from the coefficient that is located at its symmetric position. In some embodiments, it may not be necessary to process coefficients based on symmetry. For example, when it is determined that i-th coefficient is the same as j-th coefficient in the scanning order, the process may just copy j-th value to i-th value. The location may be determined based on other parameters.

Figure 107:
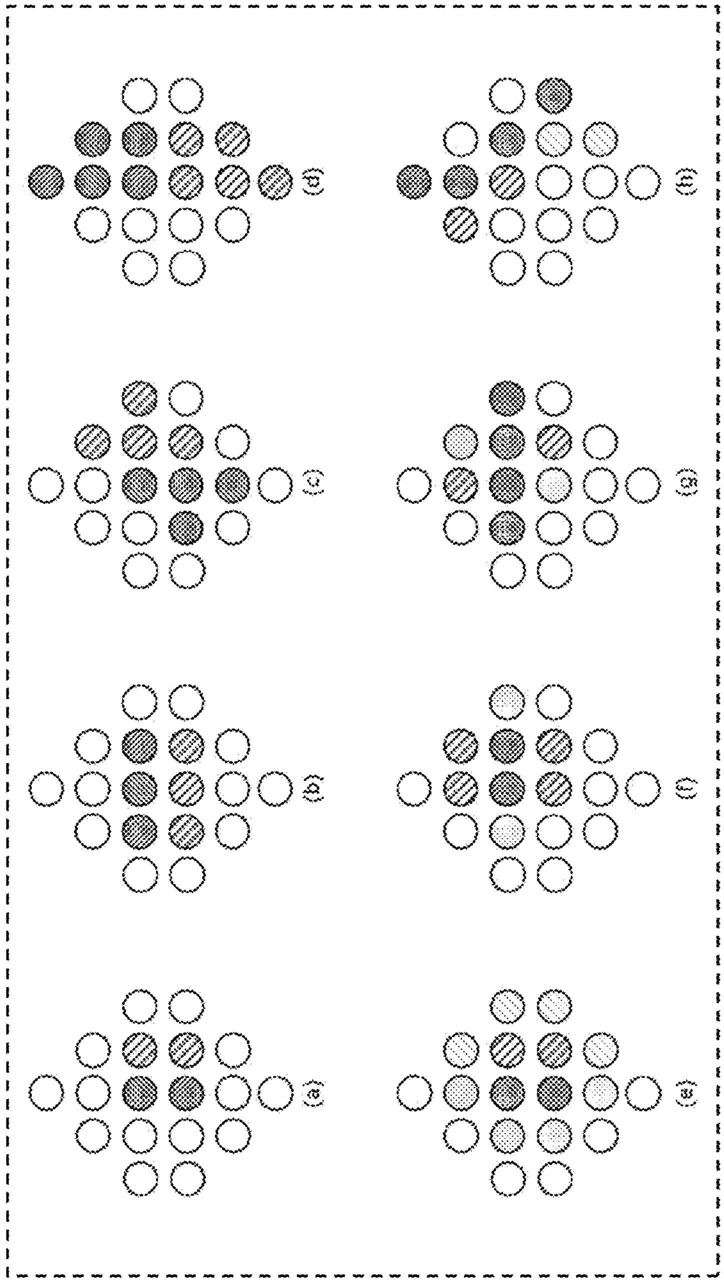

Examples (a), (b), (c), and (d) of FIG. 107 indicate examples in which a part of a set of CCALF coefficients (marked by diagonal lines and grid patterns) is located inside a defined symmetric region. In these examples, the number of symmetric coefficients may be different. The number of symmetric coefficients may be determined, predetermined, or may be signaled at a picture level, a slice level, or a block level.

Examples (e), (f), (g), and (h) of FIG. 107 indicate examples in which a part of a set of CCALF coefficients (marked by diagonal lines and grid patterns) is located inside a defined symmetric region. In these examples, symmetric coefficients in one symmetric side may be different from the corresponding coefficients in the other symmetric side, that is, some coefficients (e.g., a set of coefficients) in one side are symmetric with different coefficient values (e.g., another set of coefficients) in the other side. As an example, only a part of "grid pattern" coefficients in one symmetric side may be coded into a bitstream and copied to generate "diagonal-line pattern" coefficients in the other symmetric side.

Figure 108:
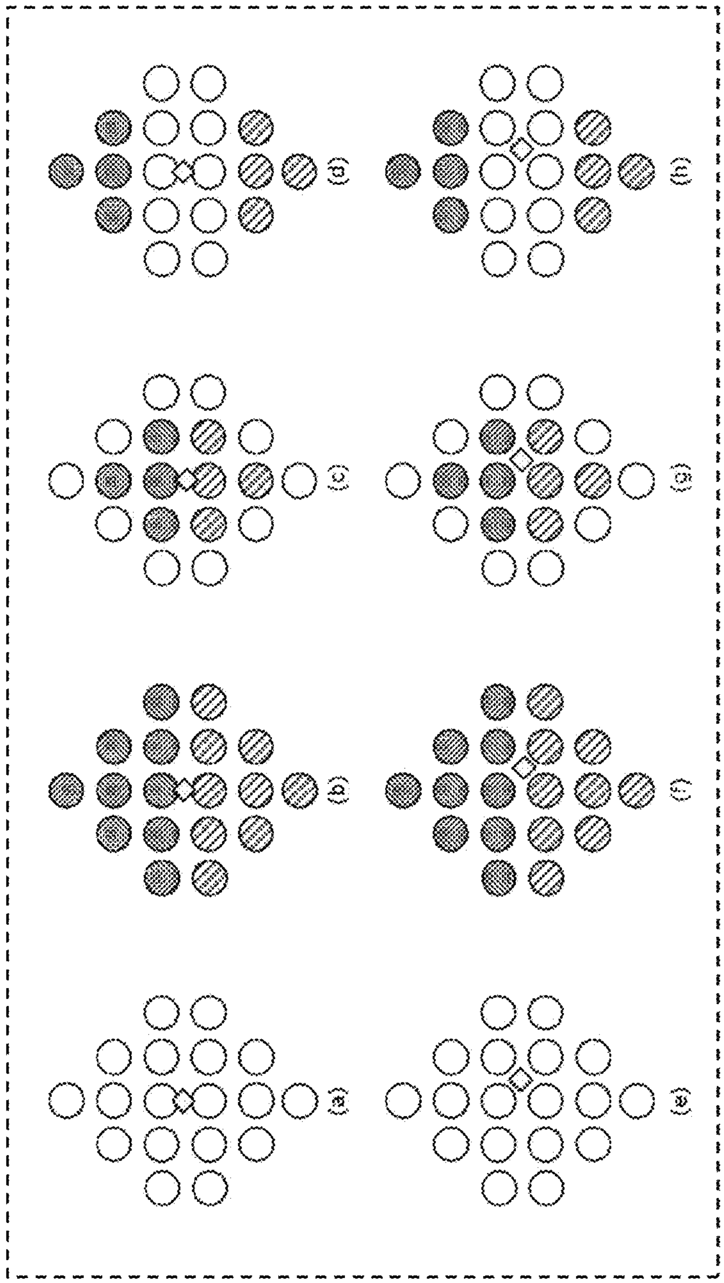

Examples (a), (b), (c), and (d) of FIG. 108 indicate examples of filter shapes in which a chroma type serves as a determined format. The determined format may be YUV 420 Type 0, for example. Marked coefficients (diagonal-lined coefficients or grid-patterned coefficients) are symmetric about the chroma position of the chroma type. The filter shape may be designed to be symmetric about the chroma position of other YUV formats. For example, these filter shapes of (a)-(d) of FIG. 108 may be used as a default, and other filter shapes may be determined to be used in a filtering process when a parameter coded in a bitstream indicates other formats.

Examples (e), (f), (g), and (h) of FIG. 108 indicate examples of filter shapes in which a chroma type serves as a determined format. The determined format may be the YUV chroma format different from YUV 420 Type 0. Different filter shapes can be used for other formats.

Figure 109:
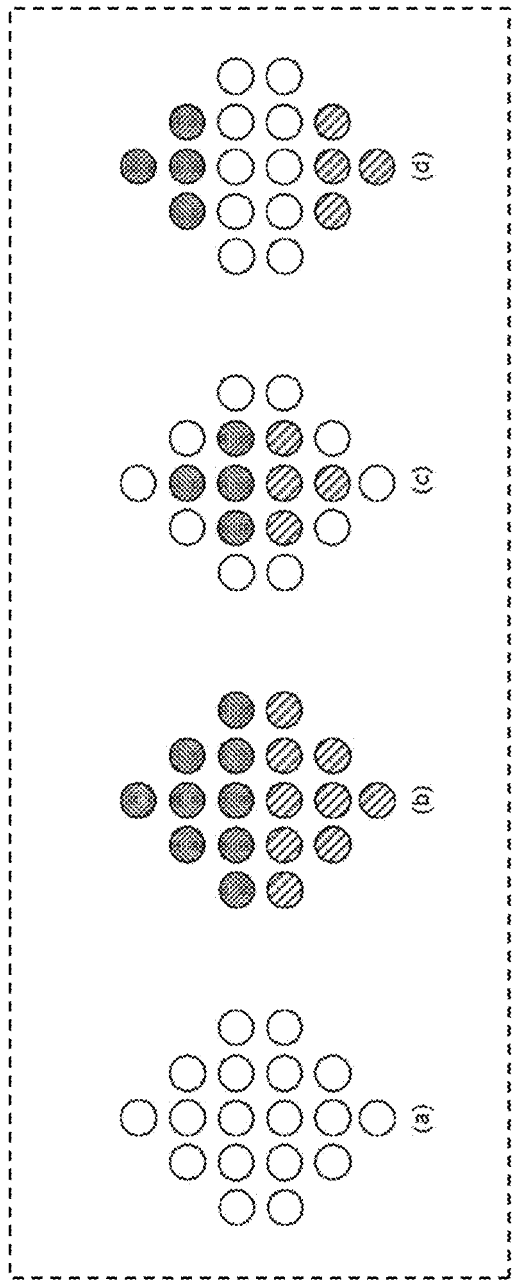

Examples (a), (b), (c), and (d) of FIG. 109 indicate other examples of filter shapes. In (a) of FIG. 109, the number of symmetric coefficients may be zero and all coefficients are signaled independently. The number of symmetric coefficients need not be coded into a bitstream. In (b) of FIG. 109, the number of symmetric coefficients may be one half of all coefficients.

Figure 110:
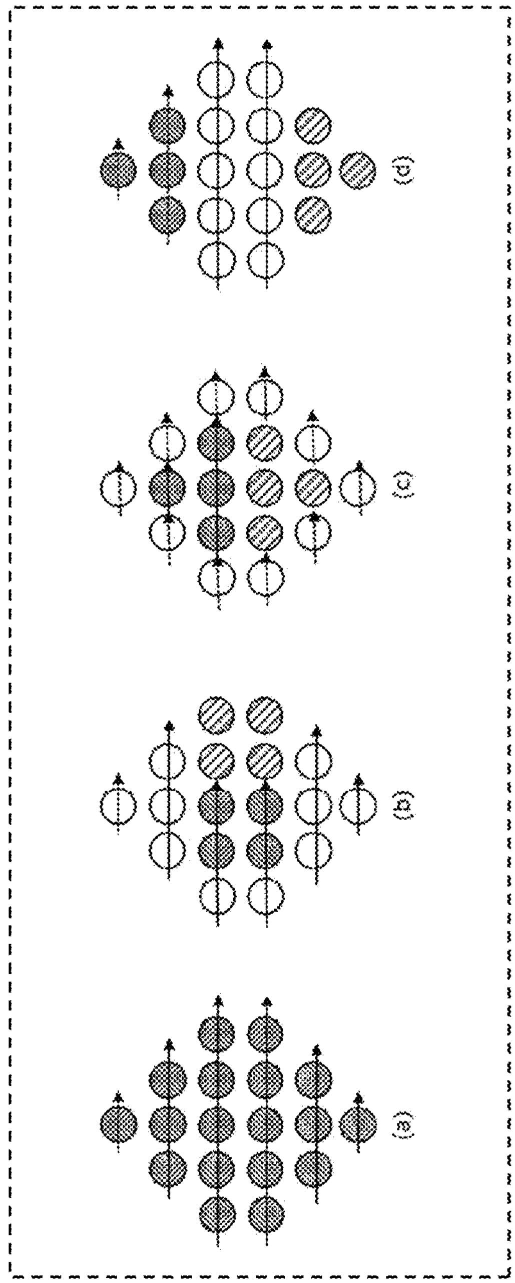

Examples (a), (b), (c), and (d) of FIG. 110 indicate other examples of filter shapes and signals to be coded with scan order indicated by arrows. In (a) of FIG. 110, raster scan order is applied to filter coefficients regardless of a symmetry type. In (b) of FIG. 110, raster scan order is applied to filter coefficients, regardless of a symmetry type, and only white colored coefficients and grid-patterned coefficients are signaled in the bitstream in the raster scan order. The decoder may use a LUT (look up table) to duplicate the grid patterned coefficients to generate diagonal line patterned coefficients. In (c) of FIG. 110, grid patterned coefficients located in a symmetric region are scanned and signaled, and then white colored coefficients located in an asymmetric region are scanned and signaled. In (d) of FIG. 110, coefficients located in an asymmetric region are scanned and signaled, and then grid-patterned coefficients are scanned and signaled.

Figure 111:
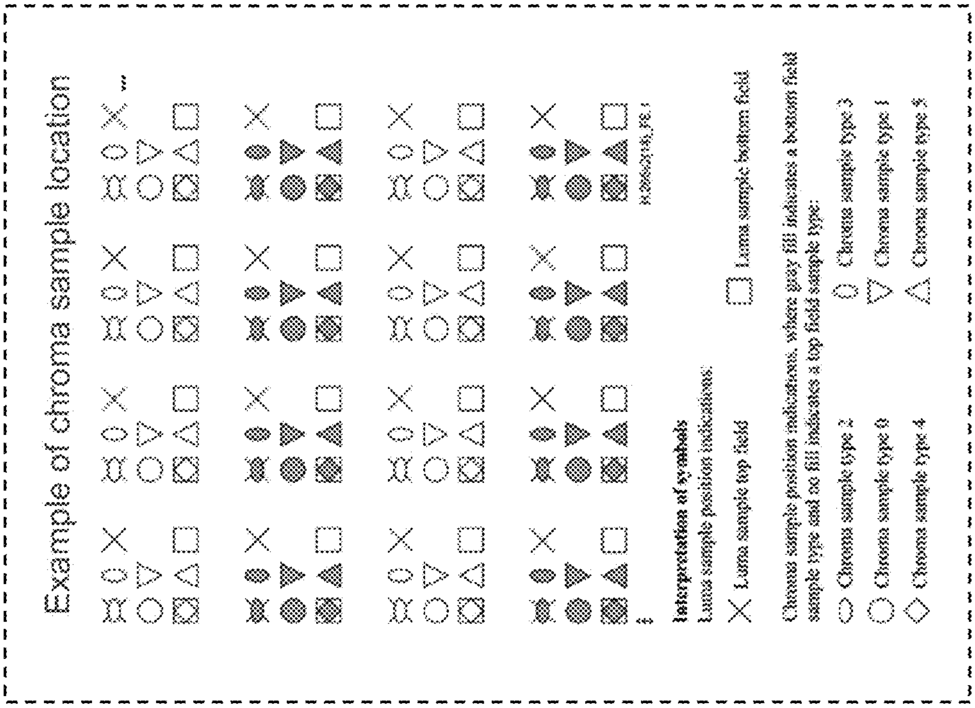
Figure 112:
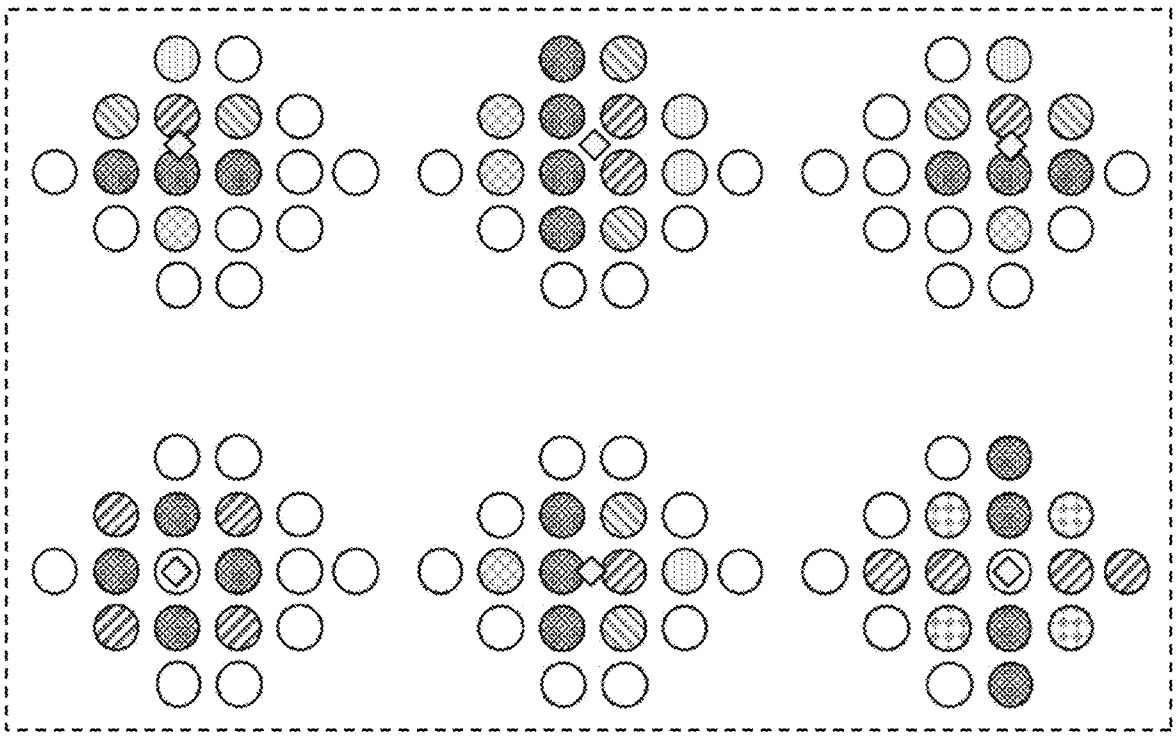

FIGS. 111 and 112 are conceptual diagrams of further examples indicating locations of filter coefficients to be used in a CCALF process. In these examples, symmetric positions, locations, or numbers of coefficients in the set of filter coefficients may be adaptive to chroma type.

FIG. 113 is a block diagram illustrating a configuration of a CCALF process performed by an encoder and a decoder according to an embodiment. After filtering the luma picture using the generated filter coefficients, the output samples are applied on the chroma picture. The filter with the generated filter coefficients is applied on the SAO Luma output picture. The filtered samples (CC ALF Cb and CC ALF Cr) are then added to the ALF Chroma output picture.

Fourth Aspect

FIG. 114 is a flow chart of an example of a process flow 4000 of decoding an image applying a CCALF process using a filter selected from a plurality of filters according to a fourth aspect. The process flow 4000 may be performed, for example, by the decoder 200 of FIG. 67, etc. This embodiment discloses methods of modifying reconstructed samples of a component using information from a different component.

In step S4001, a parameter is determined. The parameter may be parsed from a VPS, APS, SPS, PPS, slice header, or at a CTU or TU level as described in FIG. 103. The parameter is parsed from a bitstream to specify a filter. For example, the parameter may indicate an index to select a filter from a determined plurality of filters. The parameter may be parsed from a bitstream to indicate a chroma sub-sampling format as 4:4:4, 4:2:0, 4:2:2, or 4:1:1. The parameter may be parsed from a bitstream to indicate a color space as YCbCr or RGB. The parameter may be parsed from a bitstream to indicate a picture resolution as 4K, FHD, CIF, QCIF. The parameter may indicate a color component as Y, Cb, or Cr. The parameter may also be derived using luma information without being signaled. For an example, the parameter corresponding to a short tap filter may be derived if a strong gradient or edge is detected in a luma reconstructed image, and the parameter corresponding to a long tap filter may be derived if a weak gradient or edge is detected in a luma reconstructed image. As another example, the parameter corresponding to a long tap filter may be derived if a strong gradient or edge is detected in a luma reconstructed image, and the parameter corresponding to a short tap filter may be derived if a weak gradient or edge is detected in a luma reconstructed image.

In step S4002, a filter is selected from a plurality of filters based on the parameter. The plurality of filters may be of different shapes or sizes. The plurality of filters may be of the same shape and have different coefficient values. The parameter may indicate the coefficient values to be used to generate a set of filter coefficients.

FIG. 115 shows an example of a process flow of selecting a filter.

In step S4011, it is determined if the parameter indicates a determined format. The format may be predetermined. The determined format may indicate a chroma sub-sampling format as 4:4:4, 4:2:0, 4:2:2, or 4:1:1. The determined format may indicate a color component as Y, Cb, or Cr. The determined format may indicate a color space as YCbCr or RGB. The determined format may indicate a picture resolution as 4K, FHD, CIF, QCIF.

In step S4012, if it is determined that the parameter indicates the determined format (YES in step S4011), a first filter from a plurality of filters is selected.

In step S4013, if it is determined that the parameter does not indicate the determined format (No in step S4011), a filter different from the first filter is selected from a plurality of filters. The shape, size, or values of the filter coefficients may be different between S4012 and S4013.

FIG. 116 and FIG. 117 illustrate some examples of filters. In FIG. 116 showing filters (1a)-(1i), the total number of rows having the maximum number of coefficients is even (e.g. 2, 4, or 6). In FIG. 117 showing filters (2a)-(2i), the total number of rows having the maximum number of coefficients is odd (e.g. 1, 3, or 5).

For example, a filter from FIG. 116 may be selected if the parameter indicates that 4:2:0 chroma sub-sampling format is applied, while a filter from FIG. 117 may be selected if the parameter indicates that 4:2:2, 4:4:4, or 4:1:1 chroma sub-sampling format is applied. The selection of the filters from FIG. 116 and FIG. 117 may be reversed.

For example, a filter from FIG. 116 may be selected if the parameter indicates that Y is used to modify Cb or Cr, while a filter from FIG. 117 may be selected if the parameter indicates that Cb is used to modify Cr, or Cr is used to modify Cb. The selection of the filters from FIG. 116 and FIG. 117 may be reversed.

For example, a filter from FIG. 116 may be selected if the parameter indicates that color space YCbCr is applied, while a filter from FIG. 117 may be selected if the parameter indicates that color space RGB is applied. The selection of the filters from FIG. 116 and FIG. 117 can be reversed.

For example, a first filter from FIG. 116 may be selected if the parameter indicates that image resolution is large (e.g. 4K or 8K), while a filter different from the first filter from FIG. 116 may be selected if the parameter indicates that image resolution is small (e.g. QCIF or CIF). The size of these two selected filters may be different. For example, filter (1a) may be selected for image resolution QCIF, filter (1c) may be selected for image resolution FHD, and filter (1e) may be selected for image resolution 8K.

For example, a first filter from FIG. 117 may be selected if the parameter indicates that image resolution is large (e.g. 4K or 8K), while a filter different from the first filter from FIG. 117 may be selected if the parameter indicates that image resolution is small (e.g. QCIF or CIF). The size of these two selected filters may be different. For example, filter (2a) may be selected for image resolution QCIF, filter (2c) may be selected for image resolution FHD, and filter (2e) may be selected for image resolution 8K.

In step S4003, reconstructed image samples of a first component are filtered using the selected filter. The first component may be a luma component. The filtering process contains at least an operation of multiplication, division, addition or subtraction on at least two reconstructed image samples of the first component. For example, the two reconstructed image samples may come from current and neighboring image samples, or may come from two neighboring image samples. The locations of the current and neighboring image samples may be predetermined.

In step S4004, a reconstructed image sample of a second component different from the first component is modified using the output of the filtering. The second component may be a chroma component. The modification includes an operation to multiply, divide, add or subtract the output of the filtering with the reconstructed image sample.

At step S4005, an image is decoded using the modified reconstructed image sample.

The present disclosure relates to adaptively selecting one filter from a plurality of filters for cross component filtering.

Different filters may have different shapes or sizes. The adaptive selection of a filter makes cross component filtering more flexible for coding efficiency improvement.

More than one set of filters can be signaled. Different sets of filters may have different shapes and sizes. Which filter to be used may be parsed or determined thereafter (e.g. from filter_id).

Fifth Aspect

FIG. 118 is a flow chart of an example of a process flow 5000 of decoding an image applying a CCALF process using a parameter according to a fifth aspect. The process flow 5000 may be performed, for example, by the decoder 200 of FIG. 67, etc.

In step S5001, a first parameter is parsed from a bitstream. The first parameter can be parsed from a VPS, APS, SPS, PPS, slice header, or at a CTU or TU level (FIG. 103, wherein the "parameter" corresponds to the "first parameter"). The first parameter may indicate a chroma sub-sampling format as 4:4:4, 4:2:0, 4:2:2, or 4:1:1. The first parameter may indicate a color space as YCbCr or RGB. The first parameter may indicate a picture resolution as 4K, FHD, CIF, QCIF. The first parameter may indicate a color component as Y, Cb, or Cr.

In step S5002, it is determined if the first parameter is equal to a determined value. The determined value may be predetermined.

In step S5003, if it is determined that the first parameter is equal to a determined value (YES in step S5002), a first number of coefficients is parsed from the bitstream. The first number of coefficients can be parsed from a VPS, APS, SPS, PPS, slice header, or at a CTU or TU level (FIG. 103, wherein the "parameter" corresponds to the "first number of coefficients").

In step S5004, if it is determined that the first parameter is not equal to a determined value (NO in step S5003), a second number of coefficients not equal to the first number of coefficients is parsed from the bitstream. The second number of coefficients can be parsed from a VPS, APS, SPS, PPS, slice header, or at a CTU or TU level (FIG. 103, wherein the "parameter" corresponds to the "second number of coefficients"). The first number and the second number from step S5002 and step S5003 can be different.

For example, as shown in (i) of FIG. 119, the number of coefficients when the first parameter indicates that 4:2:0 chroma sub-sampling format is applied is different from the number of coefficients when the first parameter indicates that 4:2:2, 4:4:4, or 4:1:1 chroma sub-sampling format is applied.

For example, as shown in (ii) of FIG. 119, the number of coefficients when the first parameter indicates that color space YCbCr is applied is different from the number of coefficients when the first parameter indicates that color space RGB is applied.

For example, as shown in (iii) of FIG. 119, the number of coefficients when the first parameter indicates that Y is used to modify Cb or Cr is different from the number of coefficients when the first parameter indicates that Cb is used to modify Cr, or Cr is used to modify Cb.

For example, as shown in (iv) of FIG. 119, the number of coefficients when the first parameter indicates that image resolution is large (e.g. 4K or 8K) is different from the number of coefficients when the first parameter indicates that image resolution is small (e.g. QCIF or CIF).

In FIG. 119, information like the chroma sub-sampling format and the image resolution can be obtained if SPS_id is coded in an APS.

In step S5005, reconstructed image samples of a first component are filtered using parsed coefficients. The filtering process contains at least an operation of multiplication, division, addition or subtraction on at least two reconstructed image samples of the first component. The two reconstructed image samples may come from current and neighboring image samples, or may come from two neighboring image samples, for example. The locations of the current and neighboring image samples may be predetermined.

In step S5006, a reconstructed image sample of a component different from the first component is modified using the output of the filtering. The modification includes an operation to multiply, divide, add or subtract the output of the filtering with the reconstructed image sample.

In step S5007, an image is decoded using the modified reconstructed image sample.

The present disclosure relates to adaptively deriving the number of filter coefficients for cross component filtering. The adaptive derivation of the number of filter coefficients makes cross component filtering more flexible for coding efficiency improvement.

More than one set of coefficients may be signaled. Different sets of coefficients may have different numbers of coefficients. Different sets of coefficients may have the same number of coefficients. The number of coefficients of those sets of coefficients may be fixed. Which set of coefficients to be used is parsed or determined thereafter (e.g. from coef-f_set_id, or filter_id).

Sixth Aspect

FIG. 120 is a flow chart of an example of a process flow 6000 of decoding an image applying a CCALF process using a parameter according to a sixth aspect. The process flow 6000 may be performed, for example, by the decoder 200 of FIG. 67, etc.

In S6001, the process selects at least a set of reconstructed samples from a first component;

In S6002, the process derives a value based on the selected set of reconstructed samples;

In S6003, the process filters the reconstructed samples based on the derived value;

In S6004, the process modifies a reconstructed image sample of a second component using the output of the filtering;

In S6005, the process decodes an image using the filtered reconstructed image sample.

FIGS. 121, 122, and 123 are conceptual diagrams illustrating examples of generating a CCALF value of a luma component (see step S6002) for a current chroma sample by calculating a weighted average value of neighboring samples. In other words, in this example, a CCALF value of luma samples for a chroma sample is generated by calculating a weighted sum of luma samples located in a neighboring region of the chroma sample. The luma samples include a sample located adjacent to the chroma sample.

In FIG. 121, a location indicated by a diamond shape is a location of a current chroma sample. For example, the value corresponding to the location (curr) for a CCALF may be derived by calculating an averaged value of neighboring luma samples that are marked with grid patterns. White colored luma samples need not be used for the averaging process. In other words, a value for a CCALF may be derived by referring to a sample value of a luma sample located adjacent to the current chroma sample. There are two such luma samples in the example of FIG. 121.

FIG. 122 describes sample equations for calculating a CCALF value. The CCALF value may be derived by using filter coefficient values and luma sample values. A filter coefficient value is multiplied to a subconstruct of two neighboring luma sample values. A luma sample used in each of the subconstruct calculation may be located adjacent to the current chroma sample. The form of equations may be the same as the form used in an ALF filtering process. In some embodiments, if the filter coefficient value is less than 64, the coefficient value may be set to zero.

As described in FIG. 123, different numbers of luma samples can be averaged, and the number of averaged neighboring luma samples may be predefined, or signaled in/at a picture, slice, or block level. The positions of averaged neighboring luma samples may be predefined, or signaled in/at a picture, slice, or block level. The weights of averaged neighboring luma samples may be predefined, or signaled in/at a picture, slice, or block level.

FIGS. 124 and 125 are conceptual diagrams illustrating examples of generating a CCALF value of a luma component for a current sample by calculating a weighted average value of neighboring samples, wherein locations of neighboring samples are determined adaptively to (according to) chroma type. In other words, the locations of luma samples to be used in the weighting calculation are determined based on a location of a current chroma sample.

Samples marked with different patterns may represent different weights. The number of averaged samples may be adaptive to (may correspond to) the chroma type. The weights of averaged samples may be adaptive to (may correspond to) the chroma type FIGS. 126 and 127 are conceptual diagrams illustrating examples of generating a CCALF value of a luma component by applying a bit shift to an output value of the weighting calculation. In other words, a scale-down shift process is applied to a filtered value of a luma samples in the same manner as in an ALF process. In some embodiments, if the coefficient value is less than 64, the coefficient value may be set to zero.

The number of shift bits for a CCALF is represented as x. The value x may be determined as the same value as in an ALF process. In some examples the value x may be fixed to 10. In some examples the value x may be fixed to 7.

Seventh Aspect

FIG. 128 is a flow chart of an example of a process flow 7000 of decoding an image applying a CCALF process using a parameter according to a seventh aspect. The process flow 7000 may be performed, for example, by the decoder 200 of FIG. 67, etc. Methods of determining reconstructed samples to be filtered using one or more parameters are described.

In step S7001, one or more parameters are parsed from a bitstream. The one or more parameters may be coded in at least one of an APS, SPS, PPS, slice header or at a CTU level, as shown in FIG. 129. FIG. 130 shows sample processes of retrieving the one or more parameters.

The one or more parameters may be in a SPS. A slice firstly locates a PPS according to PPS_id which is coded in the slice. The PPS then locates the SPS according to SPS_id which is coded in the PPS. Through this connection, the slice can retrieve the one or more parameters in the SPS as shown in (a) of FIG. 130.

The one or more parameters may be in a parameter set at a picture level, for example, in a PPS. A slice firstly locates a PPS according to PPS_id which is coded in the slice. Through this connection, the slice can retrieve the one or more parameters in the PPS as shown in (b) of FIG. 130.

The one or more parameters may be in an APS. A slice firstly locates an APS according to APS_id which is coded in the slice. Through this connection, the slice can retrieve the one or more parameters in the APS as shown in (c) of FIG. 130.

The one or more parameters may be in a slice ((d) of FIG. 130). The slice can obtain the one or more parameters from its internal header or data.

The one or more parameters may include a first parameter that selects the size of samples to be modified. The one or more parameters may indicate whether a CCALF process is enabled. The one or more parameters may include parameters indicating whether a CCALF process is enabled or not and parameters indicating coefficient values of the filter to be used.

The samples can be grouped in a square shape having a specific size such as 4×4, 8×8, 16×16, 16×16, 32×32, 64×64, or 128×128 samples.

The first parameter can be parsed prior to the parsing of a slice header or a slice data. For example, the first parameter may be parsed from an APS, SPS, or PPS.

The first parameter can be parsed from a slice header.

The first parameter can be parsed from a coding tree unit (CTU) data.

The first parameter can depend on a chroma sub-sampling type or a CTU size or both. If the chroma sub-sampling type is 4:4:4, the block size selected by the first parameter can be 4×4, 8×8, 16×16, 32×32, 64×64, or 128×128. If the chroma sub-sampling type is 4:2:2 or 4:2:0, the block size selected by the first parameter can be 4×4, 8×8, 16×16, 32×32, or 64×64.

The first parameter can depend on a CTU size where the selected block size cannot exceed its CTU size.

The one or more parameters may include a second parameter that indicates whether a block of samples is to be filtered.

The second parameter can be a flag with value of 1 or 0, wherein 1 indicates to modify the reconstructed samples and 0 indicates not to modify the reconstructed samples.

The second parameter may be parsed prior to the parsing of the first coding tree unit (CTU) data. For example, the second parameter can be parsed from an APS, SPS, PPS, slice header, or slice data.

The second parameter may be parsed from a coding tree unit (CTU) data. FIG. 131 shows sample values of the second parameter. A plurality of second parameters can indicate whether a plurality of blocks in a coding tree unit (CTU) having the specific sizes are to be modified.

The second parameters may indicate if the modification of reconstructed samples is disabled within a picture or a sequence. If the second parameters indicates that the modification of reconstructed samples is disabled, step S7002 of FIG. 128 will lead to step S7005 directly, which corresponds to "NO" branch in FIG. 128.

The one or more parameters may include a parameter that can be parsed using non-arithmetic coding such as fixed length coding, Exponential-Golomb coding, or VLC.

The one or more parameters may include a parameter that can be parsed using arithmetic coding such as CAVLC or CABAC.

For an example, as shown in FIG. 132, the second parameter can be parsed using arithmetic coding prior to the parsing of first coding tree unit data in a slice, followed by byte-alignment or bit-alignment data. In this example, the initialization of arithmetic coding for parsing parameters after the second parameter in the same slice may be applied.

In step S7002, it is determined if a filter is to be used based on the parsed parameters.

If a filter is to be used, in step S7003, at least a reconstructed sample from a first component is filtered. The first component can be luminance samples.

In step S7004, the reconstructed samples are modified using at least one filtered reconstructed sample from a component different from the first component. The component different from the first component can be chrominance samples.

In step S7005, a block of image samples is decoded using the modified reconstructed samples.

The present disclosure illustrates the characteristics of one or more parameters at multiple levels for filtering, including generation methods, functions and coding methods. Using these control parameters, the design of filtering may be optimized to save coding bits, enhance high-frequency components using modified samples, and reduce redundancy between different channels, to thereby improve image quality.

FIG. 133 is a conceptual diagram of a variation of this embodiment.

The one or more parameters can depend on the partition of a coding tree unit. When a partition has a different size from the size indicated by the first parameter, the second parameter indicating if the partition is filtered is not coded and the filtering of the partition is disabled. In this example, the coded bits of the second parameters are reduced.

The shape or the samples described in the seventh aspect may be replaced with a rectangular or a non-rectangular shape partition. Examples of the non-rectangular shape partition may be at least one of a triangular shape partition, a L-shape partition, a pentagon shape partition, a hexagon shape partition and a polygon shape partition as shown in FIG. 133.

Eighth Aspect

FIG. 134 is a flow chart of an example of a process flow 8000 of decoding an image applying a CCALF process using a parameter according to an eighth aspect. The process flow 8000 may be performed, for example, by the decoder 200 of FIG. 67, etc.

In step S8001, it is determined whether a first sample of a first component is outside a virtual boundary.

In step S8002, if it is determined that the first sample of a first component is outside a virtual boundary, a second sample of the first component is copied to the first sample, wherein the second sample is located inside the virtual boundary.

In step S8003, the reconstructed sample of the first component which includes the first and second samples is filtered.

In step S8004, a reconstructed sample of a component different from the first component is modified using the output of the filtering.

In step S8005, the modified reconstructed sample is used to decode an image.

A padding method in S8002 may be the same regardless of a chroma sampling format. For example, symmetric padding may be used. A padding method can be changed depending on the chroma sampling format, between symmetric padding and non-symmetric padding for example.

The first component may be luma samples and the different component whose sample values are modified may be chroma samples. Chroma can be Cb, Cr, or both.

FIG. 135 is a flow chart of an example of a process flow 8100 of decoding an image applying a CCALF process using a parameter according to the eighth aspect. The process flow 8100 may be performed, for example, by the decoder 200 of FIG. 67, etc.

In S8101, it is determined whether the chroma sample type is of a first type. FIG. 136 shows the example locations of chroma sample types 0 to 5.

In S8102, if it is determined that the chroma sample type is of a first type, a first sample and a second sample are used in filtering the reconstructed samples of a first component, wherein the first sample is duplicated from the second reconstructed sample.

In S8103, if it is determined that the chroma sample type is not of a first type, the second sample and a third sample are used in filtering the reconstructed samples of the first component, and the first sample is excluded, wherein the third sample is different from the first or second sample.

In S8104, a reconstructed sample from a component different from the first component is modified using the output of the filtering. For example, the first component is indicating luminance and the output of the filtering is added to the reconstructed sample from a chrominance component. In another example, the first component is indicating chrominance Cr and the output of the filtering is added to the reconstructed sample from chrominance Cb. In another example, the output of the filtering and the reconstructed sample can be added, subtracted, multiplied, divided, or subjected to any combination of the mathematical processes to obtain the modified reconstructed sample.

In S8105, the modified reconstructed sample is used to decode an image. For example, the modified reconstructed sample is stored in a reference picture buffer.

FIGS. 137, 138, and 139 are conceptual diagrams of examples of symmetric padding.

For example, in S8002 of FIG. 134, if the chroma sample type is equal to 0 or 1 and the virtual boundary is between C0 and C2 as shown in (a) of FIG. 137, the reconstructed sample value of a second sample (C15) is duplicated to the first sample (C17). Similarly, the reconstructed sample value of a second sample (C2) is duplicated to the first sample (C0).

As another example, in S8002, if the chroma sample type is equal to 0 or 1 and the virtual boundary is between C15 and C17 as shown in (b) of FIG. 137, the reconstructed sample value of a second sample (C2) is duplicated to the first sample (C0). Similarly, the reconstructed sample value of a second sample (C15) is duplicated to the first sample (C17).

As another example, in S8002, if the chroma sample type is equal to 0 or 1 and the virtual boundary is between C2 and C6 as shown in (c) of FIG. 137, the reconstructed sample values of second samples (C10, C11 and C12) are duplicated to the first samples (C14, C15, C16 and C17). Similarly, the reconstructed sample values of second samples (C5, C6 and C7) are duplicated to the first samples (C0, C1, C2 and C3).

As another example, in S8002, if the chroma sample type is equal to 0 or 1 and the virtual boundary is between C11 and C15 as shown in (d) of FIG. 137, the reconstructed sample values of second samples (C5, C6 and C7) are duplicated to the first samples (C0, C1, C2 and C3). Similarly, the reconstructed sample values of second samples (C10, C11 and C12) are duplicated to the first samples (C14, C15, C16 and C17).

FIGS. 138 and 139 show examples of samples which are duplicated in (a) of FIG. 137 and (c) of FIG. 137, respectively.

After duplicating, the duplicated samples are used in the filtering of the reconstructed samples of a first component.

FIGS. 140, 141, 142, and 143 are conceptual diagrams of examples of non-symmetric padding.

For example, in S8002, if the chroma sample type is equal to 2 or 3 and the virtual boundary is between C0 and C2 as shown in (a) of FIG. 140, the reconstructed sample values of second samples (C10, C11 and C12) are duplicated to the first samples (C14, C15, C16 or C17). Similarly, the reconstructed sample value of a second sample (C2) is duplicated to the first sample (C0).

In another example of S8002, if the chroma sample type is equal to 2 or 3 and the virtual boundary is between C15 and C17 as shown in (b) of FIG. 140, the reconstructed sample value of a second sample (C15) is duplicated to the first sample (C17).

In another example of S8002, if the chroma sample type is equal to 2 or 3 and the virtual boundary is between C2 and C6 as shown in (c) of FIG. 140, the reconstructed sample values of second samples (C4, C5, C6, C7 and C8) are duplicated to the first samples (C9, C10, C11, C12, C13, C14, C15, C16 and C17). Similarly, the reconstructed sample values of second samples (C5, C6 and C7) are duplicated to the first samples (C0, C1, C2 and C3).

In another example of S8002, if the chroma sample type is equal to 2 or 3 and the virtual boundary is between C11 and C15 as shown in (d) of FIG. 140, the reconstructed sample values of second samples (C5, C6 and C7) are duplicated to the first samples (C0, C1, C2 and C3).

FIGS. 141, 142, and 143 show examples of samples which are duplicated in (a) of FIG. 140, (c) of FIG. 140, and (d) of FIG. 140, respectively.

After duplicating, the duplicated samples are used in the filtering of the reconstructed samples of a first component.

FIGS. 144, 145, 146, and 147 are conceptual diagrams of further examples of non-symmetric padding.

In an example of S8002, if the chroma sample type is equal to 4 or 5 and the virtual boundary is between C0 and C2 as shown in (a) of FIG. 144, the reconstructed sample value of a second sample (C2) is duplicated to the first sample (C0).

In another example of S8002, if the chroma sample type is equal to 4 or 5 and the virtual boundary is between C15 and C17 as shown in (b) of FIG. 144, the reconstructed sample values of second samples (C5, C6 and C7) are duplicated to the first samples (C0, C1, C2 and C3). Similarly, the reconstructed sample value of a second sample (C15) is duplicated to the first sample (C17).

In another example of S8002, if the chroma sample type is equal to 4 or 5 and the virtual boundary is between C2 and C6 as shown in (c) of FIG. 144, the reconstructed sample value of a second sample (C15) is duplicated to the first sample (C17). Similarly, the reconstructed sample values of second samples (C5, C6 and C7) are duplicated to the first samples (C0, C1, C2 and C3).

In another example of S8002, if the chroma sample type is equal to 4 or 5 and the virtual boundary is between C11 and C15 as shown in (d) of FIG. 144, the reconstructed sample values of second samples (C9, C10, C11, C12 and C13) are duplicated to the first samples (C0, C1, C2, C3, C4, C5, C6, C7 and C8).

FIGS. 145, 146, and 147 show examples of samples, which are duplicated in (b) of FIG. 144, (c) of FIG. 144, and (d) of FIG. 144, respectively.

After duplicating, the duplicated samples are used in the filtering of the reconstructed samples of a first component.

FIGS. 148, 149, and 150 are conceptual diagrams of further examples of symmetric padding.

In an example of S8002, if the chroma sample type is equal to 0, 2 or 4 and the virtual boundary is between C4 and C5 as shown in (a) of FIG. 148, the reconstructed sample values of second samples (C7 and C12) are duplicated to the first samples (C8 and C13). Similarly, the reconstructed sample values of second samples (C5 and C10) are duplicated to the first samples (C4 and C9).

In another example of S8002, if the chroma sample type is equal to 0, 2 or 4 and the virtual boundary is between C7 and C8 as shown in (b) of FIG. 148, the reconstructed sample values of second samples (C5 and C10) are duplicated to the first samples (C4 and C9). Similarly, the reconstructed sample values of second samples (C7 and C12) are duplicated to the first samples (C8 and C13).

In another example of S8002, if the chroma sample type is equal to 0, 2 or 4 and the virtual boundary is between C5 and C6 as shown in (c) of FIG. 148, the reconstructed sample values of second samples (C2, C6, C11 and C15) are duplicated to the first samples (C1, C4, C5, C9, C10 and C14). Similarly, the reconstructed sample values of second samples (C2, C6, C11 and C15) are duplicated to the first samples (C3, C7, C8, C12, C13 and C16).

In another example of S8002, if the chroma sample type is equal to 0, 2 or 4 and the virtual boundary is between C6 and C7 as shown in (d) of FIG. 148, the reconstructed sample values of second samples (C2, C6, C11 and C15) are duplicated to the first samples (C1, C4, C5, C9, C10 and C14). Similarly, the reconstructed sample values of second samples (C2, C6, C11 and C15) are duplicated to the first samples (C3, C7, C8, C12, C13 and C16).

FIG. 149 and FIG. 150 show examples of samples which are duplicated in (a) of FIG. 148 and (c) of FIG. 148, respectively.

After duplicating, the duplicated samples are used in the filtering of the reconstructed samples of a first component.

FIGS. 151, 152, 153, 154, and 155 are conceptual diagrams of further examples of non-symmetric padding.

In an example of S8002, if the chroma sample type is equal to 1, 3 or 5 and the virtual boundary is between C4 and C5 as shown in (a) of FIG. 151, the reconstructed sample values of second samples (C5 and C10) are duplicated to the first samples (C4 and C9).

In another example of S8002, if the chroma sample type is equal to 1, 3 or 5 and the virtual boundary is between C7 and C8 as shown in (b) of FIG. 151, the reconstructed sample values of second samples (C2, C6, C11 and C15) are duplicated to the first samples (C1, C4, C5, C9, C10 and C14). Similarly, the reconstructed sample values of second samples (C7 and C12) are duplicated to the first samples (C8 and C13).

In another example of S8002, if the chroma sample type is equal to 1, 3 or 5 and the virtual boundary is between C5 and C6 as shown in (c) of FIG. 151, the reconstructed sample values of second samples (C7 and C12) are duplicated to the first samples (C8 and C13). Similarly, the reconstructed sample values of second samples (C2, C6, C11 and C15) are duplicated to the first samples (C1, C4, C5, C9, C10 and C14).

FIGS. 152, 153 and 154 show examples of samples, which are duplicated in (a) of FIG. 151, (b) of FIG. 151, and (c) of FIG. 151, respectively.

FIG. 155 shows further examples of padding with a horizontal and vertical virtual boundary.

After duplicating, the duplicated samples are used in the filtering of the reconstructed samples of a first component.

The present disclosure illustrates padding or duplicating samples used in a filter based on the chroma sample type and the virtual boundary location in the filter. Such method of padding or duplicating samples improves picture quality.

Variations

The chroma sample type can be replaced with another information, which indicates the relationship between the first component and another component different from the first component.

The chroma sample type can be replaced with a flag, which selects symmetric or non-symmetric padding at the virtual boundary, where 0 selects symmetric padding and 1 selects non-symmetric padding, or 1 selects symmetric padding and 0 selects non-symmetric padding.

The flag may be signaled from the bitstream or may be derived.

A default value of the flag may be symmetric padding at the virtual boundary.

A default value of the flag may be non-symmetric padding at the virtual boundary.

For example, the flag may be derived based on other filter's on/off status. For example, if an ALF filter is on, the flag may select symmetric padding. If an ALF filter is off, the flag may select non-symmetric padding.

As another example, if an ALF filter is on, the flag may select non-symmetric padding. If an ALF filter is off, the flag may select symmetric padding.

Other filters which can be used include LMCS, SAO, DBF, and other post-filters.

In some embodiments, the flag may be set based on a profile.

The virtual boundary can be replaced with a picture, slice, brick, tile, or subpicture boundary.

FIG. 156 is a block diagram illustrating a configuration of an encoder and a decoder according to an example where symmetric padding is used on virtual boundary locations for an ALF, and either symmetric or non-symmetric padding is used on virtual boundary locations for a CC-ALF based on a chroma sample type and a virtual boundary location.

FIG. 157 is a block diagram illustrating a configuration of an encoder and a decoder according to another example where symmetric padding is used on virtual boundary locations for an ALF and single-side padding is used on virtual boundary locations for a CC-ALF.

FIG. 158 is a conceptual diagram illustrating an example of single-side padding with either a horizontal or vertical virtual boundary.

FIG. 159 is a conceptual diagram illustrating an example of single-side padding with a horizontal and vertical virtual boundary.

The input to a CCALF (reconstructed samples of a first component used for filtering) is not restricted to an SAO output. The input can be from output of luma mapping with chroma scaling (LMCS), bilateral/hadamard, or deblocking filter or any post-filter combinations.

CCALF may be switched on/off at each block. A block need not overlap between more than one CTU. Since ALF may be switched on/off at CTU, CCALF can be switched on for CTU in which ALF is on.

One or more of the aspects disclosed herein may be performed in combination with at least part of the other aspects in the present disclosure. In addition, one or more of the aspects disclosed herein may be performed by combining, with other aspects, part of the processes indicated in any of the flow charts according to the aspects, part of the configuration of any of the devices, part of syntaxes, etc. Aspects described with reference to a constituent element of an encoder may be performed similarly by a corresponding constituent element of a decoder.

Implementations and Applications

As described in each of the above embodiments, each functional or operational block may typically be realized as an MPU (micro processing unit) and memory, for example. Moreover, processes performed by each of the functional blocks may be realized as a program execution unit, such as a processor which reads and executes software (a program) recorded on a recording medium such as ROM. The software may be distributed. The software may be recorded on a variety of recording media such as semiconductor memory. Note that each functional block can also be realized as hardware (dedicated circuit). Various combinations of hardware and software may be employed.

The processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments will be described, as well as various systems that implement the application examples. Such a system may be characterized as including an image encoder that employs the image encoding method, an image decoder that employs the image decoding method, or an image encoder-decoder that includes both the image encoder and the image decoder. Other configurations of such a system may be modified on a case-by-case basis.

Usage Examples

FIG. 160 illustrates an overall configuration of content providing system ex100 suitable for implementing a content distribution service. The area in which the communication service is provided is divided into cells of desired sizes, and base stations ex106, ex107, ex108, ex109, and ex110, which are fixed wireless stations in the illustrated example, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above devices. In various implementations, the devices may be directly or indirectly connected together via a telephone network or near field communication, rather than via base stations ex106 through ex110. Further, streaming server ex103 may be connected to devices including computer ex111, gaming device ex112, camera ex113, home appliance ex114, and smartphone ex115 via, for example, internet ex101. Streaming server ex103 may also be connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 may be a device capable of capturing still images and video, such as a digital camera. Smartphone ex115 may be a smartphone device, cellular phone, or personal handy-phone system (PHS) phone that can operate under the mobile communications system standards of the 2G, 3G, 3.9G, and 4G systems, as well as the next-generation 5G system.

Home appliance ex114 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or a terminal in airplane ex117) may perform the encoding processing described in the above embodiments on still-image or video content captured by a user via the terminal, may multiplex video data obtained via the encoding and audio data obtained by encoding audio corresponding to the video, and may transmit the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data may decode and reproduce the received data. In other words, the devices may each function as the image decoder, according to one aspect of the present disclosure.

(Decentralized Processing)

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client may be dynamically assigned to the client. Content is cached and streamed to the edge server to reduce load times. In the event of, for example, some type of error or change in connectivity due, for example, to a spike in traffic, it is possible to stream data stably at high speeds, since it is possible to avoid affected parts of the network by, for example, dividing the processing between a plurality of edge servers, or switching the streaming duties to a different edge server and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount (an amount of features or characteristics) from an image, compresses data related to the feature amount as metadata, and transmits the compressed metadata to a server. For example, the server determines the significance of an object based on the feature amount, and changes the quantization accuracy accordingly to perform compression suitable for the meaning (or content significance) of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos, and the server, on a per-unit basis. The units may be, for example, groups of pictures (GOP), pictures, or tiles resulting from dividing a picture. This makes it possible to reduce load times and achieve streaming that is closer to real time.

Since the videos are of approximately the same scene, management and/or instructions may be carried out by the server so that the videos captured by the terminals can be cross-referenced. Moreover, the server may receive encoded data from the terminals, change the reference relationship between items of data, or correct or replace pictures themselves, and then perform the encoding. This makes it possible to generate a stream with increased quality and efficiency for the individual items of data.

Furthermore, the server may stream video data after performing transcoding to convert the encoding format of the video data. For example, the server may convert the encoding format from MPEG to VP (e.g., VP9), may convert H.264 to H.265, etc.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

(3D, Multi-Angle)

There has been an increase in usage of images or videos combined from images or videos of different scenes concurrently captured, or of the same scene captured from different angles, by a plurality of terminals such as camera ex113 and/or smartphone ex115. Videos captured by the terminals may be combined based on, for example, the separately obtained relative positional relationship between the terminals, or regions in a video having matching feature points.

In addition to the encoding of two-dimensional moving pictures, the server may encode a still image based on scene analysis of a moving picture, for example automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. The server may separately encode three-dimensional data generated from, for example, a point cloud and, based on a result of recognizing or tracking a person or object using three-dimensional data, may select or reconstruct and generate a video to be transmitted to a reception terminal, from videos captured by a plurality of terminals.

This allows the user to enjoy a scene by freely selecting videos corresponding to the video capturing terminals, and allows the user to enjoy the content obtained by extracting a video at a selected viewpoint from three-dimensional data reconstructed from a plurality of images or videos. Furthermore, as with video, sound may be recorded from relatively different angles, and the server may multiplex audio from a specific angle or space with the corresponding video, and transmit the multiplexed video and audio.

In recent years, content that is a composite of the real world and a virtual world, such as virtual reality (VR) and augmented reality (AR) content, has also become popular. In the case of VR images, the server may create images from the viewpoints of both the left and right eyes, and perform encoding that tolerates reference between the two viewpoint images, such as multi-view coding (MVC), and, alternatively, may encode the images as separate streams without referencing. When the images are decoded as separate streams, the streams may be synchronized when reproduced, so as to recreate a virtual three-dimensional space in accordance with the viewpoint of the user.

In the case of AR images, the server may superimpose virtual object information existing in a virtual space onto camera information representing a real-world space, for example based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information. The server may generate superimposed data based on three-dimensional data stored in the server in accordance with the received motion, and encode and stream the generated superimposed data to the decoder. Note that superimposed data typically includes, in addition to RGB values, an $\alpha$ value indicating transparency, and the server sets the $\alpha$ value for sections other than the object generated from three-dimensional data to, for example, 0, and may perform the encoding while those sections are transparent. Alternatively, the server may set the background to a determined RGB value, such as a chroma key, and generate data in which areas other than the object are set as the background. The determined RGB value may be predetermined.

Decoding of similarly streamed data may be performed by the client (e.g., the terminals), on the server side, or be divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area, or inspect a region in further detail up close.

In situations in which a plurality of wireless connections are possible over near, mid, and far distances, indoors or outdoors, it may be possible to seamlessly receive content using a streaming system standard such as MPEG Dynamic Adaptive Streaming over HTTP (MPEG-DASH). The user may switch between data in real time while freely selecting a decoder or display apparatus including the user's terminal, displays arranged indoors or outdoors, etc. Moreover, using, for example, information on the position of the user, decoding can be performed while switching which terminal handles decoding and which terminal handles the displaying of content. This makes it possible to map and display information, while the user is on the move in route to a destination, on the wall of a nearby building in which a device capable of displaying content is embedded, or on part of the ground. Moreover, it is also possible to switch the bit rate of the received data based on the accessibility to the encoded data on a network, such as when encoded data is cached on a server quickly accessible from the reception terminal, or when encoded data is copied to an edge server in a content delivery service.

(Web Page Optimization)

FIG. 161 illustrates an example of a display screen of a web page on computer ex111, for example. FIG. 162 illustrates an example of a display screen of a web page on smartphone ex115, for example. As illustrated in FIG. 161 and FIG. 162, a web page may include a plurality of image links that are links to image content, and the appearance of the web page may differ depending on the device used to view the web page. When a plurality of image links are viewable on the screen, until the user explicitly selects an image link, or until the image link is in the approximate center of the screen or the entire image link fits in the screen, the display apparatus (decoder) may display, as the image links, still images included in the content or I pictures; may display video such as an animated gif using a plurality of still images or I pictures; or may receive only the base layer, and decode and display the video.

When an image link is selected by the user, the display apparatus performs decoding while, for example, giving the highest priority to the base layer. Note that if there is information in the Hyper Text Markup Language (HTML) code of the web page indicating that the content is scalable, the display apparatus may decode up to the enhancement layer. Further, in order to facilitate real-time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Still further, the display apparatus may purposely ignore the reference relationship between pictures, and coarsely decode all B and P pictures as forward reference pictures, and then perform normal decoding as the number of pictures received over time increases.

(Autonomous Driving)

When transmitting and receiving still image or video data such as two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., containing the reception terminal is mobile, the reception terminal may seamlessly receive and perform decoding while switching between base stations among base stations ex106 through ex110 by transmitting information indicating the position of the reception terminal. Moreover, in accordance with the selection made by the user, the situation of the user, and/or the bandwidth of the connection, the reception terminal may dynamically select to what extent the metadata is received, or to what extent the map information, for example, is updated.

In content providing system ex100, the client may receive, decode, and reproduce, in real time, encoded information transmitted by the user.

(Streaming of Individual Content)

In content providing system ex100, in addition to high image quality, long content distributed by a video distribution entity, unicast or multicast streaming of low image quality, and short content from an individual are also possible. Such content from individuals is likely to further increase in popularity. The server may first perform editing processing on the content before the encoding processing, in order to refine the individual content. This may be achieved using the following configuration, for example.

In real time while capturing video or image content, or after the content has been captured and accumulated, the server performs recognition processing based on the raw data or encoded data, such as capture error processing, scene search processing, meaning analysis, and/or object detection processing. Then, based on the result of the recognition processing, the server—for example when prompted or automatically—edits the content, examples of which include: correction such as focus and/or motion blur correction; removing low-priority scenes such as scenes that are low in brightness compared to other pictures, or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement, based on an image processing result. Alternatively, the server may generate and encode a video digest based on a result of an analysis of the meaning of a scene.

There may be instances in which individual content may include content that infringes a copyright, moral right, portrait rights, etc. Such instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Further, the server may be configured to recognize the faces of people other than a registered person in images to be encoded, and when such faces appear in an image, may apply a mosaic filter, for example, to the face of the person. Alternatively, as pre- or post-processing for encoding, the user may specify, for copyright reasons, a region of an image including a person or a region of the background to be processed. The server may process the specified region by, for example, replacing the region with a different image, or blurring the region. If the region includes a person, the person may be tracked in the moving picture, and the person's head region may be replaced with another image as the person moves.

Since there is a demand for real-time viewing of content produced by individuals, which tends to be small in data size, the decoder may first receive the base layer as the highest priority, and perform decoding and reproduction, although this may differ depending on bandwidth. When the content is reproduced two or more times, such as when the decoder receives the enhancement layer during decoding and reproduction of the base layer, and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

Other Implementation and Application Examples

The encoding and decoding may be performed by LSI (large scale integration circuitry) ex500 (see FIG. 160), which is typically included in each terminal. LSI ex500 may be configured from a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data may be coded by LSI ex500 included in smartphone ex115.

Note that LSI ex500 may be configured to download and activate an application. In such a case, the terminal first determines whether it is compatible with the scheme used to encode the content, or whether it is capable of executing a specific service. When the terminal is not compatible with the encoding scheme of the content, or when the terminal is not capable of executing a specific service, the terminal may first download a codec or application software and then obtain and reproduce the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast, whereas unicast is easier with content providing system ex100.

(Hardware Configuration)

FIG. 163 illustrates further details of an example smartphone ex115 shown in FIG. 160. FIG. 164 illustrates a configuration example of a smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel; audio output unit ex457 such as a speaker for outputting speech or other audio; audio input unit ex456 such as a microphone for audio input; memory ex467 capable of storing decoded data such as captured video or still images, recorded audio, received video or still images, and mail, as well as decoded data; and slot ex464 which is an interface for Subscriber Identity Module (SIM) ex468 for authorizing access to a network and various data. Note that external memory may be used instead of or in addition to memory ex467.

Main controller ex460, which may comprehensively control display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns on the power button of power supply circuit ex461, smartphone ex115 is powered on into an operable state, and each component is supplied with power, for example, from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, to which spread spectrum processing is applied by modulator/demodulator ex452 and digital-analog conversion, and frequency conversion processing is applied by transmitter/receiver ex451, and the resulting signal is transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457.

In data transmission mode, text, still-image, or video data may be transmitted under control of main controller ex460 via user interface input controller ex462 based on operation of user interface ex466 of the main body, for example. Similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Audio signal processor ex454 encodes an audio signal recorded by audio input unit ex456 while camera ex465 is capturing a video or still image, and transmits the encoded audio data to multiplexer/demultiplexer ex453. Multiplexer/demultiplexer ex453 multiplexes the encoded video data and encoded audio data using a determined scheme, modulates and converts the data using modulator/demodulator (modulator/demodulator circuit) ex452 and transmitter/receiver ex451, and transmits the result via antenna ex450. The determined scheme may be predetermined.

When video appended in an email or a chat, or a video linked from a web page, is received, for example, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Audio signal processor ex454 decodes the audio signal and outputs audio from audio output unit ex457. Since real-time streaming is becoming increasingly popular, there may be instances in which reproduction of the audio may be socially inappropriate, depending on the user's environment. Accordingly, as an initial value, a configuration in which only video data is reproduced, e.g., the audio signal is not reproduced, may be preferable; audio may be synchronized and reproduced only when an input, such as when the user clicks video data, is received.

Although smartphone ex115 was used in the above example, other implementations are conceivable: a transceiver terminal including both an encoder and a decoder; a transmitter terminal including only an encoder; and a receiver terminal including only a decoder. In the description of the digital broadcasting system, an example is given in which multiplexed data obtained as a result of video data being multiplexed with audio data is received or transmitted. The multiplexed data, however, may be video data multiplexed with data other than audio data, such as text data related to the video. Further, the video data itself rather than multiplexed data may be received or transmitted.

Although main controller ex460 including a CPU is described as controlling the encoding or decoding processes, various terminals often include graphics processing units (GPUs). Accordingly, a configuration is acceptable in which a large area is processed at once by making use of the performance ability of the GPU via memory shared by the CPU and GPU, or memory including an address that is managed so as to allow common usage by the CPU and GPU, or via separate memories. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of pictures, for example, all at once.

The invention claimed is:

1. A non-transitory computer readable medium storing a bitstream containing information according to which an encoder performs an encoding process, wherein in the encoding process:

a first coefficient value is generated by applying a CCALF (cross component adaptive loop filtering) process to a first reconstructed image sample of a luma component;

the first coefficient value is clipped to be within a range of $-2^7$ to $2^7-1$;

the clipped first coefficient value is set to zero in response to the first coefficient value being less than 64;

a second coefficient value is generated by applying an ALF (adaptive loop filtering) process to a second reconstructed image sample of a chroma component;

the second coefficient value is clipped;

a third coefficient value is generated by adding the clipped first coefficient value to the clipped second coefficient value;

the third coefficient value is clipped; and a third reconstructed image sample of the chroma component is encoded using the clipped third coefficient value.

2. A non-transitory computer readable medium storing a bitstream containing information according to which a decoder performs a decoding process, wherein in the decoding process:

a first coefficient value is generated by applying a CCALF (cross component adaptive loop filtering) process to a first reconstructed image sample of a luma component;

the first coefficient value is clipped to be within a range of $-2^7$ to $2^7-1$;

the clipped first coefficient value is set to zero in response to the first coefficient value being less than 64;

a second coefficient value is generated by applying an ALF (adaptive loop filtering) process to a second reconstructed image sample of a chroma component;

the second coefficient value is clipped;

a third coefficient value is generated by adding the clipped first coefficient value to the clipped second coefficient value;

the third coefficient value is clipped; and a third reconstructed image sample of the chroma component is decoded using the clipped third coefficient value.

* * * * *